US012447014B2

(12) United States Patent
Burkart et al.

(10) Patent No.: US 12,447,014 B2
(45) Date of Patent: *Oct. 21, 2025

(54) VALVE WITH MULTI-PART FRAME AND ASSOCIATED RESILIENT BRIDGING FEATURES

(71) Applicant: EDWARDS LIFESCIENCES CORPORATION, Irvine, CA (US)

(72) Inventors: Dustin C. Burkart, Bellemont, AZ (US); Cody L. Hartman, Flagstaff, AZ (US); Roy Manygoats, Jr., Flagstaff, AZ (US); Ryan S. Titone, Flagstaff, AZ (US)

(73) Assignee: EDWARDS LIFESCIENCES CORPORATION, Irvine, CA (US)

( * ) Notice: Subject to any disclaimer, the term of this patent is extended or adjusted under 35 U.S.C. 154(b) by 789 days.

This patent is subject to a terminal disclaimer.

(21) Appl. No.: 17/603,256

(22) PCT Filed: Apr. 13, 2020

(86) PCT No.: PCT/US2020/027921
§ 371 (c)(1),
(2) Date: Oct. 12, 2021

(87) PCT Pub. No.: WO2020/210794
PCT Pub. Date: Oct. 15, 2020

(65) Prior Publication Data
US 2022/0183831 A1 Jun. 16, 2022

Related U.S. Application Data

(60) Provisional application No. 62/833,176, filed on Apr. 12, 2019.

(51) Int. Cl.
*A61F 2/24* (2006.01)

(52) U.S. Cl.
CPC ............. *A61F 2/2418* (2013.01); *A61F 2/24* (2013.01); *A61F 2210/0057* (2013.01);
(Continued)

(58) Field of Classification Search
CPC .... A61F 2/24; A61F 2/2418; A61F 2250/001; A61F 2250/0039; A61F 2250/0069;
(Continued)

(56) References Cited

U.S. PATENT DOCUMENTS

| 654,799 A | 7/1900 | Levett |
| 3,409,013 A | 11/1968 | Berry |

(Continued)

FOREIGN PATENT DOCUMENTS

| AU | 2013363172 A1 | 7/2015 |
| AU | 2017202405 A1 | 4/2017 |

(Continued)

OTHER PUBLICATIONS

Forward citations for E12 obtained from: https://scholar.google.com/scholar?cites=5981833429320176658&assdt=2005&sciodt=0,5&hl= en.
(Continued)

*Primary Examiner* — Dinah Baria
(74) *Attorney, Agent, or Firm* — Thomas C. Richardson

(57) ABSTRACT

Concepts disclosed relate to multi-frame prosthetic valves including leaflet and anchor frame subcomponents, where the leaflet frame subcomponent does not directly couple with patient anatomy and is separated from the anchor frame subcomponent by a gap/space. An optional connecting sheath may be provided to interconnect the subcomponents and assist with prosthetic valve delivery and deployment. One or more bridging members, or annular groove covers, are provided to bridge and cover gap or space between the anchor frame subcomponent and leaflet frame subcompo-
(Continued)

nent, such as at the inflow and/or outflow ends of the subcomponents. Such bridging/cover features may provide smoother flow profiles, reduce incidence of complications, facilitate perfusion during delivery, assist with device nesting during delivery, assist with relative subcomponent positioning following delivery, or provide any of a variety of additional or alternative functions and advantages.

39 Claims, 45 Drawing Sheets

(52) U.S. Cl.
CPC . *A61F 2250/001* (2013.01); *A61F 2250/0039* (2013.01); *A61F 2250/0063* (2013.01); *A61F 2250/0069* (2013.01)

(58) Field of Classification Search
CPC ...... A61F 2250/0063; A61F 2250/0065; A61F 2210/0057
See application file for complete search history.

(56) References Cited

U.S. PATENT DOCUMENTS

| | | |
|---|---|---|
| 3,472,230 A | 10/1969 | Fogarty |
| 3,548,417 A | 12/1970 | Kisher |
| 3,587,115 A | 6/1971 | Shiley |
| 3,657,744 A | 4/1972 | Ersek |
| 3,671,979 A | 6/1972 | Moulopoulos |
| 3,714,671 A | 2/1973 | Edwards et al. |
| 3,739,402 A | 6/1973 | Kahn et al. |
| 3,755,823 A | 9/1973 | Hancock |
| 3,953,566 A | 4/1976 | Gore |
| 4,011,947 A | 3/1977 | Sawyer |
| 4,035,849 A | 7/1977 | Angell et al. |
| 4,056,854 A | 11/1977 | Boretos et al. |
| 4,079,468 A | 3/1978 | Liotta et al. |
| 4,106,129 A | 8/1978 | Carpentier et al. |
| 4,178,639 A | 12/1979 | Bokros |
| 4,187,390 A | 2/1980 | Gore |
| 4,204,283 A | 5/1980 | Bellhouse et al. |
| 4,222,126 A | 9/1980 | Boretos et al. |
| 4,265,694 A | 5/1981 | Boretos et al. |
| 4,297,749 A | 11/1981 | Davis et al. |
| 4,332,035 A | 6/1982 | Mano |
| 4,339,831 A | 7/1982 | Johnson |
| 4,340,091 A | 7/1982 | Skelton et al. |
| 4,340,977 A | 7/1982 | Brownlee et al. |
| 4,343,048 A | 8/1982 | Ross et al. |
| 4,345,340 A | 8/1982 | Rosen |
| 4,373,216 A | 2/1983 | Klawitter |
| 4,406,022 A | 9/1983 | Roy |
| 4,470,157 A | 9/1984 | Love |
| 4,477,930 A | 10/1984 | Totten et al. |
| 4,490,859 A | 1/1985 | Black et al. |
| 4,535,483 A | 8/1985 | Klawitter et al. |
| 4,553,545 A | 11/1985 | Maass et al. |
| 4,556,996 A | 12/1985 | Wallace |
| 4,574,803 A | 3/1986 | Storz |
| 4,592,340 A | 6/1986 | Boyles |
| 4,605,407 A | 8/1986 | Black et al. |
| 4,612,011 A | 9/1986 | Kautzky |
| 4,626,255 A | 12/1986 | Reichart et al. |
| 4,643,732 A | 2/1987 | Pietsch et al. |
| 4,655,771 A | 4/1987 | Wallsten |
| 4,692,164 A | 9/1987 | Dzemeshkevich et al. |
| 4,733,665 A | 3/1988 | Palmaz |
| 4,759,758 A | 7/1988 | Gabbay |
| 4,759,759 A | 7/1988 | Walker et al. |
| 4,762,128 A | 8/1988 | Rosenbluth |
| 4,777,951 A | 10/1988 | Cribier et al. |
| 4,787,899 A | 11/1988 | Lazarus |
| 4,787,901 A | 11/1988 | Baykut |
| 4,796,629 A | 1/1989 | Grayzel |
| 4,829,990 A | 5/1989 | Thuroff et al. |
| 4,851,000 A | 7/1989 | Gupta |
| 4,851,001 A | 7/1989 | Taheri |
| 4,856,516 A | 8/1989 | Hillstead |
| 4,865,600 A | 9/1989 | Carpentier et al. |
| 4,877,661 A | 10/1989 | House et al. |
| 4,878,495 A | 11/1989 | Grayzel |
| 4,878,906 A | 11/1989 | Lindemann et al. |
| 4,883,458 A | 11/1989 | Shiber |
| 4,922,905 A | 5/1990 | Strecker |
| 4,955,899 A | 9/1990 | Della et al. |
| 4,966,604 A | 10/1990 | Reiss |
| 4,979,939 A | 12/1990 | Shiber |
| 4,986,830 A | 1/1991 | Owens et al. |
| 4,994,077 A | 2/1991 | Dobben |
| 5,007,896 A | 4/1991 | Shiber |
| 5,026,366 A | 6/1991 | Leckrone |
| 5,026,513 A | 6/1991 | House et al. |
| 5,032,128 A | 7/1991 | Alonso |
| 5,037,434 A | 8/1991 | Lane |
| 5,047,041 A | 9/1991 | Samuels |
| 5,059,177 A | 10/1991 | Towne et al. |
| 5,064,435 A | 11/1991 | Porter |
| 5,071,609 A | 12/1991 | Tu et al. |
| 5,080,668 A | 1/1992 | Bolz et al. |
| 5,085,635 A | 2/1992 | Cragg |
| 5,089,015 A | 2/1992 | Ross |
| 5,108,370 A | 4/1992 | Walinsky |
| 5,123,918 A | 6/1992 | Perrier et al. |
| 5,152,771 A | 10/1992 | Sabbaghian et al. |
| 5,163,953 A | 11/1992 | Vince |
| 5,163,955 A | 11/1992 | Love et al. |
| 5,167,628 A | 12/1992 | Boyles |
| 5,192,297 A | 3/1993 | Hull |
| 5,232,446 A | 8/1993 | Arney |
| 5,266,073 A | 11/1993 | Wall |
| 5,282,847 A | 2/1994 | Trescony et al. |
| 5,295,958 A | 3/1994 | Shturman |
| 5,326,371 A | 7/1994 | Love et al. |
| 5,332,402 A | 7/1994 | Teitelbaum |
| 5,360,444 A | 11/1994 | Kusuhara |
| 5,370,685 A | 12/1994 | Stevens |
| 5,397,351 A | 3/1995 | Pavcnik et al. |
| 5,411,055 A | 5/1995 | Kane |
| 5,411,522 A | 5/1995 | Trott |
| 5,411,552 A | 5/1995 | Andersen et al. |
| 5,415,667 A | 5/1995 | Frater |
| 5,443,446 A | 8/1995 | Shturman |
| 5,469,868 A | 11/1995 | Reger |
| 5,476,589 A | 12/1995 | Bacino |
| 5,480,424 A | 1/1996 | Cox |
| 5,489,297 A | 2/1996 | Duran |
| 5,500,014 A | 3/1996 | Quijano et al. |
| 5,534,007 A | 7/1996 | St et al. |
| 5,545,209 A | 8/1996 | Roberts et al. |
| 5,545,214 A | 8/1996 | Stevens |
| 5,549,663 A | 8/1996 | Cottone, Jr. |
| 5,549,665 A | 8/1996 | Vesely et al. |
| 5,554,183 A | 9/1996 | Nazari |
| 5,554,185 A | 9/1996 | Block et al. |
| 5,562,729 A | 10/1996 | Purdy |
| 5,571,175 A | 11/1996 | Vanney et al. |
| 5,591,185 A | 1/1997 | Kilmer et al. |
| 5,599,305 A | 2/1997 | Hermann et al. |
| 5,607,464 A | 3/1997 | Trescony et al. |
| 5,609,626 A | 3/1997 | Quijano et al. |
| 5,628,791 A | 5/1997 | Bokros et al. |
| 5,639,274 A | 6/1997 | Fischell et al. |
| 5,665,115 A | 9/1997 | Cragg |
| 5,673,102 A | 9/1997 | Suzuki et al. |
| 5,697,382 A | 12/1997 | Love et al. |
| 5,708,044 A | 1/1998 | Branca |
| 5,716,417 A | 2/1998 | Girard et al. |
| 5,718,973 A | 2/1998 | Lewis et al. |
| 5,728,068 A | 3/1998 | Leone et al. |
| 5,749,852 A | 5/1998 | Schwab et al. |
| 5,749,890 A | 5/1998 | Shaknovich |
| 5,752,934 A | 5/1998 | Campbell et al. |

(56) References Cited

U.S. PATENT DOCUMENTS

| | | |
|---|---|---|
| 5,756,476 A | 5/1998 | Epstein et al. |
| 5,759,192 A | 6/1998 | Saunders |
| 5,769,812 A | 6/1998 | Stevens et al. |
| 5,769,884 A | 6/1998 | Solovay |
| 5,772,884 A | 6/1998 | Tanaka et al. |
| 5,788,626 A | 8/1998 | Thompson |
| 5,800,508 A | 9/1998 | Goicoechea et al. |
| 5,814,405 A | 9/1998 | Branca et al. |
| 5,824,043 A | 10/1998 | Cottone, Jr. |
| 5,840,081 A | 11/1998 | Andersen et al. |
| 5,843,158 A | 12/1998 | Lenker et al. |
| 5,843,161 A | 12/1998 | Solovay |
| 5,843,171 A | 12/1998 | Campbell et al. |
| 5,853,419 A | 12/1998 | Imran |
| 5,855,597 A | 1/1999 | Jayaraman |
| 5,855,601 A | 1/1999 | Bessler et al. |
| 5,855,602 A | 1/1999 | Angell |
| 5,906,619 A | 5/1999 | Olson et al. |
| 5,925,061 A | 7/1999 | Ogi et al. |
| 5,925,063 A | 7/1999 | Khosravi |
| 5,928,281 A | 7/1999 | Huynh et al. |
| 5,935,162 A | 8/1999 | Dang |
| 5,935,163 A | 8/1999 | Gabbay |
| 5,944,654 A | 8/1999 | Crawford |
| 5,957,949 A | 9/1999 | Leonhardt et al. |
| 5,957,974 A | 9/1999 | Thompson et al. |
| 5,968,068 A | 10/1999 | Dehdashtian et al. |
| 6,010,529 A | 1/2000 | Herweck et al. |
| 6,013,854 A | 1/2000 | Moriuchi |
| 6,019,785 A | 2/2000 | Strecker |
| 6,027,525 A | 2/2000 | Suh et al. |
| 6,042,588 A | 3/2000 | Munsinger et al. |
| 6,042,605 A | 3/2000 | Martin et al. |
| 6,042,606 A | 3/2000 | Frantzen |
| 6,042,607 A | 3/2000 | Williamson, IV et al. |
| 6,086,612 A | 7/2000 | Jansen |
| 6,110,198 A | 8/2000 | Fogarty et al. |
| 6,113,631 A | 9/2000 | Jansen |
| 6,117,169 A | 9/2000 | Moe |
| 6,129,758 A | 10/2000 | Love |
| 6,132,473 A | 10/2000 | Williams et al. |
| 6,161,399 A | 12/2000 | Jayaraman |
| 6,165,211 A | 12/2000 | Thompson |
| 6,168,614 B1 | 1/2001 | Andersen et al. |
| 6,171,335 B1 | 1/2001 | Wheatley et al. |
| 6,174,327 B1 | 1/2001 | Mertens et al. |
| 6,174,329 B1 | 1/2001 | Callol et al. |
| 6,174,331 B1 | 1/2001 | Moe et al. |
| 6,190,406 B1 | 2/2001 | Duerig et al. |
| 6,197,143 B1 | 3/2001 | Bodnar |
| 6,210,408 B1 | 4/2001 | Chandrasekaran et al. |
| 6,217,585 B1 | 4/2001 | Houser et al. |
| 6,217,609 B1 | 4/2001 | Haverkost |
| 6,221,091 B1 | 4/2001 | Khosravi |
| 6,231,602 B1 | 5/2001 | Carpentier et al. |
| 6,245,012 B1 | 6/2001 | Kleshinski |
| 6,245,040 B1 | 6/2001 | Inderbitzen et al. |
| 6,245,102 B1 | 6/2001 | Jayaraman |
| 6,251,093 B1 | 6/2001 | Valley et al. |
| 6,261,320 B1 | 7/2001 | Tam et al. |
| 6,261,620 B1 | 7/2001 | Leadbeater |
| 6,283,994 B1 | 9/2001 | Moe et al. |
| 6,283,995 B1 | 9/2001 | Moe et al. |
| 6,287,334 B1 | 9/2001 | Moll et al. |
| 6,287,339 B1 | 9/2001 | Vazquez et al. |
| 6,299,637 B1 | 10/2001 | Shaolian et al. |
| 6,302,906 B1 | 10/2001 | Goecoechea et al. |
| 6,306,141 B1 | 10/2001 | Jervis |
| 6,312,465 B1 | 11/2001 | Griffin et al. |
| 6,328,763 B1 | 12/2001 | Love et al. |
| 6,334,873 B1 | 1/2002 | Lane et al. |
| 6,336,937 B1 | 1/2002 | Vonesh et al. |
| 6,338,740 B1 | 1/2002 | Carpentier |
| 6,350,277 B1 | 2/2002 | Kocur |
| 6,352,552 B1 | 3/2002 | Levinson et al. |
| 6,358,277 B1 | 3/2002 | Duran |
| 6,379,372 B1 | 4/2002 | Dehdashtian et al. |
| 6,379,382 B1 | 4/2002 | Jun |
| 6,425,916 B1 | 7/2002 | Garrison et al. |
| 6,436,132 B1 | 8/2002 | Patel et al. |
| 6,440,164 B1 | 8/2002 | Di Matteo et al. |
| 6,454,798 B1 | 9/2002 | Moe |
| 6,454,799 B1 | 9/2002 | Schreck |
| 6,458,153 B1 | 10/2002 | Bailey et al. |
| 6,461,382 B1 | 10/2002 | Cao |
| 6,461,665 B1 | 10/2002 | Scholander |
| 6,468,660 B2 | 10/2002 | Ogle et al. |
| 6,482,228 B1 | 11/2002 | Norred |
| 6,488,701 B1 | 12/2002 | Nolting et al. |
| 6,488,704 B1 | 12/2002 | Connelly et al. |
| 6,527,800 B1 | 3/2003 | McGuckin, Jr. et al. |
| 6,527,979 B2 | 3/2003 | Constantz |
| 6,540,782 B1 | 4/2003 | Snyders |
| 6,541,589 B1 | 4/2003 | Baillie |
| 6,558,418 B2 | 5/2003 | Carpentier et al. |
| 6,562,069 B2 | 5/2003 | Cai et al. |
| 6,569,196 B1 | 5/2003 | Vesely |
| 6,575,959 B1 | 6/2003 | Sarge et al. |
| 6,582,462 B1 | 6/2003 | Andersen et al. |
| 6,582,464 B2 | 6/2003 | Gabbay |
| 6,605,112 B1 | 8/2003 | Moll et al. |
| 6,610,088 B1 | 8/2003 | Gabbay |
| 6,613,086 B1 | 9/2003 | Moe et al. |
| 6,620,190 B1 | 9/2003 | Colone |
| 6,626,939 B1 | 9/2003 | Burnside et al. |
| 6,629,534 B1 | 10/2003 | Goar et al. |
| 6,645,244 B2 | 11/2003 | Shu et al. |
| 6,666,885 B2 | 12/2003 | Moe |
| 6,673,102 B1 | 1/2004 | Vonesh et al. |
| 6,673,107 B1 | 1/2004 | Brandt et al. |
| 6,676,698 B2 | 1/2004 | McGuckin, Jr. et al. |
| 6,695,878 B2 | 2/2004 | McGuckin, Jr. et al. |
| 6,712,836 B1 | 3/2004 | Berg et al. |
| 6,716,207 B2 | 4/2004 | Farnholtz |
| 6,726,715 B2 | 4/2004 | Sutherland |
| 6,729,356 B1 | 5/2004 | Baker et al. |
| 6,730,118 B2 | 5/2004 | Spenser et al. |
| 6,730,120 B2 | 5/2004 | Berg et al. |
| 6,733,525 B2 | 5/2004 | Yang et al. |
| 6,746,422 B1 | 6/2004 | Noriega et al. |
| 6,749,560 B1 | 6/2004 | Konstorum et al. |
| 6,755,856 B2 | 6/2004 | Fierens et al. |
| 6,755,857 B2 | 6/2004 | Peterson et al. |
| 6,758,858 B2 | 7/2004 | Mccrea et al. |
| 6,767,362 B2 | 7/2004 | Schreck |
| 6,780,200 B2 | 8/2004 | Jansen |
| 6,790,229 B1 | 9/2004 | Berreklouw |
| 6,790,230 B1 | 9/2004 | Beyersdorf et al. |
| 6,830,584 B1 | 12/2004 | Seguin |
| 6,875,231 B2 | 4/2005 | Anduiza et al. |
| 6,890,350 B1 | 5/2005 | Walak |
| 6,893,460 B2 | 5/2005 | Spenser et al. |
| 6,908,481 B2 | 6/2005 | Cribier |
| 6,916,338 B2 | 7/2005 | Speziali |
| 6,936,067 B2 | 8/2005 | Buchanan |
| 6,953,332 B1 | 10/2005 | Kurk et al. |
| 6,974,476 B2 | 12/2005 | McGuckin, Jr. et al. |
| 7,018,406 B2 | 3/2006 | Seguin et al. |
| 7,022,132 B2 | 4/2006 | Kocur |
| 7,049,380 B1 | 5/2006 | Chang et al. |
| 7,083,642 B2 | 8/2006 | Sirhan et al. |
| 7,105,018 B1 | 9/2006 | Yip et al. |
| 7,137,184 B2 | 11/2006 | Schreck |
| 7,163,556 B2 | 1/2007 | Xie et al. |
| 7,186,265 B2 | 3/2007 | Sharkawy et al. |
| 7,192,440 B2 | 3/2007 | Andreas et al. |
| 7,198,646 B2 | 4/2007 | Figulla et al. |
| 7,201,772 B2 | 4/2007 | Schwammenthal et al. |
| 7,238,200 B2 | 7/2007 | Lee et al. |
| 7,247,167 B2 | 7/2007 | Gabbay |
| 7,276,078 B2 | 10/2007 | Spenser et al. |
| 7,276,084 B2 | 10/2007 | Yang et al. |
| 7,306,729 B2 | 12/2007 | Bacino et al. |
| 7,318,278 B2 | 1/2008 | Zhang et al. |

(56) References Cited

U.S. PATENT DOCUMENTS

| | | | |
|---|---|---|---|
| 7,374,571 | B2 | 5/2008 | Pease et al. |
| 7,381,210 | B2 | 6/2008 | Zarbatany et al. |
| 7,381,218 | B2 | 6/2008 | Schreck |
| 7,381,219 | B2 | 6/2008 | Salahieh et al. |
| 7,393,360 | B2 | 7/2008 | Spenser et al. |
| 7,419,678 | B2 | 9/2008 | Falotico |
| 7,429,269 | B2 | 9/2008 | Schwammenthal et al. |
| 7,442,204 | B2 | 10/2008 | Schwammenthal et al. |
| 7,445,631 | B2 | 11/2008 | Salahieh et al. |
| 7,462,191 | B2 | 12/2008 | Spenser et al. |
| 7,462,675 | B2 | 12/2008 | Chang et al. |
| 7,510,575 | B2 | 3/2009 | Spenser et al. |
| 7,513,909 | B2 | 4/2009 | Lane et al. |
| 7,524,330 | B2 | 4/2009 | Berreklouw |
| 7,530,253 | B2 | 5/2009 | Spenser et al. |
| 7,531,611 | B2 | 5/2009 | Sabol et al. |
| 7,553,324 | B2 | 6/2009 | Andreas et al. |
| 7,563,277 | B2 | 7/2009 | Case et al. |
| 7,579,381 | B2 | 8/2009 | Dove |
| 7,585,321 | B2 | 9/2009 | Cribier |
| 7,618,446 | B2 | 11/2009 | Andersen et al. |
| 7,621,948 | B2 | 11/2009 | Herrmann et al. |
| 7,704,222 | B2 | 4/2010 | Wilk et al. |
| 7,708,775 | B2 | 5/2010 | Rowe et al. |
| 7,727,274 | B2 | 6/2010 | Zilla et al. |
| 7,736,327 | B2 | 6/2010 | Wilk et al. |
| 7,748,389 | B2 | 7/2010 | Salahieh et al. |
| 7,753,949 | B2 | 7/2010 | Lamphere et al. |
| 7,758,640 | B2 | 7/2010 | Vesely |
| 7,780,725 | B2 | 8/2010 | Haug et al. |
| 7,789,908 | B2 | 9/2010 | Sowinski et al. |
| 7,803,186 | B1 | 9/2010 | Li et al. |
| 7,806,919 | B2 | 10/2010 | Bloom et al. |
| 7,811,314 | B2 | 10/2010 | Fierens et al. |
| 7,815,763 | B2 | 10/2010 | Fierens et al. |
| 7,824,443 | B2 | 11/2010 | Salahieh et al. |
| 7,837,727 | B2 | 11/2010 | Goetz et al. |
| 7,879,085 | B2 | 2/2011 | Sowinski et al. |
| 7,887,562 | B2 | 2/2011 | Young et al. |
| 7,892,281 | B2 | 2/2011 | Seguin et al. |
| 7,914,569 | B2 | 3/2011 | Nguyen et al. |
| 7,914,575 | B2 | 3/2011 | Guyenot et al. |
| 7,927,364 | B2 | 4/2011 | Fierens et al. |
| 7,927,365 | B2 | 4/2011 | Fierens et al. |
| 7,935,141 | B2 | 5/2011 | Randall et al. |
| 7,959,672 | B2 | 6/2011 | Salahieh et al. |
| 7,967,829 | B2 | 6/2011 | Gunderson et al. |
| 7,967,853 | B2 | 6/2011 | Eidenschink et al. |
| 7,972,378 | B2 | 7/2011 | Tabor et al. |
| 7,981,151 | B2 | 7/2011 | Rowe |
| 7,993,392 | B2 | 8/2011 | Righini et al. |
| 7,993,394 | B2 | 8/2011 | Hariton et al. |
| 8,007,992 | B2 | 8/2011 | Tian et al. |
| 8,016,877 | B2 | 9/2011 | Seguin et al. |
| 8,029,556 | B2 | 10/2011 | Rowe |
| 8,048,440 | B2 | 11/2011 | Chang et al. |
| 8,052,750 | B2 | 11/2011 | Tuval et al. |
| 8,062,359 | B2 | 11/2011 | Marquez et al. |
| 8,070,800 | B2 | 12/2011 | Lock et al. |
| 8,070,802 | B2 | 12/2011 | Lamphere et al. |
| 8,075,615 | B2 | 12/2011 | Eberhardt et al. |
| 8,080,054 | B2 | 12/2011 | Rowe |
| 8,092,520 | B2 | 1/2012 | Quadri |
| 8,092,521 | B2 | 1/2012 | Figulla et al. |
| 8,092,523 | B2 | 1/2012 | Li et al. |
| 8,109,996 | B2 | 2/2012 | Stacchino et al. |
| 8,118,866 | B2 | 2/2012 | Herrmann et al. |
| 8,136,218 | B2 | 3/2012 | Millwee et al. |
| 8,137,398 | B2 | 3/2012 | Tuval et al. |
| 8,157,852 | B2 | 4/2012 | Bloom et al. |
| 8,167,932 | B2 | 5/2012 | Bourang et al. |
| 8,167,934 | B2 | 5/2012 | Styrc et al. |
| 8,167,935 | B2 | 5/2012 | McGuckin et al. |
| 8,182,530 | B2 | 5/2012 | Huber |
| 8,206,437 | B2 | 6/2012 | Bonhoeffer et al. |
| 8,216,174 | B2 | 7/2012 | Wilk et al. |
| 8,216,301 | B2 | 7/2012 | Bonhoeffer et al. |
| 8,219,229 | B2 | 7/2012 | Cao et al. |
| 8,220,121 | B2 | 7/2012 | Hendriksen et al. |
| 8,226,710 | B2 | 7/2012 | Nguyen et al. |
| 8,236,045 | B2 | 8/2012 | Benichou et al. |
| 8,246,675 | B2 | 8/2012 | Zegdi |
| 8,246,678 | B2 | 8/2012 | Salahieh et al. |
| 8,252,037 | B2 | 8/2012 | Styrc et al. |
| 8,252,051 | B2 | 8/2012 | Chau et al. |
| 8,252,052 | B2 | 8/2012 | Salahieh et al. |
| 8,287,584 | B2 | 10/2012 | Salahieh et al. |
| 8,303,647 | B2 | 11/2012 | Case |
| 8,313,525 | B2 | 11/2012 | Tuval et al. |
| 8,317,858 | B2 | 11/2012 | Straubinger et al. |
| 8,323,335 | B2 | 12/2012 | Rowe et al. |
| 8,337,541 | B2 | 12/2012 | Quadri et al. |
| 8,349,000 | B2 | 1/2013 | Schreck |
| 8,353,953 | B2 | 1/2013 | Giannetti et al. |
| 8,398,704 | B2 | 3/2013 | Straubinger et al. |
| 8,403,983 | B2 | 3/2013 | Quadri et al. |
| 8,409,274 | B2 | 4/2013 | Li et al. |
| 8,414,644 | B2 | 4/2013 | Quadri et al. |
| 8,414,645 | B2 | 4/2013 | Dwork et al. |
| 8,416,643 | B2 | 4/2013 | Magee |
| 8,444,689 | B2 | 5/2013 | Zhang |
| 8,449,599 | B2 | 5/2013 | Chau et al. |
| 8,454,685 | B2 | 6/2013 | Hariton et al. |
| 8,460,368 | B2 | 6/2013 | Taylor et al. |
| 8,460,370 | B2 | 6/2013 | Zakay |
| 8,470,023 | B2 | 6/2013 | Eidenschink et al. |
| 8,470,028 | B2 | 6/2013 | Thornton et al. |
| 8,475,512 | B2 | 7/2013 | Hunt |
| 8,475,521 | B2 | 7/2013 | Suri et al. |
| 8,475,523 | B2 | 7/2013 | Duffy |
| 8,479,380 | B2 | 7/2013 | Malewicz et al. |
| 8,491,650 | B2 | 7/2013 | Wiemeyer et al. |
| 8,500,733 | B2 | 8/2013 | Watson |
| 8,500,798 | B2 | 8/2013 | Rowe et al. |
| 8,511,244 | B2 | 8/2013 | Holecek et al. |
| 8,512,401 | B2 | 8/2013 | Murray et al. |
| 8,518,096 | B2 | 8/2013 | Nelson |
| 8,518,106 | B2 | 8/2013 | Duffy et al. |
| 8,545,525 | B2 | 10/2013 | Surti et al. |
| 8,562,663 | B2 | 10/2013 | Mearns et al. |
| 8,568,475 | B2 | 10/2013 | Nguyen et al. |
| 8,579,963 | B2 | 11/2013 | Tabor |
| 8,579,964 | B2 | 11/2013 | Lane et al. |
| 8,585,753 | B2 | 11/2013 | Scanlon et al. |
| 8,585,757 | B2 | 11/2013 | Agathos |
| 8,591,570 | B2 | 11/2013 | Revuelta et al. |
| 8,617,236 | B2 | 12/2013 | Paul et al. |
| 8,628,566 | B2 | 1/2014 | Eberhardt et al. |
| 8,637,144 | B2 | 1/2014 | Ford |
| 8,640,521 | B2 | 2/2014 | Righini et al. |
| 8,647,381 | B2 | 2/2014 | Essinger et al. |
| 8,652,145 | B2 | 2/2014 | Maimon et al. |
| 8,652,201 | B2 | 2/2014 | Oberti et al. |
| 8,652,202 | B2 | 2/2014 | Alon et al. |
| 8,652,203 | B2 | 2/2014 | Quadri et al. |
| 8,668,733 | B2 | 3/2014 | Haug et al. |
| 8,679,174 | B2 | 3/2014 | Ottma et al. |
| 8,679,404 | B2 | 3/2014 | Liburd et al. |
| 8,685,086 | B2 | 4/2014 | Navia et al. |
| 8,709,077 | B2 | 4/2014 | Schreck |
| 8,721,708 | B2 | 5/2014 | Seguin et al. |
| 8,721,714 | B2 | 5/2014 | Kelley |
| 8,722,178 | B2 | 5/2014 | Ashmead et al. |
| 8,728,103 | B2 | 5/2014 | Surti et al. |
| 8,728,154 | B2 | 5/2014 | Alkhatib |
| 8,728,155 | B2 | 5/2014 | Montorfano et al. |
| 8,740,974 | B2 | 6/2014 | Lambrecht et al. |
| 8,740,976 | B2 | 6/2014 | Tran et al. |
| 8,747,458 | B2 | 6/2014 | Tuval et al. |
| 8,747,459 | B2 | 6/2014 | Nguyen et al. |
| 8,758,432 | B2 | 6/2014 | Solem |
| 8,764,818 | B2 | 7/2014 | Gregg |
| 8,771,344 | B2 | 7/2014 | Tran et al. |
| 8,778,020 | B2 | 7/2014 | Gregg et al. |

(56) References Cited

U.S. PATENT DOCUMENTS

| | | |
|---|---|---|
| 8,784,337 B2 | 7/2014 | Voeller et al. |
| 8,784,478 B2 | 7/2014 | Tuval et al. |
| 8,784,481 B2 | 7/2014 | Alkhatib et al. |
| 8,790,387 B2 | 7/2014 | Nguyen et al. |
| 8,795,357 B2 | 8/2014 | Yohanan et al. |
| 8,801,774 B2 | 8/2014 | Silverman |
| 8,808,356 B2 | 8/2014 | Braido et al. |
| 8,808,848 B2 | 8/2014 | Bacino |
| 8,828,078 B2 | 9/2014 | Salahieh et al. |
| 8,828,079 B2 | 9/2014 | Thielen et al. |
| 8,834,564 B2 | 9/2014 | Tuval et al. |
| 8,845,709 B2 | 9/2014 | Styrc et al. |
| 8,845,721 B2 | 9/2014 | Braido et al. |
| 8,852,272 B2 | 10/2014 | Gross et al. |
| 8,858,620 B2 | 10/2014 | Salahieh et al. |
| 8,870,948 B1 | 10/2014 | Erzberger et al. |
| 8,870,950 B2 | 10/2014 | Hacohen |
| 8,876,893 B2 | 11/2014 | Dwork et al. |
| 8,911,455 B2 | 12/2014 | Quadri et al. |
| 8,926,693 B2 | 1/2015 | Duffy et al. |
| 8,926,694 B2 | 1/2015 | Costello |
| 8,936,634 B2 | 1/2015 | Irwin et al. |
| 8,939,960 B2 | 1/2015 | Rosenman et al. |
| 8,945,209 B2 | 2/2015 | Bonyuet et al. |
| 8,945,212 B2 | 2/2015 | Bruchman et al. |
| 8,961,593 B2 | 2/2015 | Bonhoeffer et al. |
| 8,961,595 B2 | 2/2015 | Alkhatib |
| 8,961,599 B2 | 2/2015 | Bruchman et al. |
| 8,974,524 B2 | 3/2015 | Yeung et al. |
| 8,979,922 B2 | 3/2015 | Jayasinghe et al. |
| 8,986,375 B2 | 3/2015 | Garde et al. |
| 8,992,608 B2 | 3/2015 | Haug et al. |
| 8,998,980 B2 | 4/2015 | Shipley et al. |
| 9,005,273 B2 | 4/2015 | Salahieh et al. |
| 9,011,521 B2 | 4/2015 | Haug et al. |
| 9,011,523 B2 | 4/2015 | Seguin |
| 9,011,524 B2 | 4/2015 | Eberhardt |
| 9,028,545 B2 | 5/2015 | Taylor |
| 9,034,032 B2 | 5/2015 | McLean et al. |
| 9,039,757 B2 | 5/2015 | McLean et al. |
| 9,055,937 B2 | 6/2015 | Rowe et al. |
| 9,066,801 B2 | 6/2015 | Kovalsky et al. |
| 9,078,749 B2 | 7/2015 | Lutter et al. |
| 9,078,751 B2 | 7/2015 | Naor |
| 9,101,469 B2 | 8/2015 | Bruchman et al. |
| 9,101,696 B2 | 8/2015 | Leontein et al. |
| 9,107,771 B2 | 8/2015 | Wubbeling et al. |
| 9,125,738 B2 | 9/2015 | Figulla et al. |
| 9,125,740 B2 | 9/2015 | Morriss et al. |
| 9,139,669 B2 | 9/2015 | Ku et al. |
| 9,144,492 B2 | 9/2015 | Bruchman et al. |
| 9,168,131 B2 | 10/2015 | Yohanan et al. |
| 9,173,737 B2 | 11/2015 | Hill et al. |
| 9,180,004 B2 | 11/2015 | Alkhatib |
| 9,186,249 B2 | 11/2015 | Rolando et al. |
| 9,198,787 B2 | 12/2015 | Kratzberg et al. |
| 9,241,695 B2 | 1/2016 | Peavey et al. |
| 9,259,313 B2 | 2/2016 | Wheatley |
| 9,277,990 B2 | 3/2016 | Klima et al. |
| 9,277,993 B2 | 3/2016 | Gamarra et al. |
| 9,283,072 B2 | 3/2016 | Bruchman et al. |
| 9,289,291 B2 | 3/2016 | Gorman, III et al. |
| 9,295,551 B2 | 3/2016 | Straubinger et al. |
| 9,295,552 B2 | 3/2016 | McLean et al. |
| 9,314,355 B2 | 4/2016 | Styrc et al. |
| 9,345,601 B2 | 5/2016 | Jantzen et al. |
| 9,375,308 B2 | 6/2016 | Norris |
| 9,393,110 B2 | 7/2016 | Levi et al. |
| 9,398,952 B2 | 7/2016 | Bruchman et al. |
| 9,399,085 B2 | 7/2016 | Cleek et al. |
| 9,445,897 B2 | 9/2016 | Bishop et al. |
| 9,456,877 B2 | 10/2016 | Weitzner et al. |
| 9,504,565 B2 | 11/2016 | Armstrong |
| 9,554,786 B2 | 1/2017 | Carley et al. |
| 9,554,900 B2 | 1/2017 | Bruchman et al. |
| 9,597,181 B2 | 3/2017 | Christianson et al. |
| 9,629,718 B2 | 4/2017 | Gloss et al. |
| 9,681,948 B2 | 6/2017 | Evi et al. |
| 9,681,968 B2 | 6/2017 | Goetz et al. |
| 9,687,345 B2 | 6/2017 | Rabito et al. |
| 9,700,329 B2 | 7/2017 | Metzger et al. |
| 9,700,411 B2 | 7/2017 | Klima et al. |
| 9,724,083 B2 | 8/2017 | Quadri et al. |
| 9,730,790 B2 | 8/2017 | Quadri et al. |
| 9,730,791 B2 | 8/2017 | Ratz et al. |
| 9,737,398 B2 | 8/2017 | Bruchman et al. |
| 9,737,422 B2 | 8/2017 | Armstrong et al. |
| 9,743,932 B2 | 8/2017 | Amplatz et al. |
| 9,795,479 B2 | 10/2017 | Lim et al. |
| 9,795,496 B2 | 10/2017 | Armstrong et al. |
| 9,801,712 B2 | 10/2017 | Bruchman et al. |
| 9,827,089 B2 | 11/2017 | Bruchman et al. |
| 9,827,094 B2 | 11/2017 | Bennett |
| 9,833,313 B2 | 12/2017 | Board et al. |
| 9,839,540 B2 | 12/2017 | Armstrong et al. |
| 9,855,141 B2 | 1/2018 | Dienno et al. |
| 9,861,473 B2 | 1/2018 | Lafontaine |
| 9,861,476 B2 | 1/2018 | Salahieh et al. |
| 9,861,477 B2 | 1/2018 | Backus et al. |
| 9,867,698 B2 | 1/2018 | Kovalsky et al. |
| 9,877,830 B2 | 1/2018 | Lim et al. |
| 9,889,029 B2 | 2/2018 | Li et al. |
| 9,895,225 B2 | 2/2018 | Rolando et al. |
| 9,925,045 B2 | 3/2018 | Creaven et al. |
| 9,931,193 B2 | 4/2018 | Cully et al. |
| 9,931,204 B2 | 4/2018 | Rothstein et al. |
| 9,937,037 B2 | 4/2018 | Dienno et al. |
| 9,968,443 B2 | 5/2018 | Bruchman et al. |
| 10,004,599 B2 | 6/2018 | Rabito et al. |
| 10,039,638 B2 | 8/2018 | Bruchman et al. |
| 10,117,744 B2 | 11/2018 | Ratz et al. |
| 10,166,128 B2 | 1/2019 | Armstrong et al. |
| 10,179,044 B2 | 1/2019 | Ratz et al. |
| 10,219,897 B2 | 3/2019 | Essinger et al. |
| 10,279,084 B2 | 5/2019 | Goepfrich et al. |
| 10,285,808 B2 | 5/2019 | Bruchman et al. |
| 10,314,697 B2 | 6/2019 | Gassler |
| 10,321,986 B2 | 6/2019 | Bruchman et al. |
| 10,335,298 B2 | 7/2019 | Armstrong et al. |
| 10,342,659 B2 | 7/2019 | Bennett |
| 10,350,065 B2 | 7/2019 | Quadri |
| 10,350,066 B2 | 7/2019 | Cooper et al. |
| 10,368,984 B2 | 8/2019 | Armstrong |
| 10,376,360 B2 | 8/2019 | Bruchman et al. |
| 10,376,363 B2 | 8/2019 | Quadri et al. |
| 10,441,416 B2 | 10/2019 | Oba et al. |
| 10,463,478 B2 | 11/2019 | Bruchman et al. |
| 10,507,124 B2 | 12/2019 | Armstrong et al. |
| 10,555,809 B2 | 2/2020 | Hastings et al. |
| 10,575,951 B2 | 3/2020 | Johnson et al. |
| 10,583,000 B2 | 3/2020 | Ratz et al. |
| 10,639,144 B2 | 5/2020 | Bruchman et al. |
| 10,639,146 B2 | 5/2020 | Quadri et al. |
| 10,660,745 B2 | 5/2020 | Bruchman et al. |
| 10,695,177 B2 | 6/2020 | Hariton et al. |
| 10,758,344 B2 | 9/2020 | Hariton et al. |
| 10,881,507 B2 | 1/2021 | Bruchman et al. |
| 10,980,633 B2 | 4/2021 | Dienno et al. |
| 11,020,221 B2 | 6/2021 | Arcaro et al. |
| 11,039,917 B2 | 6/2021 | Bruchman et al. |
| D926,322 S | 7/2021 | Bennett et al. |
| 11,065,112 B2 | 7/2021 | Gassler |
| 11,090,153 B2 | 8/2021 | Haarer et al. |
| 11,109,963 B2 | 9/2021 | Dienno et al. |
| 11,123,183 B2 | 9/2021 | Bennett et al. |
| 11,406,499 B2 | 8/2022 | Zhang et al. |
| 11,439,502 B2 | 9/2022 | Busalacchi et al. |
| 11,452,598 B2 | 9/2022 | Essinger et al. |
| 11,471,276 B2 | 10/2022 | Bennett |
| 11,672,658 B2 | 6/2023 | Hariton et al. |
| 11,701,225 B2 | 7/2023 | Hammer et al. |
| 11,903,829 B1 | 2/2024 | Ma et al. |
| 2001/0021872 A1 | 9/2001 | Bailey et al. |
| 2001/0053929 A1 | 12/2001 | Vonesh et al. |

(56) References Cited

U.S. PATENT DOCUMENTS

| | | |
|---|---|---|
| 2002/0032481 A1 | 3/2002 | Gabbay |
| 2002/0045929 A1 | 4/2002 | Diaz |
| 2002/0045936 A1 | 4/2002 | Moe |
| 2002/0052644 A1 | 5/2002 | Shaolian et al. |
| 2002/0055773 A1 | 5/2002 | Campbell et al. |
| 2002/0076542 A1 | 6/2002 | Kramer et al. |
| 2002/0082687 A1 | 6/2002 | Moe |
| 2002/0107565 A1 | 8/2002 | Greenhalgh |
| 2002/0123802 A1 | 9/2002 | Snyders |
| 2002/0133226 A1 | 9/2002 | Marquez et al. |
| 2002/0151953 A1 | 10/2002 | Chobotov et al. |
| 2002/0151956 A1 | 10/2002 | Chobotov et al. |
| 2002/0173842 A1 | 11/2002 | Buchanan |
| 2002/0183840 A1 | 12/2002 | Lapeyre et al. |
| 2002/0198588 A1 | 12/2002 | Armstrong et al. |
| 2002/0198594 A1 | 12/2002 | Schreck |
| 2003/0014105 A1 | 1/2003 | Cao |
| 2003/0027332 A1 | 2/2003 | Hugues et al. |
| 2003/0050694 A1 | 3/2003 | Yang et al. |
| 2003/0055494 A1 | 3/2003 | Bezuidenhout et al. |
| 2003/0055496 A1 | 3/2003 | Cai et al. |
| 2003/0060871 A1 | 3/2003 | Hill et al. |
| 2003/0074052 A1 | 4/2003 | Besselink et al. |
| 2003/0097175 A1 | 5/2003 | O'Connor et al. |
| 2003/0100939 A1 | 5/2003 | Yodfat et al. |
| 2003/0105517 A1 | 6/2003 | White et al. |
| 2003/0114913 A1 | 6/2003 | Spenser et al. |
| 2003/0120333 A1 | 6/2003 | Ouriel et al. |
| 2003/0125805 A1 | 7/2003 | Johnson et al. |
| 2003/0130729 A1 | 7/2003 | Paniagua et al. |
| 2003/0149477 A1 | 8/2003 | Gabbay |
| 2003/0149478 A1 | 8/2003 | Figulla et al. |
| 2003/0158597 A1 | 8/2003 | Quiachon et al. |
| 2003/0176914 A1 | 9/2003 | Rabkin et al. |
| 2003/0180488 A1 | 9/2003 | Lim et al. |
| 2003/0199971 A1 | 10/2003 | Tower et al. |
| 2003/0209835 A1 | 11/2003 | Chun et al. |
| 2003/0212454 A1 | 11/2003 | Scott et al. |
| 2003/0220683 A1 | 11/2003 | Minasian et al. |
| 2003/0229394 A1 | 12/2003 | Ogle et al. |
| 2004/0024442 A1 | 2/2004 | Sowinski et al. |
| 2004/0024448 A1 | 2/2004 | Chang et al. |
| 2004/0024451 A1 | 2/2004 | Johnson et al. |
| 2004/0026245 A1 | 2/2004 | Agarwal et al. |
| 2004/0039436 A1 | 2/2004 | Spenser et al. |
| 2004/0044400 A1 | 3/2004 | Cheng et al. |
| 2004/0044401 A1 | 3/2004 | Bales et al. |
| 2004/0092858 A1 | 5/2004 | Wilson et al. |
| 2004/0093075 A1 | 5/2004 | Kuehne |
| 2004/0117009 A1 | 6/2004 | Cali et al. |
| 2004/0133263 A1 | 7/2004 | Dusbabek et al. |
| 2004/0133266 A1 | 7/2004 | Clerc et al. |
| 2004/0133273 A1 | 7/2004 | Cox |
| 2004/0170782 A1 | 9/2004 | Wang et al. |
| 2004/0176839 A1 | 9/2004 | Huynh et al. |
| 2004/0186563 A1 | 9/2004 | Lobbi |
| 2004/0186565 A1 | 9/2004 | Schreck |
| 2004/0210307 A1 | 10/2004 | Khairkhahan |
| 2004/0215325 A1 | 10/2004 | Penn et al. |
| 2004/0224442 A1 | 11/2004 | Grigg |
| 2004/0225353 A1 | 11/2004 | McGuckin et al. |
| 2004/0236411 A1 | 11/2004 | Sarac et al. |
| 2004/0243222 A1 | 12/2004 | Osborne et al. |
| 2004/0260277 A1 | 12/2004 | Maguire |
| 2004/0260389 A1 | 12/2004 | Case et al. |
| 2004/0260393 A1 | 12/2004 | Rahdert et al. |
| 2005/0027348 A1 | 2/2005 | Case et al. |
| 2005/0033398 A1 | 2/2005 | Seguin |
| 2005/0075727 A1 | 4/2005 | Wheatley |
| 2005/0080476 A1 | 4/2005 | Gunderson et al. |
| 2005/0090887 A1 | 4/2005 | Pryor |
| 2005/0096738 A1 | 5/2005 | Cali et al. |
| 2005/0107872 A1 | 5/2005 | Mensah et al. |
| 2005/0119722 A1 | 6/2005 | Styrc et al. |
| 2005/0137680 A1 | 6/2005 | Ortiz et al. |
| 2005/0137682 A1 | 6/2005 | Justino |
| 2005/0137686 A1 | 6/2005 | Salahieh et al. |
| 2005/0137687 A1 | 6/2005 | Salahieh et al. |
| 2005/0137688 A1 | 6/2005 | Salahieh et al. |
| 2005/0137691 A1 | 6/2005 | Salahieh et al. |
| 2005/0137698 A1 | 6/2005 | Salahieh et al. |
| 2005/0159811 A1 | 7/2005 | Lane |
| 2005/0182486 A1 | 8/2005 | Gabbay |
| 2005/0203614 A1 | 9/2005 | Forster et al. |
| 2005/0203617 A1 | 9/2005 | Forster et al. |
| 2005/0216079 A1 | 9/2005 | MaCoviak |
| 2005/0234546 A1 | 10/2005 | Nugent et al. |
| 2005/0261765 A1 | 11/2005 | Liddicoat |
| 2005/0283224 A1 | 12/2005 | King |
| 2005/0288766 A1 | 12/2005 | Plain et al. |
| 2006/0008497 A1 | 1/2006 | Gabbay |
| 2006/0009835 A1 | 1/2006 | Osborne et al. |
| 2006/0015171 A1 | 1/2006 | Armstrong |
| 2006/0020327 A1 | 1/2006 | Lashinski et al. |
| 2006/0025857 A1 | 2/2006 | Bergheim et al. |
| 2006/0036311 A1 | 2/2006 | Nakayama et al. |
| 2006/0041091 A1 | 2/2006 | Chang et al. |
| 2006/0058872 A1 | 3/2006 | Salahieh et al. |
| 2006/0095115 A1 | 5/2006 | Bladillah et al. |
| 2006/0106337 A1 | 5/2006 | Blankenship |
| 2006/0118236 A1 | 6/2006 | House et al. |
| 2006/0122693 A1 | 6/2006 | Biadillah et al. |
| 2006/0135985 A1 | 6/2006 | Cox et al. |
| 2006/0142837 A1 | 6/2006 | Haverkost et al. |
| 2006/0149350 A1 | 7/2006 | Patel et al. |
| 2006/0154365 A1 | 7/2006 | Ratcliffe et al. |
| 2006/0161241 A1 | 7/2006 | Barbut et al. |
| 2006/0161249 A1 | 7/2006 | Realyvasquez et al. |
| 2006/0173537 A1 | 8/2006 | Yang et al. |
| 2006/0190070 A1 | 8/2006 | Dieck et al. |
| 2006/0195134 A1 | 8/2006 | Crittenden |
| 2006/0195183 A1 | 8/2006 | Navia et al. |
| 2006/0212110 A1 | 9/2006 | Osborne et al. |
| 2006/0229718 A1 | 10/2006 | Marquez |
| 2006/0229719 A1 | 10/2006 | Marquez et al. |
| 2006/0241745 A1 | 10/2006 | Solem |
| 2006/0259133 A1 | 11/2006 | Sowinski et al. |
| 2006/0259135 A1 | 11/2006 | Navia et al. |
| 2006/0259136 A1 | 11/2006 | Nguyen et al. |
| 2006/0259137 A1 | 11/2006 | Artof et al. |
| 2006/0265053 A1 | 11/2006 | Hunt |
| 2006/0271091 A1 | 11/2006 | Campbell et al. |
| 2006/0276813 A1 | 12/2006 | Greenberg |
| 2006/0276874 A1 | 12/2006 | Wilson et al. |
| 2006/0276883 A1 | 12/2006 | Greenberg et al. |
| 2006/0276888 A1 | 12/2006 | Lee et al. |
| 2006/0282162 A1 | 12/2006 | Nguyen et al. |
| 2006/0287719 A1 | 12/2006 | Rowe et al. |
| 2006/0290027 A1 | 12/2006 | O'Connor et al. |
| 2006/0293745 A1 | 12/2006 | Carpentier et al. |
| 2007/0005131 A1 | 1/2007 | Taylor |
| 2007/0010876 A1 | 1/2007 | Salahieh et al. |
| 2007/0010877 A1 | 1/2007 | Salahieh et al. |
| 2007/0012624 A1 | 1/2007 | Bacino et al. |
| 2007/0021826 A1 | 1/2007 | Case et al. |
| 2007/0027534 A1 | 2/2007 | Bergheim et al. |
| 2007/0043435 A1 | 2/2007 | Seguin et al. |
| 2007/0050021 A1 | 3/2007 | Johnson |
| 2007/0060999 A1 | 3/2007 | Randall et al. |
| 2007/0066863 A1 | 3/2007 | Rafiee et al. |
| 2007/0088431 A1 | 4/2007 | Bourang et al. |
| 2007/0100432 A1 | 5/2007 | Case et al. |
| 2007/0100435 A1 | 5/2007 | Case et al. |
| 2007/0100439 A1 | 5/2007 | Cangialosi et al. |
| 2007/0112422 A1 | 5/2007 | Dehdashtian |
| 2007/0118210 A1 | 5/2007 | Pinchuk |
| 2007/0129786 A1 | 6/2007 | Beach et al. |
| 2007/0129794 A1 | 6/2007 | Realyvasquez |
| 2007/0142906 A1 | 6/2007 | Figulla et al. |
| 2007/0156224 A1 | 7/2007 | Cioanta et al. |
| 2007/0203503 A1 | 8/2007 | Salahieh et al. |
| 2007/0203575 A1 | 8/2007 | Forster et al. |
| 2007/0207186 A1 | 9/2007 | Scanlon et al. |
| 2007/0207816 A1 | 9/2007 | Spain |

(56) References Cited

U.S. PATENT DOCUMENTS

| | | |
|---|---|---|
| 2007/0208417 A1 | 9/2007 | Agnew |
| 2007/0208421 A1 | 9/2007 | Quigley |
| 2007/0213800 A1 | 9/2007 | Fierens et al. |
| 2007/0213813 A1 | 9/2007 | Von Segesser et al. |
| 2007/0244552 A1 | 10/2007 | Salahieh et al. |
| 2007/0250146 A1 | 10/2007 | Cully et al. |
| 2007/0250153 A1 | 10/2007 | Cully et al. |
| 2007/0254012 A1 | 11/2007 | Ludwig et al. |
| 2007/0255394 A1 | 11/2007 | Ryan |
| 2007/0270943 A1 | 11/2007 | Solem et al. |
| 2008/0009940 A1 | 1/2008 | Cribier |
| 2008/0021546 A1 | 1/2008 | Patz et al. |
| 2008/0026190 A1 | 1/2008 | King et al. |
| 2008/0039934 A1 | 2/2008 | Styrc |
| 2008/0051876 A1 | 2/2008 | Ta et al. |
| 2008/0065011 A1 | 3/2008 | Marchand et al. |
| 2008/0065198 A1 | 3/2008 | Quintessenza |
| 2008/0071361 A1 | 3/2008 | Tuval et al. |
| 2008/0071362 A1 | 3/2008 | Tuval et al. |
| 2008/0071363 A1 | 3/2008 | Tuval et al. |
| 2008/0071366 A1 | 3/2008 | Tuval et al. |
| 2008/0071368 A1 | 3/2008 | Tuval et al. |
| 2008/0071369 A1 | 3/2008 | Tuval et al. |
| 2008/0082154 A1 | 4/2008 | Tseng et al. |
| 2008/0082164 A1 | 4/2008 | Friedman |
| 2008/0082165 A1 | 4/2008 | Wilson et al. |
| 2008/0082166 A1 | 4/2008 | Styrc et al. |
| 2008/0097301 A1 | 4/2008 | Alpini et al. |
| 2008/0097401 A1 | 4/2008 | Trapp et al. |
| 2008/0097579 A1 | 4/2008 | Shanley et al. |
| 2008/0097581 A1 | 4/2008 | Shanley |
| 2008/0097582 A1 | 4/2008 | Shanley et al. |
| 2008/0114442 A1 | 5/2008 | Mitchell et al. |
| 2008/0119943 A1 | 5/2008 | Armstrong et al. |
| 2008/0125853 A1 | 5/2008 | Bailey et al. |
| 2008/0133004 A1 | 6/2008 | White |
| 2008/0140178 A1 | 6/2008 | Rasmussen et al. |
| 2008/0147179 A1 | 6/2008 | Cai et al. |
| 2008/0147183 A1 | 6/2008 | Styrc |
| 2008/0154355 A1 | 6/2008 | Benichou et al. |
| 2008/0161910 A1 | 7/2008 | Revuelta et al. |
| 2008/0177381 A1 | 7/2008 | Navia et al. |
| 2008/0183273 A1 | 7/2008 | Mesana et al. |
| 2008/0195199 A1 | 8/2008 | Kheradvar et al. |
| 2008/0208327 A1 | 8/2008 | Rowe |
| 2008/0208328 A1 | 8/2008 | Antocci et al. |
| 2008/0208332 A1 | 8/2008 | Lamphere et al. |
| 2008/0220041 A1 | 9/2008 | Brito et al. |
| 2008/0221672 A1 | 9/2008 | Lamphere et al. |
| 2008/0228254 A1 | 9/2008 | Ryan |
| 2008/0228263 A1 | 9/2008 | Ryan |
| 2008/0255660 A1 | 10/2008 | Guyenot et al. |
| 2008/0255661 A1 | 10/2008 | Straubinger et al. |
| 2008/0281411 A1 | 11/2008 | Berreklouw |
| 2008/0300678 A1 | 12/2008 | Eidenschink et al. |
| 2008/0319531 A1 | 12/2008 | Doran et al. |
| 2009/0005854 A1 | 1/2009 | Huang et al. |
| 2009/0005863 A1 | 1/2009 | Goetz et al. |
| 2009/0030499 A1 | 1/2009 | Bebb et al. |
| 2009/0036976 A1 | 2/2009 | Beach et al. |
| 2009/0043373 A1 | 2/2009 | Arnault De La Menardiere et al. |
| 2009/0054968 A1 | 2/2009 | Bonhoeffer et al. |
| 2009/0054974 A1 | 2/2009 | McGuckin, Jr. et al. |
| 2009/0076598 A1 | 3/2009 | Salahieh et al. |
| 2009/0099640 A1 | 4/2009 | Weng |
| 2009/0104247 A1 | 4/2009 | Pacetti |
| 2009/0112309 A1 | 4/2009 | Jaramillo et al. |
| 2009/0117334 A1 | 5/2009 | Sogard et al. |
| 2009/0138079 A1 | 5/2009 | Tuval et al. |
| 2009/0157175 A1 | 6/2009 | Benichou |
| 2009/0164005 A1 | 6/2009 | Dove et al. |
| 2009/0171432 A1 | 7/2009 | Von Segesser et al. |
| 2009/0171447 A1 | 7/2009 | Von Segesser et al. |
| 2009/0171456 A1 | 7/2009 | Kveen et al. |
| 2009/0182413 A1 | 7/2009 | Burkart et al. |
| 2009/0188964 A1 | 7/2009 | Orlov |
| 2009/0216310 A1 | 8/2009 | Straubinger et al. |
| 2009/0216313 A1 | 8/2009 | Straubinger et al. |
| 2009/0216322 A1 | 8/2009 | Le et al. |
| 2009/0222076 A1 | 9/2009 | Figulla et al. |
| 2009/0234443 A1 | 9/2009 | Ottma et al. |
| 2009/0240320 A1 | 9/2009 | Tuval et al. |
| 2009/0264997 A1 | 10/2009 | Salahieh et al. |
| 2009/0270972 A1 | 10/2009 | Lane |
| 2009/0276027 A1 | 11/2009 | Glynn |
| 2009/0276039 A1 | 11/2009 | Meretei |
| 2009/0276040 A1 | 11/2009 | Rowe et al. |
| 2009/0281609 A1 | 11/2009 | Benichou et al. |
| 2009/0281618 A1 | 11/2009 | Hill et al. |
| 2009/0281619 A1 | 11/2009 | Le et al. |
| 2009/0287296 A1 | 11/2009 | Manasse |
| 2009/0287299 A1 | 11/2009 | Tabor et al. |
| 2009/0287305 A1 | 11/2009 | Amalaha |
| 2009/0292350 A1 | 11/2009 | Eberhardt et al. |
| 2009/0306762 A1 | 12/2009 | McCullagh et al. |
| 2009/0306766 A1 | 12/2009 | McDermott et al. |
| 2009/0306768 A1 | 12/2009 | Quadri |
| 2009/0319037 A1 | 12/2009 | Rowe et al. |
| 2010/0016940 A1 | 1/2010 | Shokoohi et al. |
| 2010/0016958 A1 | 1/2010 | St. Goar et al. |
| 2010/0023114 A1 | 1/2010 | Chambers et al. |
| 2010/0024818 A1 | 2/2010 | Stenzler et al. |
| 2010/0036021 A1 | 2/2010 | Lee et al. |
| 2010/0036484 A1 | 2/2010 | Hariton et al. |
| 2010/0049294 A1 | 2/2010 | Zukowski et al. |
| 2010/0049313 A1 | 2/2010 | Alon et al. |
| 2010/0069852 A1 | 3/2010 | Kelley |
| 2010/0082089 A1 | 4/2010 | Quadri et al. |
| 2010/0082094 A1 | 4/2010 | Quadri et al. |
| 2010/0094394 A1 | 4/2010 | Beach et al. |
| 2010/0094405 A1 | 4/2010 | Cottone |
| 2010/0106240 A1 | 4/2010 | Duggal et al. |
| 2010/0114305 A1 | 5/2010 | Kang et al. |
| 2010/0114307 A1 | 5/2010 | Agnew et al. |
| 2010/0131054 A1 | 5/2010 | Tuval et al. |
| 2010/0131056 A1 | 5/2010 | Lapeyre |
| 2010/0137979 A1 | 6/2010 | Tuval et al. |
| 2010/0137998 A1 | 6/2010 | Sobrino-Serrano et al. |
| 2010/0145438 A1 | 6/2010 | Barone |
| 2010/0159171 A1 | 6/2010 | Clough |
| 2010/0168839 A1 | 7/2010 | Braido et al. |
| 2010/0174362 A1 | 7/2010 | Straubinger et al. |
| 2010/0185274 A1 | 7/2010 | Moaddeb et al. |
| 2010/0185277 A1 | 7/2010 | Braido et al. |
| 2010/0191320 A1 | 7/2010 | Straubinger et al. |
| 2010/0191326 A1 | 7/2010 | Alkhatib |
| 2010/0204781 A1 | 8/2010 | Alkhatib |
| 2010/0204785 A1 | 8/2010 | Alkhatib |
| 2010/0211165 A1 | 8/2010 | Schreck |
| 2010/0217382 A1 | 8/2010 | Chau et al. |
| 2010/0248324 A1 | 9/2010 | Xu et al. |
| 2010/0249894 A1 | 9/2010 | Oba et al. |
| 2010/0249911 A1 | 9/2010 | Alkhatib |
| 2010/0249923 A1 | 9/2010 | Alkhatib et al. |
| 2010/0256723 A1 | 10/2010 | Murray |
| 2010/0256738 A1 | 10/2010 | Berglund |
| 2010/0262231 A1 | 10/2010 | Tuval et al. |
| 2010/0286760 A1 | 11/2010 | Beach et al. |
| 2010/0298931 A1 | 11/2010 | Quadri et al. |
| 2010/0305682 A1 | 12/2010 | Furst |
| 2010/0305685 A1 | 12/2010 | Millwee et al. |
| 2010/0312333 A1 | 12/2010 | Navia et al. |
| 2011/0009953 A1 | 1/2011 | Luk et al. |
| 2011/0015616 A1 | 1/2011 | Straubinger et al. |
| 2011/0015729 A1 | 1/2011 | Jimenez et al. |
| 2011/0029072 A1 | 2/2011 | Gabbay |
| 2011/0040366 A1 | 2/2011 | Goetz et al. |
| 2011/0054515 A1 | 3/2011 | Bridgeman et al. |
| 2011/0064781 A1 | 3/2011 | Cleek et al. |
| 2011/0087318 A1 | 4/2011 | Daugherty et al. |
| 2011/0137397 A1 | 6/2011 | Chau et al. |
| 2011/0160836 A1 | 6/2011 | Behan |
| 2011/0172784 A1 | 7/2011 | Richter et al. |
| 2011/0178597 A9 | 7/2011 | Navia et al. |

(56) References Cited

U.S. PATENT DOCUMENTS

| | | |
|---|---|---|
| 2011/0208283 A1 | 8/2011 | Rust |
| 2011/0208290 A1 | 8/2011 | Straubinger et al. |
| 2011/0208297 A1 | 8/2011 | Tuval et al. |
| 2011/0208298 A1 | 8/2011 | Tuval et al. |
| 2011/0218619 A1 | 9/2011 | Benichou et al. |
| 2011/0224785 A1 | 9/2011 | Hacohen |
| 2011/0238159 A1 | 9/2011 | Guyenot et al. |
| 2011/0251678 A1 | 10/2011 | Eidenschink et al. |
| 2011/0257739 A1 | 10/2011 | Corbett |
| 2011/0264196 A1 | 10/2011 | Savage et al. |
| 2011/0264198 A1 | 10/2011 | Murray, III et al. |
| 2011/0282439 A1 | 11/2011 | Thill et al. |
| 2011/0288634 A1 | 11/2011 | Tuval et al. |
| 2011/0295363 A1 | 12/2011 | Girard et al. |
| 2011/0313515 A1 | 12/2011 | Quadri et al. |
| 2011/0319989 A1 | 12/2011 | Lane et al. |
| 2012/0022639 A1 | 1/2012 | Hacohen et al. |
| 2012/0035722 A1 | 2/2012 | Tuval |
| 2012/0041550 A1 | 2/2012 | Salahieh et al. |
| 2012/0046741 A1 | 2/2012 | Tuval et al. |
| 2012/0046742 A1 | 2/2012 | Tuval et al. |
| 2012/0078357 A1 | 3/2012 | Conklin |
| 2012/0078360 A1 | 3/2012 | Rafiee |
| 2012/0083839 A1 | 4/2012 | Letac et al. |
| 2012/0089223 A1 | 4/2012 | Nguyen et al. |
| 2012/0101567 A1 | 4/2012 | Jansen |
| 2012/0101570 A1 | 4/2012 | Tuval et al. |
| 2012/0101571 A1 | 4/2012 | Thambar et al. |
| 2012/0101572 A1 | 4/2012 | Kovalsky et al. |
| 2012/0116496 A1 | 5/2012 | Chuter et al. |
| 2012/0116498 A1 | 5/2012 | Chuter et al. |
| 2012/0123529 A1 | 5/2012 | Levi et al. |
| 2012/0123530 A1 | 5/2012 | Carpentier et al. |
| 2012/0130468 A1 | 5/2012 | Khosravi et al. |
| 2012/0130471 A1 | 5/2012 | Shoemaker et al. |
| 2012/0185038 A1 | 7/2012 | Fish et al. |
| 2012/0185039 A1 | 7/2012 | Tuval et al. |
| 2012/0197386 A1 | 8/2012 | Von Segesser et al. |
| 2012/0209374 A1 | 8/2012 | Bonhoeffer et al. |
| 2012/0215303 A1 | 8/2012 | Quadri et al. |
| 2012/0253453 A1 | 10/2012 | Bruchman et al. |
| 2012/0271398 A1 | 10/2012 | Essinger et al. |
| 2012/0277734 A1 | 11/2012 | Goetz et al. |
| 2012/0283823 A1 | 11/2012 | Bonhoeffer et al. |
| 2012/0290062 A1 | 11/2012 | McNamara et al. |
| 2012/0290082 A1 | 11/2012 | Quint et al. |
| 2012/0296418 A1 | 11/2012 | Bonyuet et al. |
| 2012/0310328 A1 | 12/2012 | Olson et al. |
| 2012/0310336 A1 | 12/2012 | Figulla et al. |
| 2012/0323211 A1 | 12/2012 | Ogle et al. |
| 2012/0323315 A1 | 12/2012 | Bruchman et al. |
| 2013/0006294 A1 | 1/2013 | Kashkarov et al. |
| 2013/0018456 A1 | 1/2013 | Li et al. |
| 2013/0018458 A1 | 1/2013 | Yohanan et al. |
| 2013/0035759 A1 | 2/2013 | Gross et al. |
| 2013/0073035 A1 | 3/2013 | Tuval et al. |
| 2013/0079700 A1 | 3/2013 | Ballard et al. |
| 2013/0079869 A1 | 3/2013 | Straubinger et al. |
| 2013/0110229 A1 | 5/2013 | Bokeriya et al. |
| 2013/0116655 A1 | 5/2013 | Bacino et al. |
| 2013/0131780 A1 | 5/2013 | Armstrong et al. |
| 2013/0150956 A1 | 6/2013 | Yohanan et al. |
| 2013/0158647 A1 | 6/2013 | Norris et al. |
| 2013/0166021 A1 | 6/2013 | Bruchman et al. |
| 2013/0172992 A1 | 7/2013 | Gross et al. |
| 2013/0183515 A1 | 7/2013 | White |
| 2013/0184807 A1 | 7/2013 | Kovach et al. |
| 2013/0190861 A1 | 7/2013 | Chau et al. |
| 2013/0190862 A1 | 7/2013 | Pintor et al. |
| 2013/0197622 A1 | 8/2013 | Mitra et al. |
| 2013/0197624 A1 | 8/2013 | Armstrong et al. |
| 2013/0204347 A1 | 8/2013 | Armstrong et al. |
| 2013/0204360 A1 | 8/2013 | Gainor |
| 2013/0211508 A1 | 8/2013 | Lane et al. |
| 2013/0253466 A1 | 9/2013 | Campbell et al. |
| 2013/0253635 A1 | 9/2013 | Straubinger et al. |
| 2013/0253642 A1 | 9/2013 | Brecker |
| 2013/0297003 A1 | 11/2013 | Pinchuk |
| 2013/0310928 A1 | 11/2013 | Morriss et al. |
| 2013/0331929 A1 | 12/2013 | Mitra et al. |
| 2013/0338755 A1 | 12/2013 | Goetz et al. |
| 2013/0338766 A1 | 12/2013 | Hastings et al. |
| 2013/0345786 A1 | 12/2013 | Behan |
| 2014/0005771 A1 | 1/2014 | Braido et al. |
| 2014/0005773 A1 | 1/2014 | Wheatley |
| 2014/0018912 A1 | 1/2014 | Delaloye et al. |
| 2014/0025163 A1 | 1/2014 | Padala et al. |
| 2014/0031924 A1 | 1/2014 | Bruchman et al. |
| 2014/0031927 A1 | 1/2014 | Bruchman et al. |
| 2014/0039611 A1 | 2/2014 | Lane et al. |
| 2014/0052237 A1 | 2/2014 | Lane et al. |
| 2014/0094898 A1 | 4/2014 | Borck |
| 2014/0100651 A1 | 4/2014 | Kheradvar et al. |
| 2014/0106951 A1 | 4/2014 | Brandon |
| 2014/0135897 A1 | 5/2014 | Cully et al. |
| 2014/0163668 A1 | 6/2014 | Rafiee |
| 2014/0163671 A1 | 6/2014 | Bruchman et al. |
| 2014/0163673 A1 | 6/2014 | Bruchman et al. |
| 2014/0172066 A1 | 6/2014 | Goepfrich et al. |
| 2014/0172069 A1 | 6/2014 | Roeder et al. |
| 2014/0172077 A1 | 6/2014 | Bruchman et al. |
| 2014/0172078 A1 | 6/2014 | Bruchman et al. |
| 2014/0172079 A1 | 6/2014 | Bruchman et al. |
| 2014/0172082 A1 | 6/2014 | Bruchman et al. |
| 2014/0172083 A1 | 6/2014 | Bruchman et al. |
| 2014/0180400 A1 | 6/2014 | Bruchman et al. |
| 2014/0180402 A1 | 6/2014 | Bruchman et al. |
| 2014/0194968 A1 | 7/2014 | Zukowski |
| 2014/0194981 A1 | 7/2014 | Menk et al. |
| 2014/0207231 A1 | 7/2014 | Hacohen et al. |
| 2014/0214157 A1 | 7/2014 | Bortlein et al. |
| 2014/0222136 A1 | 8/2014 | Geist et al. |
| 2014/0222139 A1 | 8/2014 | Nguyen et al. |
| 2014/0222140 A1 | 8/2014 | Schreck |
| 2014/0222142 A1 | 8/2014 | Kovalsky et al. |
| 2014/0222144 A1 | 8/2014 | Eberhardt et al. |
| 2014/0236289 A1 | 8/2014 | Alkhatib |
| 2014/0243966 A1 | 8/2014 | Garde et al. |
| 2014/0257467 A1 | 9/2014 | Lane et al. |
| 2014/0277390 A1 | 9/2014 | Ratz et al. |
| 2014/0277403 A1 | 9/2014 | Peter |
| 2014/0277412 A1 | 9/2014 | Bortlein et al. |
| 2014/0277413 A1 | 9/2014 | Arnold et al. |
| 2014/0277418 A1 | 9/2014 | Miller |
| 2014/0277422 A1 | 9/2014 | Ratz et al. |
| 2014/0277426 A1 | 9/2014 | Dakin et al. |
| 2014/0277427 A1 | 9/2014 | Ratz et al. |
| 2014/0277428 A1* | 9/2014 | Skemp ................. A61F 2/2418 623/2.42 |
| 2014/0296969 A1 | 10/2014 | Tegels et al. |
| 2014/0296973 A1 | 10/2014 | Bergheim et al. |
| 2014/0296975 A1 | 10/2014 | Tegels et al. |
| 2014/0303719 A1 | 10/2014 | Cox et al. |
| 2014/0309728 A1 | 10/2014 | Dehdashtian et al. |
| 2014/0324160 A1 | 10/2014 | Benichou et al. |
| 2014/0324164 A1 | 10/2014 | Gross et al. |
| 2014/0330368 A1 | 11/2014 | Gloss et al. |
| 2014/0330371 A1 | 11/2014 | Gloss et al. |
| 2014/0330372 A1 | 11/2014 | Weston et al. |
| 2014/0336754 A1 | 11/2014 | Gurskis et al. |
| 2014/0343669 A1 | 11/2014 | Lane et al. |
| 2014/0343670 A1 | 11/2014 | Bakis et al. |
| 2014/0350666 A1 | 11/2014 | Righini |
| 2014/0350668 A1 | 11/2014 | Delaloye et al. |
| 2014/0358223 A1 | 12/2014 | Rafiee et al. |
| 2014/0364939 A1 | 12/2014 | Deshmukh et al. |
| 2014/0364943 A1 | 12/2014 | Conklin |
| 2014/0371842 A1 | 12/2014 | Marquez et al. |
| 2014/0371844 A1 | 12/2014 | Dale et al. |
| 2014/0371847 A1 | 12/2014 | Madrid et al. |
| 2014/0371848 A1 | 12/2014 | Murray, III et al. |
| 2015/0005863 A1 | 1/2015 | Para |
| 2015/0005870 A1 | 1/2015 | Kovach et al. |
| 2015/0018944 A1 | 1/2015 | O'Connell et al. |

(56) References Cited

U.S. PATENT DOCUMENTS

| | | |
|---|---|---|
| 2015/0039083 A1 | 2/2015 | Rafiee |
| 2015/0088250 A1 | 3/2015 | Zeng et al. |
| 2015/0105856 A1 | 4/2015 | Rowe et al. |
| 2015/0142100 A1 | 5/2015 | Morriss et al. |
| 2015/0142103 A1 | 5/2015 | Vidlund |
| 2015/0148731 A1 | 5/2015 | McNamara et al. |
| 2015/0157456 A1 | 6/2015 | Armstrong |
| 2015/0157770 A1 | 6/2015 | Cully et al. |
| 2015/0173897 A1 | 6/2015 | Raanani et al. |
| 2015/0196390 A1 | 7/2015 | Ma et al. |
| 2015/0209141 A1 | 7/2015 | Braido et al. |
| 2015/0224231 A1 | 8/2015 | Bruchman et al. |
| 2015/0245910 A1 | 9/2015 | Righini et al. |
| 2015/0272737 A1 | 10/2015 | Dale et al. |
| 2015/0297346 A1 | 10/2015 | Duffy et al. |
| 2015/0297381 A1 | 10/2015 | Essinger et al. |
| 2015/0313871 A1 | 11/2015 | Li et al. |
| 2015/0335429 A1 | 11/2015 | Morriss et al. |
| 2015/0351903 A1 | 12/2015 | Morriss et al. |
| 2015/0359629 A1 | 12/2015 | Ganesan et al. |
| 2015/0366663 A1 | 12/2015 | Bruchman et al. |
| 2015/0366664 A1 | 12/2015 | Guttenberg et al. |
| 2016/0000591 A1 | 1/2016 | Lei et al. |
| 2016/0001469 A1 | 1/2016 | Bacchereti et al. |
| 2016/0015422 A1 | 1/2016 | De et al. |
| 2016/0030169 A1 | 2/2016 | Shahriari |
| 2016/0030170 A1 | 2/2016 | Alkhatib et al. |
| 2016/0030171 A1 | 2/2016 | Quijano et al. |
| 2016/0038280 A1 | 2/2016 | Morriss et al. |
| 2016/0038281 A1 | 2/2016 | Delaloye et al. |
| 2016/0074160 A1 | 3/2016 | Christianson et al. |
| 2016/0074161 A1 | 3/2016 | Bennett |
| 2016/0106537 A1 | 4/2016 | Christianson et al. |
| 2016/0113699 A1 | 4/2016 | Sverdlik et al. |
| 2016/0113765 A1 | 4/2016 | Ganesan et al. |
| 2016/0113768 A1 | 4/2016 | Ganesan et al. |
| 2016/0143732 A1 | 5/2016 | Glimsdale |
| 2016/0157998 A1 | 6/2016 | Bruchman et al. |
| 2016/0158010 A1 | 6/2016 | Lim et al. |
| 2016/0166383 A1 | 6/2016 | Lim et al. |
| 2016/0175095 A1 | 6/2016 | Dienno et al. |
| 2016/0175096 A1 | 6/2016 | Dienno et al. |
| 2016/0184097 A1 | 6/2016 | Lim et al. |
| 2016/0199206 A1 | 7/2016 | Lim et al. |
| 2016/0206424 A1 | 7/2016 | Al-Jilaihawi et al. |
| 2016/0213465 A1 | 7/2016 | Girard et al. |
| 2016/0213473 A1 | 7/2016 | Hacohen et al. |
| 2016/0235525 A1 | 8/2016 | Rothstein et al. |
| 2016/0235529 A1 | 8/2016 | Ma et al. |
| 2016/0250051 A1 | 9/2016 | Lim et al. |
| 2016/0278923 A1 | 9/2016 | Krans et al. |
| 2016/0279386 A1 | 9/2016 | Dale et al. |
| 2016/0310267 A1 | 10/2016 | Zeng et al. |
| 2016/0310268 A1 | 10/2016 | Oba et al. |
| 2016/0317299 A1 | 11/2016 | Alkhatib |
| 2017/0027727 A1 | 2/2017 | Wuebbeling et al. |
| 2017/0042674 A1 | 2/2017 | Armstrong |
| 2017/0042678 A1 | 2/2017 | Ganesan et al. |
| 2017/0056169 A1 | 3/2017 | Johnson et al. |
| 2017/0065400 A1 | 3/2017 | Armstrong et al. |
| 2017/0079785 A1 | 3/2017 | Li |
| 2017/0095330 A1 | 4/2017 | Malewicz et al. |
| 2017/0095331 A1 | 4/2017 | Spenser et al. |
| 2017/0100236 A1 | 4/2017 | Robertson et al. |
| 2017/0105854 A1 | 4/2017 | Treacy et al. |
| 2017/0106176 A1 | 4/2017 | Taft et al. |
| 2017/0128199 A1 | 5/2017 | Gurovich et al. |
| 2017/0128209 A1 | 5/2017 | Morriss et al. |
| 2017/0156859 A1 | 6/2017 | Chang et al. |
| 2017/0165066 A1 | 6/2017 | Rothstein |
| 2017/0165067 A1 | 6/2017 | Barajas-Torres et al. |
| 2017/0216023 A1 | 8/2017 | Lane et al. |
| 2017/0216062 A1 | 8/2017 | Armstrong et al. |
| 2017/0216575 A1 | 8/2017 | Asleson et al. |
| 2017/0224481 A1 | 8/2017 | Spenser et al. |
| 2017/0252153 A1 | 9/2017 | Chau et al. |
| 2017/0257902 A1 | 9/2017 | Xing et al. |
| 2017/0258614 A1 | 9/2017 | Griffin |
| 2017/0325945 A1 | 11/2017 | Dale et al. |
| 2017/0325954 A1 | 11/2017 | Perszyk |
| 2017/0333186 A1 | 11/2017 | Spargias |
| 2017/0348096 A1 | 12/2017 | Anderson |
| 2017/0348101 A1 | 12/2017 | Vaughn et al. |
| 2017/0367821 A1 | 12/2017 | Landon et al. |
| 2017/0367823 A1 | 12/2017 | Hariton et al. |
| 2018/0014931 A1 | 1/2018 | Morriss et al. |
| 2018/0021128 A1 | 1/2018 | Bruchman et al. |
| 2018/0021129 A1 | 1/2018 | Peterson et al. |
| 2018/0055629 A1 | 3/2018 | Oba et al. |
| 2018/0055636 A1 | 3/2018 | Valencia et al. |
| 2018/0085218 A1 | 3/2018 | Eidenschink |
| 2018/0110534 A1 | 4/2018 | Gavala et al. |
| 2018/0110622 A1 | 4/2018 | Gregg et al. |
| 2018/0116790 A1 | 5/2018 | Ratz et al. |
| 2018/0125646 A1 | 5/2018 | Bruchman et al. |
| 2018/0126119 A1 | 5/2018 | McNiven et al. |
| 2018/0177583 A1 | 6/2018 | Cully et al. |
| 2018/0206983 A1 | 7/2018 | Noe et al. |
| 2018/0214664 A1 | 8/2018 | Kim et al. |
| 2018/0221144 A1 | 8/2018 | Bruchman et al. |
| 2018/0271651 A1 | 9/2018 | Christianson et al. |
| 2018/0271653 A1 | 9/2018 | Vidlund et al. |
| 2018/0296341 A1 | 10/2018 | Noe et al. |
| 2018/0318070 A1 | 11/2018 | Bruchman et al. |
| 2018/0344457 A1 | 12/2018 | Gross et al. |
| 2018/0344490 A1 | 12/2018 | Fox et al. |
| 2019/0008639 A1 | 1/2019 | Landon et al. |
| 2019/0008640 A1 | 1/2019 | Cooper et al. |
| 2019/0060072 A1 | 2/2019 | Zeng |
| 2019/0076245 A1 | 3/2019 | Arcaro et al. |
| 2019/0091014 A1 | 3/2019 | Arcaro et al. |
| 2019/0091015 A1 | 3/2019 | Dienno et al. |
| 2019/0110893 A1 | 4/2019 | Haarer et al. |
| 2019/0125517 A1 | 5/2019 | Cully et al. |
| 2019/0125528 A1 | 5/2019 | Busalacchi et al. |
| 2019/0125530 A1 | 5/2019 | Arcaro et al. |
| 2019/0125531 A1 | 5/2019 | Bennett et al. |
| 2019/0125534 A1 | 5/2019 | Arcaro et al. |
| 2019/0209292 A1 | 7/2019 | Bruchman et al. |
| 2019/0209739 A1 | 7/2019 | Goepfrich et al. |
| 2019/0216592 A1 | 7/2019 | Cully et al. |
| 2019/0247185 A1 | 8/2019 | Gassler |
| 2019/0254815 A1 | 8/2019 | Bruchman et al. |
| 2019/0262129 A1 | 8/2019 | Cooper et al. |
| 2019/0269505 A1 | 9/2019 | Bruchman et al. |
| 2019/0314154 A1 | 10/2019 | Armstrong |
| 2019/0328525 A1 | 10/2019 | Noe et al. |
| 2019/0374339 A1 | 12/2019 | Bennett |
| 2020/0000578 A1 | 1/2020 | Bruchman et al. |
| 2020/0000579 A1 | 1/2020 | Manash et al. |
| 2020/0022828 A1 | 1/2020 | Armstrong et al. |
| 2020/0108225 A1 | 4/2020 | Jamal et al. |
| 2020/0138572 A1 | 5/2020 | Zhao et al. |
| 2020/0179663 A1 | 6/2020 | McDaniel et al. |
| 2020/0237497 A1 | 7/2020 | Silverman et al. |
| 2020/0237505 A1 | 7/2020 | Bruchman et al. |
| 2020/0246137 A1 | 8/2020 | Bruchman et al. |
| 2020/0276014 A1 | 9/2020 | Burkart et al. |
| 2020/0323631 A1 | 10/2020 | Chuter et al. |
| 2020/0323668 A1 | 10/2020 | Diedering et al. |
| 2020/0345494 A1 | 11/2020 | Srinimukesh et al. |
| 2020/0352718 A1 | 11/2020 | Rowe et al. |
| 2021/0015615 A1 | 1/2021 | Groothuis et al. |
| 2021/0121289 A1 | 4/2021 | Bruchman et al. |
| 2021/0145576 A1 | 5/2021 | Becerra et al. |
| 2021/0177589 A1 | 6/2021 | Arcaro et al. |
| 2021/0205074 A1 | 7/2021 | Bruchman et al. |
| 2021/0228354 A1 | 7/2021 | Rafiee et al. |
| 2021/0259835 A1 | 8/2021 | Tyler, II et al. |
| 2021/0307900 A1 | 10/2021 | Hacohen |
| 2021/0307905 A1 | 10/2021 | Arcaro et al. |
| 2021/0338422 A1 | 11/2021 | Dienno et al. |
| 2021/0346156 A1 | 11/2021 | Haarer et al. |
| 2021/0361420 A1 | 11/2021 | Bennett et al. |

(56) References Cited

U.S. PATENT DOCUMENTS

| | | |
|---|---|---|
| 2021/0378817 A1 | 12/2021 | Nia et al. |
| 2021/0386544 A1 | 12/2021 | Cooper et al. |
| 2021/0393399 A1 | 12/2021 | Arcaro et al. |
| 2022/0000611 A1 | 1/2022 | Arcaro et al. |
| 2022/0023032 A1 | 1/2022 | Bruchman et al. |
| 2022/0142777 A1 | 5/2022 | Scheinblum et al. |
| 2022/0257369 A1 | 8/2022 | Burkart et al. |
| 2022/0273426 A1 | 9/2022 | Hagaman et al. |
| 2022/0287836 A1 | 9/2022 | Landon et al. |
| 2022/0346993 A1 | 11/2022 | Srinimukesh et al. |
| 2022/0378575 A1 | 12/2022 | Busalacchi et al. |
| 2022/0401243 A1 | 12/2022 | Diedering et al. |
| 2023/0000623 A1 | 1/2023 | Bennett |
| 2023/0000624 A1 | 1/2023 | Okabe et al. |
| 2023/0200980 A1 | 6/2023 | Peterson et al. |
| 2023/0218391 A1 | 7/2023 | Dass et al. |
| 2023/0380963 A1 | 11/2023 | Kaufman et al. |
| 2023/0390052 A1 | 12/2023 | Okafor et al. |
| 2023/0404753 A1 | 12/2023 | Luong et al. |
| 2024/0008978 A1 | 1/2024 | Nawalakhe et al. |
| 2024/0091000 A1 | 3/2024 | King et al. |

FOREIGN PATENT DOCUMENTS

| | | |
|---|---|---|
| CA | 2304325 A1 | 10/2000 |
| CA | 2297536 A1 | 12/2000 |
| CA | 2462509 A1 | 4/2003 |
| CA | 2849030 A1 | 4/2013 |
| CA | 2878691 A1 | 1/2014 |
| CA | 2964546 A1 | 1/2014 |
| CA | 2960034 A1 | 3/2016 |
| CN | 101057796 A | 10/2007 |
| CN | 101091675 A | 12/2007 |
| CN | 101188985 A | 5/2008 |
| CN | 101374477 A | 2/2009 |
| CN | 101420913 A | 4/2009 |
| CN | 101849863 A | 10/2010 |
| CN | 101902989 A | 12/2010 |
| CN | 201744060 U | 2/2011 |
| CN | 102015009 A | 4/2011 |
| CN | 102119013 A | 7/2011 |
| CN | 102292053 A | 12/2011 |
| CN | 102438546 A | 5/2012 |
| CN | 102573703 A | 7/2012 |
| CN | 102652694 A | 9/2012 |
| CN | 102724937 A | 10/2012 |
| CN | 102764169 A | 11/2012 |
| CN | 102791223 A | 11/2012 |
| CN | 102883684 A | 1/2013 |
| CN | 103079498 A | 5/2013 |
| CN | 103228232 A | 7/2013 |
| CN | 103237524 A | 8/2013 |
| CN | 103384505 A | 11/2013 |
| CN | 103732183 A | 4/2014 |
| CN | 103781439 A | 5/2014 |
| CN | 103945796 A | 7/2014 |
| CN | 104114127 A | 10/2014 |
| CN | 104487023 A | 4/2015 |
| CN | 104507417 A | 4/2015 |
| CN | 104869948 A | 8/2015 |
| CN | 105007955 A | 10/2015 |
| CN | 105101911 A | 11/2015 |
| CN | 105263445 A | 1/2016 |
| CN | 105662651 A | 6/2016 |
| CN | 105792780 A | 7/2016 |
| CN | 106668949 A | 5/2017 |
| CN | 106714733 A | 5/2017 |
| CN | 106794065 A | 5/2017 |
| CN | 107106294 A | 8/2017 |
| CN | 107690323 A | 2/2018 |
| CN | 108578016 A | 9/2018 |
| DE | 2246526 A1 | 3/1973 |
| DE | 19532846 A1 | 3/1997 |
| DE | 19546692 A1 | 6/1997 |
| DE | 19857887 A1 | 7/2000 |
| DE | 19907646 A1 | 8/2000 |
| DE | 10010074 A1 | 10/2001 |
| DE | 10049812 A1 | 4/2002 |
| DE | 10049813 C1 | 4/2002 |
| DE | 10049814 A1 | 4/2002 |
| DE | 10049815 A1 | 4/2002 |
| DE | 102006052564 B3 | 12/2007 |
| DE | 212013000104 U1 | 11/2014 |
| EP | 0103546 A1 | 3/1984 |
| EP | 0144167 A2 | 6/1985 |
| EP | 0293090 A2 | 11/1988 |
| EP | 0313263 A2 | 4/1989 |
| EP | 0582870 A2 | 2/1994 |
| EP | 0592410 A1 | 4/1994 |
| EP | 0597967 A1 | 5/1994 |
| EP | 0775472 A2 | 5/1997 |
| EP | 0815806 A2 | 1/1998 |
| EP | 0850607 A1 | 7/1998 |
| EP | 0893108 A2 | 1/1999 |
| EP | 1057460 A1 | 12/2000 |
| EP | 1088529 A2 | 4/2001 |
| EP | 1171059 A1 | 1/2002 |
| EP | 1239901 A1 | 9/2002 |
| EP | 1255510 A1 | 11/2002 |
| EP | 1259194 A1 | 11/2002 |
| EP | 1318775 A1 | 6/2003 |
| EP | 1369098 A1 | 12/2003 |
| EP | 1469797 A1 | 10/2004 |
| EP | 1472996 A1 | 11/2004 |
| EP | 1570809 A1 | 9/2005 |
| EP | 1653888 A2 | 5/2006 |
| EP | 1666003 A1 | 6/2006 |
| EP | 1849440 A1 | 10/2007 |
| EP | 1935377 A1 | 6/2008 |
| EP | 1395205 B1 | 7/2008 |
| EP | 1235537 B1 | 12/2008 |
| EP | 2124826 A1 | 12/2009 |
| EP | 2168536 A1 | 3/2010 |
| EP | 2193762 A1 | 6/2010 |
| EP | 2255750 A2 | 12/2010 |
| EP | 2400923 A1 | 1/2012 |
| EP | 2413842 A1 | 2/2012 |
| EP | 2446915 A1 | 5/2012 |
| EP | 2489331 A2 | 8/2012 |
| EP | 2359774 B1 | 1/2013 |
| EP | 2591100 A2 | 5/2013 |
| EP | 2109417 B1 | 11/2013 |
| EP | 2745805 A1 | 6/2014 |
| EP | 2749254 A1 | 7/2014 |
| EP | 2750630 A1 | 7/2014 |
| EP | 2777616 A1 | 9/2014 |
| EP | 2777617 A1 | 9/2014 |
| EP | 2918249 A2 | 9/2015 |
| EP | 2948103 A2 | 12/2015 |
| EP | 2967858 A2 | 1/2016 |
| EP | 2168536 B1 | 4/2016 |
| EP | 3037064 A1 | 6/2016 |
| EP | 3046511 A2 | 7/2016 |
| EP | 3057541 A1 | 8/2016 |
| EP | 3075354 A2 | 10/2016 |
| EP | 3139864 A1 | 3/2017 |
| EP | 3142603 A1 | 3/2017 |
| EP | 3142608 A1 | 3/2017 |
| EP | 3184083 A1 | 6/2017 |
| EP | 2413842 B1 | 8/2017 |
| EP | 2446915 B1 | 1/2018 |
| EP | 3294220 A1 | 3/2018 |
| EP | 3417813 A1 | 12/2018 |
| EP | 3570779 A1 | 11/2019 |
| EP | 2918249 B1 | 4/2020 |
| EP | 2777616 B1 | 8/2020 |
| EP | 3797738 A1 | 3/2021 |
| EP | 2750630 B1 | 6/2021 |
| EP | 2777617 B1 | 9/2022 |
| FR | 2591100 A1 | 6/1987 |
| FR | 2788217 A1 | 7/2000 |
| GB | 1264471 A | 2/1972 |
| GB | 1315844 A | 5/1973 |
| GB | 2056023 A | 3/1981 |

(56) References Cited

FOREIGN PATENT DOCUMENTS

| | | |
|---|---|---|
| GB | 2312485 A | 10/1997 |
| GB | 2398245 A | 8/2004 |
| GB | 2513194 A | 10/2014 |
| IN | 101926699 A | 12/2010 |
| JP | 44-032400 | 12/1969 |
| JP | 1969-032400 B | 12/1969 |
| JP | 02-000645 A | 1/1990 |
| JP | 09-241412 A | 9/1997 |
| JP | 10-507097 A | 7/1998 |
| JP | 11-290448 A | 10/1999 |
| JP | 11-512635 A | 11/1999 |
| JP | 2000-511459 A | 9/2000 |
| JP | 2000-513248 A | 10/2000 |
| JP | 2001-000460 A | 1/2001 |
| JP | 2001-508641 A | 7/2001 |
| JP | 2001-508681 A | 7/2001 |
| JP | 2001-509702 A | 7/2001 |
| JP | 2001-511030 A | 8/2001 |
| JP | 2002-525169 A | 8/2002 |
| JP | 2002-541915 A | 12/2002 |
| JP | 2004-510471 A | 4/2004 |
| JP | 2005-500101 A | 1/2005 |
| JP | 2005-512611 A | 5/2005 |
| JP | 2005-514108 A | 5/2005 |
| JP | 2007-525291 A | 9/2007 |
| JP | 2007-526098 A | 9/2007 |
| JP | 2007-536989 A | 12/2007 |
| JP | 2008-506459 A | 3/2008 |
| JP | 2008-535572 A | 9/2008 |
| JP | 4335487 B2 | 9/2009 |
| JP | 2010-500107 A | 1/2010 |
| JP | 2010-504174 A | 2/2010 |
| JP | 2010-517623 A | 5/2010 |
| JP | 2010-528761 A | 8/2010 |
| JP | 2010-188189 A | 9/2010 |
| JP | 2010-535075 A | 11/2010 |
| JP | 2010-536527 A | 12/2010 |
| JP | 2012-504031 A | 2/2012 |
| JP | 2012-152563 A | 8/2012 |
| JP | 2013-506439 A | 2/2013 |
| JP | 2013-543399 A | 12/2013 |
| JP | 2014-513585 A | 6/2014 |
| JP | 2014-517720 A | 7/2014 |
| JP | 2015-523168 A | 8/2015 |
| JP | 2016-501104 A | 1/2016 |
| JP | 2016-501115 A | 1/2016 |
| JP | 2016-509932 A | 4/2016 |
| JP | 2016-510645 A | 4/2016 |
| JP | 2016-512753 A | 5/2016 |
| JP | 2016-518948 A | 6/2016 |
| JP | 2017-527397 A | 9/2017 |
| JP | 2018-079352 A | 5/2018 |
| JP | 6392778 B2 | 9/2018 |
| JP | 6802300 B2 | 12/2020 |
| NO | 01/64278 A1 | 9/2001 |
| RU | 2124986 C1 | 1/1999 |
| RU | 2434604 C1 | 11/2011 |
| SU | 1271508 A1 | 11/1986 |
| WO | 9116041 A1 | 10/1991 |
| WO | 9117720 A1 | 11/1991 |
| WO | 9217118 A1 | 10/1992 |
| WO | 9301768 A1 | 2/1993 |
| WO | 94/13224 A1 | 6/1994 |
| WO | 94/16802 A1 | 8/1994 |
| WO | 95/05555 A1 | 2/1995 |
| WO | 95/09586 A1 | 4/1995 |
| WO | 96/02212 A1 | 2/1996 |
| WO | 96/07370 A1 | 3/1996 |
| WO | 96/40348 A1 | 12/1996 |
| WO | 97/10871 A1 | 3/1997 |
| WO | 9724080 A1 | 7/1997 |
| WO | 9829057 A1 | 7/1998 |
| WO | 99/26558 A1 | 6/1999 |
| WO | 9933414 A1 | 7/1999 |
| WO | 9940964 A1 | 8/1999 |
| WO | 9947075 A1 | 9/1999 |
| WO | 00/18333 A1 | 4/2000 |
| WO | 00/41649 A1 | 7/2000 |
| WO | 0041652 A1 | 7/2000 |
| WO | 00/47271 A1 | 8/2000 |
| WO | 0047139 A1 | 8/2000 |
| WO | 00/62716 A1 | 10/2000 |
| WO | 0061034 A1 | 10/2000 |
| WO | 01/28453 A2 | 4/2001 |
| WO | WO-2001028459 A1 | 4/2001 |
| WO | WO-2001035878 A2 | 5/2001 |
| WO | 01/41679 A1 | 6/2001 |
| WO | WO-2001049213 A2 | 7/2001 |
| WO | WO-2001054624 A1 | 8/2001 |
| WO | WO-2001054625 A1 | 8/2001 |
| WO | WO-2001064137 A1 | 9/2001 |
| WO | 01/74272 A2 | 10/2001 |
| WO | WO-2001076510 A2 | 10/2001 |
| WO | 02/07795 A2 | 1/2002 |
| WO | 02/24118 A1 | 3/2002 |
| WO | 02/24119 A1 | 3/2002 |
| WO | 0236048 A1 | 5/2002 |
| WO | WO-2002041789 A2 | 5/2002 |
| WO | 02/45933 A2 | 6/2002 |
| WO | 02/47468 A1 | 6/2002 |
| WO | 02/60506 A1 | 8/2002 |
| WO | 2002/100301 A1 | 12/2002 |
| WO | 03/03946 A1 | 1/2003 |
| WO | 03/07795 A2 | 1/2003 |
| WO | 03/47468 A1 | 6/2003 |
| WO | 03047468 A1 | 6/2003 |
| WO | 03/90834 A2 | 11/2003 |
| WO | 03092554 A1 | 11/2003 |
| WO | 2004/000375 A1 | 12/2003 |
| WO | 2004030569 A2 | 4/2004 |
| WO | 2005011534 A1 | 2/2005 |
| WO | 2005034812 A1 | 4/2005 |
| WO | WO-2005062980 A2 | 7/2005 |
| WO | 2005/084595 A1 | 9/2005 |
| WO | 2005087140 A1 | 9/2005 |
| WO | 2005102015 A2 | 11/2005 |
| WO | 2005/112827 A2 | 12/2005 |
| WO | 2006/019626 A2 | 2/2006 |
| WO | 2006014233 A2 | 2/2006 |
| WO | 2006034008 A2 | 3/2006 |
| WO | 2006/058322 A2 | 6/2006 |
| WO | 2006085225 A1 | 8/2006 |
| WO | 2006108090 A2 | 10/2006 |
| WO | 2006111391 A1 | 10/2006 |
| WO | 2006138173 A2 | 12/2006 |
| WO | 2007/016251 A2 | 2/2007 |
| WO | 2007025028 A1 | 3/2007 |
| WO | 2008005405 A2 | 1/2008 |
| WO | 2008/021002 A1 | 2/2008 |
| WO | 2008/028964 A2 | 3/2008 |
| WO | 2008/036870 A2 | 3/2008 |
| WO | 2008035337 A2 | 3/2008 |
| WO | 2008/049045 A2 | 4/2008 |
| WO | 2008/052421 A1 | 5/2008 |
| WO | 2008/091589 A1 | 7/2008 |
| WO | 2008/021006 A3 | 8/2008 |
| WO | 2008/097589 A1 | 8/2008 |
| WO | 2008/097592 A2 | 8/2008 |
| WO | 2008125153 A1 | 10/2008 |
| WO | 2008/150529 A1 | 12/2008 |
| WO | 2008147964 A1 | 12/2008 |
| WO | 2009/017827 A1 | 2/2009 |
| WO | 2009024859 A2 | 2/2009 |
| WO | 2009026563 A2 | 2/2009 |
| WO | 2009/029199 A1 | 3/2009 |
| WO | 2009/045332 A2 | 4/2009 |
| WO | 2009042196 A2 | 4/2009 |
| WO | 2009091509 A1 | 7/2009 |
| WO | 2009094500 A1 | 7/2009 |
| WO | 2009/100210 A1 | 8/2009 |
| WO | 2009/108355 A1 | 9/2009 |
| WO | WO-2009116041 A2 | 9/2009 |
| WO | 2010/006783 A1 | 1/2010 |
| WO | 2010/008570 A1 | 1/2010 |

(56) References Cited

FOREIGN PATENT DOCUMENTS

| | | |
|---|---|---|
| WO | 2010005524 A2 | 1/2010 |
| WO | 2010008549 A1 | 1/2010 |
| WO | 2010/030766 A1 | 3/2010 |
| WO | 2010/037141 A1 | 4/2010 |
| WO | 2010/057262 A1 | 5/2010 |
| WO | 2010/086460 A1 | 8/2010 |
| WO | 2010121076 A2 | 10/2010 |
| WO | 2010/132707 A1 | 11/2010 |
| WO | 2010/150208 A2 | 12/2010 |
| WO | 2011002996 A2 | 1/2011 |
| WO | 2011081997 A1 | 7/2011 |
| WO | 2011/098565 A1 | 8/2011 |
| WO | 2011/109450 A2 | 9/2011 |
| WO | 2011/109801 A2 | 9/2011 |
| WO | 2011/112706 A2 | 9/2011 |
| WO | 2012/004460 A2 | 1/2012 |
| WO | 2012/011261 A1 | 1/2012 |
| WO | 2012008459 A1 | 1/2012 |
| WO | 2012/040643 A2 | 3/2012 |
| WO | 2012032187 A1 | 3/2012 |
| WO | 2012/047644 A2 | 4/2012 |
| WO | 2012/065080 A2 | 5/2012 |
| WO | 2012/082952 A2 | 6/2012 |
| WO | 2012/099979 A1 | 7/2012 |
| WO | 2012095455 A2 | 7/2012 |
| WO | 2012/110767 A2 | 8/2012 |
| WO | 2012/116368 A2 | 8/2012 |
| WO | 2012/135603 A2 | 10/2012 |
| WO | 2012/158944 A1 | 11/2012 |
| WO | 2012/167131 A1 | 12/2012 |
| WO | 2013005878 A1 | 1/2013 |
| WO | 2013028387 A2 | 2/2013 |
| WO | 2013/074663 A2 | 5/2013 |
| WO | 2013/074990 A1 | 5/2013 |
| WO | 2013/096854 A2 | 6/2013 |
| WO | 2013/109337 A1 | 7/2013 |
| WO | 2013106585 A1 | 7/2013 |
| WO | 2014/018189 A2 | 1/2014 |
| WO | 2014/018432 A2 | 1/2014 |
| WO | 2014009213 A1 | 1/2014 |
| WO | 2014079291 A1 | 5/2014 |
| WO | 2014/099150 A1 | 6/2014 |
| WO | 2014/099163 A1 | 6/2014 |
| WO | 2014/099722 A1 | 6/2014 |
| WO | 2014/144937 A2 | 9/2014 |
| WO | 2014/149319 A1 | 9/2014 |
| WO | 2014145338 A1 | 9/2014 |
| WO | 2014149865 A1 | 9/2014 |
| WO | 2014163706 A1 | 10/2014 |
| WO | 2014/181188 A2 | 11/2014 |
| WO | 2014194178 A1 | 12/2014 |
| WO | 2015004624 A1 | 1/2015 |
| WO | 2015004625 A1 | 1/2015 |
| WO | 2015/045002 A1 | 4/2015 |
| WO | 2015057407 A1 | 4/2015 |
| WO | 2015077274 A1 | 5/2015 |
| WO | 2015/085138 A1 | 6/2015 |
| WO | 2015/171743 A2 | 11/2015 |
| WO | 2015/173794 A1 | 11/2015 |
| WO | 2016002189 A1 | 1/2016 |
| WO | 2016004137 A1 | 1/2016 |
| WO | 2016/028591 A1 | 2/2016 |
| WO | 2016016899 A1 | 2/2016 |
| WO | 2016/044223 A1 | 3/2016 |
| WO | 2016/100913 A1 | 6/2016 |
| WO | 2016/172349 A1 | 10/2016 |
| WO | 2016/186909 A1 | 11/2016 |
| WO | 2017006510 A1 | 1/2017 |
| WO | 2017/038145 A1 | 3/2017 |
| WO | 2017035487 A1 | 3/2017 |
| WO | 2017/096157 A1 | 6/2017 |
| WO | 2018000333 A1 | 1/2018 |
| WO | 2018213209 A1 | 11/2018 |
| WO | 2019/067219 A1 | 4/2019 |
| WO | 2019/067220 A1 | 4/2019 |
| WO | 2019/074607 A1 | 4/2019 |
| WO | 2019/074869 A1 | 4/2019 |
| WO | 2019/089138 A1 | 5/2019 |
| WO | 2019/246268 A1 | 12/2019 |
| WO | 2022002054 A1 | 1/2022 |
| WO | 2023006048 A1 | 2/2023 |
| WO | 2023076103 A1 | 5/2023 |
| WO | 2023081236 A1 | 5/2023 |
| WO | 2023091769 A1 | 5/2023 |
| WO | 2023096804 A1 | 6/2023 |
| WO | 2023154250 A1 | 8/2023 |
| WO | 2023196150 A1 | 10/2023 |
| WO | 2023244454 A1 | 12/2023 |
| WO | 2023244767 A1 | 12/2023 |
| WO | 2023250114 A1 | 12/2023 |
| WO | 2024001789 A1 | 1/2024 |
| WO | 2024003620 A1 | 1/2024 |
| WO | 2024007575 A1 | 1/2024 |
| WO | 2024009540 A1 | 1/2024 |
| WO | 2024010739 A1 | 1/2024 |
| WO | 2024030520 A1 | 2/2024 |

OTHER PUBLICATIONS

International Preliminary Report on Patentability received for PCT Patent Application No. PCT/US2020/044603, mailed on Feb. 10, 2022, 9 pages.
International Search Report and Written Opinion received for PCT Patent Application No. PCT/US2020/044603, mailed on Oct. 20, 2020, 12 pages.
English translation of RU2434604 (C1), filed Apr. 30. 2010, translation powered by EPO and Google, 8 pages.
Nishi S, Nakayama Y, Ishibashi-Ueda FI, Okamoto Y, Yoshida M. Development of microporous self-expanding stent grafts for treating cerebral aneurysms: designing micropores to control intimal hyperplasia. J Artif Organs 2011; 14:348-356.
Cardiac Surgery in the Adult, Third Edition, Chapter 2 2008.
Clough, Norman E. Introducing a New Family of GORE ePTFE Fibers (2007), pp. 1-10.
English translation of RU2434604 (C1), filed 30.04.2010, translation powered by EPO and Google, 8 pages.
EPO Form 1002 for EP16196687.4 Filed Dec. 28, 2016.
Google Image Search Results, "S-Shaped", accessed Nov. 1, 2013.
International Preliminary Report on Patentability received for PCT Patent Application No. PCT/US2020/027921, mailed on Oct. 21, 2021, 11 pages.
International Search Report and Written Opinion received for PCT Patent Application No. PCT/US2020/027921, mailed on Jul. 24, 2020, 16 pages.
Mano Thubrikar, "The Aortic Valve", Chapter 1: Geometry of the Aortic Valve, CRC Press, Inc., Informa Healthcare, 2011, 40 pages.
Nakayama, Yasuhide. Microporous Stent Achieves Brain Aneurysm Occlusion Without Disturbing Branching Flow. NeuroNews Nov. 2012; 8:1-2.
Nishi S, Nakayama Y, Ishibashi-Ueda FI, Okamoto Y, Yoshida M. Development of microporous self-expanding stent 11 grafts for treating cerebral aneurysms: designing micropores to control intimal hyperplasia. J Artif Organs 2011; 14:348-356.
Opposition from EP16196687.4, mailed on Dec. 12, 2019, 38 pages.
Neale, Todd, "Flushing TAVI Valves With Carbon Dioxide May Protect Against Brain Injury", News > Conference News, EuroPCR 2023, TCTMD, May 16, 2023, Paris France.
Andersen, et al., "Transluminal implantation of artificial heart valves. Description of a new expandable aortic valve and initial results with implantation by catheter technique in closed chest pigs." European Heart Journal (1992), 13, 704-708.
Andersen, Henning Rud, "History of Percutaneous Aortic Valve Prosthesis," Herz 34 2009 Nr. 5, Urban & Vogel, pp. 343-346, Skejby University Hospital Department of Cardiology, Aarhus, Denmark.
Dotter, M.D., Charles T., "Transluminal Treatment of Arteriosclerotic Obstruction," University of Oregon's Minthorn Memorial Laboratory for Cardiovascular Research through Radiology, Circulation, vol. XXX, Nov. 1964, pp. 654-670.

(56) References Cited

OTHER PUBLICATIONS

Inoue, M.D., Kanji, et al., "Clinical Application of Transvenous Mitral Commissurotomy by a New Balloon Catheter," The Journal of Thoracic and Cardiovascular Surgery 87:394-402, 1984.
Pavcnik, M.D., Ph.D., Dusan, et al. "Development and Initial Experimental Evaluation of a Prosthetic Aortic Valve for Transcatheter Placement," Cardiovascular Radiology 1992; 183:151-154.
Rösch, M.D., Josef, "The Birth, Early Years and Future of Interventional Radiology," J Vasc Interv Radiol 2003; 14:841-853.
Ross, F.R.C.S., D.N., "Aortic Valve Surgery," Guy's Hospital, London, pp. 192-197, approximately 1968.
Sabbah, Ph.D., Hani N., et al., "Mechanical Factors in the Degeneration of Porcine Bioprosthetic Valves: An Overview," Journal of Cardiac Surgery, vol. 4, No. 4, pp. 302-309, Dec. 1989; ISSN 0886-0440.
Wheatley, M.D., David J., "Valve Prostheses," Rob & Smith's Operative Surgery, Fourth Edition, pp. 415-424, Butterworths 1986.
Bavaria, Joseph E. M.D. et al.: "Transcatheter Mitral Valve Implantation: The Future Gold Standard for MR?," Applicant requests the Examiner to consider this reference to be prior art as of Dec. of 2010.
Backer, Ole De, MD, et al., "Percutaneous Transcatheter Mitral Valve Replacement—An Overview of Devices in Preclinical and Early Clinical Evaluation," Contemporary Reviews in Interventional Cardiology, Circ Cardiovasc Interv. 2014;7:400-409, Applicant believes this may have been available as early as Jun. of 2014.
Bavaria, Joseph E. M.D.: "CardiAQ Valve Technologies: Transcatheter Mitral Valve Implantation," Sep. 21, 2009.
Berreklouw, Eric, PhD, et al., "Sutureless Mitral Valve Replacement With Bioprostheses and Nitinol Attachment Rings: Feasibility In Acute Pig Experiments," The Journal of Thoracic and Cardiovascular Surgery, vol. 142, No. 2, Aug. 2011 in 7 pages, Applicant believes this may have been available online as early as Feb. 7, 2011.
Boudjemline, Younes, et al., "Steps Toward the Percutaneous Replacement of Atrioventricular Valves," JACC, vol. 46, No. 2, Jul. 19, 2005:360-5.
CardiAQ Valve Technologies, "Innovations in Heart Valve Therapy," In3 San Francisco, Jun. 18, 2008, PowerPoint presentation in 19 slides.
Chiam, Paul T.L., et al., "Percutaneous Transcatheter Aortic Valve Implantation: Assessing Results, Judging Outcomes, and Planning Trials," JACC: Cardiovascular Interventions, The American College of Cardiology Foundation, vol. 1, No. 4, Aug. 2008:341-50.
Condado, Jose Antonio, et al., "Percutaneous Treatment of Heart Valves," Rev Esp Cardio. 2006;59(12):1225-31, Applicant believes this may have been available as early as December of 2006.
Feldman, Ted, MD. "Prospects for Percutaneous Valve Therapies," Circulation 2007; 116:2866-2877. Applicant believes that this may be available as early as Dec. 11, 2007.
Fitzgerald, Peter J. M.D., "Tomorrow's Technology: Percutaneous Mitral Valve Replacement, Chordal Shortening, and Beyond," Transcatheter Valve Therapies (TVT) Conference. Seattle, WA. Applicant believes this may have been available as early as Jun. 7, 2010.
"Fornell, Dave, "Transcatheter Mitral Valve replacement Devices in Development,"" Diagnostic and Interventional Cardiology, Dec. 30, 2014, p. 3, <http://www.dicardiology.com/article/transcatheter-mitral-valve-replacement-devices-development>.
Grube, E. et al., "Percutaneous aortic valve replacement for severe aortic stenosis in high-risk patients using the second- and current third-generation self-expanding CoreValve prosthesis: device success and 30-day clinical outcome." J Am Coll Cardiol. Jul. 3, 2007;50(1):69-76. Epub Jun. 6, 2007.
Karimi, Houshang, et al., "Percutaneous Valve Therapies," SIS 2007 Yearbook, Chapter 11, pp. 1-11.
"Kronemyer, Bob,""CardiAQ Valve Technologies: Percutaneous Mitral Valve Replacement," Start Up—Windhover Review of Emerging Medical Ventures, vol. 14, Issue No. 6, Jun. 2009, pp. 48-49.

Leon, Martin B., et al., "Transcatheter Aortic Valve Replacement in Patients with Critical Aortic Stenosis: Rationale, Device Descriptions, Early Clinical Experiences, and Perspectives," Semin. Thorac. Cardiovasc. Surg. 18:165-174, 2006 in 10 pages, Applicant believes this may have been available as early as the Summer of 2006.
Lutter, Georg, et al., "Off-Pump Transapical Mitral Valve Replacement," European Journal of Cardio-thoracic Surgery 36 (2009) 124-128, Applicant believes this may have been available as early as Apr. 25, 2009.
Ma, Liang, et al., "'Double-Crowned Valved Stents For Off-Pump Mitral Valve Replacement," European Journal of Cardio-thoracic Surgery 28 (2005) 194-199, Applicant believes this may have been available as early as Aug. of 2005.
Mack, Michael, M.D., "Antegrade Transcatheter Mitral valve Implantation: A Short-term Experience in Swine Model," Applicant believes this may have been presented on May of 2011 at TVT.
Mack, Michael, M.D., "Antegrade Transcatheter Mitral valve Implantation: On-Going Experience in Swine Model," Applicant believes this may have been presented on Nov. of 2011 at TCT.
Ostrovsky, Gene, "Transcatheter Mitral Valve Implantation Technology from CardiAQ," medGadget, Jan. 15, 2010, available at: http://www.medgadget.com/2010/01/transcatheter_mitral_valve_implantation_technology_from_cardiaq.html.
Preston-Maher, Georgia L., et al., "A Technical Review of Minimally Invasive Mitral Valve Replacements," Cardiovascular Engineering and Technology, vol. 6, No. 2, Jun. 2015, pp. 174-184. Applicant believes this may have been available as early as Nov. 25, 2014.
Quadri, Arshad M.D., "Transcatheter Mitral Valve Implantation (TMVI) (An Acute In Vivo Study)," Applicant believes this may have been presented on Sep. 22, 2010 at TCT.
Ratz, J. Brent, "Lsi Emt Spotlight," May 15, 2009.
Ratz, J. Brent et al., "Any experiences making an expandable stent frame?" Arch-Pub.com, Architecture Forums: Modeling, Multiple forum postings from Feb. 3, 2009 to Feb. 4, 2009, http://www.arch-pub.com.
Ratz, J. Brent, "In3 Company Overview," Jun. 24, 2009.
Ruiz, Carlos E., "Overview of Novel Transcatheter Valve Technologies," Applicant believes this may have been presented on May 27, 2010 at EuroPCR.
Spillner, J. et al., "New Sutureless 'Atrial-Mitral-Valve Prosthesis' For Minimally Invasive Mitral Valve Therapy," Textile Research Journal, 2010, in 7 pages, Applicant believes this may have been available as early as Aug. 9, 2010.
Sondergaard, Lars, et al., "Transcatheter Mitral Valve Implantation: CardiAQ™," Applicant believes this may have been presented at TCT 2013.
Sondergaard, Lars, et al., "Transcatheter Mitral Valve Implantation: CardiAQ™," Applicant believes this may have been presented at EuroPCR 2013.
Sondergaard, Lars, "CardiAQ TMVR FIH—Generation 2," Applicants believe this may have been presented in 2014 at the TVT symposium.
Treede et al.: "Transapical transcatheter aortic valve implantation using the JenaValve™ system: acute and 30-day results of the multicentre CE-mark study." http://ejcts.oxfordjournals.org/content/41/6/e131.long. Apr. 16, 2012.
Taramasso et al.: "New devices for TAVI: technologies and initial clinical experiences" http://www.nature.com/nrcardio/journal/v11/n3/full/nrcardio.2013.221.html?message-global=remove#access. Jan. 21, 2014.
Webb, John G., et al., "Transcatheter Aortic Valve Implantation: The Evolution Of Prostheses, Delivery Systems And Approaches," Archives of Cardiovascular Disease (2012) 105, 153-159. Applicant believes this may have been available as early as Mar. 16, 2012.
Wayback Machine, Cleveland Clinic Lerner Research Institute, Transcatheter Mitral Stent/Valve Prosthetic, https://web.archive.org/web/20130831094624/http://mds.clevelandclinic.org/Portfolio.aspx?n=331, indicated as archived on Aug. 31, 2013.
"Company Overview," at TVT on Jun. 25, 2009.
BioSpace, "CardiAQ Valve Technologies (CVT) Reports First-In-Human Percutaneous Transfemoral, Transseptal Implantation With Its Second Generation Transcatheter Bioprosthetic Mitral Heart

(56) References Cited

OTHER PUBLICATIONS

Valve," Jun. 23, 2015, p. 1, http://www.biospace.com/News/cardiaq-valve-technologies-cvt-reports-first- in/382370.

BioSpace, "CardiAQ Valve Technologies (CVT) Reports Cardiovascular Medicine Milestone: First-In-Humannonsurgical Percutaneous Implantation of a Bioprosthetic Mitral Heart Valve," Jun. 14, 2012, p. 1, http://www.biospace.com/News/cardiaq-valve-technologies-cvt-reports/263900.

Neovasc corporate presentation, Oct. 2009, available at http://www.neovasc.com/investors/documents/Neovasc-Corporate-Presentation-October-2009.pdf.

Medtronic, "Transcatheter Aortic Valve Delivery Catheter System Compression Loading System", Core Valve Sytem, 2014, Medtronic Inc., Santa Ana, CA.

Herrmann, Howard C. MD, "Advances in Transseptal Transcatheter Mitral Valve Replacement", tct 2018, Cardiovascular Research Foundation.

Wheatley D.J., "Valve Prostheses," Operative Surgery, 4th edition, 1986, pp. 415-424.

\* cited by examiner

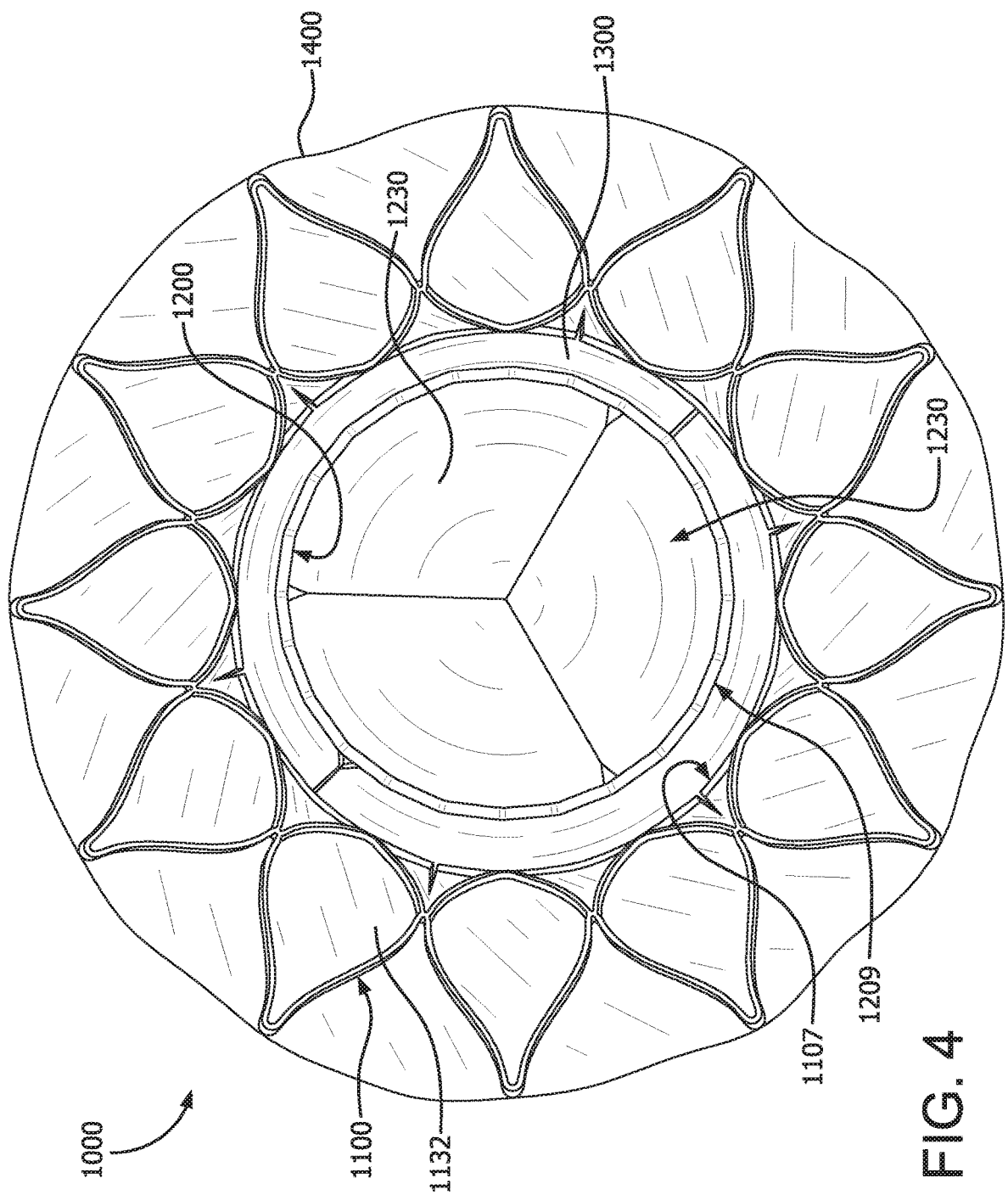

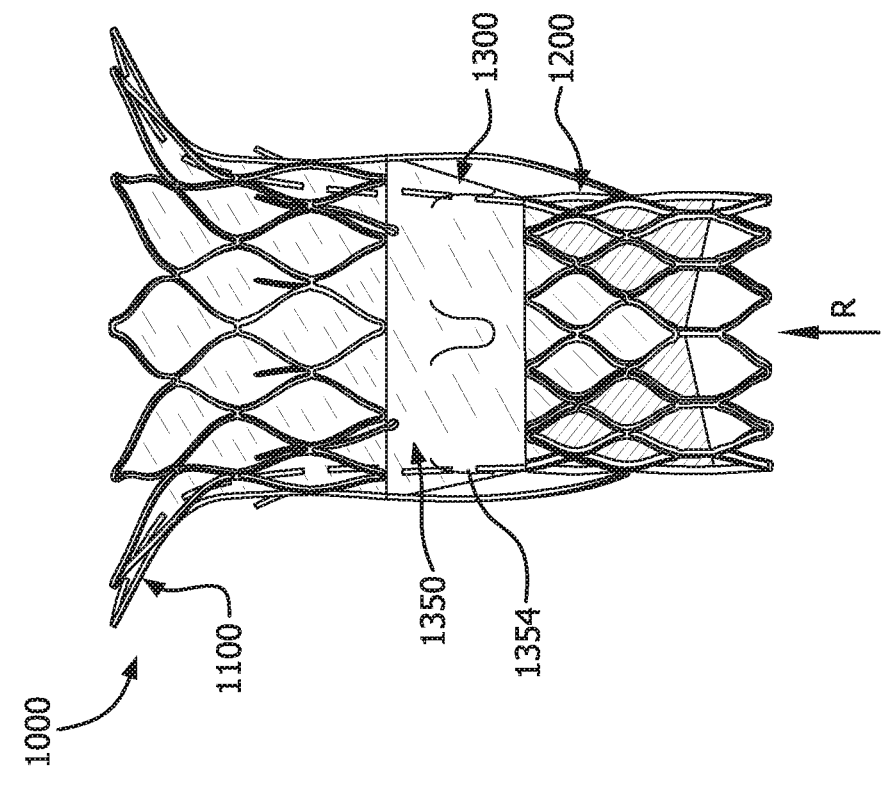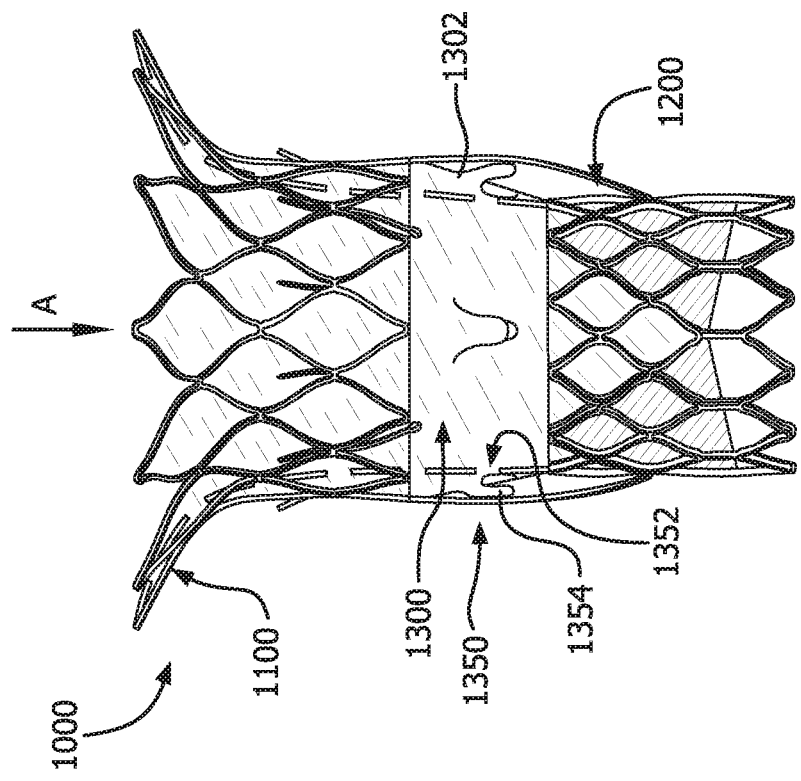
FIG. 10A
FIG. 10B

VALVE WITH MULTI-PART FRAME AND ASSOCIATED RESILIENT BRIDGING FEATURES

CROSS-REFERENCE TO RELATED APPLICATION

This application is a national phase application of PCT Application No. PCT/US2020/027921, internationally filed on Apr. 13, 2020, which claims the benefit of Provisional Application No. 62/833,176, filed Apr. 12, 2019, which is incorporated herein by reference in its entirety for all purposes.

FIELD

The present disclosure relates generally to prosthetic valves, and more specifically multi-part frame prosthetic valve devices, systems and methods.

BACKGROUND

Bioprosthetic valves have been developed that attempt to mimic the function and performance of a native valve. Bioprosthetic valves may be formed from synthetic materials, natural tissue such as biological tissue, or a combination of synthetic materials and natural tissue.

Though many conventional designs require delivery to a target region within a patient's anatomy via open-heart surgical techniques, alternative approaches such as transcatheter techniques offer a number of advantages. Among other examples, a transcatheter prosthetic valve that is delivered endovascularly via a catheter can help to minimize patient trauma as compared with an open-heart, surgical procedure. Open-heart surgery involves extensive trauma to the patient, with attendant morbidity and extended recovery. On the other hand, a valve delivered to the recipient site via a catheter avoids the trauma of open-heart surgery and may be performed on patients too ill or feeble to survive the open-heart surgery.

However, challenges exist with accessing treatment regions within the anatomy, properly positioning the bioprosthesis for deployment, and ultimately, prosthesis efficacy, among others.

SUMMARY

Various inventive concepts are disclosed relating to multi-frame prosthetic valves including leaflet and anchor frame subcomponents, where the leaflet frame subcomponent does not directly couple with patient anatomy and is separated from the anchor frame subcomponent by a gap or space. An optional connecting sheath may be provided to interconnect the anchor and leaflet frame subcomponents and assist with delivery of the prosthetic valve in an un-nested, low profile configuration and transition to a nested, deployed configuration. One or more bridging members, or annular groove covers, are provided to bridge and cover gap or space between the anchor frame subcomponent and leaflet frame subcomponent, such as at the inflow and/or outflow ends of the subcomponents. Such bridging/cover features can help provide smoother flow profiles into and/or out from the prosthetic valve, reduce incidence of complications associated with emboli, facilitate perfusion during prosthetic valve delivery, assist with telescoping nesting of the subcomponents during delivery, assist with relative positioning of the subcomponents following delivery, or provide any of a variety of additional or functions and advantages. Associated prosthetic valve devices, delivery systems, delivery methods and assembly methods are all contemplated and addressed herein.

According to one example ("Example 1"), a prosthetic valve includes a leaflet frame subcomponent including a leaflet frame and having an inflow end and an outflow end, an anchor frame subcomponent including an anchor frame and having an inflow end and an outflow end, the anchor frame subcomponent coupled to the leaflet frame subcomponent such that the prosthetic valve is configured to be transitioned from a delivery configuration in which the leaflet frame subcomponent and the anchor frame subcomponent are longitudinally offset from one another such that the inflow end of the leaflet frame subcomponent is situated distal of the outflow end of the anchor frame subcomponent to a deployed configuration in which the leaflet frame subcomponent is at least partially nested at a nested position within the anchor frame subcomponent such that the leaflet frame subcomponent and the anchor frame subcomponent define a pair of adjacent inflow end portions, a pair of adjacent outflow end portions and an annular gap between the leaflet frame subcomponent and the anchor frame subcomponent, and an annular groove cover extending between the pair of adjacent inflow end portions or the pair of adjacent outflow end portions to cover the annular groove between the leaflet frame subcomponent and the anchor frame subcomponent.

According to another example ("Example 2"), further to Example 1, the annular gap includes an inflow annular groove and the annular groove cover is an inflow annular groove cover coupled between the pair of adjacent inflow end portions to cover the inflow annular groove when the prosthetic valve is in the deployed configuration.

According to another example ("Example 3"), further to Example 1, the annular gap includes an outflow annular groove and the annular groove cover is an outflow annular groove cover coupled between the pair of adjacent outflow end portions to cover the outflow annular groove when the prosthetic valve is in the deployed configuration.

According to another example ("Example 4"), further to any preceding Example, the annular groove cover is configured to be blood-permeable under physiologic conditions prior to the prosthetic valve being transitioned to the deployed configuration.

According to another example ("Example 5"), further to any preceding Example, the annular groove cover is configured to less permeable to blood under physiologic conditions when the prosthetic valve is in the deployed configuration than when the prosthetic valve is in the not in the deployed configuration.

According to another example ("Example 6"), further to Example 1, the annular gap includes an inflow annular groove and an outflow annular groove, wherein the annular groove cover is an inflow annular groove cover coupled between the pair of adjacent inflow end portions to cover the inflow annular groove when the prosthetic valve is in the deployed configuration, and further wherein the prosthetic valve further comprises an outflow annular groove cover coupled between the pair of adjacent outflow end portions to cover the outflow annular groove when the prosthetic valve is in the deployed configuration.

According to another example ("Example 7"), further to Example 6, the outflow annular groove cover is configured to be blood-permeable under physiologic conditions prior to the prosthetic valve being transitioned to the deployed configuration.

According to another example ("Example 8"), further to either Example 6 or 7, the outflow annular groove cover is configured to be blood impermeable under physiologic conditions prior to the prosthetic valve being transitioned to the deployed configuration.

According to another example ("Example 9"), further to any preceding Example, the annular groove cover is transitionable from an extended configuration when the prosthetic valve is in the delivery configuration to a retracted configuration when the prosthetic valve is transitioned to the deployed configuration.

According to another example ("Example 10"), further to Example 9, the annular groove cover is substantially wrinkle-free in the retracted configuration.

According to another example ("Example 11"), further to Example 9 or 10, the annular groove cover is configured to resiliently transition from the extended configuration to the retracted configuration.

According to another example ("Example 12"), further to any one of Examples 9-11, the annular groove cover has an annular wall that is configured to angulate relative to a longitudinal axis of the prosthetic valve upon transitioning the annular groove cover from the extended configuration to the retracted configuration.

According to another example ("Example 13"), further to any one of Examples 9-12, the annular groove cover includes a porous elastic film that when in the extended configuration defines pores large enough to render the porous elastic film blood-permeable under physiologic conditions and when in the retracted configuration the pores are small enough to render the porous elastic film less permeable to blood under physiologic conditions.

According to another example ("Example 14"), further to any preceding Example, the annular groove cover includes a composite material formed of a retracted membrane and an elastomer.

According to another example ("Example 15"), further to Example 14, the annular groove cover includes a retracted membrane microstructure comprising serpentine fibrils.

According to another example ("Example 16"), further to any preceding Example, the annular groove cover includes at least one of a pleated configuration, a sinuous folded configuration, and a zig-zag folded configuration when the prosthetic valve is in the deployed configuration and, optionally, the annular groove cover is stretched and has an elastic bias when the prosthetic valve is in the delivery configuration.

According to another example ("Example 17"), further to any preceding Example, the annular groove cover is configured to provide a bias for translating the leaflet frame subcomponent to the nested position within the anchor frame subcomponent.

According to another example ("Example 18"), further to Example 17, the bias is sufficient to longitudinally translate the leaflet frame subcomponent into the anchor frame subcomponent when the leaflet frame subcomponent is longitudinally unconstrained relative to the anchor frame subcomponent.

According to another example ("Example 19"), further to any preceding Example, at least a portion of the annular groove cover is configured for tissue ingrowth and/or at least a portion of the annular groove cover is configured to resist tissue ingrowth.

According to another example ("Example 20"), further to any preceding Example, the prosthetic valve further includes a filler agent operable to fill a volume defined by the annular gap and, optionally, wherein the filler agent includes at least one of: hydrogel, alginate, foam, porous material, collagen, hyaluronic acid, alginic salt, cellulose, chitosan, gelatin, agarose, glycosaminoglycan, polysaccharide, and combinations thereof.

According to another example ("Example 21"), further to any preceding Example, the prosthetic valve further includes a connecting sheath coupling the leaflet frame subcomponent to the anchor frame subcomponent such that upon transitioning the prosthetic valve to the deployed configuration, the connecting sheath is everted.

According to another example ("Example 22"), further to Example 21, the annular gap is defined by the anchor frame subcomponent, the connecting sheath, and the leaflet frame subcomponent.

According to another example ("Example 23"), further to Example 21, the annular groove cover is an inflow annular groove cover coupled to and extending circumferentially adjacent an anchor frame subcomponent inflow end and a leaflet frame subcomponent inflow end, wherein the annular gap is an inflow annular groove formed by the anchor frame subcomponent, the connecting sheath, and the leaflet frame subcomponent, and further wherein the inflow annular groove cover is configured to cover the inflow annular groove when the valve is in the deployed configuration.

According to another example ("Example 24"), further to Example 21, the prosthetic valve further includes an outflow annular groove cover coupled to and circumferentially extending from adjacent an anchor frame subcomponent outflow end and a leaflet frame subcomponent outflow end, wherein, the annular gap defines an outflow annular groove formed between the anchor frame subcomponent outflow end, the connecting sheath, and the leaflet frame subcomponent outflow end, and further wherein when the valve is in the deployed configuration, the outflow annular groove cover is configured to cover the outflow annular groove.

According to another example ("Example 25"), further to Example 24, the annular groove cover is an outflow annular groove cover coupled to and circumferentially extending from adjacent an anchor frame subcomponent outflow end and a leaflet frame cover outflow edge of the leaflet frame subcomponent, wherein, when the valve is in the deployed configuration, the outflow annular groove cover is configured to cover an outflow annular groove formed between the anchor frame subcomponent outflow end, the connecting sheath, and the leaflet frame cover.

According to another example ("Example 26"), further to any one of Examples 21-25, when the prosthetic valve is in the deployed configuration, the inflow annular groove cover and/or the outflow annular groove cover are configured to have lower permeability to blood than when the prosthetic valve is not in the deployed configuration.

According to another example ("Example 27"), further to any one of Examples 21-26, after initiation, but prior to completion of transitioning the prosthetic valve to a fully deployed configuration the inflow annular groove cover and/or the outflow annular groove cover are configured to be blood permeable.

According to another example ("Example 28"), further to any preceding Example, the leaflet frame includes a leaflet frame wall and the leaflet frame subcomponent further includes one or more leaflets coupled to the leaflet frame and a leaflet frame cover coupled to the leaflet frame, the leaflet frame being generally tubular in shape and defining a leaflet frame inflow end and a leaflet frame outflow end.

According to another example ("Example 29"), further to Example 28, the leaflet frame wall of the leaflet frame includes one or more openings at least partially covered by the leaflet frame cover to define a covered portion of the leaflet frame wall, such that the leaflet frame cover is configured to restrict fluid from passing through the covered portion of the leaflet frame wall.

According to another example ("Example 30"), further to Example 28 or 29, the one or more flexible leaflets coupled to the leaflet frame are operable to open to allow flow from the leaflet frame subcomponent inflow end to pass through the leaflet frame subcomponent outflow end in antegrade flow conditions, and are operable to close to restrict flow from flowing from the leaflet frame subcomponent outflow end through the leaflet frame subcomponent inflow end in retrograde flow conditions.

According to another example ("Example 31"), further to any one of Examples 28-30, the one or more leaflets comprise a composite material including a porous synthetic fluoropolymer membrane defining pores and an elastomer or elastomeric material filling the pores, and optionally TFE-PMVE copolymer comprising from 27 to 32 weight percent perfluorom ethyl vinyl ether and respectively from 73 to 68 weight percent tetrafluoroethylene on at least a portion of the composite material, and optionally, the elastomer or elastomeric material comprises a TFE-PMVE copolymer, and optionally, the porous synthetic fluoropolymer membrane is ePTFE.

According to another example ("Example 32"), further to any preceding Example, the anchor frame subcomponent further includes an anchor frame and an anchor frame cover and the anchor frame defines a generally tubular shape, wherein an anchor frame inner surface and an anchor frame outer surface define an anchor frame wall of the anchor frame, and wherein the anchor frame wall defines one or more apertures at least partially covered by the anchor frame cover to define a covered portion of the anchor frame wall such that the anchor frame cover is configured to restrict fluid from passing through the anchor frame wall.

According to another example ("Example 33"), further to Example 32, the connecting sheath is contiguous with the anchor frame cover and the leaflet frame cover.

According to another example ("Example 34"), further to any one of Examples 21-33, the connecting sheath is a thin-walled flexible tubular member that defines a connecting sheath lumen in fluid communication with an inner lumen of the anchor frame subcomponent and an inner lumen of the leaflet frame subcomponent, and wherein the connecting sheath is operable to fold and evert when the leaflet frame subcomponent is transitioned from the undeployed configuration to the deployed configuration such that the connecting sheath lies between the leaflet frame subcomponent and the anchor frame subcomponent.

According to another example ("Example 35"), further to any one of Examples 21-34, the connecting sheath comprises flow enabling features in a wall of the connecting sheath, the wall extending between a connecting sheath inflow end and a connecting sheath outflow end, wherein the flow enabling features are operable to allow antegrade fluid flow through the connecting sheath wall and prevent retrograde flow through the connecting sheath wall after initiation, but prior to completion of transitioning the prosthetic valve to a fully deployed configuration.

According to another example ("Example 36"), further to Example 21-35, the connecting sheath comprises an inner film layer and an outer film layer, the inner film layer and the outer film layer being coupled together at least at a leaflet frame subcomponent inflow end and an anchor frame subcomponent outflow end, the inner film defining at least one inner film aperture therethrough adjacent the anchor frame subcomponent outflow end and the outer film layer defining at least one outer film aperture therethrough adjacent the leaflet frame subcomponent, the inner film layer and the outer film layer being not coupled at least between one of the inner film apertures and one of the outer film apertures so as to define a flow space therebetween operable to permit antegrade blood flow and restrict retrograde flow therethrough after initiation, but prior to completion of transitioning the prosthetic valve to a fully deployed configuration.

According to another example ("Example 37"), further to Example 21-35, the connecting sheath comprises an inner film layer and an outer film layer, the inner film layer and the outer film layer being coupled together at least at an anchor frame subcomponent outflow end, the inner film defining at least one inner film aperture therethrough adjacent the anchor frame subcomponent outflow end, the inner film layer and the outer film layer being not coupled at least downstream of the inner film apertures so as to define a flow space therebetween operable to permit antegrade blood flow with the inner film layer separating from the outer film layer at the inner film aperture and restrict retrograde flow therethrough with the inner film layer coming together and covering the inner film aperture after initiation, but prior to completion of transitioning the prosthetic valve to a fully deployed configuration.

According to another example ("Example 38"), further to any preceding Example, when the prosthetic valve is in the deployed configuration, the anchor frame defines a flared portion at the inflow end of the anchor frame subcomponent that flares or tapers radially outward.

According to another example ("Example 39"), further to any preceding Example, the prosthetic valve has a smaller diameter in the delivery configuration than in the deployed configuration.

According to another example ("Example 40"), further to any preceding Example, in the deployed configuration, the anchor frame subcomponent has an inner surface defining an inner diameter larger than the portion of the leaflet frame subcomponent that is nested within the anchor frame subcomponent.

According to another example ("Example 41"), a method of treating a native valve of a patient's anatomy includes advancing a prosthetic valve in a delivery configuration to a treatment site within a patient's anatomy, wherein in the delivery configuration a leaflet frame subcomponent and an anchor frame subcomponent of the prosthetic valve are longitudinally offset from one another such that a leaflet frame subcomponent inflow end of the leaflet frame subcomponent is situated distal of an anchor frame subcomponent inflow end of the anchor frame subcomponent, deploying the anchor frame within a tissue annulus, and nesting the leaflet frame subcomponent within the anchor frame subcomponent by changing a relative longitudinal position between the leaflet frame subcomponent and the anchor frame subcomponent such that the leaflet frame subcomponent is at least partially nested at a nested position within the anchor frame subcomponent such that the leaflet frame subcomponent and the anchor frame subcomponent define a pair of adjacent inflow end portions, a pair of adjacent outflow end portions and an annular gap between the leaflet frame subcomponent and the anchor frame subcomponent, wherein during nesting of the leaflet frame subcomponent within the anchor frame subcomponent an annular groove cover of the prosthetic valve that extends between the pair of adjacent inflow end portions or the pair of adjacent inflow end portions transitions from an extended configuration to a retracted configuration to cover the annular gap.

According to another example ("Example 42"), further to Example 41, the method further includes fully deploying the prosthetic valve at the treatment site to selectively control blood flow at the treatment site.

According to another example ("Example 43"), further to any one of Examples 41 or 42, the leaflet frame subcomponent is nested within the anchor frame subcomponent after the anchor frame subcomponent is deployed at the treatment site.

According to another example ("Example 44"), further to any one of Examples 41-43, the prosthetic valve is advanced to the treatment site via a catheter.

According to another example ("Example 45"), further to any one of Examples 41-44, nesting the leaflet frame subcomponent within the anchor frame subcomponent includes drawing the leaflet frame subcomponent proximally relative to the anchor frame subcomponent.

According to another example ("Example 46"), further to any one of Examples 41-45, the method further includes securing the prosthetic valve to a tissue annulus of the native valve such that the prosthetic valve is operable to transition between an open position wherein antegrade fluid flow is permitted, and a closed position wherein retrograde fluid flow is inhibited.

According to another example ("Example 47"), further to any one of Examples 41-46, deploying the anchor frame within a tissue annulus includes releasing constraining elements of a delivery system onto which the prosthetic valve has been coupled to facilitate deployment of the anchor frame to a larger diameter.

According to another example ("Example 48"), further to any one of Examples 41-47, the method further includes recompressing the anchor frame to a smaller diameter after deploying the anchor frame to facilitate repositioning of the prosthetic valve.

According to another example ("Example 49"), further to any one of Examples 41-48, deploying the anchor frame within a tissue annulus includes releasing constraining elements operable to expand the flange portion or flange element so as to position the flange portion or flange element against the tissue annulus.

According to another example ("Example 50"), a method of treating a patient with a prosthetic valve according to any one of Examples 1-40 includes delivering the prosthetic valve to a treatment site in a body of a patient, and deploying the prosthetic valve at the treatment site in the body of the patient.

According to another example ("Example 51"), a prosthetic valve includes a leaflet frame subcomponent including a leaflet frame and having an inflow end and an outflow end, a leaflet subcomponent operably coupled to the leaflet frame subcomponent, an anchor frame subcomponent including an anchor frame and having an inflow end and an outflow end, the leaflet frame subcomponent being configured to be in a nested configuration at a nested position at least partially within the anchor frame subcomponent, and one or more bridging members coupled between the leaflet frame subcomponent and the anchor frame subcomponent to bridge an annular gap defined between the anchor frame subcomponent and the leaflet frame subcomponent in the nested configuration, the one or more bridging members being resiliently extendible and retractable in length between an extended configuration and a retracted configuration such that the leaflet frame subcomponent is translatable longitudinally relative to the anchor frame subcomponent.

According to another example ("Example 52"), further to Example 51, the one or more bridging members include an annular membrane configured to cover the annular gap defined between the leaflet frame subcomponent and the anchor frame subcomponent when the leaflet frame subcomponent is in the nested configuration.

According to another example ("Example 53"), further to any one of Examples 51 or 52, the one or more bridging members include a proximal bridging member coupled between a proximal end portion of the anchor frame subcomponent and a proximal end portion of the leaflet frame subcomponent.

According to another example ("Example 54"), further to any one of Examples 51-53, the one or more bridging members include an outflow bridging member coupled between an outflow end portion of the anchor frame subcomponent and an outflow end portion of the leaflet frame subcomponent.

According to another example ("Example 55"), further to any one of Examples 51-54, the one or more bridging members include a bridging member that is configured to be blood impermeable under physiologic conditions.

According to another example ("Example 56"), further to any one of Examples 51-55, the one or more bridging members include a bridging member that is configured to be blood-permeable under physiologic conditions when the leaflet frame subcomponent is in an un-nested configuration with the anchor frame subcomponent.

According to another example ("Example 57"), further to any one of Examples 51-56, the one or more bridging members are substantially wrinkle-free in the retracted configuration.

According to another example ("Example 58"), further to Example 51-57, the one or more bridging members includes an elastomeric material.

According to another example ("Example 59"), further to any one of Examples 51-58, the one or more bridging members include an annular wall that is configured to angulate relative to a longitudinal axis of the prosthetic valve upon transitioning the leaflet frame subcomponent from an un-nested configuration with the anchor frame subcomponent to the nested configuration.

According to another example ("Example 60"), further to any one of Examples 51-59, the one or more bridging members include a membrane and a plurality of elastomeric members associated with the membrane.

According to another example ("Example 61"), further to any one of Examples 51-60, the one or more bridging members includes a porous elastic film that when the one or more bridging members are in the extended configuration the porous elastic film defines pores that render the one or more bridging members blood-permeable under physiologic conditions in the extended configuration and less permeable to blood under physiologic conditions it the retracted configuration.

According to another example ("Example 62"), further to any one of Examples 51-61, the one or more bridging members includes a composite material formed of a retracted membrane and an elastomer.

According to another example ("Example 63"), further to any one of Examples 51-62, the one or more bridging members includes a retracted membrane microstructure comprising serpentine fibrils.

According to another example ("Example 64"), further to any one of Examples 51-62, the one or more bridging members includes at least one of a pleated configuration, a sinuous folded configuration, and a zig-zag folded configuration in the retracted configuration.

According to another example ("Example 65"), further to any one of Examples 51-64, the one or more bridging members are configured to provide a bias for translating the leaflet frame subcomponent to the nested configuration.

According to another example ("Example 66"), further to any one of Examples 51-65, at least a portion of the one or more bridging members is configured for tissue ingrowth, and/or wherein at least a portion of the one or more bridging members is configured to resist tissue ingrowth.

According to another example ("Example 67"), further to Example 51-66, the prosthetic valve further includes a connecting sheath coupling the leaflet frame subcomponent to the anchor frame subcomponent such that upon transitioning the leaflet frame subcomponent from an un-nested configuration with the anchor frame subcomponent to the nested configuration, the connecting sheath is everted.

According to another example ("Example 68"), further to Example 67, the anchor frame subcomponent, the connecting sheath, and the leaflet frame subcomponent define an annular gap, and further wherein the one or more bridging members act to inhibit blood flow passing through the annular gap when the leaflet frame subcomponent is in the nested position and the leaflet subcomponent is operable to facilitate antegrade blood flow and the inhibit retrograde blood flow through the prosthetic valve.

According to another example ("Example 69"), further to Example 67 or 68, the connecting sheath comprises flow enabling features in a wall of the connecting sheath, the wall extending between a connecting sheath inflow end and a connecting sheath outflow end, wherein the flow enabling features are operable to allow antegrade fluid flow through the connecting sheath wall and prevent retrograde flow through the connecting sheath wall after initiation, but prior to completion of transitioning the prosthetic valve from a compacted, delivery configuration to an expanded, fully deployed configuration.

According to another example ("Example 70"), further to any one of Examples 51-69, the prosthetic valve further includes a filler operable to be delivered into an annular gap between the leaflet frame subcomponent and the anchor frame subcomponent when the leaflet frame subcomponent is in the nested configuration and the prosthetic valve is fully deployed at a treatment site.

The foregoing Examples are just that, and should not be read to limit or otherwise narrow the scope of any of the inventive concepts otherwise provided. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIGS. 3A, 3B, and 4 show a prosthetic valve in a fully-deployed configuration, according to some embodiments;

FIGS. 10A-10E show various views of assemblies and components associated with flow enabling features of a connecting sheath of a prosthetic valve, according to some embodiments;

Figure 1:
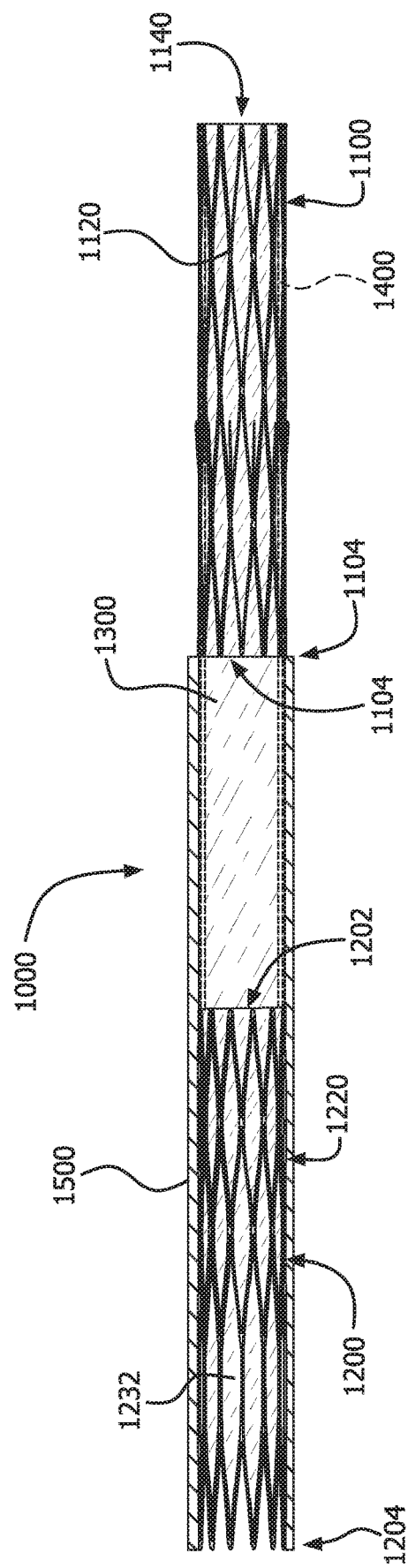
FIG. 1 is a side view of a prosthetic valve in a compressed pre-deployed configuration, according to some embodiments.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

DETAILED DESCRIPTION

Definitions and Terminology

This disclosure is not meant to be read in a restrictive manner. For example, the terminology used in the application should be read broadly in the context of the meaning those in the field would attribute such terminology.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example.

Certain terminology is used herein for convenience only. For example, words such as "top", "bottom", "upper,"

"lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

A "prosthetic valve" (also referred to as a bioprosthetic valves) may be configured to replace a native valve, such as any of the cardiac valves (e.g., aortic, mitral, or tricuspid) or other bodily valves (e.g., vascular valves). Such prosthetic valves may include leaflets that are flexible and fabricated from biological tissue, synthetic materials, or combinations thereof. In some prosthetic valve designs, the leaflets are coupled onto a relatively more rigid frame that supports the leaflets and provides dimensional stability when implanted. Typically, the leaflets move under the influence of fluid pressure where, in operation, the leaflets open when the upstream fluid pressure exceeds the downstream fluid pressure and close when the downstream fluid pressure exceeds the upstream fluid pressure. The free edges of the leaflets generally coapt under the influence of the downstream fluid pressure, which closes the valve to prevent downstream blood from flowing retrograde through the valve. In turn, the free edges of the leaflets separate, or move away from one another under the influence of upstream fluid pressure to perm it flow antegrade through the valve.

The term "leaflet" or "leaflet construct", which comprises a plurality of leaflets, as used herein in the context of prosthetic valves is a component of a one-way valve wherein the leaflet is operable to move between an open and closed position under the influence of a pressure differential. In an open position, the leaflet allows fluid (e.g., blood) to flow through the valve. In a closed position, the leaflet substantially blocks retrograde flow through the valve by occluding the prosthetic valve orifice. In embodiments comprising multiple leaflets, each leaflet cooperates with at least one neighboring leaflet or secondary structure to block the retrograde flow of blood. The pressure differential in the blood is caused, for example, by the contraction of a ventricle or atrium of the heart, such pressure differential typically resulting from a fluid pressure building up on one side of the leaflets when closed, for example, by the contraction of a ventricle or atrium of the heart. As the pressure on an inflow side of the valve rises above the pressure on the outflow side of the valve, the leaflets open and blood flows therethrough. As blood flows through the valve into a neighboring chamber or blood vessel, the pressure on the inflow side equalizes with the pressure on the outflow side. As the pressure on the outflow side of the valve rises above the blood pressure on the inflow side of the valve, the leaflet returns to the closed position generally preventing retrograde flow of blood through the valve.

It is appreciated that leaflets, where not required by the specific design or mode of function of the disclosed embodiment, may be rigid such as in mechanical valves or may be flexible as in bioprosthetic and synthetic valves. It is further appreciated that, although embodiments provided herein include a frame that supports the leaflets, the leaflets may not necessarily be supported by a frame. In other embodiments, the leaflets may be constructed as in the tissue valve art that are formed into the desired shape without a frame.

The term "frame" as used herein generically refers to any structure or support used to directly or indirectly support leaflets for use in the prosthetic valve. It will be understood that, where appropriate, that the term frame may be used interchangeably with support structure. In accordance with some embodiments, the leaflets may be supported by the wall of a solid-walled conduit, the solid-walled conduit being understood to be a frame or support structure.

The term "tubular" as used herein includes tubes having a constant diameter along the length of the tube, and tubes having a variable diameter along the length of the tube, such as, but not limited to, a taper, a non-circular transverse profile or irregular circumference, and the like. For example, a tubular member may have a variable diameter along its length in at least one configuration of the tubular member. As another example, a tubular member may have a generally constant diameter in a delivery configuration, and a variable diameter in a deployed or pre-deployed configuration (e.g., when operably positioned in an anatomy of a patient). It is understood that the term "tubular" does not require a circular profile, but may also include irregular profiles, such as, but not limited to, out-of-round profiles, elliptical profiles, square profiles, and the like.

The term "bridging member" is inclusive of the term "annular groove cover," and thus attributes described herein in association with an "annular groove cover" are generally applicable to a "bridging member" and vice versa.

The term "tissue annulus" is inclusive of native cardiac valve structures, vasculature, and other anatomical features.

The term "membrane" as used herein refers to a sheet of material comprising a single composition, such as, but not limited to, expanded fluoropolymer.

The term "composite material" as used herein refers to a material including two or more material components with one or more different material properties from the other. In some examples, a composite material includes at least a first material component in the form of a membrane and a second material component in the form of a polymer that is combined with the membrane (e.g., by coating and/or imbibing processes). The term "laminate" as used herein refers to multiple layers of membrane, composite material, or other materials, such as, but not limited to a polymer, such as, but not limited to an elastomer, elastomeric or non-elastomeric material, and combinations thereof.

The term "film" as used herein generically refers to one or more of the membrane, composite material, or laminate.

The term "elastomer" refers to a polymer or a mixture of polymers that has the ability to be stretched to at least 1.3 times its original length and to retract rapidly to approximately its original length when released.

The term "elastomeric material" refers to a polymer or a mixture of polymers that displays stretch and recovery properties similar to an elastomer, although not necessarily to the same degree of stretch and/or recovery.

The term "non-elastomeric material" refers to a polymer or a mixture of polymers that displays stretch and recovery properties not similar to either an elastomer or elastomeric material, that is, considered not an elastomer or elastomeric material as is generally known.

The term "resilient" refers to the ability to recoil or spring back into shape after bending, stretching, or being compressed.

The term "wrinkle-free" refers to freedom from creases, folds or wrinkles visible to the naked eye (i.e., on a gross scale).

The term "contiguous" refers to elements that share a common border or are touching.

The term "biocompatible material" as used herein generically refers to any material with biocompatible characteristics including synthetic materials, such as, but not limited to, a biocompatible polymer, or a biological material, such as, but not limited to, bovine pericardium. Biocompatible material may comprise a first film and a second film as described herein for various embodiments.

The section headers in the description below are not meant to be read in a limiting sense, nor are they meant to segregate the collective disclosure presented below. The disclosure should be read as a whole. The headings are simply provided to assist with review, and do not imply that discussion outside of a particular heading is inapplicable to the portion of the disclosure falling under that header.

Although various examples are described herein in association with transcatheter designs, it is appreciated that the various examples of the prosthetic valve may be suitable for either surgical or transcatheter applications. Therefore, the inventive concepts described in association with transcatheter designs are applicable for both surgical and transcatheter applications and not limited to only transcatheter applications.

Description of Various Embodiments

As will be described further below, in various examples, a prosthetic valve includes a leaflet frame subcomponent that does not directly couple with a tissue annulus or other anatomical feature in which the prosthetic valve is received. The leaflet frame subcomponent and the anchor frame subcomponent generally define a gap, or space between the two. A connecting sheath, interconnecting the two, may extend longitudinally between the leaflet frame subcomponent and the anchor frame subcomponent when the leaflet frame subcomponent is not nested within the anchor frame subcomponent. Then, when the leaflet frame subcomponent is nested within the anchor frame subcomponent, the connecting sheath is optionally everted and extends within the space between the two. One or more annular groove covers (e.g., an annular inflow groove cover or annular outflow groove cover), also described as bridging members, may additionally or alternatively connect the leaflet frame subcomponent and anchor frame subcomponent. In general terms, the bridging members are annular members (e.g., annular membranes) configured to cover annular grooves or gap between anchor frame subcomponent and leaflet frame subcomponent.

In various examples, the leaflet frame subcomponent floats, or is otherwise held in a mechanically isolated position within the anchor frame subcomponent to which the leaflet frame subcomponent is coupled. Such a configuration may be advantageous from a standpoint that the anchor frame subcomponent may conform to the patient anatomy (e.g., shape of the tissue annulus), while the leaflet frame subcomponent is not required to conform to the anatomy, or altered in shape by engagement with the anatomy. In this manner, the leaflet frame subcomponent can retain a desired shape (e.g., a right circular hollow cylinder) so as to present the leaflets with a geometrically stable platform that promotes proper, repeatable leaflet function, including opening and closing leaflet dynamics and coaptation. In different terms, such configurations provide that the anchor frame subcomponent can deform, (e.g., by being out of round or generally oval-shaped), to accommodate or otherwise conform to a native valve tissue annulus without causing a deformation of the leaflet frame subcomponent.

In various embodiments, the inflow annular groove cover (also described as a proximal annular groove cover) and/or the outflow annular groove cover (also described as an outflow annular groove cover) may assist with maintaining the relative positioning of the leaflet frame subcomponent within the anchor frame subcomponent when the prosthetic valve is fully deployed. For example, the inflow annular groove cover and/or outflow annular groove cover may be resiliently retractable and extendible, such that the groove cover(s) are able to be transitioned between extended and retracted configurations. In different terms, the inflow annular groove cover is operable to contract within the lumen of the anchor frame subcomponent from a relatively extended configuration to a relatively retracted configuration adjacent the anchor frame subcomponent inflow end.

The inflow annular groove cover and/or the outflow annular groove cover can present from the extended configuration to the retracted configuration during nesting and expansion of the leaflet frame subcomponent within the anchor frame subcomponent such that the inflow annular groove cover and/or the outflow annular groove cover take on relatively flatter shapes as the groove cover(s) contract. For example, the annular groove cover(s) may have an angular wall that is defined as the cover(s) contract and angulate as they transition from a lower angle (shallower angle) relative to a longitudinal axis of the prosthetic valve to a higher angle (steeper angle) relative to the longitudinal axis of the prosthetic valve. In some examples, the groove cover(s) extend approximately perpendicularly between the walls of the leaflet frame subcomponent and the anchor frame subcomponent in the retracted configuration.

In terms of coupling locations, in various examples, the inflow annular groove cover is coupled between a pair of adjacent proximal end portions (also described as inflow end portions) of the respective leaflet and anchor frame subcomponents and the outflow annular groove cover is coupled between a pair of adjacent outflow end portions (also described as outflow end portions) of the respective leaflet and anchor frame subcomponents. In some examples, the inflow annular groove cover first end can be coupled to the anchor frame subcomponent inflow end (also described as a proximal end) and the inflow annular groove cover second end can be coupled to the leaflet frame subcomponent inflow end (again, optionally described as a proximal end). Similarly, the outflow annular groove cover first end can be coupled to the anchor frame subcomponent outflow end (also described as a distal end) and the outflow annular groove cover second end can be coupled to the leaflet frame subcomponent outflow end (also described as a distal end).

The one or more bridging members, referred to as annular groove covers below, are configured to bridge, or extend across, an annular space, or annular gap between the anchor frame subcomponent and the leaflet frame subcomponent when the leaflet frame subcomponent is translated longitudinally and nested within the anchor frame subcomponent. In various examples, the annular groove covers are operable to cover annular gaps or grooves, such as an inflow annular groove or an outflow annular groove, respectively, defined by the anchor frame subcomponent, the connecting sheath, and the leaflet frame subcomponent at an inflow end or outflow end, respectively, of the prosthetic valve.

In the deployed, or retracted configuration, the inflow annular groove cover and/or the outflow annular groove cover extend between the leaflet frame subcomponent inflow end and the anchor frame subcomponent inflow end with the inflow annular groove cover operable to cover and restrict fluid flow into, or out from, the inflow annular groove. Where employed, the outflow annular groove cover extends between the leaflet frame subcomponent outflow end and the anchor frame subcomponent outflow end with the outflow annular groove cover operable to cover and restrict fluid flow into, or out from, the outflow annular groove. In various embodiments, the inflow annular groove cover and/or the outflow annular groove cover is less permeable to blood (e.g., blood impermeable under physiologic conditions) when in the retracted configuration. The inflow annular groove cover and/or the outflow annular groove cover may also be configured to be blood-permeable under physiologic conditions when in the extended configuration. For example, after initiation, but prior to completion of transitioning the prosthetic valve to a fully deployed configuration the inflow annular groove cover and/or the outflow annular groove cover are configured to be blood permeable.

Although various features are described above, they are provided by way of example and additional or alternative features, associated advantages, and other inventive aspects are contemplated and will be apparent from the disclosure read as a whole.

Figure 12:
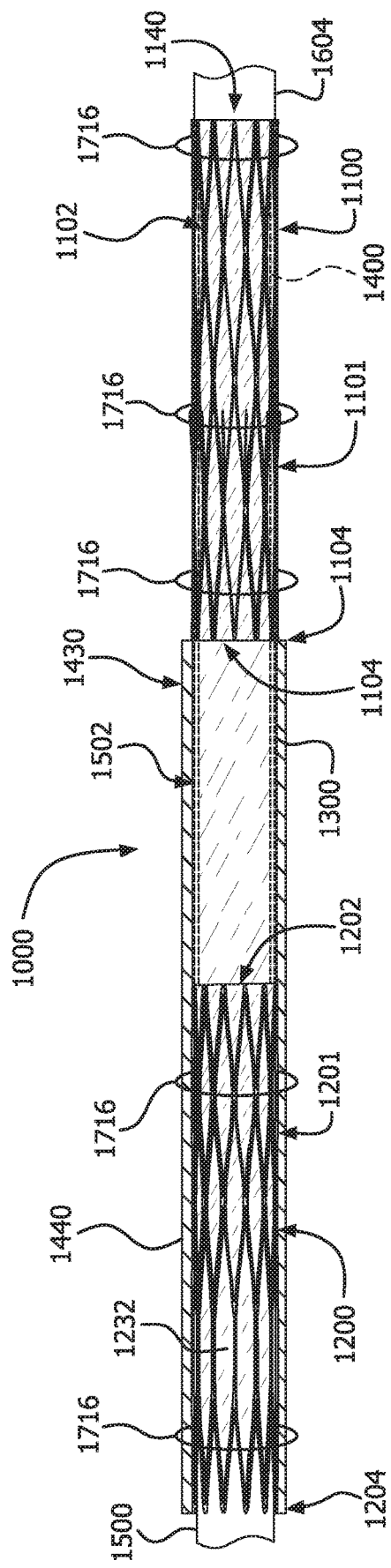
FIG. 12 shows a prosthetic valve and associated delivery device, according to some embodiments.

Various embodiments are directed to a prosthetic valve 1000 that is transitionable between a delivery, compressed, un-nested configuration (FIG. 1) and a deployed, expanded, nested configuration (FIGS. 3A and 3B) in-situ. FIG. 1 is a side view of the prosthetic valve 1000 in a pre-deployed state, where the prosthetic valve 1000 is in a delivery, un-nested configuration. As shown, the prosthetic valve 1000 includes an anchor frame subcomponent 1100, a leaflet frame subcomponent 1200 in coaxial alignment with the anchor frame subcomponent 1100, a connecting sheath 1300 extending between and in coaxial serial alignment with the anchor frame subcomponent 1100 and the leaflet frame subcomponent 1200, an inflow annular groove cover 1400 (hidden, but indicated in broken lines), and an outflow annular groove cover 1500 (shown in cross-section). As subsequently described and as shown in FIG. 12, the prosthetic valve 1000 may be carried in the pre-deployed configuration on a delivery device 1600.

The prosthetic valve 1000 provides a leaflet frame subcomponent 1200 that essentially floats within the anchor frame subcomponent 1100 and does not directly couple with the anchor frame subcomponent 1100 nor the native valve tissue annulus. The anchor frame subcomponent 1100 may conform to the shape of the native valve tissue annulus whereas the leaflet frame subcomponent 1200 does not conform to the shape of the native valve tissue annulus. The leaflet frame subcomponent 1200 remains a right circular hollow cylinder or at a predetermined geometrical configuration so as to present the valve leaflet(s) with a geometrically stable platform ensuring proper leaflet function, including opening and closing dynamics and, for flexible leaflets, coaptation. It is appreciated that these benefits associated with the leaflet frame subcomponent 1200 not needing to conform to the native valve tissue annulus may be realized in either transcatheter or surgical placement of the prosthetic valve 1000.

In various embodiments, as discussed in greater detail below, the prosthetic valve 1000 is configured such that the anchor frame subcomponent 1100 and the leaflet frame subcomponent 1200 can be nested in-situ after the anchor frame subcomponent 1100 and the leaflet frame subcomponent 1200 are deployed to a treatment site in a patient's anatomy. That is, in various embodiments, the prosthetic valve 1000 can be delivered to a treatment region within a patient's anatomy with the anchor frame subcomponent 1100 and the leaflet frame subcomponent 1200 longitudinally offset relative to one another and subsequently nested with one another at the treatment site. In various embodiments, the prosthetic valve 1000 is loaded onto a delivery catheter with the anchor frame subcomponent 1100 and the leaflet frame subcomponent 1200 longitudinally offset relative to one another which presents a lower profile or diameter than if the prosthetic valve 1000 were to be loaded onto the delivery catheter in the nested configuration. A lower delivery profile of a transcatheter delivered prosthetic valve has well recognized advantages, including easier advancement though vessels.

It is appreciated that these benefits associated with the leaflet frame subcomponent 1200 not being nested into the anchor frame subcomponent 1100 during implantation may also be realized in surgical placement of the prosthetic valve 1000. By way of example, but not limited thereto, the anchor frame subcomponent 1100 may be more easily sutured into the native valve tissue annulus without the leaflet frame subcomponent 1200 being within the anchor frame subcomponent 1100 and in close proximity to the suturing procedure lessening the chance of needle damage to the leaflets.

FIGS. 2A-2D are each a side view of different variations of the prosthetic valve 1000 each in an expanded, un-nested configuration showing the leaflet frame subcomponent 1200 and the anchor frame subcomponent 1100 having each been expanded to larger diameters relative to what they exhibit in the compressed configuration of FIG. 1. The views of FIGS. 2A-2D would be as if the prosthetic valve 1000 were radially/circumferentially unconstrained from the con-strained pre-nested configuration of FIG. 1, such as when the prosthetic valve 1000 is placed over a delivery catheter 1604 of the delivery device 1600 prior to being compressed and constrained onto the delivery catheter 1604 (e.g., using one or more constraining elements 1716 associated with the delivery device 1600 as shown in FIG. 12).

Figure 2A:
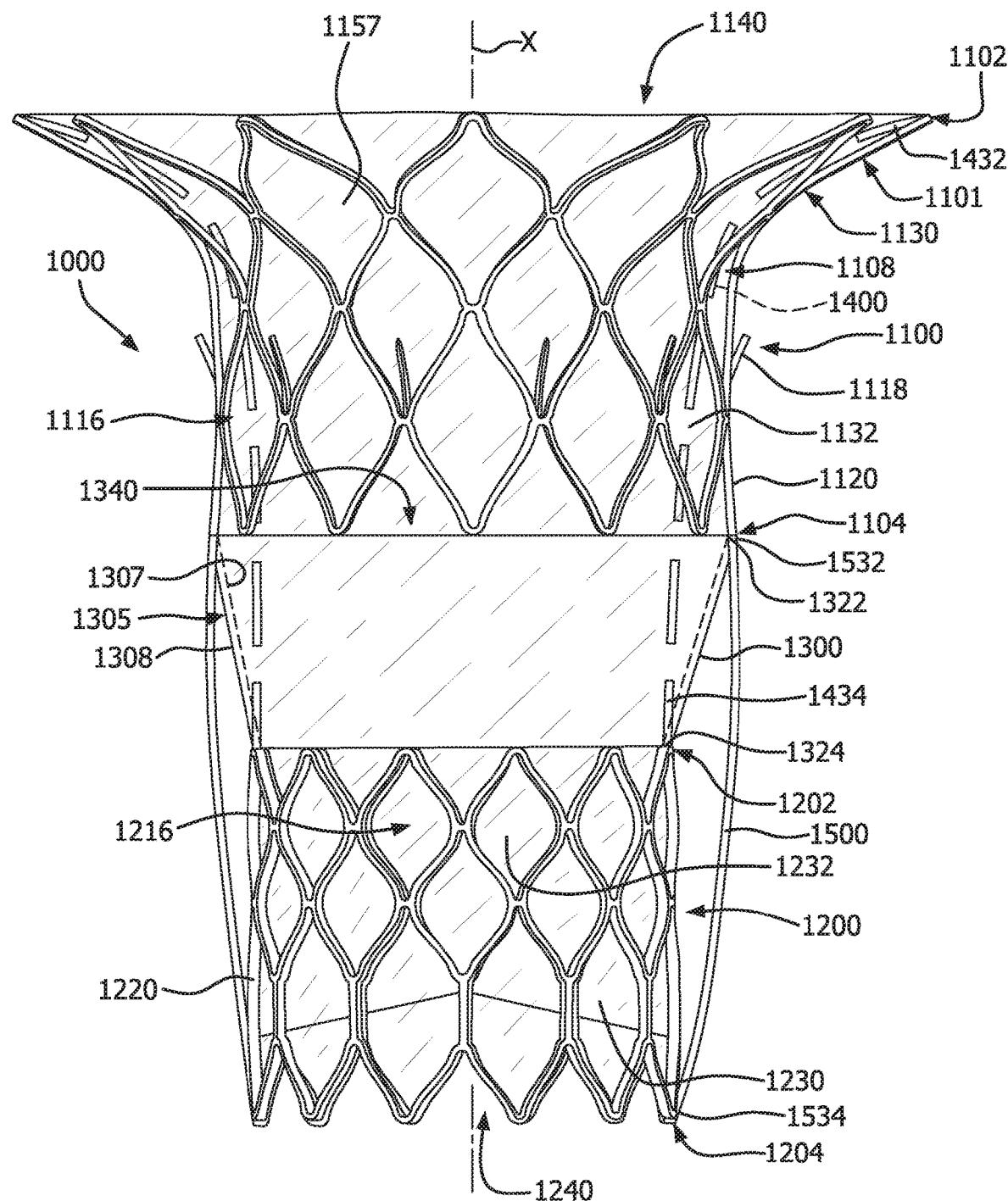
FIGS. 2A-2D are side views of the prosthetic valve of FIG. 1 in expanded pre-deployed configurations, according to some embodiments.
Figure 2B:
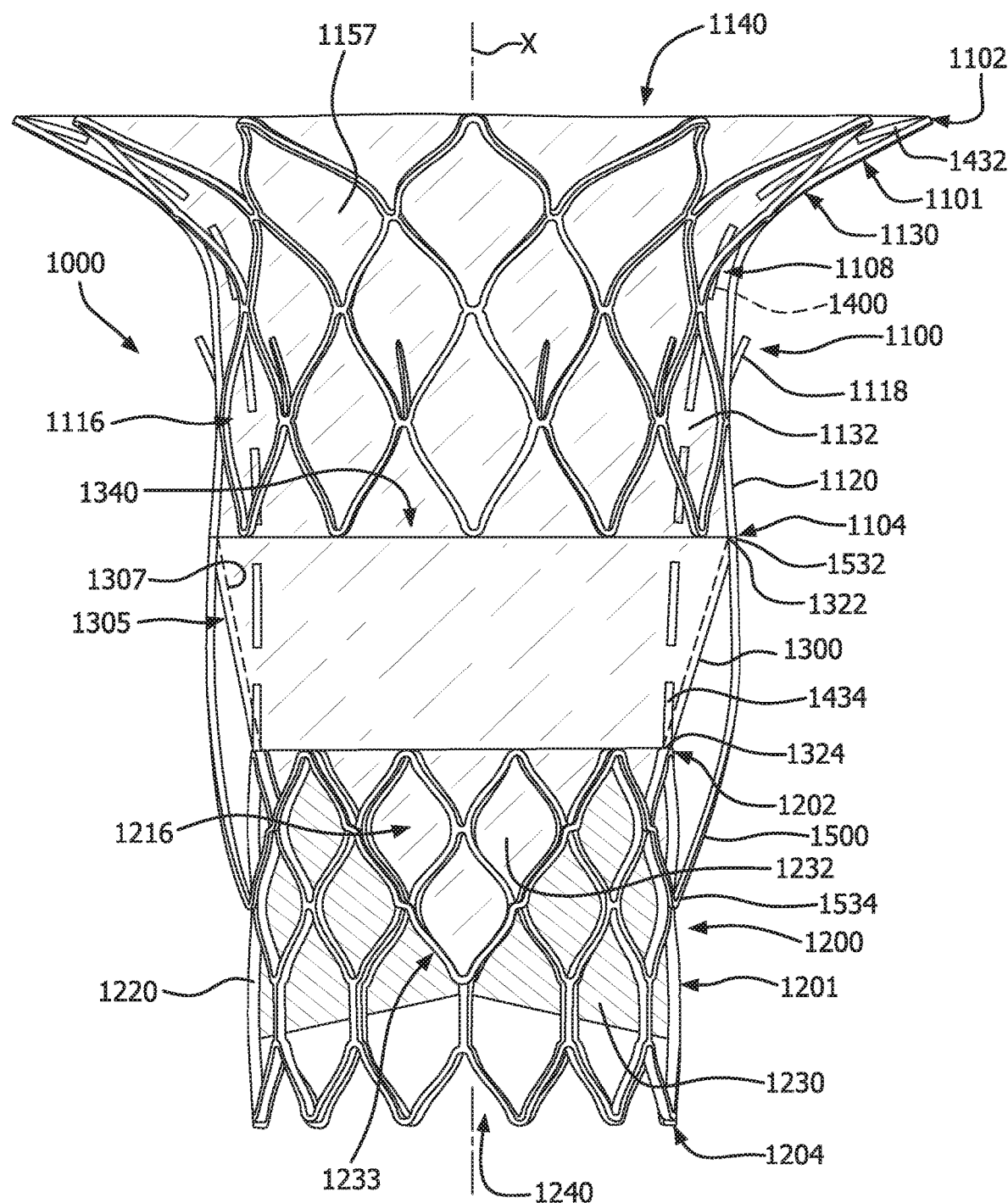
Figure 2C:
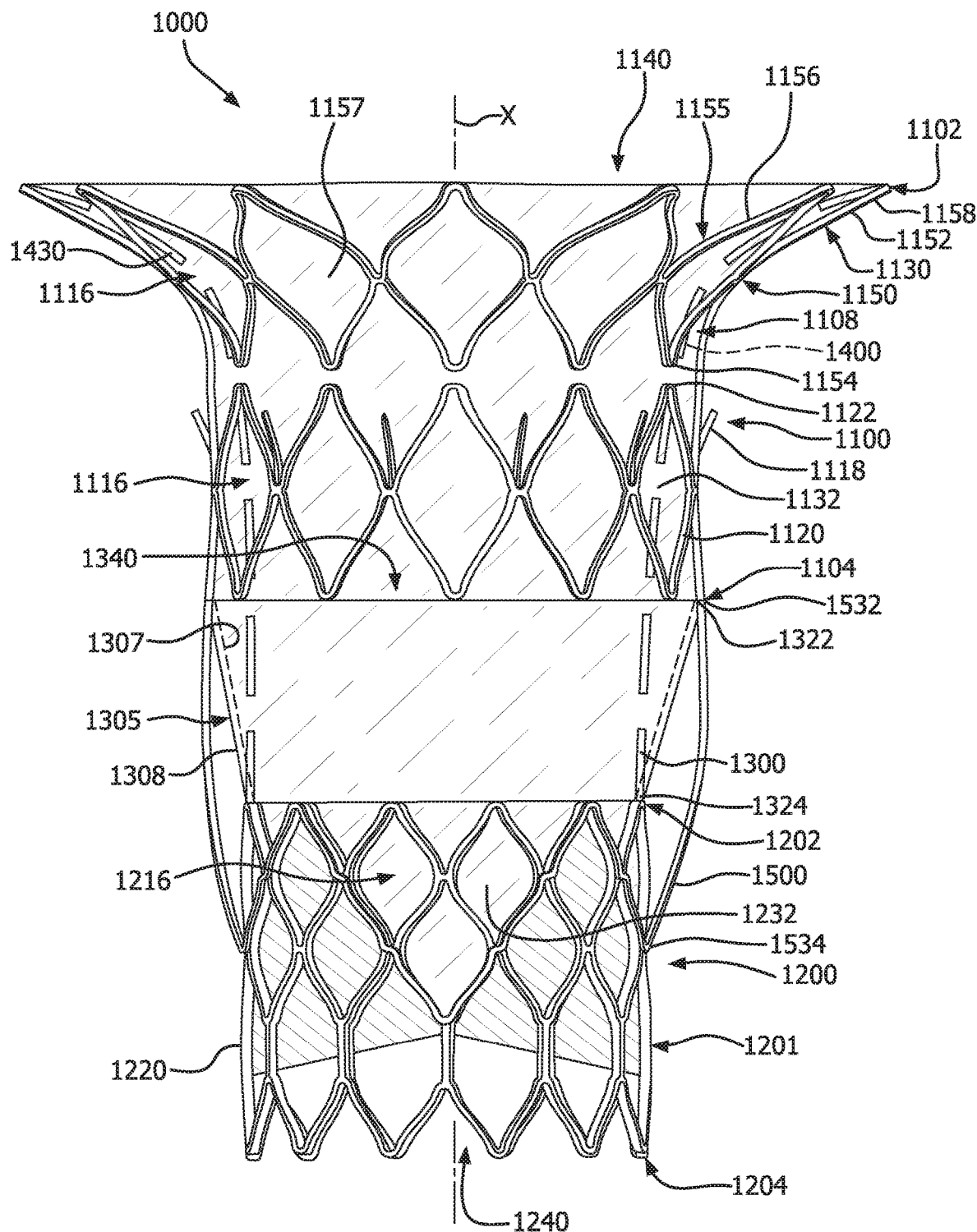
Figure 2D:
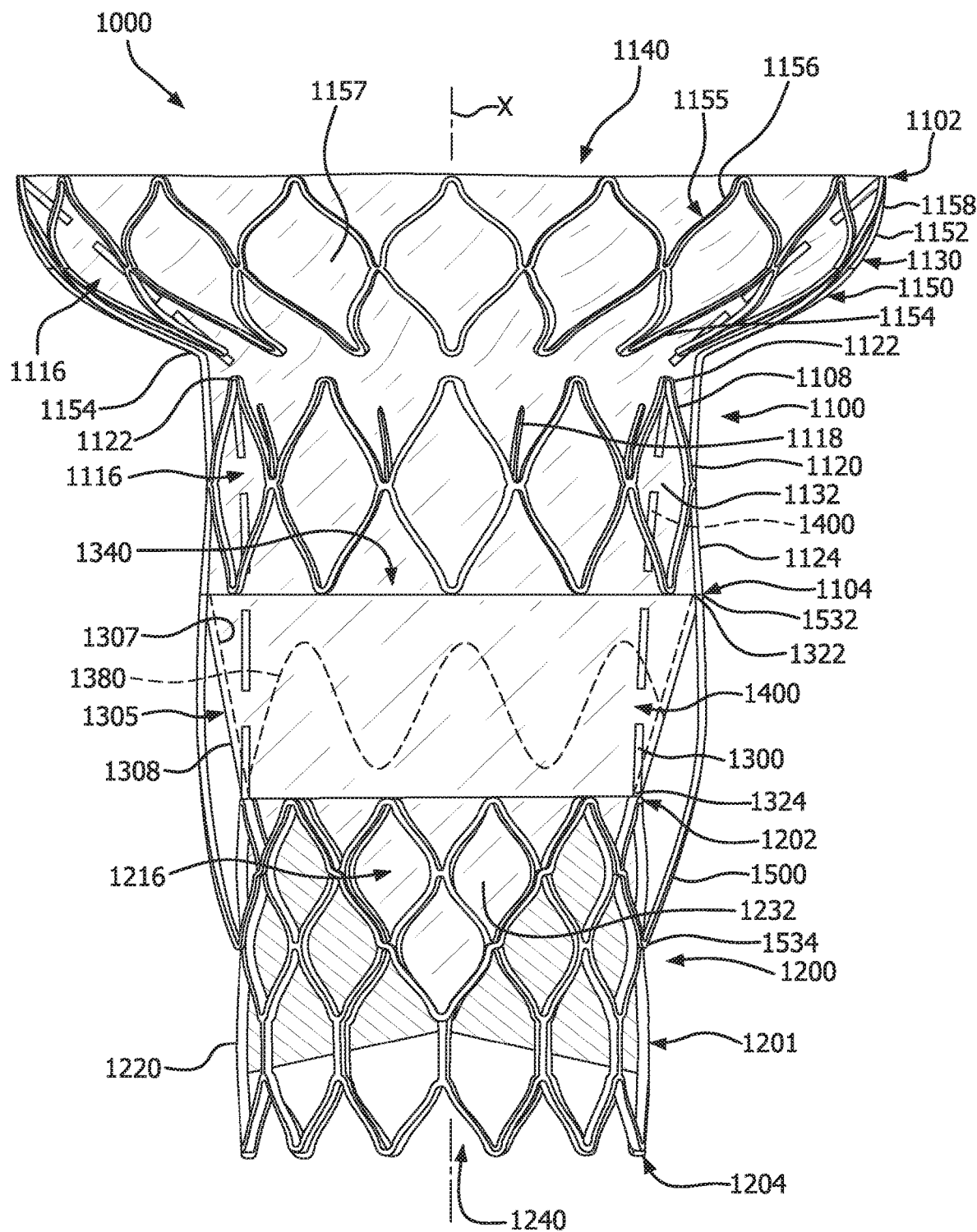
Figure 3A:
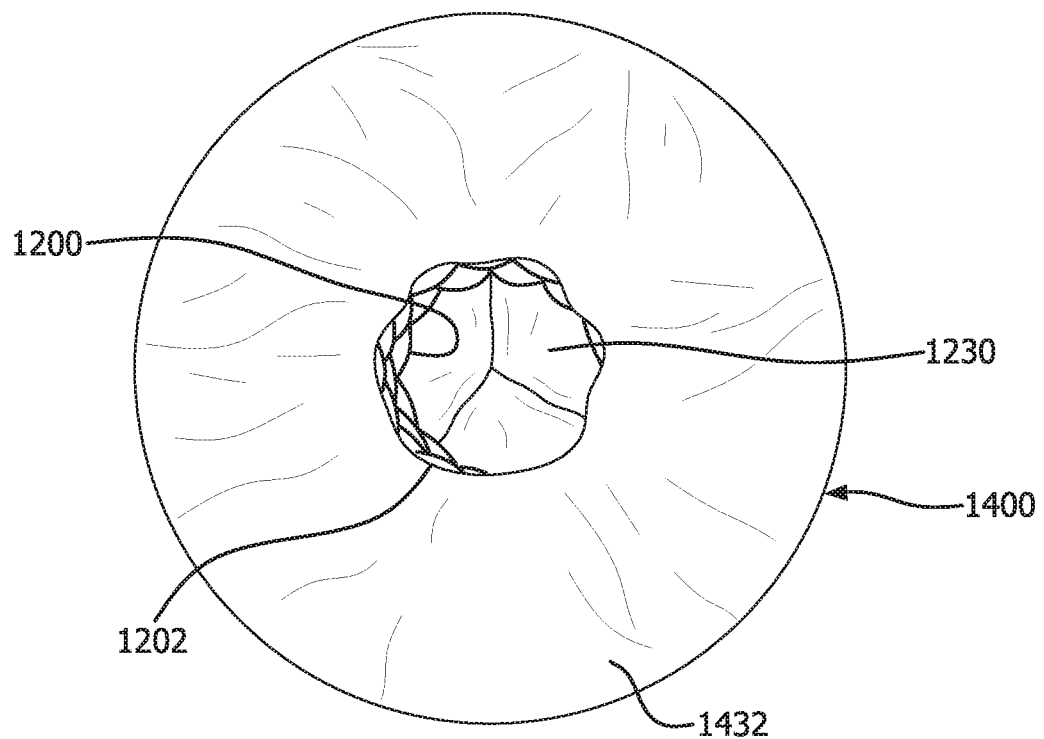
Figure 3B:
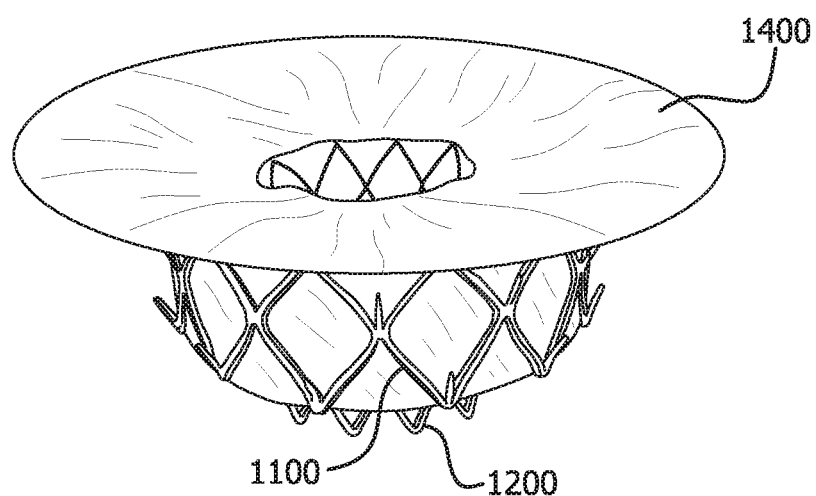

FIG. 3A is an axial view from the inflow side of the prosthetic valve 1000 in a fully deployed, nested configuration with the leaflet frame subcomponent 1200 nested within the anchor frame subcomponent 1100 at a nested position, according to some examples. FIG. 3B is an isometric view of the prosthetic valve 1000 in the fully deployed, nested configuration with both the anchor frame subcomponent 1100 and the leaflet frame subcomponent 1200 transitioned to a fully expanded configuration. FIG. 4 is an axial view of the prosthetic valve 1000 from the inflow end in the deployed configuration showing the anchor frame subcomponent 1100, the leaflet frame subcomponent 1200, and the connecting sheath 1300 therebetween, and the inflow annular groove cover 1400 shown as being transparent for clarity of visualizing the other components. As understood with reference to FIGS. 1 to 4, the anchor frame subcomponent 1100 and the leaflet frame subcomponent 1200 are generally tubular shaped and operable to have a smaller delivery configuration diameter and a larger deployed configuration diameter, facilitated by balloon expansion and/or self-expansion deployment means.

Anchor Frame Subcomponent

Figure 5:
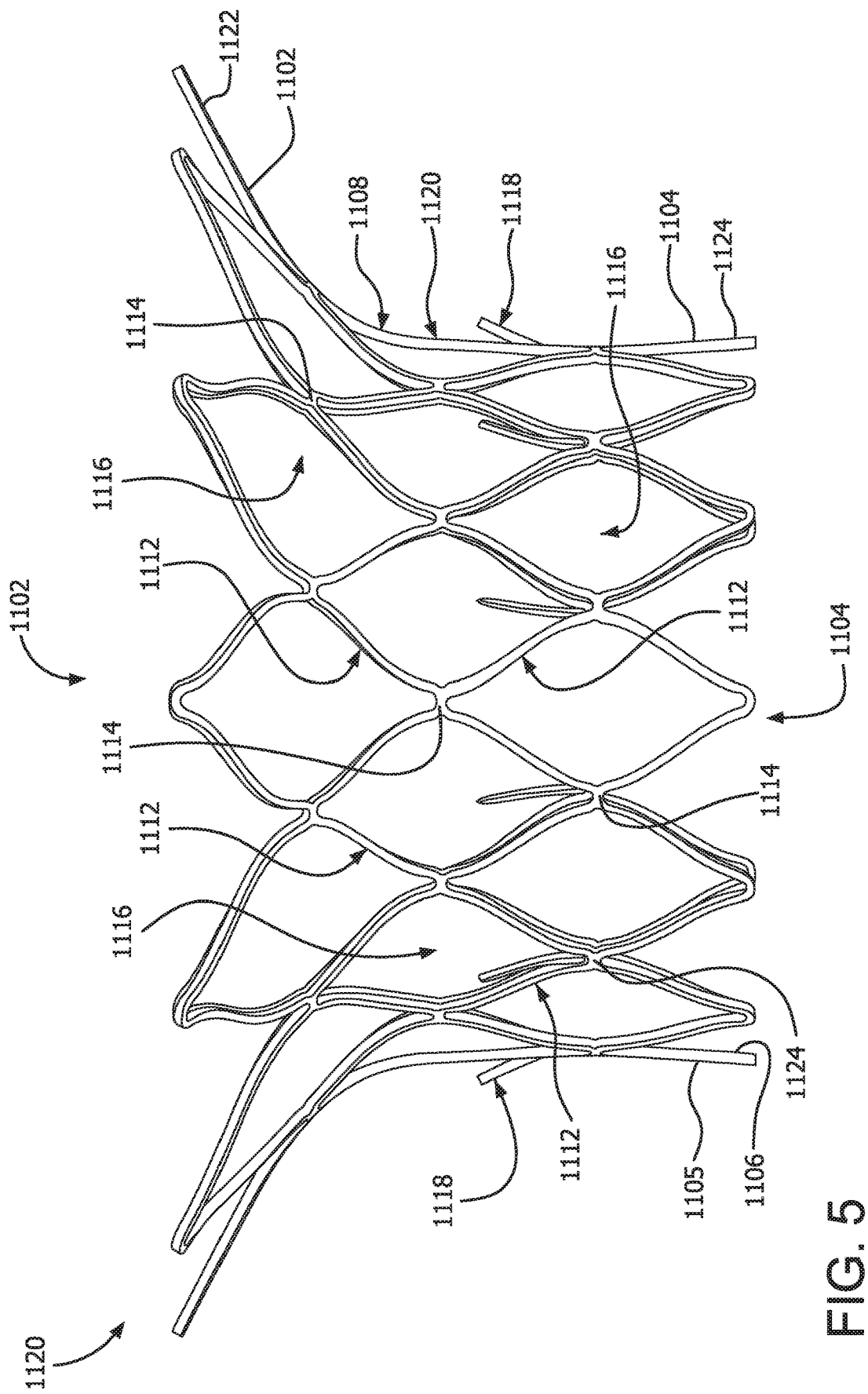
FIGS. 5 and 6 show an anchor frame of a prosthetic valve, according to some embodiments.
Figure 6:
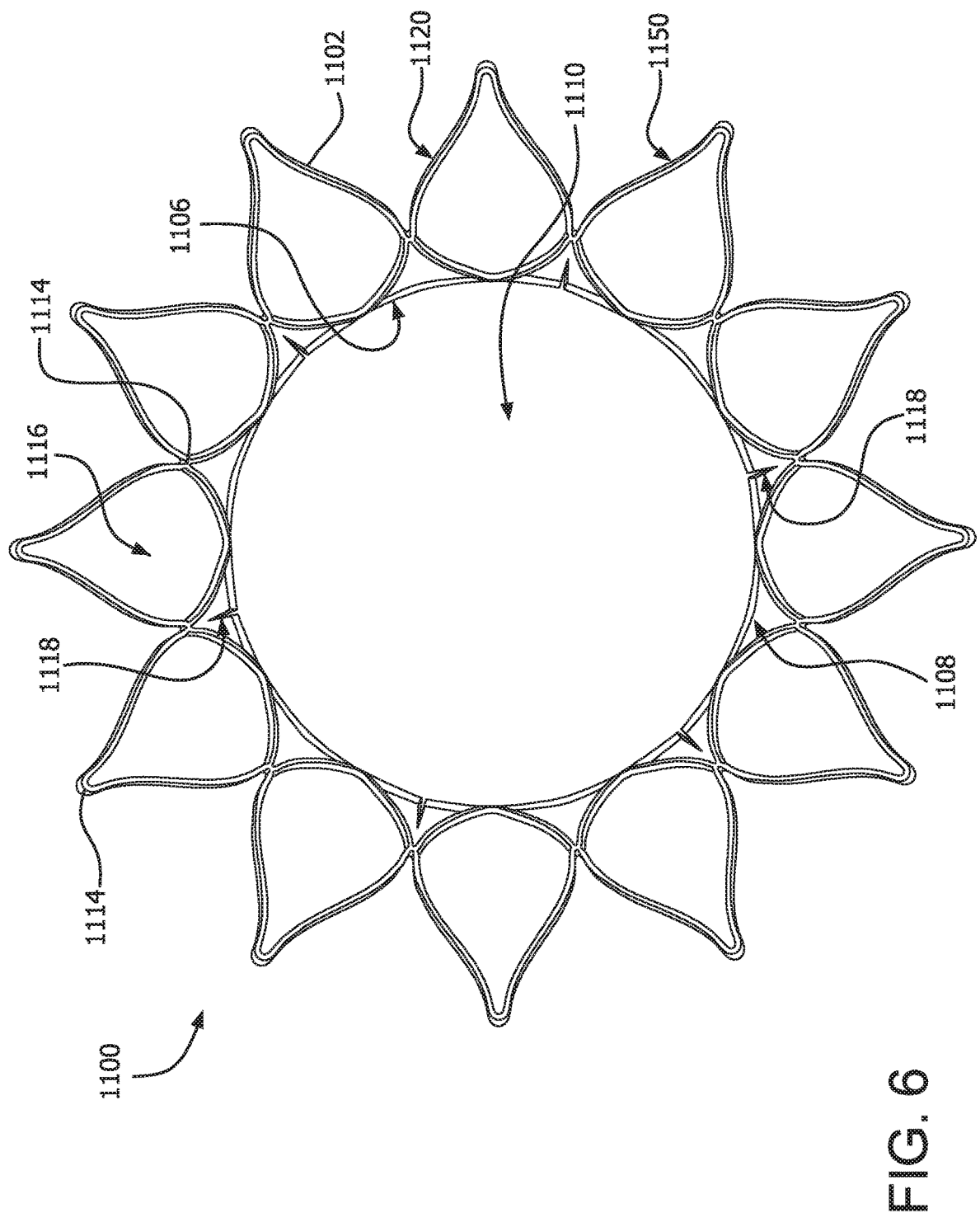

In some embodiments, the anchor frame subcomponent 1100 includes an anchor frame 1120 and an anchor frame cover 1132 as shown in FIGS. 2A-2D. FIG. 5 is a side view of the anchor frame 1120 and FIG. 6 is an axial view of the anchor frame 1120. The anchor frame wall 1105 of the anchor frame 1120 may be at least partially covered by the anchor frame cover 1132 (e.g., a film or fabric, FIGS. 2A-2D) that is suitable for desired effect, such as to restrict fluid from passing through the anchor frame wall 1105 of the anchor frame 1120, to encourage tissue ingrowth of the anchor frame subcomponent 1100 with the implant site, or alternative or additional purposes as desired. The anchor frame cover 1132 may be coupled to the inner surface, outer surface, or both inner surface and outer surface of the anchor frame 1120. For illustrative purposes, the following examples are suitable especially for a transcatheter application, but are also suitable for a surgical application.

As shown in FIGS. 5 and 6, the anchor frame 1120 is a generally tubular member having an anchor frame inflow end 1122 corresponding to an anchor frame subcomponent inflow end 1102 (FIGS. 2A-2D, also described as a proximal end), an anchor frame outflow end 1124 corresponding to an anchor frame subcomponent outflow end 1104 (FIGS. 2A-2D, also described as a distal end), an anchor frame inner surface 1106 and an anchor frame outer surface 1108 defining an anchor frame wall 1105, wherein the anchor frame inner surface 1106 defines an anchor frame subcomponent lumen 1140 therethrough. For reference, the anchor frame subcomponent 1100 defines an inflow end portion and an outflow end portion proximate the anchor frame subcomponent inflow end 1102 and the anchor frame subcomponent outflow end 1104, respectively.

As shown in FIG. 6, the anchor frame subcomponent lumen 1140 is a generally cylindrical void defined between the anchor frame subcomponent inflow end 1102 (FIGS. 2A-2D) and the anchor frame subcomponent outflow end 1104 (FIGS. 2A-2D), and the anchor frame inner surface 1106 of the anchor frame subcomponent 1100. However, in-situ, the anchor frame subcomponent lumen 1140 may adopt an irregular cross section, depending on the geometry of the tissue annulus into which it is placed and the conformity of the anchor frame subcomponent 1100 to the tissue annulus at the implant site. In various examples, the anchor frame 1120 is configured to couple or otherwise be secured to a native valve tissue annulus. Accordingly, in various examples, a diameter of the anchor frame 1120 (e.g., a diameter of the anchor frame outer surface 1108), and essentially the diameter of the anchor frame subcomponent outer surface 1109 (FIGS. 2A-2D) of the anchor frame subcomponent 1100 is sized in accordance with patient anatomy.

It will be appreciated that nonlimiting examples of an anchor frame subcomponent 1100 can be provided with a diameter (e.g., a diameter of an exterior surface of the anchor frame subcomponent 1100) in a range of between twenty-five (25) millimeters and fifty (50) millimeters, depending on a patient's anatomy. However, anchor frames 1120 having diameters (e.g., a diameter of an anchor frame outer surface 1108) less than twenty-five (25) millimeters and more than fifty (50) millimeters are also envisioned and fall within the scope of the present disclosure, depending on patient anatomy. In general terms, anchor frame subcomponent inner surface 1107 (shown generically in FIG. 4) of the anchor frame subcomponent 1100 has a diameter at least slightly larger than the outer surface of the leaflet frame subcomponent 1200 to facilitate nesting of the leaflet frame subcomponent 1200 telescopically within the anchor frame subcomponent 1100 and to allow the leaflet frame subcomponent 1200 to float, or otherwise be held in a mechanically isolated position within the anchor frame subcomponent 1100.

In various examples, the anchor frame 1120 is elastically deformable so as to be self-expanding. In some embodiments, the anchor frame 1120 comprises a shape memory material operable to flex under load and retain its original shape when the load is removed, thus allowing the anchor frame subcomponent 1100 to self-expand from a compressed shape to a predetermined larger shape. The anchor frame 1120 may comprise the same or different materials as the leaflet frame, described in further detail below. In some examples, the anchor frame 1120 is plastically deformable, such that it may be mechanically expanded by a radial expansion force, such as with a balloon.

In some embodiments, the anchor frame 1120 defines a tubular mesh having a framework defining apertures or voids 1116 as shown in FIG. 5. For example, as shown, the anchor frame 1120 includes a plurality of frame members 1112 that are interconnected and arranged in one or more patterns. In some examples, these patterns repeat one or more times. In some such examples, the frame members 1112 are arranged and interconnected such that the anchor frame 1120 includes a plurality of patterned rows. In various examples, the frame members 1112 are connected to one another at various joints 1114. In some examples, these joints 1114 operate as flex points so as to provide a preferential flexing location for the anchor frame 1120 to flex when compressed to a smaller delivery diameter and when forces from the surrounding anatomy act to compress the anchor frame 1120 during normal operation after delivery and deployment of the prosthetic valve 1000. A flex point or joint 1114 may comprise a site on the anchor frame 1120 that undergoes a high degree of bending. In some examples, the joints 1114 have a geometry, structural modification or material modification, among others, that biases the anchor frame 1120 to preferentially bend at the flex point or joint 1114 when compressed.

In some embodiments, one or more closed cell apertures or voids 1116 are defined between the joints 1114 and the interconnected frame members 1112 of the anchor frame 1120. As shown, such apertures or voids 1116 can extend from the anchor frame outer surface 1108 to the anchor frame subcomponent inner surface 1107 of the anchor frame 1120. As illustrated in the embodiments of FIGS. 5 and 6, one or more of the apertures or voids 1116 define a diamond shape when the anchor frame 1120 is in a deployed configuration. Upon compression to a smaller diameter (e.g., a delivery diameter), one or more of the joints 1114 and the frame members 1112 deform such that the apertures or voids 1116 generally define an elongated diamond shape (e.g., as shown generally in FIG. 1). Upon expanding the anchor frame 1120 to a larger diameter during deployment at a treatment site, the apertures or voids 1116 expand to define the generally wider diamond shape.

It should be appreciated that while the frame members 1112 illustrated and described herein are interconnected and define apertures or voids 1116 having generally a diamond shape, the interconnected frame members 1112 may be arranged in a number of alternative patterns. For example, a framework of the anchor frame 1120 can define any number of features, repeatable or otherwise, such as geometric shapes and/or linear or meandering series of sinusoids. Geometric shapes can comprise any shape that facilitates circumferential compressibility and expandability of the anchor frame 1120. That is, a number of alternative patterns are envisioned where the arrangement of frame members 1112 is configured in such a manner as to provide for an anchor frame 1120 that can be compressed to a smaller diameter for transcatheter delivery and subsequently expanded (or allowed to expand) to a larger diameter at a treatment site during deployment of the prosthetic valve 1000. Accordingly, the disclosure should not be read as being limited to arrangements of the frame members 1112 that define diamond-shaped apertures or voids 1116.

In various embodiments, the anchor frame 1120 may comprise or otherwise be formed from a cut tube, or any other element suitable for the particular purpose of the anchor frame 1120 as described herein. In some examples, the anchor frame 1120 may be etched, cut, laser cut, or stamped into a tube or a sheet of material, with the sheet then formed into a tubular structure. Alternatively, an elongated material, such as a wire, bendable strip, or a series thereof, can be bent or braided and formed into a tubular structure wherein the wall of the tube comprises an open framework that is compressible to a smaller diameter in a generally uniform and circumferential manner and expandable to a larger diameter as illustrated and described herein.

The anchor frame 1120 can comprise any metallic or polymeric biocompatible material. For example, the anchor frame 1120 can comprise a material, such as, but not limited to nitinol, cobalt-nickel alloy, stainless steel, or polypropylene, acetyl homopolymer, acetyl copolymer, ePTFE, other alloys or polymers, or any other biocompatible material having adequate physical and mechanical properties to function as described herein.

In various examples, the anchor frame 1120 is elastically deformable so as to be self-expanding under spring loads, as those of skill will appreciate. In some examples, the anchor frame 1120 is plastically deformable so as to be mechanically expanded such as with a balloon, as those of skill will appreciate. In yet some other examples, the anchor frame 1120 is plastically deformable as well as elastically deformable. That is, in some examples, the anchor frame 1120 includes one or more elastically deformable components or features and one or more plastically deformable components or features. Thus, it should be appreciated that the examples of the anchor frame 1120 presented herein are not to be limited to a specific design or mode of expansion.

In various embodiments, the anchor frame subcomponent 1100 is configured to provide positive engagement with an implant site to firmly anchor the prosthetic valve 1000 to the site. Such positive engagement with the implant site may be facilitated by one or more of the following, but not limited thereto: expansion spring bias of the anchor frame 1120; hoop strength of the expanded anchor frame 1120, tissue engagement features, and the geometric shape, contour and/or texture of the anchor frame subcomponent outer surface 1109.

In various examples, the anchor frame subcomponent 1100 (e.g., anchor frame 1120) includes one or more tissue engagement features 1118 that are configured to engage one or more regions of tissue at the tissue orifice surrounding the prosthetic valve 1000. In various examples, the tissue engagement features 1118 comprise one or more barbs or tissue anchors and may be integral or separately formed from the anchor frame 1120.

As shown in FIGS. 2A-2D, the anchor frame subcomponent 1100 can define a flange or a flared portion 1130 at the anchor frame subcomponent inflow end 1102 that flares or tapers radially outward when in the deployed configuration. As shown, the flared portion 1130 results in the anchor frame subcomponent inflow end 1102 having a larger deployed diameter than does the anchor frame subcomponent outflow end 1104. In various examples, as discussed in greater detail below, such a configuration can help to minimize migration risks and facilitate abutment of the anchor frame subcomponent 1100 with tissue annulus at the implant site.

As shown in FIGS. 2C and 2D, rather than an integral flared portion 1130 as shown in FIGS. 2A and 2B, the anchor frame subcomponent 1100 may include a flange element 1150 separate from, adjacent to, and coaxial with the anchor frame inflow end 1122 of the anchor frame 1120. FIG. 2C is a side view of the prosthetic valve 1000 in an expanded pre-deployed configuration showing the leaflet frame subcomponent 1200 and the anchor frame subcomponent 1100 having been expanded to larger diameters so as to show the details of the flange element 1150 as compared with an integral flange or flared portion 1130 of the anchor frame inflow end 1122 of anchor frame 1120 of the embodiment of FIGS. 2A and 2B.

As shown in FIG. 2C, the flange element 1150 defines a flange or a flared portion 1130 of the anchor frame subcomponent 1100 that also defines the anchor frame subcomponent inflow end 1102 that flares or tapers radially outward when in the deployed configuration. The flange element 1150 is a generally tubular member of substantially the same construction as the anchor frame 1120. The flange element 1150 has a flange element inflow end 1152, a flange element outflow end 1154, a flange element inner surface 1156, and a flange element outer surface 1158 defining a flange element wall 1155 defining flange voids 1157. The flange element inner surface 1156 defines a portion of the anchor frame subcomponent lumen 1140 therethrough. In-situ, the flange element 1150 may adopt an irregular cross section, depending on the geometry of the tissue annulus into which it is placed and the conformity of the flange element 1150 to the tissue annulus at the implant site.

The flange element 1150 is coupled to the anchor frame inflow end 1122 by the anchor frame cover 1132 which is described below. The flange element 1150 defines a flange element inflow end 1152 and a flange element outflow end 1154. The flange element 1150 is located adjacent to, coaxial with, and axially spaced apart from the anchor frame 1120, with the flange element outflow end 1154 adjacent to but separate from the anchor frame inflow end 1122.

FIG. 2C shows the flange element 1150 flaring outward in a trumpet shape having a concave curvature to the flange element outer surface 1158. FIG. 2D shows another embodiment of the flange element 1150 wherein the flange element outer surface 1158 defines a convex curvature. The shape of the anatomy into which the anchor frame subcomponent 1100 is placed will determine the best choice of shape for the flange element 1150 of FIGS. 2C and 2D or the flared portion 1130 of the anchor frame subcomponent 1100 of FIGS. 2A and 2B. The flared portion 1130 of the anchor frame subcomponent 1100 of FIGS. 2A and 2B may also define the convex curvature of the embodiment of FIG. 2D suitable for a particular anatomy into which is it placed.

The anchor frame subcomponent 1100 further comprises an anchor frame cover 1132 that is operable to prevent the flow of fluid through the anchor frame wall 1105 of the anchor frame 1120. In various examples, the anchor frame cover 1132 is translucent or transparent, and thus the elements of the anchor frame 1120 are shown through the anchor frame cover 1132. In addition to inhibiting or preventing flow, the anchor frame cover 1132 may also be operable to provide a favorable surface for tissue abutment at the tissue annulus, and further, may be operable to facilitate tissue ingrowth at desired locations which may be advantageous for fixation of the prosthetic valve 1000 to the tissue annulus, facilitate a favorable biological response of the blood (e.g., to prevent a thrombotic response), and/or facilitate sealing of the prosthetic valve 1000 with the tissue annulus to minimize para-valvular leakage.

FIGS. 2A-2D provides an embodiment wherein all or a majority of the voids 1116 of the anchor frame 1120 are covered by the anchor frame cover 1132 so as to block flow through the anchor frame wall 1105 (e.g., the anchor frame cover 1132 is less permeable to blood (e.g., blood impermeable under physiologic conditions), or is configured to become less permeable to blood over time (e.g., similarly to woven and/or polyester-based graft materials). Thus, in some implementations, the anchor frame cover 1132 is a low permeability or impermeable film, sheet or membrane coupled to the anchor frame outer surface 1108. The anchor frame cover 1132 may comprise any suitable material known in the art. By way of example, the anchor frame cover 1132 may be a film or fabric material, among others.

The anchor frame cover 1132 may be a sheet-like material that is biologically compatible and configured to couple to the anchor frame 1120. In various examples, the biocompatible material is a film that is not of a biological source and that is sufficiently flexible and strong for the particular purpose, such as a biocompatible polymer. In an embodiment, the film comprises a biocompatible polymer (e.g., ePTFE). In some examples, the film is a composite of two or more materials. The film may comprise one or more of a membrane, composite material, or laminate. In various examples, the construction of and materials used in the film are such that the anchor frame cover 1132 is less permeable to blood (e.g., blood impermeable under physiologic conditions). In various examples, the construction of and materials used in the film are such that the anchor frame cover 1132 promotes cellular ingrowth, adhesion, and/or attachment. That is, in various examples, the anchor frame cover 1132 is constructed in a manner that promotes the ingrowth of tissue into one or more portions of the anchor frame cover 1132. It will be appreciated that cellular ingrowth may further increase sealing of the prosthetic valve with the tissue annulus and helps minimize para-valvular leakage, that is, leakage between the prosthetic valve and the tissue into which it is coupled.

Leaflet Frame Subcomponent

Figure 7:
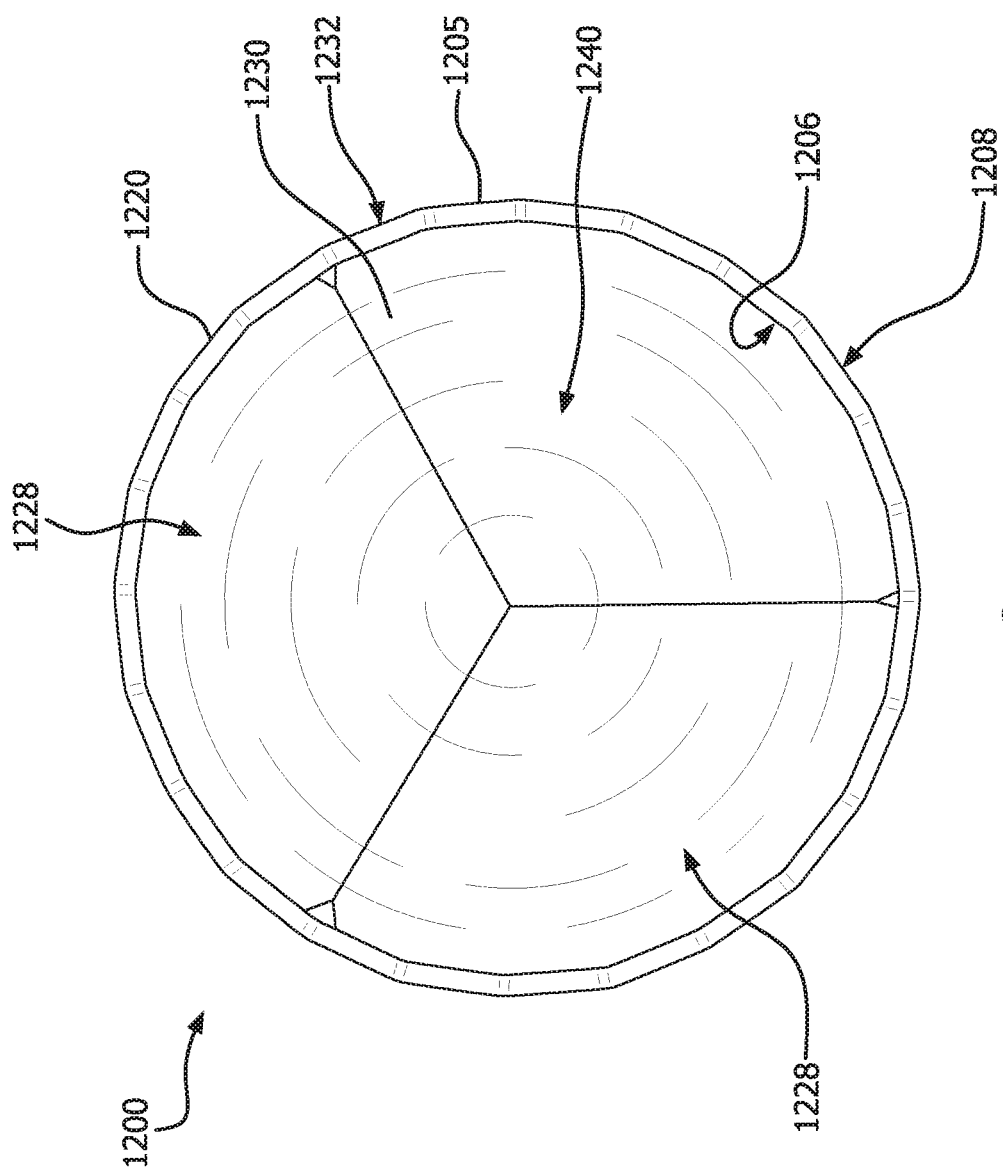
FIG. 7 is an axial view of a leaflet frame subcomponent, according to some embodiments.

FIG. 7 is an axial, inflow end view of the leaflet frame subcomponent 1200. As shown in FIGS. 2A-2D and 7, the leaflet frame subcomponent 1200 includes a leaflet frame 1220, a leaflet subcomponent 1228 (FIG. 7) including one or more leaflets 1230, and leaflet frame cover 1232. The leaflet frame subcomponent 1200 is generally tubular shaped defining a leaflet frame subcomponent inflow end 1202 and a leaflet frame subcomponent outflow end 1204 with a leaflet frame subcomponent lumen 1240 therethrough. The leaflet frame subcomponent 1200 generally provides the prosthetic valve 1000 with the functionality of a one-way valve. It is appreciated that mechanical leaflet, biological leaflet, synthetic leaflet, and biological and synthetic leaflet valves may be employed. It is also appreciated that, for transcatheter applications, the leaflet frame subcomponent 1200 is required to have a smaller-diameter compressed configuration and a larger-diameter expanded configuration, and that the valve subcomponent and associated leaflets 1230 must be able to accommodate that functionality.

Figure 8:
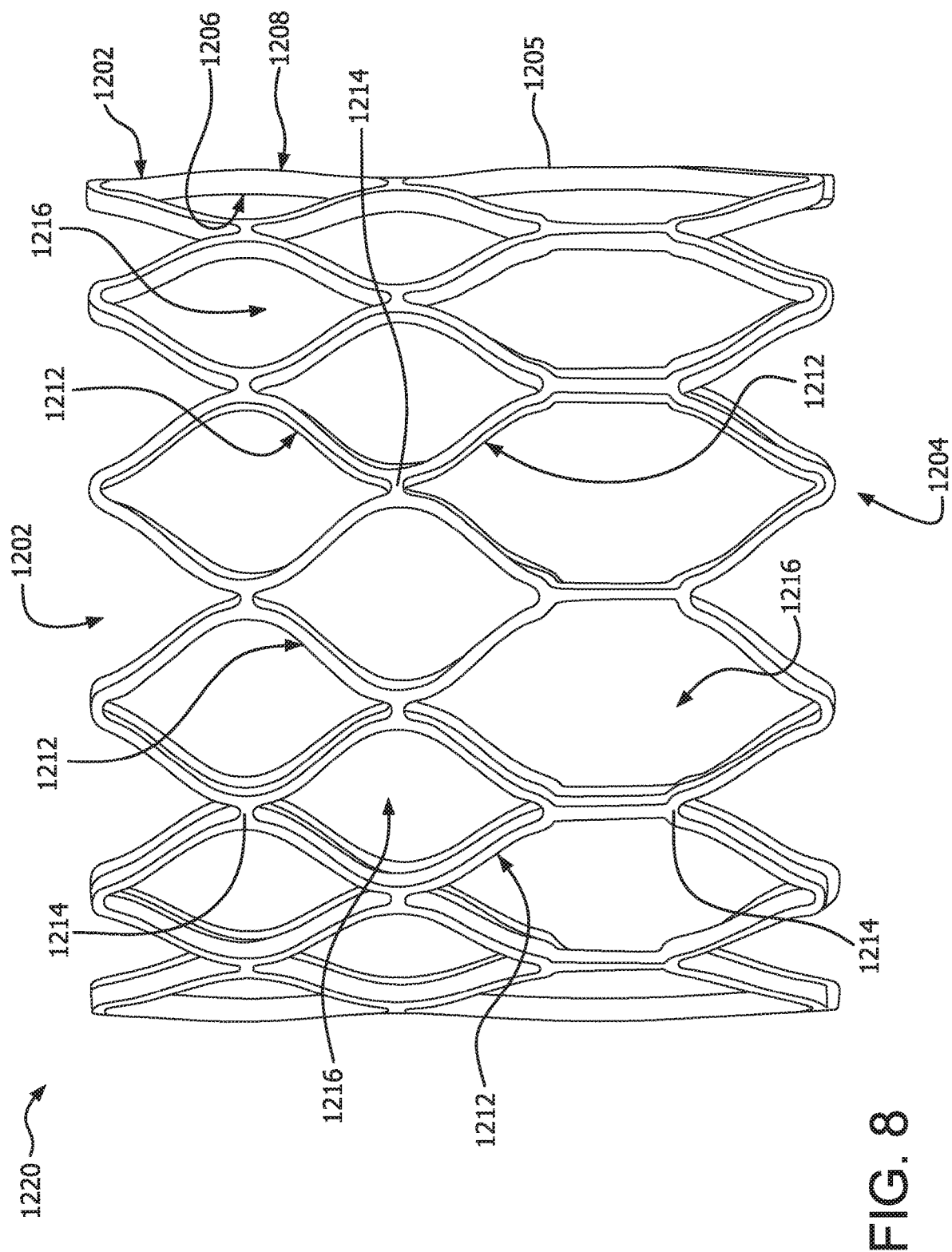
FIG. 8 is a side view of a leaflet frame of a prosthetic valve, according to some embodiments.

FIG. 8 is a side view of the leaflet frame 1220. In general terms, the leaflet frame 1220 provides structural support for the leaflets 1230 (FIG. 7). The leaflet frame 1220 is operable to have a smaller delivery configuration diameter and a larger deployed configuration diameter, facilitated by balloon expansion and/or self-expansion deployment means. As is known in the art, by way of example, structure defining apertures, such as, but not limited to, a wire form or perforated wall tube that allows for the leaflet frame to have various diameters, such as a stent, is suitable for the particular purpose. As shown in FIGS. 2A-2D, the leaflet frame wall 1205 of the leaflet frame 1220 may be at least partially covered with a leaflet frame cover 1232, such as a less blood-permeable material (e.g., blood impermeable under physiologic conditions) including a low-permeability film or fabric, to restrict fluid from passing through the leaflet frame wall 1205 of the leaflet frame 1220.

Referring to FIG. 8, the leaflet frame 1220 is a generally tubular member having a leaflet frame inflow end 1222 corresponding to a leaflet frame subcomponent inflow end 1202, a leaflet frame outflow end 1224 corresponding to a leaflet frame subcomponent outflow end 1204 (FIGS. 2A-2D), a leaflet frame inner surface 1206 and a leaflet frame outer surface 1208 defining a leaflet frame wall 1205, wherein the leaflet frame inner surface 1206 defines a leaflet frame subcomponent lumen 1240 (FIG. 7) therethrough. The leaflet frame subcomponent lumen 1240 is a generally cylindrical void defined between the leaflet frame inflow end 1222 and the leaflet frame outflow end 1224, and the leaflet frame inner surface 1206.

The leaflet frame 1220 defines a tubular framework defining apertures or voids 1216. For example, as shown, the leaflet frame 1220 includes a plurality of frame members 1212 that are interconnected and arranged in one or more patterns. In various examples, the frame members 1112 are connected to one another at various joints 1214. In some examples, these joints 1214 operate as flex points so as to provide a preferential flexing location for the leaflet frame subcomponent 1200, such as to flex when compressed to a smaller delivery diameter such as required for transcatheter delivery. In some examples, a flex point or joint 1214 comprises a site on the leaflet frame 1220 that undergoes a high degree of bending. In some examples, the flex points or joints 1214 may comprise a geometry, structural modification or material modification, among others, that biases the leaflet frame 1220 to bend at the joint 1214 when compressed or expanded between a larger diameter and a smaller diameter.

In some examples, one or more closed cell apertures or voids 1216 are defined between the joints 1214 and the interconnected frame members 1212 of the leaflet frame subcomponent 1200. In some examples, these apertures or voids 1216 extend from the leaflet frame outer surface 1208 to the leaflet frame inner surface 1206 of the leaflet frame wall 1205 of the leaflet frame 1220. As illustrated in the embodiments of FIG. 2A, one or more of the apertures or voids 1216 define a diamond shape when the leaflet frame subcomponent 1200 is in a deployed configuration. Upon compression to a smaller diameter (e.g., a delivery diameter), one or more of the joints 1214 and the frame members 1212 deform such that the apertures or voids 1216 generally define an elongated diamond shape (e.g., as shown generally in FIG. 1A). Upon expanding the leaflet frame subcomponent 1200 to a larger diameter during deployment at a treatment site, the apertures or voids 1216 expand to define the generally wider diamond shape.

It should be appreciated that while the frame members 1212 illustrated and described herein are interconnected and define apertures or voids 1216 having generally a diamond shape, the interconnected frame members 1212 may be arranged in a number of alternative patterns without departing from the spirit or scope of the disclosure. That is, a number of alternative patterns are envisioned where the arrangement of frame members 1212 is configured in such a manner as to provide for a leaflet frame subcomponent 1200 that can be compressed to a smaller diameter for transcatheter delivery and subsequently expanded (or allowed to expand) to a larger diameter at a treatment site during deployment of the prosthetic valve 1000. Accordingly, the disclosure should not be limited to arrangements of the frame members 1212 that define diamond-shaped apertures or voids 1216. For example, a framework of the leaflet frame 1220 can define any number of features, repeatable or otherwise, such as geometric shapes and/or linear or meandering series of sinusoids. Geometric shapes can comprise any shape that facilitates circumferential compressibility and expandability.

In various embodiments, the leaflet frame 1220 may comprise or otherwise be formed from a cut tube, or any other element suitable for the particular purpose of the leaflet frame 1220 as described herein. In some examples, the leaflet frame 1220 may be etched, cut, laser cut, or stamped into a tube or a sheet of material, with the sheet then formed into a tubular structure. Alternatively, an elongated material, such as a wire, bendable strip, or a series thereof, can be bent or braided and formed into a substantially tubular structure wherein the wall of the tube comprises an open framework that is compressible to a smaller diameter and expandable to a larger diameter as illustrated and described herein.

The leaflet frame 1220 may comprise, such as, but not limited to, any elastically deformable metallic or polymeric biocompatible material, in accordance with embodiments. The leaflet frame 1220 may comprise a shape-memory material, such as nitinol, a nickel-titanium alloy. Other materials suitable for the leaflet frame 1220 include, but are not limited to, other titanium alloys, stainless steel, cobalt-nickel alloy, polypropylene, acetyl homopolymer, acetyl copolymer, other alloys or polymers, or any other biocompatible material having adequate physical and mechanical properties to function as a leaflet frame subcomponent 1200 as described herein.

In various examples, the leaflet frame 1220 is elastically deformable so as to be self-expanding under spring loads, as those of skill will appreciate. In some examples, the leaflet frame 1220 is plastically deformable so as to be mechanically expanded such as with a balloon, as those of skill will appreciate. In yet some other examples, the leaflet frame 1220 is plastically deformable as well as elastically deformable. That is, in some examples, the leaflet frame 1220 includes one or more elastically deformable components or features and one or more plastically deformable components or features. Thus, it should be appreciated that the examples of the leaflet frame 1220 presented herein are not to be limited to a specific design or mode of expansion.

In accordance with some embodiments, the leaflet frame 1220 comprises a shape memory material operable to flex under load and retain its original shape when the load is removed, thus allowing the leaflet frame subcomponent 1200 to self-expand from a compressed shape to a predetermined shape. The leaflet frame subcomponent 1200 and the anchor frame subcomponent 1100 may comprise the same or different materials. In accordance with an embodiment, the leaflet frame 1220 is plastically deformable to be expanded by a balloon. In another embodiment the leaflet frame 1220 is elastically deformable so as to be self-expanding.

In various embodiments, one or more leaflets 1230 of the leaflet subcomponent 1228 are coupled to the leaflet frame 1220 to provide a one-way valve structure. As referenced above, a variety of mechanical valve, biological leaflet, and synthetic leaflet designs may be employed as desired.

In general terms, the one or more flexible leaflets 1230 coupled to the leaflet frame 1220 are operable to open to allow flow from the leaflet frame subcomponent inflow end 1202 and to pass through the leaflet frame subcomponent outflow end 1204, also referred to as the forward flow direction, and are operable to close to restrict flow from flowing from the leaflet frame subcomponent outflow end 1204 through the leaflet frame subcomponent inflow end 1202, also referred to as the retrograde flow direction.

In some examples, the leaflet subcomponent 1228, and in particular the one or more leaflets 1230 of the leaflet subcomponent 1228, is coupled to the leaflet frame inner surface 1206 of the leaflet frame 1220. In other examples, a film that comprises a leaflet material is coupled to the leaflet frame outer surface 1208 and extends through a leaflet window defined by the leaflet frame 1220 to define the leaflet subcomponent 1228. Such a configuration minimizes a potential for the leaflet 1230 to peel or delaminate, as compared to configurations where the leaflets 1230 are coupled to a leaflet frame inner surface 1206 of the leaflet frame 1220. In some related examples, one or more portions of the leaflets 1230 are wrapped about one or more portions of the leaflet frame subcomponent 1200 to provide enhanced attachment and/or improved fatigue performance, for example.

The leaflet frame subcomponent 1200 further comprises a leaflet frame cover 1232 that is operable to prevent the flow of fluid through the wall of the leaflet frame 1220 such that the fluid can only flow through a lumen defined by the open leaflets 1230. FIGS. 2A-2D show the voids 1216 of the leaflet frame 1220 covered by the leaflet frame cover 1232 so as to block flow through the portion of the leaflet frame 1220 that is upstream of the attachment of leaflets 1230 to the leaflet frame 1220. In accordance with some examples, the leaflet frame cover 1232 may be a low permeability material (e.g., blood impermeable under physiologic conditions), such as an impermeable film, sheet or membrane that is wrapped around and coupled to the leaflet frame outer surface 1208. The leaflet frame cover 1232 may comprise any suitable material known in the art. By way of example, the leaflet frame cover 1232 may be a film or a fabric, among others.

The leaflet frame cover 1232 may be a sheet-like material that is biologically compatible and configured to couple to the leaflet frame 1220. In various examples, the biocompatible material is a film that is not of a biological source and that is sufficiently flexible and strong for the particular purpose, such as a biocompatible polymer. In an embodiment, the film comprises a biocompatible polymer (e.g., ePTFE). In some examples, the film is a composite of two or more materials. The film may comprise one or more of a membrane, composite material of two or more components, or laminate of more than one layer of material. In various examples, the construction of and materials used in the film are such that the leaflet frame cover 1232 is less permeable to blood (e.g., blood impermeable under physiologic conditions).

Figure 9:
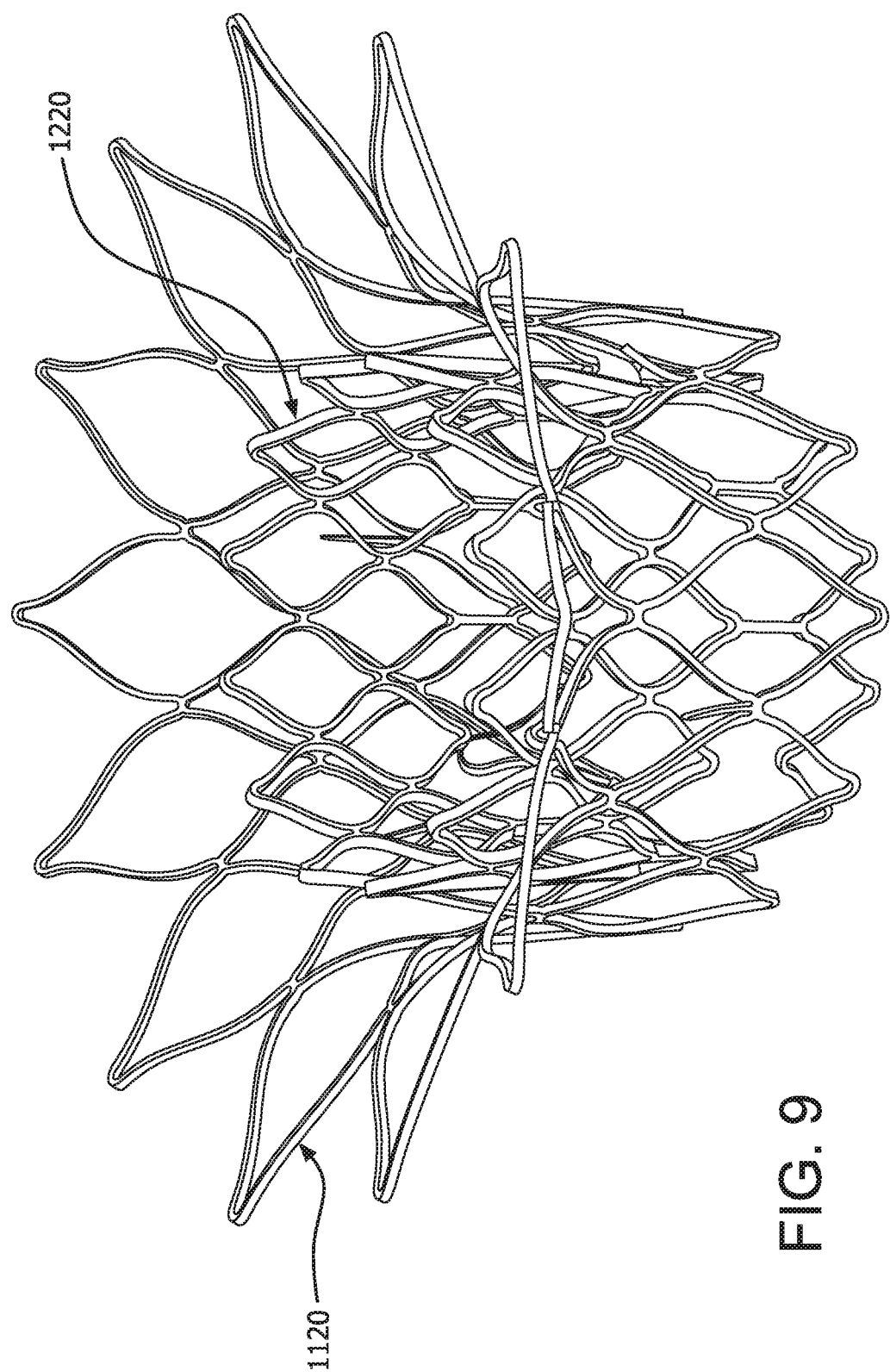
FIG. 9 is an isometric view of nested, expanded anchor and leaflet frames of a prosthetic valve, with other portions removed for visualization purposes, according to some embodiments.

As previously referenced, in various embodiments, the leaflet frame subcomponent 1200 is nestable within the anchor frame subcomponent 1100. FIG. 9 is a perspective view of the leaflet frame 1220 and anchor frame 1120 in the nested, expanded configuration, without other components shown for clearer visualization. In terms of the full subcomponent assemblies, as shown in FIGS. 3 and 9, the anchor frame subcomponent 1100 and the leaflet frame subcomponent 1200 are sized and shaped in a manner that provides for the leaflet frame subcomponent 1200 being coaxially disposable or receivable, or otherwise telescopically nested, at least partially within the anchor frame subcomponent 1100. In different terms, the anchor frame subcomponent 1100 is configured such that a portion of (or alternatively all of) the leaflet frame subcomponent 1200 can be received by or otherwise positioned within a space defined by the anchor frame subcomponent 1100, to define a pair of adjacent inflow and outflow end portions (or, a pair of adjacent inflow and outflow end portions).

Consistent with the foregoing, in some examples, the leaflet frame subcomponent 1200 is sized such that a diameter of the exterior surface of the leaflet frame subcomponent 1200 (when in an expanded, deployed configuration) is less than a diameter of the interior surface of the anchor frame subcomponent 1100 (when in an expanded, deployed configuration). In some examples, a diameter of the exterior surface of the leaflet frame subcomponent 1200 is in a range of between seventy five percent (75%) and ninety percent (90%) of a diameter of the interior surface of the anchor frame subcomponent 1100. In others, a diameter of the exterior surface of the leaflet frame subcomponent 1200 is seventy five percent (75%) or less than a diameter of the interior surface of the anchor frame subcomponent 1100. It will be appreciated that nonlimiting examples of the leaflet frame subcomponent 1200 can be provided with a diameter (e.g., a diameter of an interior or exterior surface of the leaflet frame subcomponent 1200) in a range of between twenty (20) millimeters and thirty (30) millimeters, depending on a patient's anatomy.

Leaflet Materials

In various examples, the one or more leaflets 1230 of the leaflet subcomponent 1228 are formed of a biocompatible, synthetic material (e.g., including ePTFE and ePTFE composites, or other materials as desired). In other examples, the leaflet 1230 is formed of a natural material, such as repurposed tissue, including bovine tissue, porcine tissue, or the like.

In accordance with embodiments herein, the leaflet subcomponent 1228 comprises a composite material having at least one porous synthetic polymer membrane layer having a plurality of pores and/or spaces and an elastomer and/or an elastomeric material and/or a non-elastomeric material filling the pores and/or spaces of the at least one synthetic polymer membrane layer. In accordance with other examples, the leaflet 1230 further comprises a layer of an elastomer and/or an elastomeric material and/or a non-elastomeric material on the composite material. In accordance with examples, the composite material comprises porous synthetic polymer membrane by weight in a range of 10% to 90%.

An example of a porous synthetic polymer membrane includes expanded fluoropolymer membrane having a node and fibril structure defining the pores and/or spaces. In some examples, the expanded fluoropolymer membrane is expanded polytetrafluoroethylene (ePTFE) membrane. Another example of porous synthetic polymer membrane includes microporous polyethylene membrane.

Examples of an elastomer and/or an elastomeric material and/or a non-elastomeric material include, but are not limited to, copolymers of tetrafluoroethylene and perfluoromethyl vinyl ether (TFE/PMVE copolymer), (per)fluoroalkylvinylethers (PAVE), urethanes, silicones (organopolysiloxanes), copolymers of silicon-urethane, styrene/isobutylene copolymers, polyisobutylene, polyethylene-co-poly(vinyl acetate), polyester copolymers, nylon copolymers, fluorinated hydrocarbon polymers and copolymers or mixtures of each of the foregoing. In some examples, the TFE/PMVE copolymer is an elastomer comprising between 60 and 20 weight percent tetrafluoroethylene and respectively between 40 and 80 weight percent perfluoromethyl vinyl ether. In some examples, the TFE/PMVE copolymer is an elastomeric material comprising between 67 and 61 weight percent tetrafluoroethylene and respectively between 33 and 39 weight percent perfluoromethyl vinyl ether. In some examples, the TFE/PMVE copolymer is a non-elastomeric material comprising between 73 and 68 weight percent tetrafluoroethylene and respectively between 27 and 32 weight percent perfluoromethyl vinyl ether. The TFE and PMVE components of the TFE-PMVE copolymer are presented in wt %. For reference, the wt % of PMVE of 40, 33-39, and 27-32 corresponds to a mol % of 29, 23-28, and 18-22, respectively.

In some examples, the TFE-PMVE copolymer exhibits elastomer, elastomeric, and/or non-elastomeric properties.

In some examples, the composite material further comprises a layer or coating of TFE-PMVE copolymer comprising from 73 to 68 weight percent tetrafluoroethylene and respectively from 27 to 32 weight percent perfluorom ethyl vinyl ether.

In some examples, the leaflet the leaflet subcomponent 1228 is an expanded polytetrafluoroethylene (ePTFE) membrane having been imbibed with TFE-PMVE copolymer comprising from 60 to 20 weight percent tetrafluoroethylene and respectively from 40 to 80 weight percent perfluorom ethyl vinyl ether, the leaflet subcomponent 1228 further including a coating of TFE-PMVE copolymer comprising from 73 to 68 weight percent tetrafluoroethylene and respectively 27 to 32 weight percent perfluoromethyl vinyl ether on the blood-contacting surfaces.

As discussed above, the elastomer and/or an elastomeric material and/or a non-elastomeric material may be combined with the expanded fluoropolymer membrane such that the elastomer and/or the elastomeric material and/or the non-elastomeric material occupies substantially all of the void space or pores within the expanded fluoropolymer membrane.

Although some examples of suitable leaflet materials have been provided, the foregoing examples are not meant to be read in a limiting sense, and additional or alternative materials are contemplated.

In some examples, the leaflet frame cover 1232, the anchor frame cover 1132, the connecting sheath 1300, the inflow annular groove cover 1400 and/or the outflow annular groove cover 1500 may comprise any of the materials described above in association with the leaflet subcomponent 1228.

Connecting Sheath

FIGS. 1 and 2A-2D show the connecting sheath 1300 extending between the anchor frame subcomponent 1100 and the leaflet frame subcomponent 1200 with the leaflet frame subcomponent un-nested, or offset from the anchor frame subcomponent 1100. In various examples, the connecting sheath 1300 is a flexible tubular membrane coupled about its circumference to the leaflet frame subcomponent 1200 at the leaflet frame subcomponent inflow end 1202 and to the anchor frame subcomponent 1100 at the anchor frame subcomponent outflow end 1104 operable to couple the leaflet frame subcomponent 1200 to the anchor frame subcomponent 1100. The connecting sheath 1300 is thin and flexible, and operable to fold or elastically contract to a smaller diameter in a delivery configuration.

When the anchor frame subcomponent 1100 and the leaflet frame subcomponent 1200 are expanded, the connecting sheath 1300 defines a tapered configuration extending between the leaflet frame subcomponent 1200 and the anchor frame subcomponent 1100. The connecting sheath 1300 is configured to facilitate nesting of the leaflet frame subcomponent 1200 into the anchor frame subcomponent 1100.

Figure 11A:
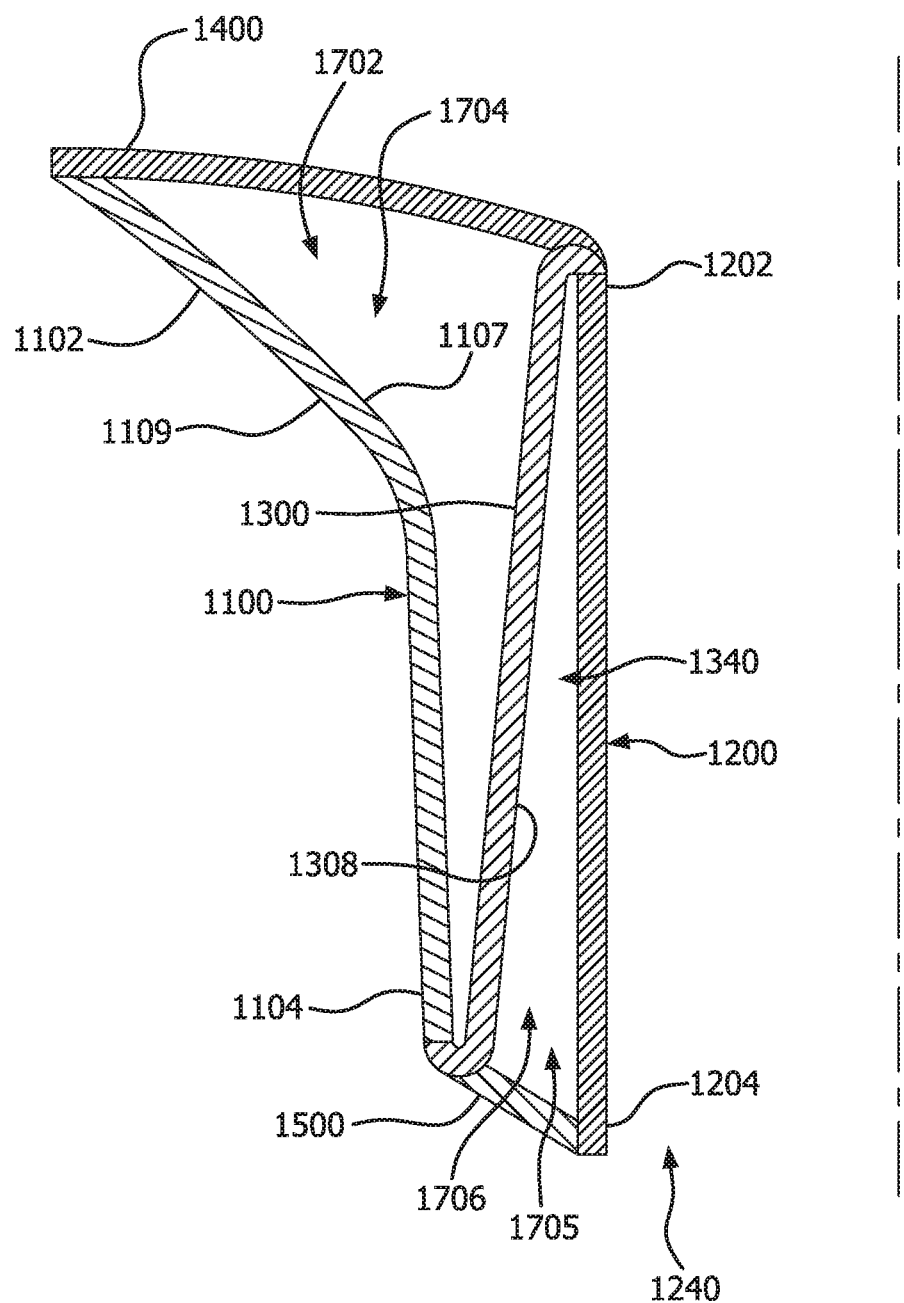
FIGS. 11A-11H are simplified longitudinal sections of a prosthetic valve showing bridging members, or annular groove covers, in extended and retracted configurations, according to some embodiments.

When the prosthetic valve 1000 is in the deployed nested configuration, the leaflet frame subcomponent 1200 translated into the anchor frame subcomponent 1100 in a nested position, with the connecting sheath 1300 having been everted and positioned therebetween (FIG. 11A).

Figure 11B:
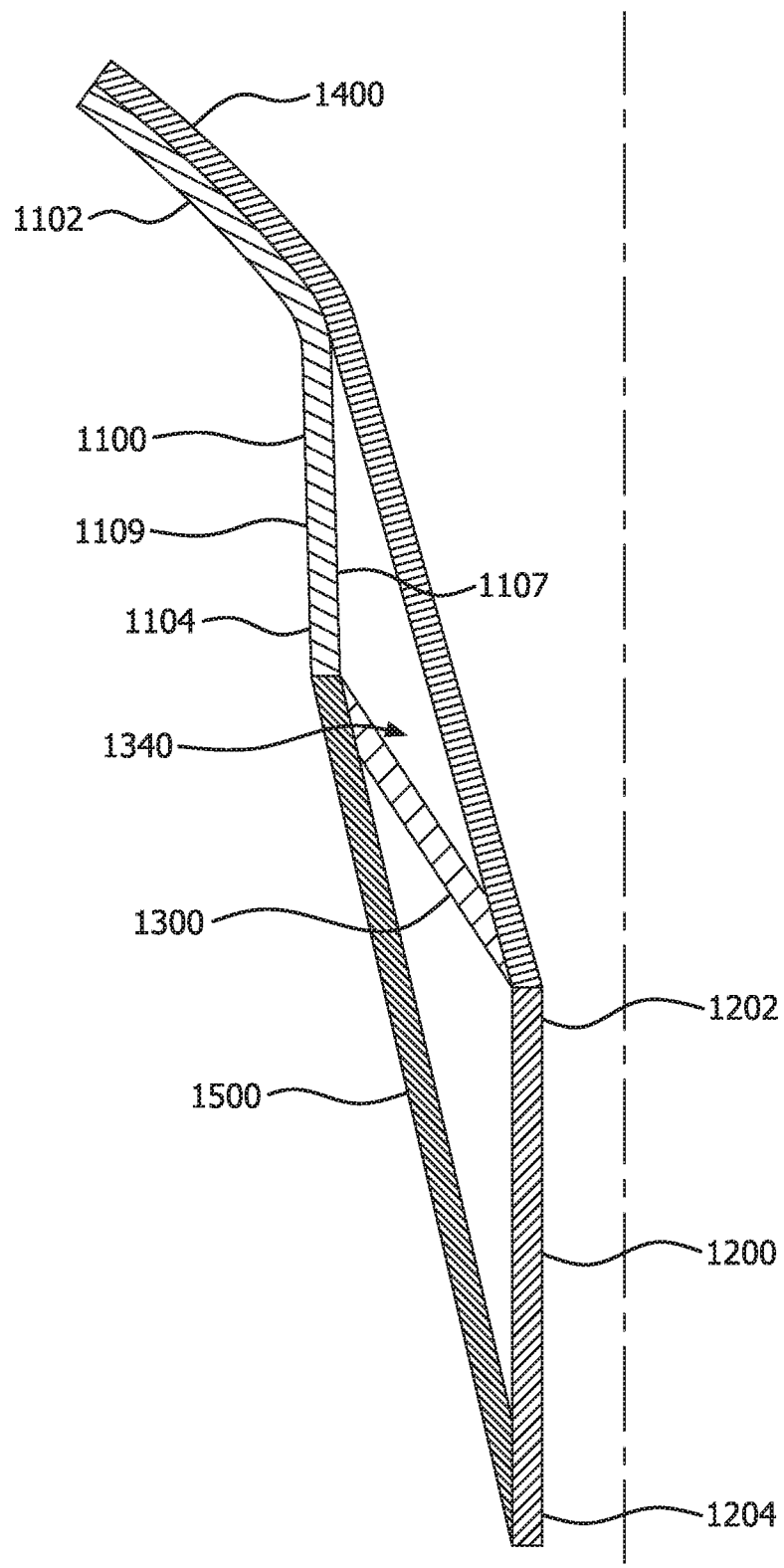

Referring to FIGS. 2A-2D, which shows the prosthetic valve in the un-nested configuration, the connecting sheath 1300 has an inner surface 1307, an outer surface 1308, an inflow end 1322, and an outflow end 1324. As shown, the connecting sheath 1300 is coupled to the anchor frame subcomponent outflow end 1104 of the anchor frame subcomponent 1100 at the connecting sheath inflow end 1322 and is coupled to the leaflet frame subcomponent inflow end 1202 at the connecting sheath outflow end 1324. The connecting sheath 1300 is a thin-walled flexible tubular member that defines a connecting sheath lumen 1340 (e.g., FIGS. 11A and 11B) in fluid communication with the anchor frame subcomponent lumen 1140 and the leaflet frame subcomponent lumen 1240 when in the pre-deployed configuration. When the leaflet frame subcomponent 1200 is nested into the anchor frame subcomponent 1100 the connecting sheath 1300 is operable to fold and evert so as to lie between the leaflet frame subcomponent 1200 and the anchor frame subcomponent 1100. The connecting sheath 1300 may comprise any suitable material known in the art. By way of example, the connecting sheath 1300 may be a film, fabric, or membrane, among others, that is flexible and less permeable to blood (e.g., blood impermeable under physiologic conditions).

The connecting sheath 1300 can be disposed within and/or about the anchor frame subcomponent 1100 and the leaflet frame subcomponent 1200 as desired. For example, the connecting sheath 1300 can extend not only between but also over or within either or both of the anchor frame subcomponent 1100 and the leaflet frame subcomponent 1200. In some examples, the connecting sheath 1300 is contiguous with the leaflet frame cover 1232 and the anchor frame cover 1132. In particular, the connecting sheath 1300 can be a contiguous film with that of the anchor frame cover 1132 and/or the leaflet frame cover 1232 that at least extends between and operates to couple the anchor frame subcomponent 1100 and the leaflet frame subcomponent 1200 to one another. As shown, the connecting sheath 1300 is formed from a generally tubular material and at least partially covers one or more of the anchor frame subcomponent 1100 and the leaflet frame subcomponent 1200.

In some examples, the connecting sheath 1300 is formed by wrapping a film over and around a cylindrical mandrel that defines a variable diameter to match the respective inner diameter of each of the leaflet frame 1220 and anchor frame 1120 with a tapered portion therebetween to transition from the smaller diameter of the leaflet frame 1220 to the larger diameter of the anchor frame 1120. Either or both of the anchor frame 1120 and the leaflet frame 1220 are slid over the film and bonded thereto to the inner surface of the frames. If desired, the connecting sheath 1300 is formed by wrapping the film over and around either or both of the anchor frame 1120 and the leaflet frame 1220 and bonded to the outer surface of the frames, for example.

The connecting sheath 1300 can be any sheet-like material that is biologically compatible and configured to couple to the anchor frame subcomponent 1100 and the leaflet frame subcomponent 1200. In various examples, the biocompatible material is a film that is not of a biological source and that is sufficiently flexible and strong for the particular purpose, such as a biocompatible polymer. In an embodiment, the film comprises a biocompatible polymer (e.g., ePTFE). The film may comprise one or more of a membrane, composite material, or laminate. In various examples, the construction of and materials used in the film are such that the connecting sheath 1300 has low permeability to fluid flow (e.g., blood impermeable) under physiologic conditions.

In various examples, the connecting sheath 1300 includes a connecting sheath wall 1305 that is impervious to fluid flow (e.g., blood impermeable under physiologic conditions) and controls the flow of fluid only through the connecting sheath lumen 1340 particularly during deployment of the prosthetic valve 1000 into the tissue annulus and acts as a low-permeability or impermeable seal between the leaflet frame subcomponent 1200 and the anchor frame subcomponent 1100 when in the deployed nested configuration as shown in FIG. 3. As will be discussed further below, during deployment of the prosthetic valve 1000, with the anchor frame subcomponent 1100 deployed within the tissue annulus and the leaflet frame subcomponent 1200 mounted to a delivery device 1600 (FIG. 12), blood flow may be occluded during deployment, or the connecting sheath 1300 may include features for facilitating selective blood flow during deployment of the prosthetic valve 1000. In particular, in some examples, the connecting sheath 1300 is operable to allow antegrade fluid flow, (e.g., blood perfusion) through the connecting sheath wall 1305 during deployment of the prosthetic valve 1000 into the tissue annulus.

Figure 10C:
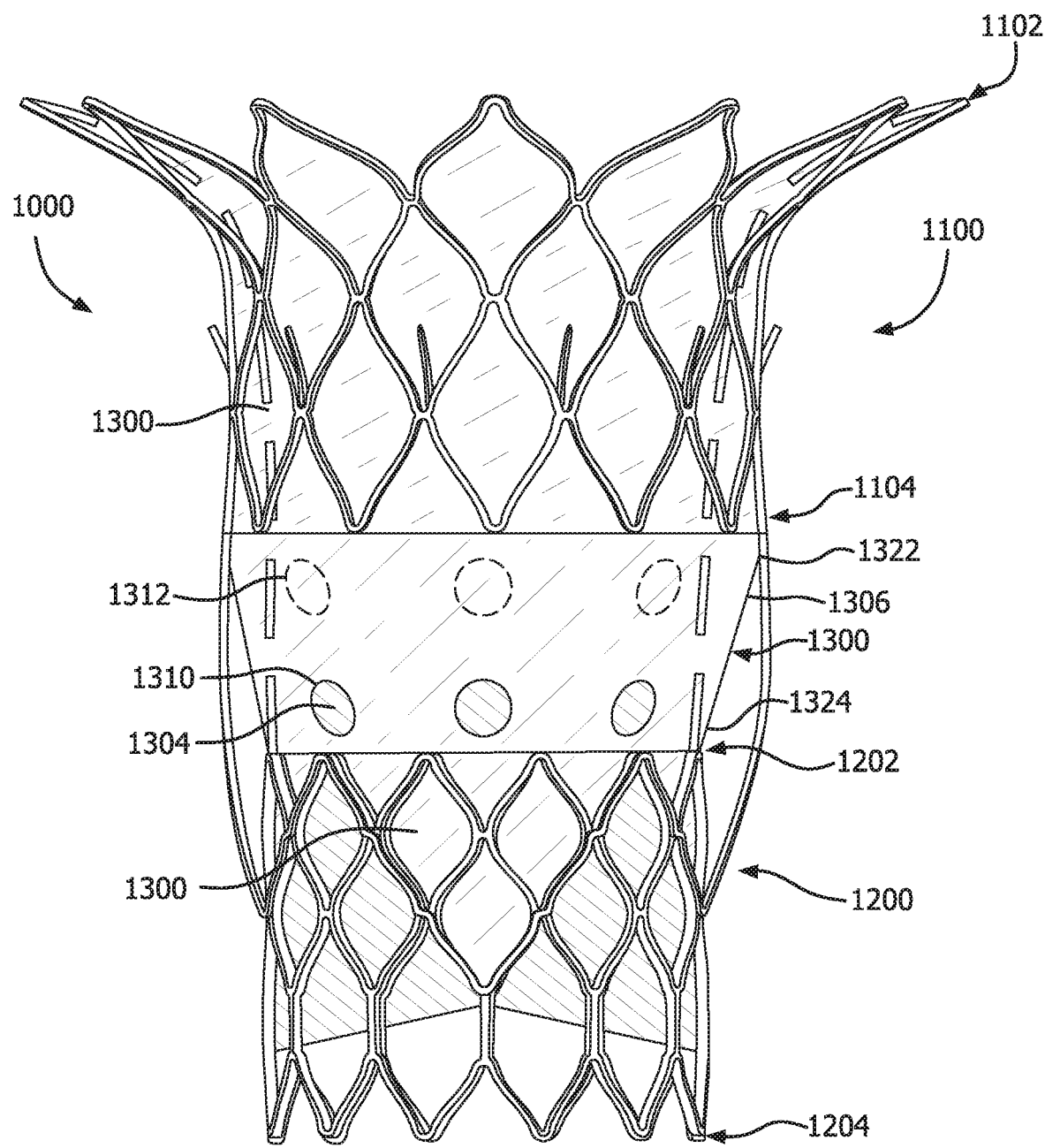

With reference to FIGS. 10A-10C and 10E, the prosthetic valve 1000 optionally includes one or more flow enabling features 1350 formed in the connecting sheath 1300. FIG. 10A is a side view of the prosthetic valve 1000 with the flow enabling features 1350 in an open configuration where antegrade flow (denoted by arrow "A") is permitted. FIG. 10B is a side view of the prosthetic valve 1000 with the flow enabling features 1350 in a closed configuration where retrograde (denoted by arrow "R") flow is obstructed. In some examples, the one or more flow enabling feature 1350 include one or more perforations or apertures. The flow enabling features 1350 are operable to enable antegrade flow and prevent retrograde flow through the flow enabling features 1350 prior to the anchor frame subcomponent 1100 and the leaflet frame subcomponent 1200 being nested together and in a fully deployed configuration. Further, the flow enabling features 1350 are configured to be fully closed and sealed when the leaflet frame subcomponent 1200 is nested into the anchor frame subcomponent 1100 and in a fully deployed configuration.

In some examples, the one or more flow enabling features 1350 additionally or alternatively include one or more mechanisms that facilitate unidirectional flow. For instance, in some examples, the flow enabling features 1350 are configured as one-way valves. In some examples, one-way valves include an aperture or perforation and a flap or element of material that overlays and is larger than the aperture or perforation so as to cover and seal the aperture or perforation under retrograde flow pressure. In some examples, the one-way valve is oriented to permit antegrade flow through the prosthetic valve, while minimizing or preventing retrograde flow through the prosthetic valve.

FIGS. 10A-10E are side views as if the prosthetic valve 1000, as shown in FIG. 1, was unconstrained from a constrained pre-nested configuration in order to more clearly show the particular elements. As shown in FIGS. 10A-10B, an example of flow enabling features 1350 include an aperture 1352 and a flap 1354 that operate to enable antegrade flow through the prosthetic valve 1000 prior to the anchor frame subcomponent 1100 and the leaflet frame subcomponent 1200 being nested together (while the anchor frame subcomponent 1100 and the leaflet frame subcomponent 1200 are longitudinally offset). The flap 1354 can be oversized relative to the aperture 1352 to cover the aperture 1352 under retrograde flow pressure and restrict or minimize retrograde flow through the aperture 1352, while during antegrade flow the flap 1354 lifts away from the aperture 1352 permitting antegrade flow through the aperture 1352. Further, the flap 1354 can be configured to cover and seal the aperture 1352 when the leaflet frame subcomponent 1200 is nested into the anchor frame subcomponent 1100 and in a fully deployed configuration.

Figure 10D:
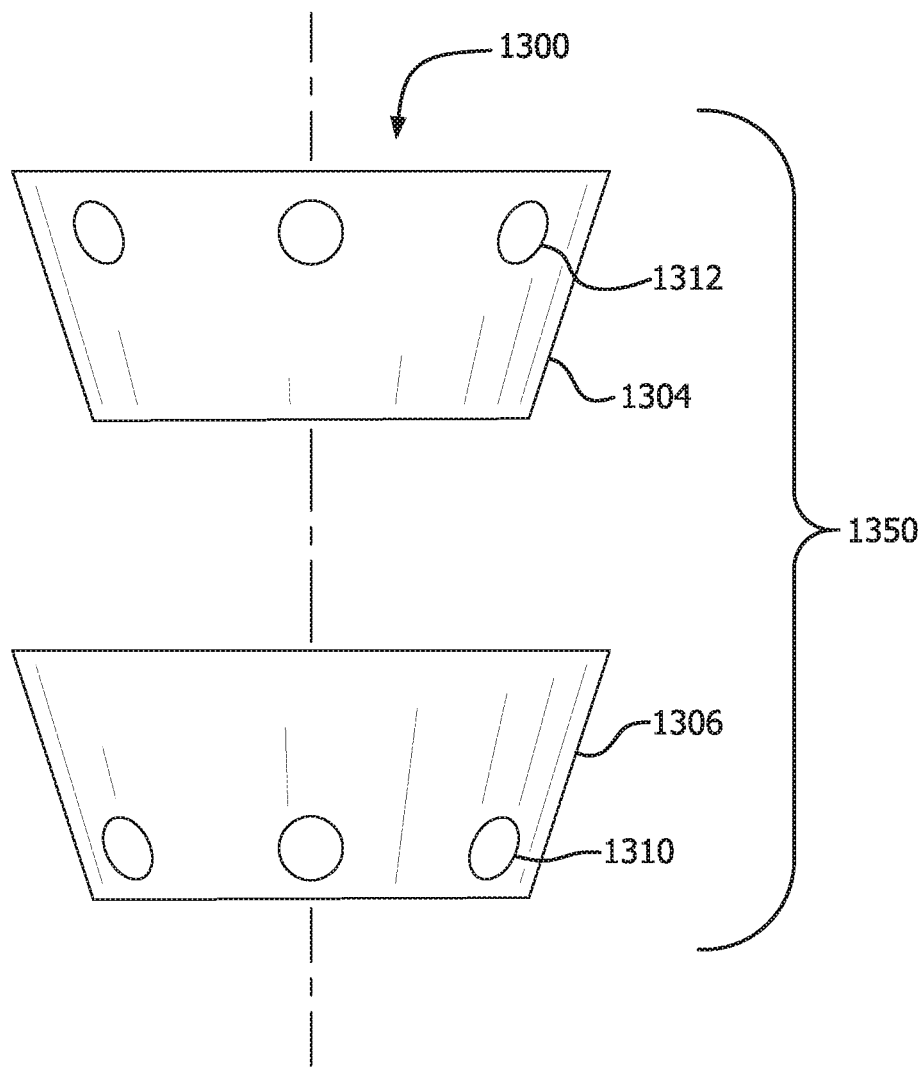

In some embodiments, the connecting sheath 1300 comprises two layers of film, an inner film layer 1304 and an outer film layer 1306 (as shown in FIGS. 10C and 10D) with both layers coupled to either the inner or outer surface of the anchor frame 1120 and leaflet frame 1220, or the inner film layer 1304 bonded to the inner surfaces of the anchor frame 1120 and leaflet frame 1220 and the outer film layer 1306 coupled to the outer surfaces of the anchor frame 1120 and leaflet frame 1220.

FIG. 10C is a side view of another embodiment of the connecting sheath 1300 as shown coupled to the leaflet frame subcomponent 1200 and anchor frame subcomponent 1100. FIG. 10D is an exploded view of the connecting sheath 1300. In accordance with this embodiment, the connecting sheath 1300 is a double layer of film, an inner film layer 1304 that is a conical tubular member that defines an inner layer of the connecting sheath 1300 and an outer film layer 1306 that is a conical tubular member that is slightly larger than the inner film layer 1304 that defines an outer layer of the connecting sheath 1300 when in the partially deployed configuration shown in FIG. 10C.

In some examples, the inner film layer 1304 and the outer film layer 1306 are coupled together at least at the leaflet frame subcomponent inflow end 1202 of the leaflet frame subcomponent 1200 and the anchor frame subcomponent outflow end 1104 of the anchor frame subcomponent 1100. The inner film layer 1304 defines at least one inner film aperture 1312 therethrough adjacent the anchor frame subcomponent 1100 and the outer film layer 1306 defines at least one outer film aperture 1310 therethrough adjacent the leaflet frame subcomponent 1200. A respective inner film aperture 1312 is offset in the radial direction from a respective outer film aperture 1310 to facilitate operation as provided below. The inner film layer 1304 and the outer film layer 1306 are not coupled at least between one of the inner film apertures 1312 and one of the outer film apertures 1310 so as to define a flow space 1320 therebetween such that the outer film layer 1306 lifts away from the inner film apertures 1312 to enable antegrade flow through the inner film apertures 1312 and the outer film apertures 1310 prior to the anchor frame subcomponent 1100 and the leaflet frame subcomponent 1200 being nested (while the anchor frame subcomponent 1100 and the leaflet frame subcomponent 1200 are longitudinally offset as illustrated and described herein). In some embodiments, the outer film layer 1306 is not coupled at least downstream of the outer film apertures 1310 and the inner film apertures 1312 so as to define the flow space 1320.

In operation, the inner film layer 1304 and the outer film layer 1306 come together to close the flow space and to cover and seal the inner film apertures 1312 and outer film apertures 1310 under retrograde flow pressure and restrict or minimize retrograde flow through the inner film apertures 1312 and outer film apertures 1310. Further, the inner film layer 1304 and the outer film layer 1306 are configured to cover and seal the inner film apertures 1312 and outer film apertures 1310 when the leaflet frame subcomponent 1200 is nested into the anchor frame subcomponent 1100 and in a fully deployed configuration.

In the above embodiment, the inner film layer 1304 and the outer film layer 1306 are coupled together at least at the leaflet frame subcomponent inflow end 1202 of the leaflet frame subcomponent 1200 and the anchor frame subcomponent outflow end 1104 of the anchor frame subcomponent 1100. It is appreciated that in accordance with an embodiment, the outer film layer 1306 may not be coupled together at or adjacent to the anchor frame subcomponent outflow end 1104 and still function to cover the inner film aperture 1312 during retrograde flow conditions. As provided in the above embodiment related to the flap 1354, the outer film layer 1306 may function as does the flap 1354; that is, to occlude the inner film aperture 1312 during retrograde flow conditions.

Figure 10E:
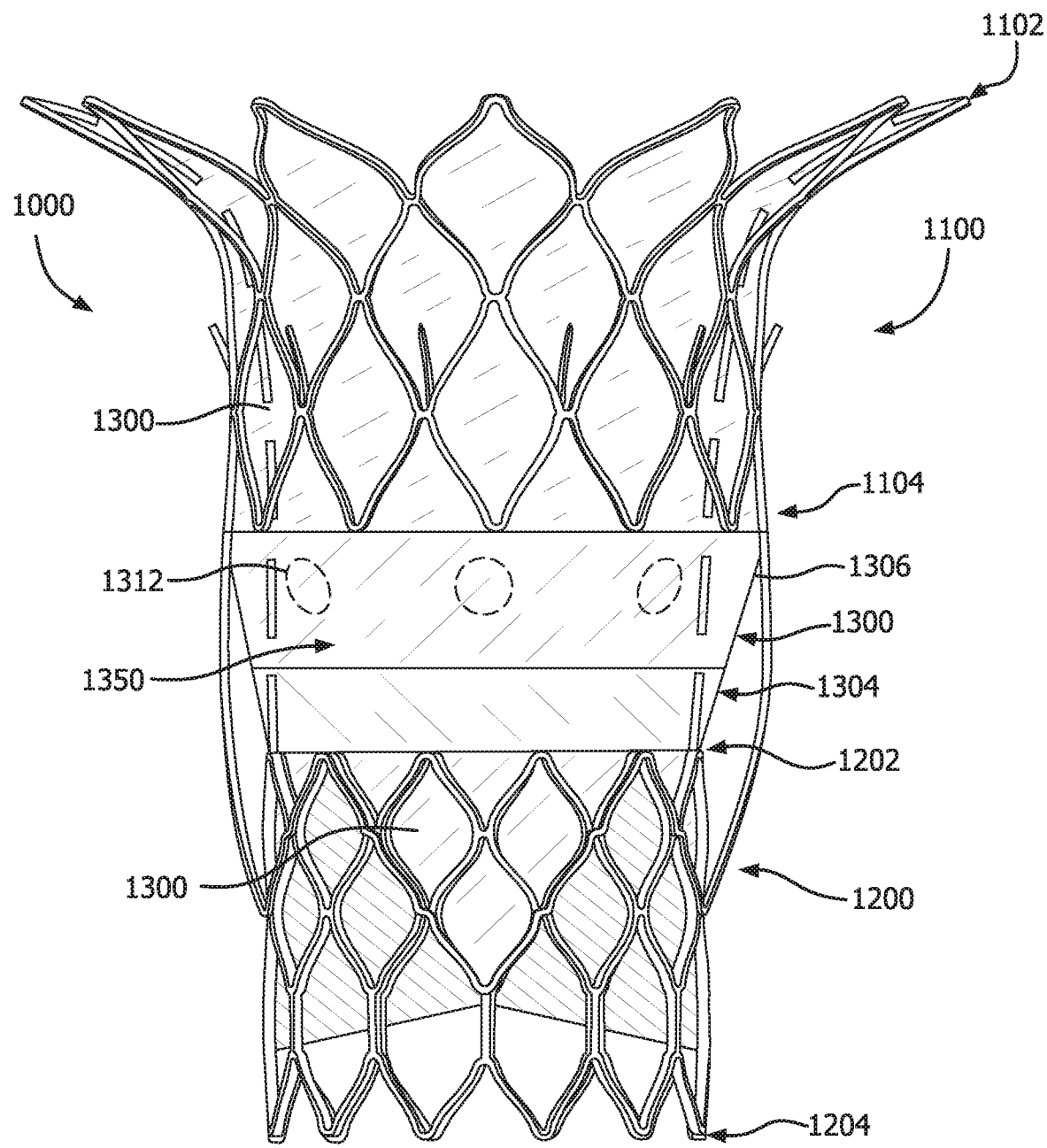

FIG. 10E is a side view of the prosthetic valve 1000 similar to the views of FIGS. 2A-2D, with an embodiment of the connecting sheath 1300 including flow enabling features 1350, the connecting sheath 1300 coupled to the leaflet frame subcomponent 1200 and anchor frame subcomponent 1100. In accordance with this embodiment, the connecting sheath 1300 is a double layer of film, an inner film layer 1304 that is a conical tubular member that defines an inner layer of the connecting sheath 1300 and an outer film layer 1306 that is a conical tubular member that is slightly larger but shorter than the inner film layer 1304 that defines an outer layer of the connecting sheath 1300 when in the partially deployed configuration shown in FIG. 10E. The inner film layer 1304 and the outer film layer 1306 are coupled together at least at the anchor frame subcomponent outflow end 1104 of the anchor frame subcomponent 1100 but are not coupled at the leaflet frame subcomponent inflow end 1202 of the leaflet frame subcomponent 1200.

The inner film layer 1304 defines at least one inner film aperture 1312 therethrough adjacent the anchor frame subcomponent 1100 and the outer film layer 1306 is configured to cover the at least one inner film aperture 1312. Under antegrade flow conditions, the outer film layer 1306 lifts away from the inner film layer 1304 and uncovers the at least one inner film aperture 1312 so as to define a flow space 1320 therebetween such that the outer film layer 1306 lifts away from the inner film apertures 1312 to enable antegrade flow through the inner film apertures 1312 prior to the anchor frame subcomponent 1100 and the leaflet frame subcomponent 1200 being nested (i.e., while the anchor frame subcomponent 1100 and the leaflet frame subcomponent 1200 are longitudinally offset as illustrated and described herein). The inner film layer 1304 and the outer film layer 1306 come together to close the flow space and to cover and seal the inner film apertures 1312 under retrograde flow pressure and restrict or minimize retrograde flow through the inner film apertures 1312. Further, the inner film layer 1304 and the outer film layer 1306 are configured to cover and seal the inner film apertures 1312 when the leaflet frame subcomponent 1200 is nested into the anchor frame subcomponent 1100 and in a fully deployed configuration.

In any of the examples of the connecting sheath 1300, the connecting sheath 1300 optionally includes one or more reinforcement elements 1380 as shown in FIG. 2D. In particular, FIG. 2D shows an optional reinforcement element 1380 in broken line for visualization purposes. The reinforcement element 1380 is optionally a stent-like frame element (e.g., a circumferentially-extending, sinuous shape memory element), one or more longitudinally extending reinforcement members (e.g., a fiber, wire, shape memory frame element or the like), or the like. Examples of such reinforcement elements can be found in U.S. patent application Ser. No. 16/129,779, filed Sep. 12, 2018, and titled "Telescoping Prosthetic Valve and Delivery System." In various examples, the reinforcement element 1380 provides stiffening bias to the connecting sheath 1300, may be configured to evert along with the connecting sheath 1300, can be curved or s-shaped as shown or zig-zag, or take another form as desired. The one or more reinforcement elements 1380 can be temporarily elastically bent or folded upon itself as the anchor frame subcomponent 1100 and the leaflet frame subcomponent 1200 are nested to provide stiffening bias such that it takes a predetermined amount of force to nest the leaflet frame subcomponent 1200 into the anchor frame subcomponent 1100 and a corresponding predetermined amount of force to resist the movement of the leaflet frame subcomponent 1200 from the nested position. In some examples, with the anchor frame subcomponent 1100 and the leaflet frame subcomponent 1200 in the nested configuration, a column strength of the reinforcement element resists compressive loads that would otherwise cause the leaflet frame subcomponent 1200 to de-nest or telescope out of and away from the anchor frame subcomponent 1100. Although some functions and advantages of the one or more reinforcement elements 1380 have been described, additional or alternative features and advantages are contemplated.

Figure 11C:
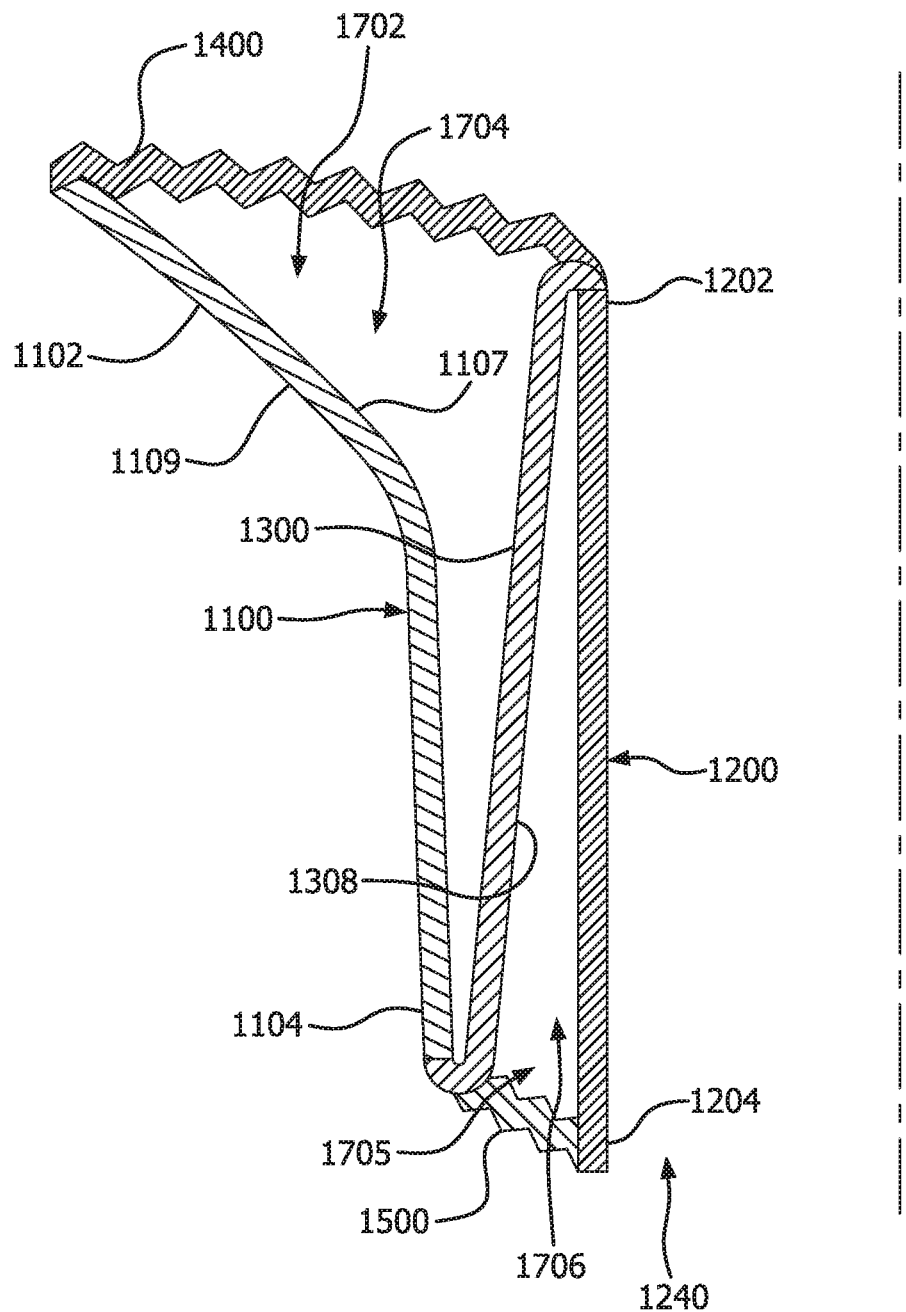
Figure 11D:
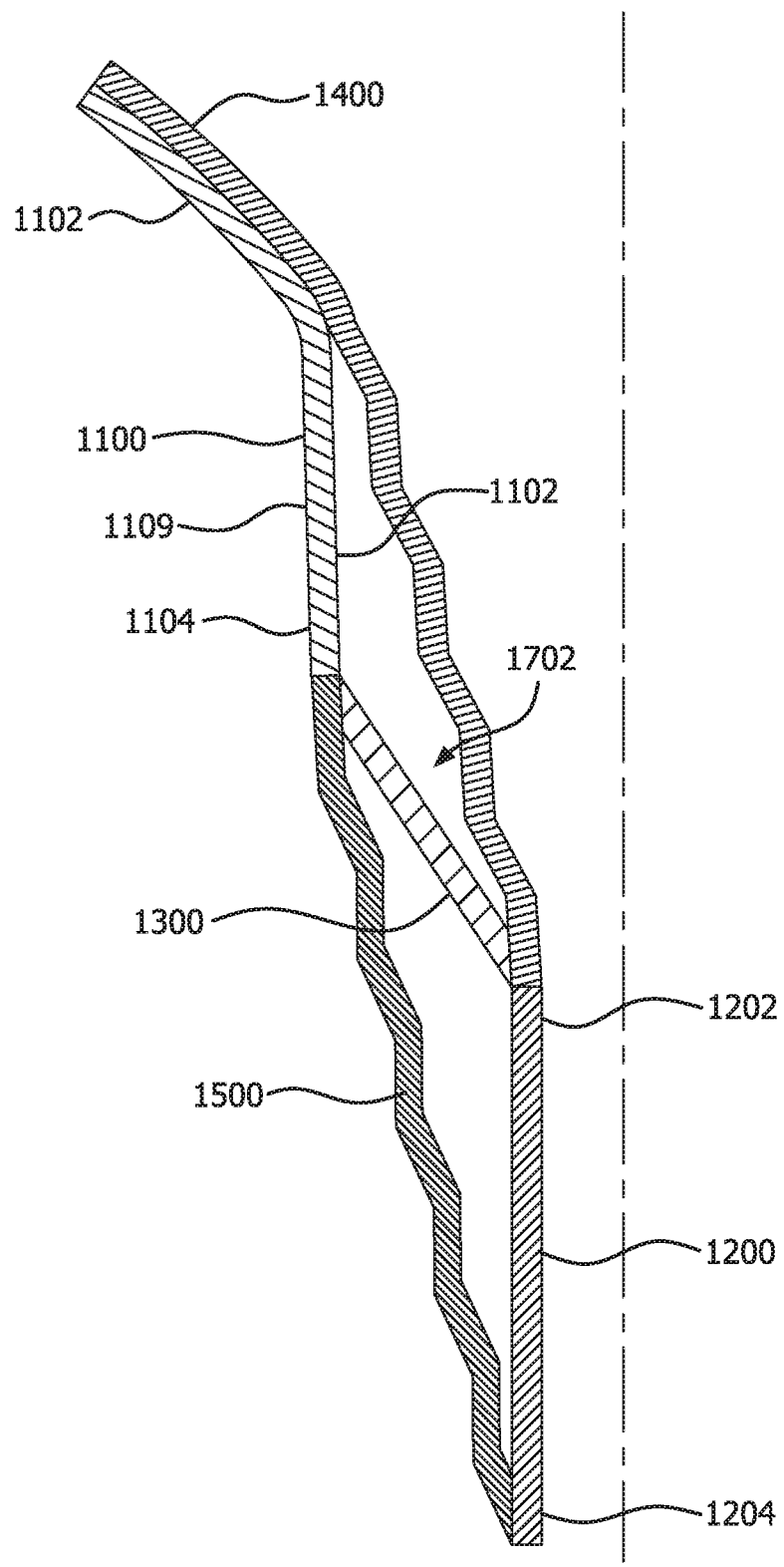
Figure 11E:
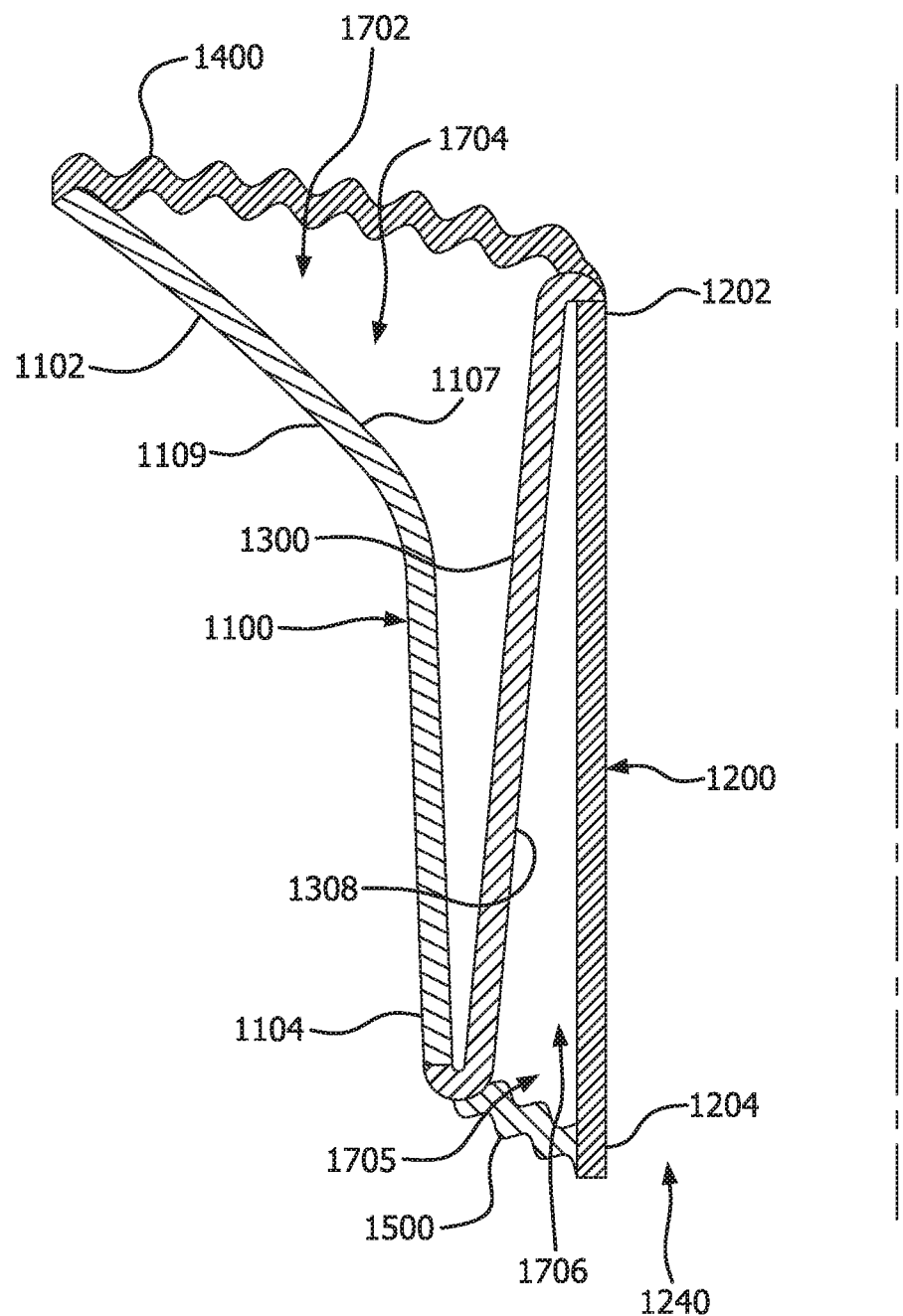
Figure 11F:
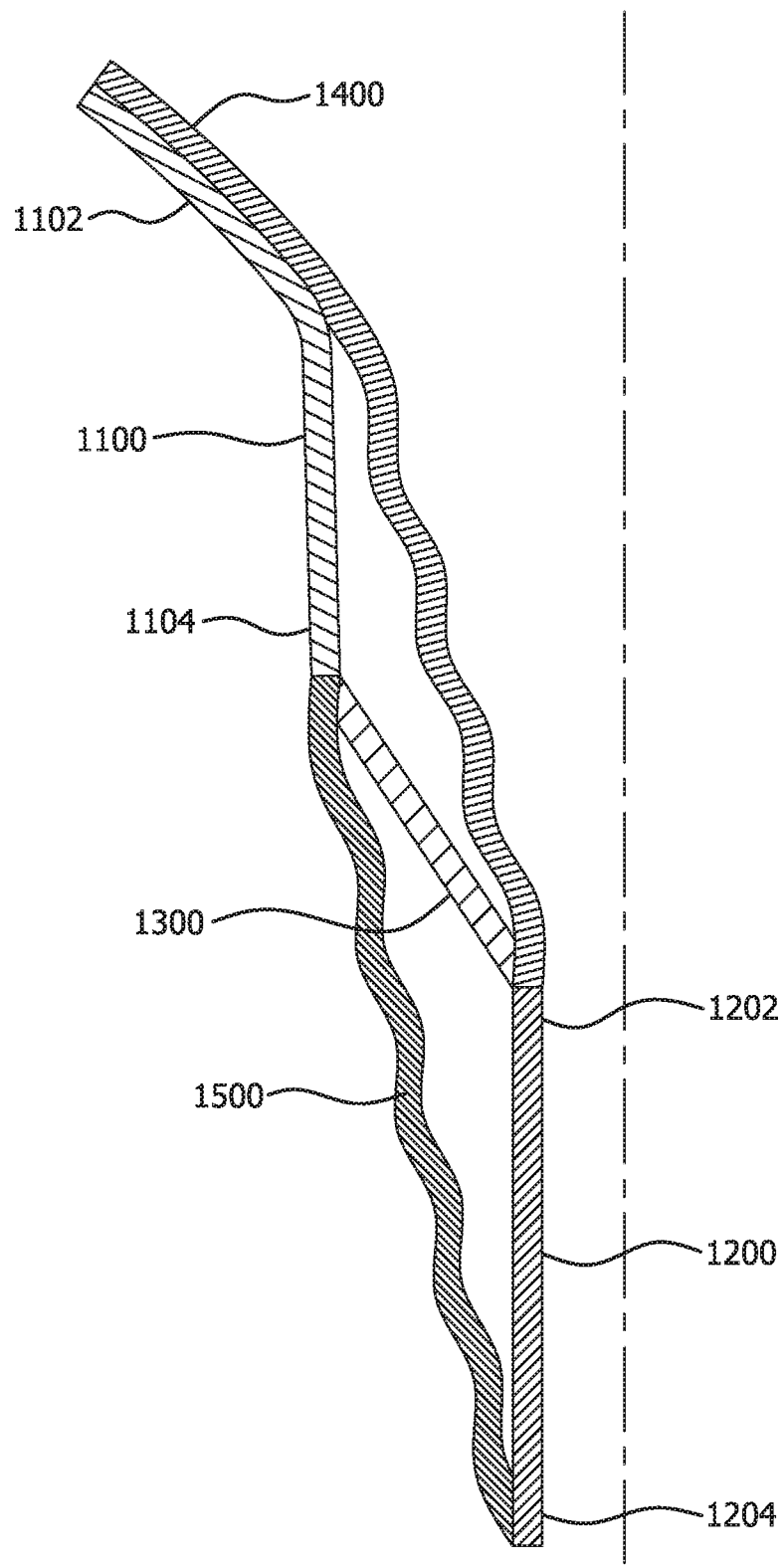
Figure 11G:
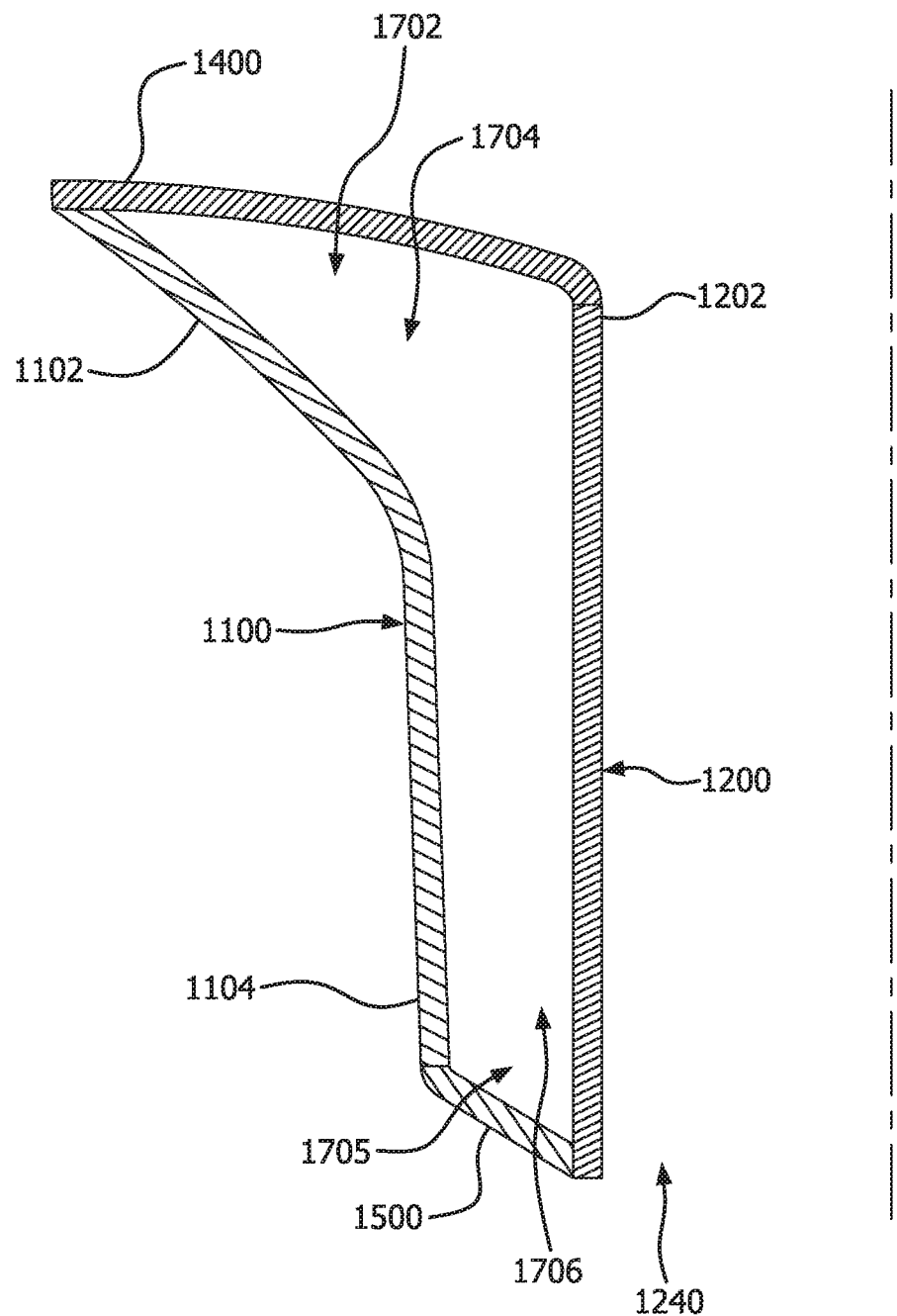
Figure 11H:
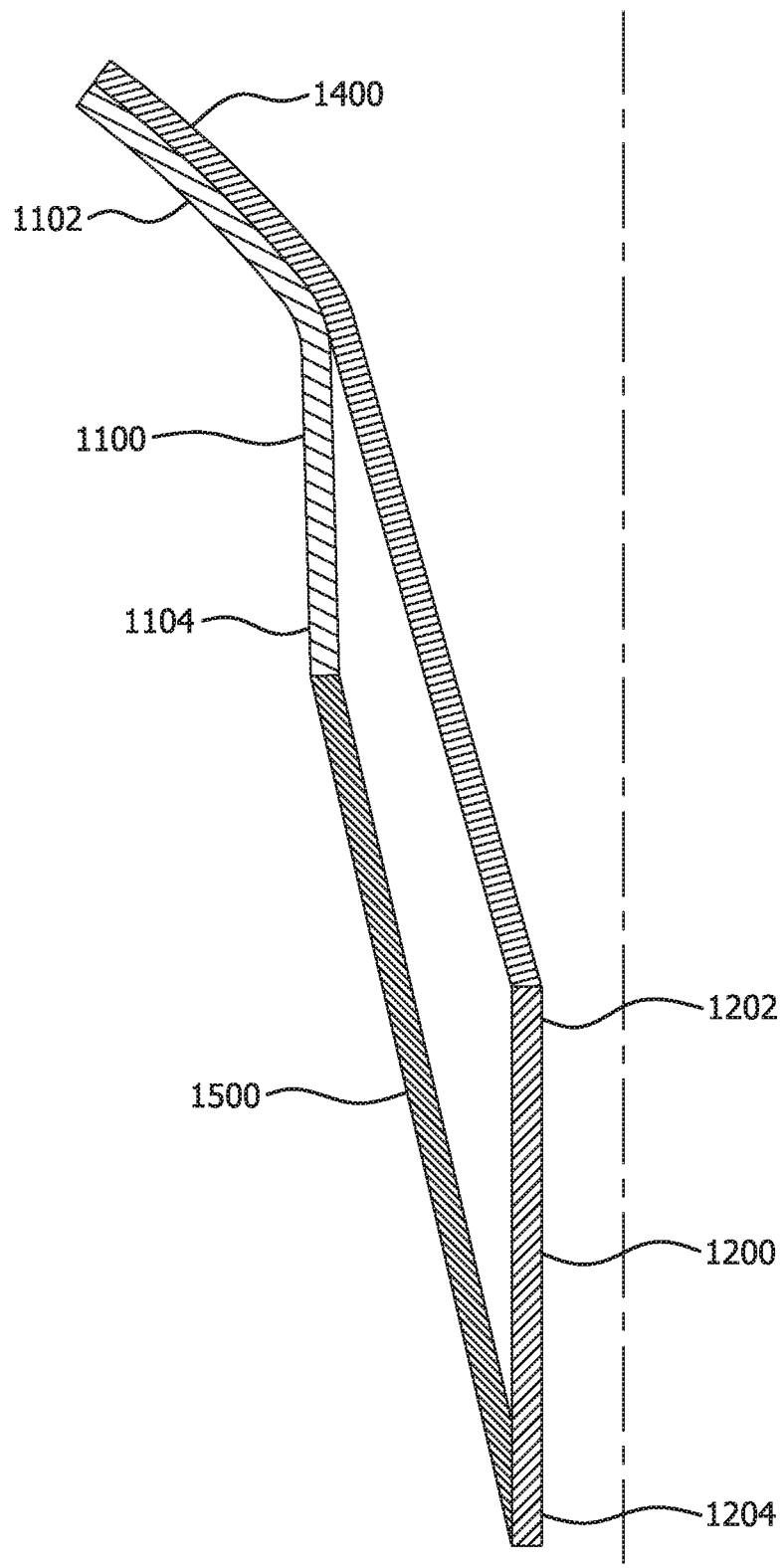

Although various embodiments are described including the connecting sheath 1300, in other embodiments the connecting sheath 1300 is omitted (e.g., as shown in FIGS. 11G and 11H. In such embodiments, the inflow annular groove cover 1400 and/or outflow annular groove cover 1500 optionally serve to couple, or connect the anchor frame subcomponent 1100 and leaflet frame subcomponent 1200 without use of the connecting sheath 1300, for example.

Annular Groove Covers/Bridging Members

FIGS. 2A-2D (collectively, FIGS. 2A-2D) shows an outline of the lateral borders, or periphery of the inflow bridging member 1400 and outflow bridging member 1500, or inflow annular groove cover 1400 and outflow annular groove cover 1500, with relation to a remainder of the prosthetic valve 1000. FIGS. 11A to 11G illustrated features of the bridging elements, or annular groove covers in a stylized, schematic views, as taken from a cross-section of one-half of the prosthetic valve 1000, according to some embodiments. For reference, FIGS. 11A, 11C, 11E, and 11G illustrate the prosthetic valve 1000 in a fully deployed configuration, with the leaflet frame subcomponent 1200 nested and expanded within the anchor frame subcomponent 1100 also in an expanded configuration. In turn, FIGS. 11B, 11D, 11F, and 11H illustrate the prosthetic valve 1000 in a pre-deployed state with the leaflet frame subcomponent 1200 un-nested from the anchor frame subcomponent 1100 and the leaflet frame subcomponent 1200 relatively more diametrically compacted (e.g., in a partially expanded configuration).

As shown in each of FIGS. 11A to 11G, the inflow annular groove cover 1400 is coupled to the inflow end portion of the anchor frame at the anchor frame subcomponent inflow end 1102 and the inflow end portion of the leaflet frame subcomponent at the leaflet frame subcomponent inflow end 1202. The outflow annular groove cover 1500 is coupled to the anchor frame subcomponent 1100 at the outflow end portion of the anchor frame subcomponent outflow end 1104 and the outflow end portion of the leaflet frame subcomponent 1200 at the leaflet frame subcomponent outflow end 1204. Although the inflow annular groove cover 1400 is shown and described as being attached toward the ends of the anchor frame subcomponent 1100 and the leaflet frame subcomponent 1200, the inflow annular groove cover 1400 and/or the outflow annular groove cover 1500 may be attached at other locations as appropriate.

In various examples, the inflow annular groove cover 1400 and/or the outflow annular groove cover 1500 is a flexible elastic element that is operable to resiliently stow into a low radial profile in a delivery configuration and is operable to extend between the leaflet frame subcomponent 1200 and the anchor frame subcomponent 1100. The inflow annular groove cover 1400 and/or outflow annular groove cover 1500 can be implemented to inhibit flood flow into or out from between the anchor frame subcomponent 1100 and the leaflet frame subcomponent 1200.

In some examples, one or both of the inflow annular groove cover 1400 and the outflow annular groove cover 1500 are under elastic bias when in a deployed position such that they are held relatively taught. Engagement of the inflow annular groove cover 1400 and/or the outflow annular groove cover 1500 with the anchor frame subcomponent 1100 and the leaflet frame subcomponent 1200 may assist in maintaining the relative position of the leaflet frame subcomponent 1200 within an anchor frame subcomponent lumen 1140, according to some embodiments.

Inflow Annular Groove Cover/Inflow Bridging Member

In various embodiments, the inflow annular groove cover 1400 is operable to extend across, or bridge an inflow gap 1702 between the anchor frame subcomponent 1100 and the leaflet frame subcomponent 1200. In general terms, the inflow gap 1702 has an annular axial profile. In some examples, the inflow annular groove cover 1400 is operable to cover an inflow annular groove 1704 defined between the anchor frame subcomponent 1100 and the leaflet frame subcomponent 1200, as well as the connecting sheath 1300 when present, when the leaflet frame subcomponent 1200 is nested within the anchor frame subcomponent 1100 according to FIGS. 11A, 11C, 11E, 11G, for example. As shown in FIGS. 11A, 11C, and 11E, the inflow annular groove cover 1400 is configured to bridge the inflow gap 1702 and cover the inflow annular groove 1704 formed between the anchor frame subcomponent 1100, the connecting sheath 1300 (everted during the deployment process), and the leaflet frame subcomponent 1200.

As shown, the inflow annular groove cover 1400 defines an inflow annular groove cover first end 1432 and an inflow annular groove cover second end 1434. The inflow annular groove cover first end 1432 is coupled to the anchor frame subcomponent inflow end 1102. The inflow annular groove cover second end 1434 is coupled to the leaflet frame subcomponent inflow end 1202 The inflow annular groove cover 1400 is a tubular element that is operable to extend generally parallel to the longitudinal axis X of the prosthetic valve 1000 (or at a relatively small, or shallow angle relative to the longitudinal axis X), when in the pre-deployed/ expanded configuration (e.g., FIGS. 11B, 11D, 11F) and operable to extend at an angle, and in some examples, in a generally lateral direction to the longitudinal axis X (or at a relatively large, or steep angle relative to the longitudinal axis X) when in the deployed/retracted configuration (e.g., FIGS. 11A, 11C, 11E). The inflow annular groove cover 1400 is operable to extend through the anchor frame subcomponent 1100 during the deployment process, as shown in FIGS. 11A-12F while the connecting sheath 1300 is operable to fold and evert within the anchor frame subcomponent lumen 1140 of the anchor frame subcomponent 1100 and lie between the leaflet frame subcomponent 1200 and the anchor frame subcomponent 1100 as shown in FIGS. 11A-11F and 12A-12F.

The inflow annular groove cover 1400 is configured to facilitate delivery of the prosthetic valve 1000, and is operable to be elastically restrained to an extended tubular or conical configuration as shown in FIGS. 1 and 2. In particular, the inflow annular groove cover 1400 may also be restrained to define a small tubular diameter in the constrained pre-deployment configuration at relatively the same diameter as that of the constrained leaflet frame subcomponent 1200 and the constrained anchor frame subcomponent 1100 with the inflow annular groove cover 1400 extending adjacent to the connecting sheath lumen 1340, as shown in FIG. 1. In some embodiments, the delivery device 1600 is configured to longitudinally restrain the prosthetic valve 1000 in the un-nested configuration until the time in the delivery sequence at which the leaflet frame subcomponent 1200 is nested into the anchor frame subcomponent 1100.

In the deployed configuration, the inflow annular groove cover 1400 bridges the distance between the leaflet frame subcomponent inflow end 1202 and the anchor frame subcomponent inflow end 1102 to bridge the inflow gap 1702 and extends across the inflow annular groove 1704 (FIG. 11A) defined by the anchor frame subcomponent inflow end 1102, the connecting sheath 1300, and the leaflet frame subcomponent inflow end 1202.

In some embodiments, the inflow annular groove cover 1400 retains the relative position of the leaflet frame subcomponent 1200 and the anchor frame subcomponent 1100 by virtue of the elastic bias of the inflow annular groove cover 1400. For example, the inflow annular groove cover 1400 optionally resists forces in opposition to the inflow annular groove cover 1400 being biased to the retracted configuration.

If desired, the bias may be predetermined to assist with centering or other desirable positioning of the leaflet frame subcomponent 1200 within the anchor frame subcomponent 1100 under physiologic loading conditions. In other embodiments, the bias may be selected to permit some resilient deflection, or adjustment of the position of the leaflet frame subcomponent 1200 within the anchor frame subcomponent 1100 to accommodate physiologic loading, or potentially even better replicate natural physiologic action (e.g., to more closely match movement of a natural valve during a cardiac cycle). In different terms, the bias may be predetermined the such that fluid dynamic forces on the prosthetic valve 1000 are not sufficient to overcome the elastic bias needed to stretch/expand the inflow annular groove cover 1400 which would lead to the leaflet frame subcomponent 1200 moving an unacceptable distance axially or radially within the anchor frame subcomponent lumen 1140 and maintain a relative axial and/or radial position (or at least minimize relative axial or radial movement) between the anchor frame subcomponent 1100 and the leaflet frame subcomponent 1200.

In accordance with an embodiment, the inflow annular groove cover 1400 comprises a pleated, or folded configuration that has a continuous sinuous and/or zig-zag configuration. The pleated, or folded configuration may facilitate reduction of the inflow annular groove cover 1400 to a smaller diameter. The pleated configuration may have an elastic bias, or otherwise resiliently return to the contracted, or retracted configuration. FIGS. 11C and 11D show a zig-zag, or accordion pleated embodiment in extended and retracted configurations, respectively. FIGS. 11E and 11F show a sinuous, pleated or folded configuration in extended and retracted configurations, respectively.

In accordance with embodiments, the inflow annular groove cover 1400 is non-permeable upon retracting to a retracted or partially retracted configuration (e.g., as shown in FIGS. 11A, 11C, 11E, and 11G) such that fluid/blood is prevented from passing through the inflow annular groove cover 1400 when the prosthetic valve 1000 is in the deployed configuration (e.g., as shown in FIGS. 3A and 3B). In the retracted configuration, the inflow annular groove cover 1400 extends from the leaflet frame subcomponent inflow end 1202 to the anchor frame subcomponent inflow end 1102 effectively bridging the inflow gap 1702 and covering the inflow annular groove 1704 formed between the anchor frame subcomponent 1100, the connecting sheath 1300 and the leaflet frame subcomponent 1200. FIGS. 11G and 11H provide for examples where the connecting sheath 1300 is omitted from the prosthetic valve 1000. In such examples, the inflow annular groove cover 1400 serves to bridge the inflow gap and cover the inflow annular groove 1704, which in such instances is defined between the anchor frame subcomponent 1100 and the leaflet frame subcomponent 1200.

There may be various reasons for bridging the inflow gap 1702 and covering or sealing off the inflow annular groove 1704 from blood flow when the prosthetic valve 1000 is in the fully deployed configuration. For example, such practice may help provide smoother flow into the leaflet frame subcomponent inflow end 1202 of the leaflet frame subcomponent 1200, which could otherwise flow antegrade into and retrograde out of the inflow annular groove 1704, or may prevent, or contain embolus that could form within the inflow annular groove 1704, dislodge and enter blood flow. In various embodiments, the inflow annular groove cover 1400 may assist with positioning and/or retention of the leaflet frame subcomponent 1200 within the anchor frame subcomponent 1100 (e.g., at a desired, relatively coaxial position). In accordance with some embodiments, the inflow annular groove cover 1400 may be operable to control the axial position of the leaflet frame subcomponent 1200 within the anchor frame subcomponent 1100. And, in further embodiments, the inflow annular groove cover 1400 may provide a bias for longitudinally translating the leaflet frame subcomponent 1200 into the anchor frame subcomponent 1100 during a delivery sequence. These, and additional or alternative features and advantages may be achieved according to the examples provided herein.

Outflow Annular Groove Cover/Outflow Bridging Member

In various embodiments, the outflow annular groove cover 1500 is operable to extend across, or bridge an outflow gap 1705 between the anchor frame subcomponent 1100 and the leaflet frame subcomponent 1200. In various examples, the inflow gap 1702 and the outflow gap 1705 are interrupted by the connecting sheath 1300. In other embodiments (e.g., FIGS. 11G and 11H), the connecting sheath 1300 is omitted and the inflow gap 1702 and the outflow gap 1705 are continuous and uninterrupted to form a single, continuous gap. Regardless, the outflow gap 1705 has an annular axial profile according to various examples. The outflow annular groove cover 1500 is generally operable to cover an outflow annular groove 1706 defined between the anchor frame subcomponent 1100 and the leaflet frame subcomponent 1200, as well as the connecting sheath 1300 when present, when the leaflet frame subcomponent 1200 is nested within the anchor frame subcomponent 1100 according to FIGS. 11A, 11C, 11E, 11G, for example. As shown in FIGS. 11A, 11C, and 11E, the outflow annular groove cover 1500 is configured to bridge the outflow gap 1705 and cover the outflow annular groove 1706 formed between the anchor frame subcomponent 1100, the connecting sheath 1300 (everted during the deployment process), and the leaflet frame subcomponent 1200.

As shown, the outflow annular groove cover 1500 defines an outflow annular groove cover first end 1532 and an outflow annular groove cover second end 1534. The outflow annular groove cover first end 1532 is coupled to the outflow end portion adjacent the anchor frame subcomponent outflow end 1104. The outflow annular groove cover second end 1534 is coupled to the outflow end portion adjacent the leaflet frame subcomponent outflow end 1204. As shown in FIGS. 2A and 2B, the outflow annular groove cover second end 1534 may be contiguously attached to the outflow end of the leaflet frame cover 1232. For example, the outflow annular groove cover 1500 may be coupled to and circumferentially extend from adjacent the anchor frame subcomponent outflow end 1104 and an outflow edge of the leaflet frame cover 1232. As shown in FIG. 2A, the leaflet frame cover 1232 optionally couples to an outflow end that corresponds to the leaflet frame outflow end 1224. In such instances, it may be desirable for the leaflet frame cover 1232 to also extend to the leaflet frame outflow end 1224 to avoid blood flow through the leaflet frame 1220 into the space corresponding to the outflow annular groove 1706. In such instances, the line of attachment may be substantially flat in circumference. As shown in FIG. 2B, the leaflet frame cover 1232 optionally couples to the outflow end portion which resides proximal to the leaflet frame outflow end 1224. As shown, the leaflet frame cover 1232 does not extend to the leaflet frame outflow end 1224, and the outflow annular groove cover may track the outflow or distal edge of the leaflet frame cover 1232 in a relatively jagged, or non-flat circumferential path, to avoid blood flow through the leaflet frame 1220 into the space corresponding to the outflow annular groove 1706.

The outflow annular groove cover 1500 is a tubular element that is operable to extend generally parallel to the longitudinal axis X of the prosthetic valve 1000 (or at a relatively small, or shallow angle relative to the longitudinal axis X), when in the pre-deployed/expanded configuration (e.g., FIGS. 11B, 11D, 11F) and operable to extend at an angle, and in some examples, in a generally lateral direction to the longitudinal axis X (or at a relatively large, or steep angle relative to the longitudinal axis X) when in the deployed/retracted configuration (e.g., FIGS. 11A, 11C, 11E). The outflow annular groove cover 1500 is operable to extend through the anchor frame subcomponent 1100 during the deployment process, as shown in FIGS. 11A-12F while the connecting sheath 1300 is operable to fold and evert within the anchor frame subcomponent lumen 1140 of the anchor frame subcomponent 1100 and lie between the leaflet frame subcomponent 1200 and the anchor frame subcomponent 1100 as shown in FIGS. 11A-11F and 12A-12F.

In some examples, the outflow annular groove cover 1500 is configured to facilitate delivery of the prosthetic valve 1000, and is operable to be elastically restrained to an extended tubular or conical configuration as shown in FIGS. 1 and 2. In particular, the outflow annular groove cover 1500 may also be restrained to define a small tubular diameter in the constrained pre-deployment configuration at relatively the same diameter as that of the constrained leaflet frame subcomponent 1200 and the constrained anchor frame subcomponent 1100 with the outflow annular groove cover 1500 extending within the anchor frame subcomponent 1100 as indicated by broken lines in FIG. 1 and shown in cross-section in FIGS. 11B, 11D, 11F, and 11H. For reference, as indicated above, in some embodiments, the delivery device 1600 is configured to longitudinally restrain the prosthetic valve 1000 in the un-nested configuration until the time in the delivery sequence at which the leaflet frame subcomponent 1200 is nested into the anchor frame subcomponent 1100.

In the deployed configuration, the outflow annular groove cover 1500 bridges the distance between the leaflet frame subcomponent outflow end 1204 and the anchor frame subcomponent outflow end 1104 to bridge the outflow gap 1705 (e.g., FIGS. 11A, 11C, 11E, and 11G) and extends across the outflow annular groove 1706 defined by the anchor frame subcomponent outflow end 1104, the connecting sheath 1300, and the leaflet frame subcomponent outflow end 1204.

In some embodiments, the outflow annular groove cover 1500 can help retain the relative position of the leaflet frame subcomponent 1200 and the anchor frame subcomponent 1100 by virtue of the elastic bias of the outflow annular groove cover 1500. For example, the outflow annular groove cover 1500 optionally resists forces in opposition to the outflow annular groove cover 1500 being biased to the retracted configuration.

If desired, the bias may be predetermined to assist with centering or other desirable positioning of the leaflet frame subcomponent 1200 within the anchor frame subcomponent 1100 under physiologic loading conditions. In other embodiments, the bias may be selected to permit some resilient deflection, or adjustment of the position of the leaflet frame subcomponent 1200 within the anchor frame subcomponent 1100 to accommodate physiologic loading, or potentially even better replicate natural physiologic action (e.g., to more closely match movement of a natural valve during a cardiac cycle). In different terms, the bias may be predetermined the such that fluid dynamic forces on the prosthetic valve 1000 are not sufficient to overcome the elastic bias needed to stretch/expand the outflow annular groove cover 1500 which would lead to the leaflet frame subcomponent 1200 moving an unacceptable distance axially or radially within the anchor frame subcomponent lumen 1140 and maintain a relative axial and/or radial position (or at least minimize relative axial or radial movement) between the anchor frame subcomponent 1100 and the leaflet frame subcomponent 1200.

In accordance with an embodiment, the outflow annular groove cover 1500 comprises a pleated, or folded configuration that has a continuous sinuous and/or zig-zag configuration. The pleated, or folded configuration may facilitate reduction of the outflow annular groove cover 1500 to a smaller diameter. The pleated configuration may have an elastic bias, or otherwise resiliently return to the contracted, or retracted configuration. FIGS. 11C and 11D show a zig-zag, or accordion pleated embodiment in extended and retracted configurations, respectively. FIGS. 11E and 11F show a sinuous, pleated or folded configuration in extended and retracted configurations, respectively.

In accordance with embodiments, the outflow annular groove cover 1500 is non-permeable upon retracting to a retracted or partially retracted configuration (e.g., as shown in FIGS. 11A, 11C, 11E, and 11G) such that fluid/blood is prevented from passing through the outflow annular groove cover 1500 when the prosthetic valve 1000 is in the deployed configuration (e.g., as shown in FIGS. 3A and 3B). In the retracted configuration, the outflow annular groove cover 1500 extends from the leaflet frame subcomponent outflow end 1204 to the anchor frame subcomponent outflow end 1104 effectively bridging the outflow gap 1705 and covering the outflow annular groove 1706 formed between the anchor frame subcomponent 1100, the connecting sheath 1300 and the leaflet frame subcomponent 1200. FIGS. 11G and 11H provide for examples where the connecting sheath 1300 is omitted from the prosthetic valve 1000. In such examples, the outflow annular groove cover 1500, also described as the outflow bridging member, serves to bridge the outflow gap 1705 and cover the outflow annular groove 1706, which in such instances is defined between the anchor frame subcomponent 1100 and the leaflet frame subcomponent 1200.

There may be various reasons for bridging the outflow gap 1705 and covering or sealing off the outflow annular groove 1706 from blood flow when the prosthetic valve 1000 is in the fully deployed configuration. For example, such practice may help provide smoother flow from the leaflet frame subcomponent outflow end 1204 of the leaflet frame subcomponent 1200, which could otherwise stagnate, or flow retrograde into the outflow annular groove 1706, or may prevent, or contain embolus that could form within the outflow annular groove 1706, dislodge and enter blood flow. In various embodiments, the outflow annular groove cover 1500 may assist with positioning and/or retention of the leaflet frame subcomponent 1200 within the anchor frame subcomponent 1100 (e.g., at a desired, relatively coaxial position). In accordance with some embodiments, the outflow annular groove cover 1500 may be operable to control the axial position of the leaflet frame subcomponent 1200 within the anchor frame subcomponent 1100. And, in further embodiments, the outflow annular groove cover 1500 may provide a bias for longitudinally translating the leaflet frame subcomponent 1200 into the anchor frame subcomponent 1100 during a delivery sequence. These, and additional or alternative features and advantages may be achieved according to the examples provided herein.

Annular Groove Cover/Bridging Member Materials

From the foregoing, it should be understood that the prosthetic valve 1000 may have either an inflow annular groove cover 1400 or an outflow annular groove cover 1500, or both an inflow annular groove cover 1400 and an outflow annular groove cover 1500 as desired, and according to any of the previously-described examples. As previously referenced the inflow annular groove cover 1400 and/or the outflow annular groove cover may be formed from similar materials as those described above with regard to the leaflet subcomponent 1228. In some examples, one or both are formed from a retracted microstructure membrane such as those described in U.S. Pat. No. 10,166,128, entitled "Lattice" and issued Jan. 1, 2019. Such retracted microstructures exhibit a high degree of recoverable elongation such that they can be extended and resilient retract. They may be formed of fluoropolymer membranes (e.g., porous synthetic fluoropolymer membranes) such that they exhibit high elongation while substantially retaining the strength properties associated with the fluoropolymer membrane. Such retracted microstructure membranes characteristically possess a microstructure of serpentine fibrils that curve or turn generally one way then generally another way. It is to be understood that the amplitude and/or frequency of the serpentine-like fibrils may vary. In some embodiments, the fluoropolymer membranes that go through a retraction process to provide a precursor retracted membrane are formed of expandable fluoropolymers. Non-limiting examples of expandable fluoropolymers include, but are not limited to, expanded PTFE, expanded modified PTFE, and expanded copolymers of PTFE.

The high elongation is facilitated by forming relatively straight fibrils into serpentine fibrils that substantially straighten upon the application of a force in a direction opposite to the compressed direction. The creation of the serpentine fibrils can be achieved through a thermally-induced controlled retraction of the expanded polytetrafluoroethylene (ePTFE), through wetting the article with a solvent, such as, but not limited to, isopropyl alcohol or Fluorinert® (a perfluorinated solvent commercially available from 3M, Inc., St. Paul, MN), or by a combination of these two techniques. The retraction of the article does not result in visible pleating, folding, or wrinkling of the ePTFE, unlike what occurs during mechanical compression. During the retraction process, the fibrils not only become serpentine in shape but also may also increase in width.

The retracted membranes described above can be imbibed with an elastomeric material prior, during, or subsequent to retraction to form a composite such that at least a portion of the pores of a porous material such as ePTFE or the like are filled. Suitable elastomeric materials may include, but are not limited to, PMVE-TFE (perfluoromethylvinyl ether-tetrafluoroethylene) copolymers, PAVE-TFE (perfluoro (alkyl vinyl ether)-tetrafluoroethylene) copolymers, silicones, polyurethanes, and the like. It is to be noted that PMVE-TFE and PAVE-TFE are fluoroelastomers. Other fluoroelastomers include suitable elastomeric materials as identified by those of skill in the art. The resultant retracted membrane composite possesses resilient elongation capability while substantially retaining the strength properties of the fluoropolymer membrane. Moreover, such retracted membranes have the ability to be free of creases, folds or wrinkles visible to the naked eye (i.e., on a gross scale) in both retracted and extended configurations.

In addition to or as an alternative to a membrane or other sheet-like component having elastic recovery (e.g., by coating or imbibing a membrane with elastomer), one or more elastomeric elements may otherwise be associated with a membrane or sheet-like member to provide desired properties. For example, one or more elastomeric bands, members, or other feature may be associated (e.g., bonded, adhered, or mechanically fastened) with a sheet-like member, such as a membrane or film, to provide resilient elongation capabilities to the annular groove cover(s).

In some examples, wherein the material of the inflow annular groove cover 1400 or outflow annular groove cover 1500 includes a porous elastic film that when in the extended configuration defines pores large enough to render the porous elastic film blood-permeable under physiologic conditions and when in the retracted configuration the pores are small enough to render the porous elastic film low-permeability, such as blood impermeable under physiologic conditions.

The materials utilized for the inflow annular groove cover 1400 and/or outflow annular groove cover 1500 may also be configured for tissue ingrowth (i.e., to facilitate or promote tissue ingrowth or adhesion) or to resist tissue ingrowth. Moreover, one or more portions of the cover(s) may be configured for tissue ingrowth, whereas other portions are configured to resist tissue ingrowth.

Filler materials may also be utilized in addition to the annular groove covers. Whether separately injectable (e.g., utilizing a syringe or other delivery mechanism) or associated with the annular groove cover(s) as a coating or other treatment, such filler materials may serve to help fill the inflow gap 1702 and inflow annular groove 1704 and/or the outflow gap 1705 and outflow annular groove 1706 as desired. Examples of such materials include biocompatible filler agents or bulking agents operable to fill a volume (e.g., a volume defined by one of the annular grooves) and may include at least one of hydrogel, alginate, foam, porous bulking material, collagen, hyaluronic acid, alginic salt, cellulose, chitosan, gelatin, agarose, glycosaminoglycans, polysaccharides, and combinations thereof, among others.

Tissue Ingrowth

In various embodiments, the leaflet 1230 is constructed in a manner that promotes tissue ingrowth. In some embodiments, the leaflet 1230 may be constructed to encourage tissue ingrowth and proliferation across one or more discrete regions, portions, or sections of one or more of the materials forming the leaflet 1230, or alternatively across an entirety of one or more of the materials forming the leaflet 1230. Tissue ingrowth and proliferation may be promoted on an outflow side or surface of the leaflet 1230, and/or on an inflow side or surface of the leaflet 1230, and/or within one or more materials forming the leaflet.

In various embodiments, the leaflets 1230 include a composite material combined with a tissue ingrowth curtain that may be incorporated into the composite material and/or coupled to the composite material.

In various embodiments, one or more portions of the leaflet frame subcomponent 1200 may be covered with material suitable for promoting tissue ingrowth. For example, the leaflet frame subcomponent 1200 can be wrapped with a material, suitable for promoting tissue ingrowth. In various examples, such tissue ingrowth promoting materials can be applied to leaflet frame subcomponent 1200 entirely, or alternatively to less than all of the leaflet frame subcomponent 1200. For example, suitable materials for promoting tissue ingrowth could be coupled to the leaflet frame inner surface and the leaflet frame outer surface of the leaflet frame. Some nonlimiting examples of materials that can be applied to the leaflet frame subcomponent 1200 (or other portions of the leaflet frame subcomponent 1200) include expanded polytetrafluoroethylene (ePTFE), such as an ePTFE membrane, as well as fabric, film, or coating, and a polyethylene terephthalate fabric (e.g., Dacron fabric).

According to some examples, as will be discussed in greater detail below, this promotion of tissue ingrowth is facilitated by the coupling of one or more synthetic tissue ingrowth curtains to one or more composite materials such that tissue is encouraged to grow (or is not otherwise prevented or inhibited from growing) into and/or onto the one or more tissue ingrowth curtains. That is, in some examples, one or more layers configured to promote tissue ingrowth may be applied to the composite material. In some examples, as described herein, the underlying leaflet structure or material may be configured to inhibit or prevent tissue ingrowth.

Additionally or alternatively, in some examples, this promotion of tissue ingrowth is facilitated by selectively imbibing, such as with one or more fluoroelastomers, one or more portions of the one or more materials forming the leaflet 1230. Reference to "selectively imbibing" is referring to the act of imbibing a porous material with a filling material at selected portions of the porous material or to a lesser degree leaving a degree of porosity of the porous material.

That is, in some examples, in addition to or as an alternative to coupling one or more synthetic tissue ingrowth curtains to one or more composite materials, the composite material as discussed above regarding leaflet materials is configured to promote or accommodate tissue ingrowth. In some such examples, as discussed in greater detail below, the composite material is configured such that tissue is encouraged to grow (or is not otherwise prevented or inhibited from growing) into and/or onto one or more discrete or designated sections, portions, or regions of the composite material by way of selectively imbibing the membrane associated with those portions.

In various embodiments, the tissue ingrowth curtain generally includes an expanded fluoropolymer membrane which comprises a plurality of spaces within a matrix of fibrils that is suitable for promoting and supporting the ingrowth of tissue. Other nonlimiting example materials include other biocompatible porous materials such as knit PTFE. However, as mentioned above, and as discussed in greater detail below, in some examples the tissue ingrowth curtain(s) may be applied to the composite material in the form of one or more coatings.

In some examples, the tissue ingrowth curtain includes an expanded fluoropolymer made from a porous ePTFE membrane. However, it is appreciated that the tissue ingrowth curtain may be formed from a number of different types of membranes, including other fluoropolymer membranes, and other biocompatible porous materials such as porous polyethylene membrane and knit PTFE. For instance, the expandable fluoropolymer can comprise PTFE homopolymer. In some examples, the tissue ingrowth curtain can be formed from copolymers of hexafluoropropylene and tetrafluoroethylenethe, such as Fluorinated Ethylene Propylene (FEP). In some examples, blends of PTFE, expandable modified PTFE and/or expanded copolymers of PTFE can be used. It will thus be appreciated that the tissue ingrowth curtain may be formed from a variety of different polymeric materials provided they are biocompatible and possess or are modified to include a suitable microstructure suitable for promoting or supporting tissue ingrowth. In various examples, the tissue ingrowth curtains may range in thickness from between one micron and four hundred microns depending on the selected material.

In some examples, the polymeric material may include one or more naturally occurring and/or one or more artificially created pores, reliefs, channels, and/or predetermined surface topology, suitable for supporting tissue ingrowth. Other biocompatible materials which can be suitable for use in forming the tissue ingrowth curtain include but are not limited to the groups of urethanes, fluoropolymers, styrene/isobutylene copolymers, polyisobutylene, polyethylene-co-poly(vinyl acetate), polyester copolymers, nylon copolymers, fluorinated hydrocarbon polymers and copolymers or mixtures of each of the foregoing.

While the above-discussed tissue ingrowth curtains generally include membranes, films, knits, or other structures that are bonded, applied, or otherwise attached to the composite material, as mentioned above, in some examples the tissue ingrowth curtain(s) may be applied to the composite material in the form of one or more coatings. In some such example, a coherent irregular network is distributed or deposited onto one or more portions, regions, sections, areas, or zones of the composite material. In some examples, the coherent irregular network is applied to one or more portions of the composite material to create a surface texture suitable for supporting the ingrowth and proliferation of tissue, as those of skill will appreciate. For example, the coherent irregular network may be selectively applied to one or more discrete or designated sections, portions, or regions of the composite material. In some such examples, the coherent irregular network is applied to the designated areas by masking or otherwise covering those portions of the underlying leaflet where ingrowth of tissue is undesirable such that the cover or mask can be removed subsequent to the coherent irregular network application process to achieve a leaflet having a first region including the coherent irregular network and a second region free of a coherent irregular network. In some examples, one or more sacrificial sheets, such as one or more polyimide sheets (e.g., Kapton sheets), are arranged on the composite material and operate to mask or otherwise prevent the coherent irregular network from being applied to the masked or covered areas. Some nonlimiting examples of sacrificial sheet materials include polyester, polyetheretherketone (PEEK), PET, ePTFE/Kapton blends such as mapton, ePTFE, PTFE, silicones, and stainless steel, or other thin metal sheeting. In some examples, the one or more sacrificial sheets can be removed after the coherent irregular network application process to reveal a leaflet having a structure including one or more regions including the coherent irregular network and one or more regions free of the coherent irregular network (e.g., where the underlying composite material is exposed). Such a configuration provides for a construction of the leaflet that minimizes a possibility for delamination between bonded membrane layers.

As mentioned above, in some examples, in addition to or as an alternative to applying one or more tissue ingrowth curtains to the composite material, the composite material is configured to promote or accommodate tissue ingrowth. For instance, in some examples, the composite material is configured such that tissue is encouraged to grow (or is not otherwise prevented or inhibited from growing) into and/or onto one or more discrete or designated sections, portions, or regions of the composite material. For instance, as mentioned above, the composite material forming the synthetic leaflet may include an elastomer and/or an elastomeric material such as a fluoroelastomer imbibed or otherwise incorporated into the expanded fluoropolymer membrane. In various examples, to achieve a composite material that promotes or otherwise accommodates the ingrowth and proliferation of tissue the expanded fluoropolymer membrane is selectively imbibed, such as with one or more fluoroelastomers, such that the expanded fluoropolymer membrane includes one or more discrete portions, regions, sections, zones, or areas that are free of or are not otherwise imbibed with the elastomeric filler material (or at least are not filled to the extent that the elastomeric filler material operates to prevent tissue ingrowth). Selectively imbibing the membrane material of the composite material may be done in accordance with techniques as known to those of skill in the art.

While the above discussed embodiments and examples include applying a tissue ingrowth curtain to one or more portions of one or more surfaces of the composite material, or selectively imbibing one or more portions of one or more sides of a membrane of the composite material with a filler material, it will be appreciated that, in various examples, a leaflet may be constructed by both imbibing one or more portions of the membrane and applying a tissue ingrowth curtain to the selectively imbibed membrane.

In various examples, the membrane may be imbibed with a plurality of filler materials. That is, in some examples, a first portion, area, region, section, or zone of the membrane of composite material may be imbibed with a first filler material while a second portion, area, region, section, or zone of the membrane of the composite material is imbibed with a second filler material. For instance, in some examples, a first portion of the membrane of the composite material is imbibed with a first filler material such that the first portion of the membrane is resistant to or otherwise inhibits or prevents tissue ingrowth into and/or onto and/or across the first portion. However, in some examples, those portions of the membrane imbibed with the first filler may also be unsuitable for accommodating the bonding or coupling of a tissue ingrowth curtain. Accordingly, in examples where it is desirable bond or otherwise couple a tissue ingrowth leaflet to a second portion of the membrane, the second portion may be imbibed with a second filler material such that the second portion of the membrane is suited to have a tissue ingrowth curtain bonded or otherwise coupled thereto. In some examples, the second filler material may additionally or alternatively encourage tissue ingrowth. That is, in some examples, one or more portions of the membrane may be imbibed with a filler material that encourages tissue ingrowth and proliferation. Alternatively, as mentioned above, the second portion may not be imbibed with any filler material at all, but may instead remain free of filler material.

In some examples, the method includes applying an adhesive to the membrane in addition to or as an alternative to applying the adhesive to the tissue ingrowth curtain, as discussed above. In some examples, an adhesive, such as FEP, is similarly wicked or imbibed into one or more portions of the membrane, after which the tissue ingrowth curtain and the membrane are pressed together and/or heat set according to known methods.

In some other examples, in addition to or as an alternative to applying adhesives to the tissue ingrowth curtain and the membrane separately or individually, the tissue ingrowth curtain (e.g., having a designated pattern) and the membrane are layered with one or more adhesives or adhesive layers therebetween, after which the layered construct is pressed and/or heat set according to known methods. The method further includes cutting the leaflet from the resulting construct according to known methods. In some examples, a final free edge cutting operation may be performed on the leaflet to achieve a clean free edge of the resulting leaflet according to known methods, as those of skill will appreciate.

In accordance with an embodiment, the composite material can include an expanded fluoropolymer made from porous ePTFE membrane.

The expanded fluoropolymer membrane, used to form some of the composites described, can comprise PTFE homopolymer. In alternative embodiments, blends of PTFE, expandable modified PTFE and/or expanded copolymers of PTFE can be used.

Delivery Perfusion and Associated Features

FIG. 12 shows the prosthetic valve 1000 carried on the delivery catheter 1604 of the delivery device 1600. As shown, the delivery catheter includes a plurality of containing elements, or constraining elements 1716 (e.g., fibers or tethers) for maintaining the various subcomponents of the prosthetic valve 1000 at a desired relatively longitudinal position and at a desired diameter. The delivery catheter 1604 may be configured to facilitate the delivery sequences described herein, with one or more of the constraining elements 1716 being releasable in a desired sequence. The delivery device 1600 may include additional features (e.g., a delivery sheath) as described in further detail in subsequent sections.

Figure 13A:
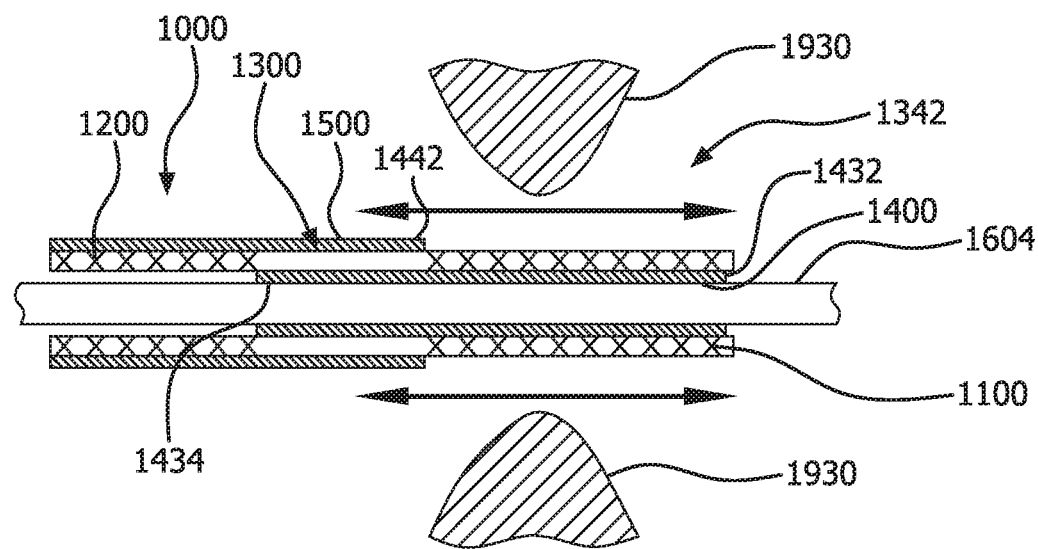
FIGS. 13A-13G are simplified longitudinal sections of a prosthetic valve in various stages of deployment, according to some embodiments.
Figure 13B:
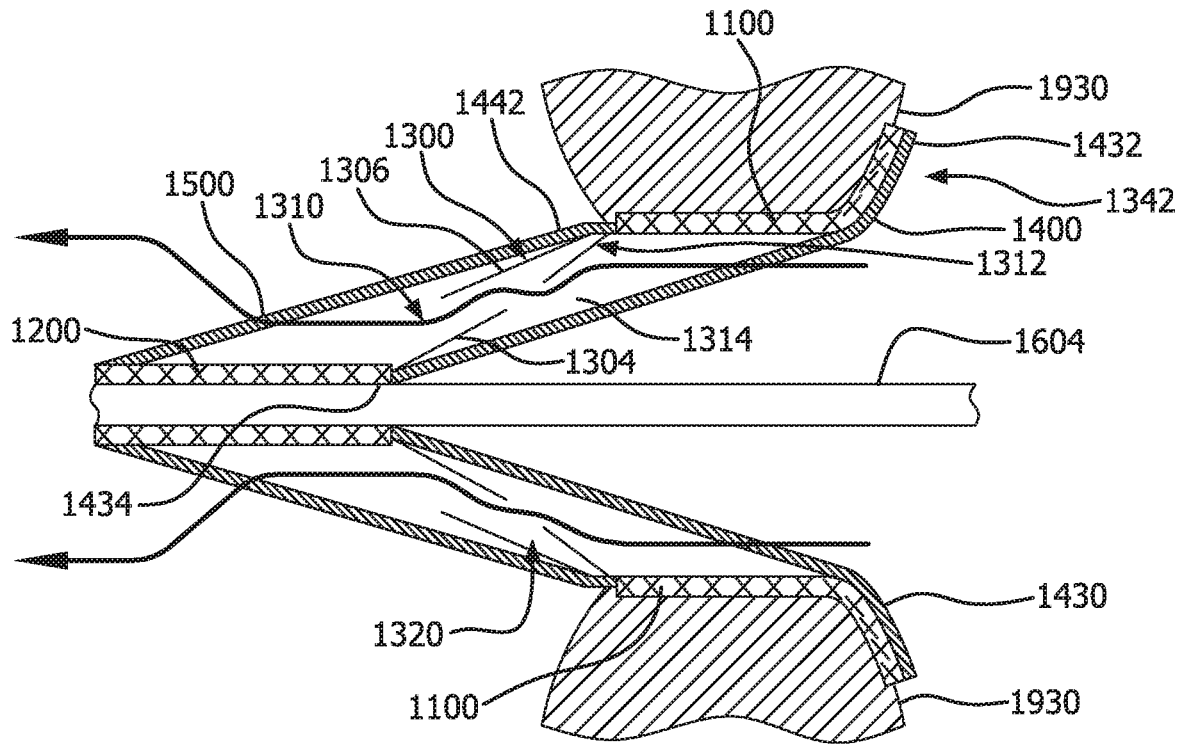
Figure 13C:
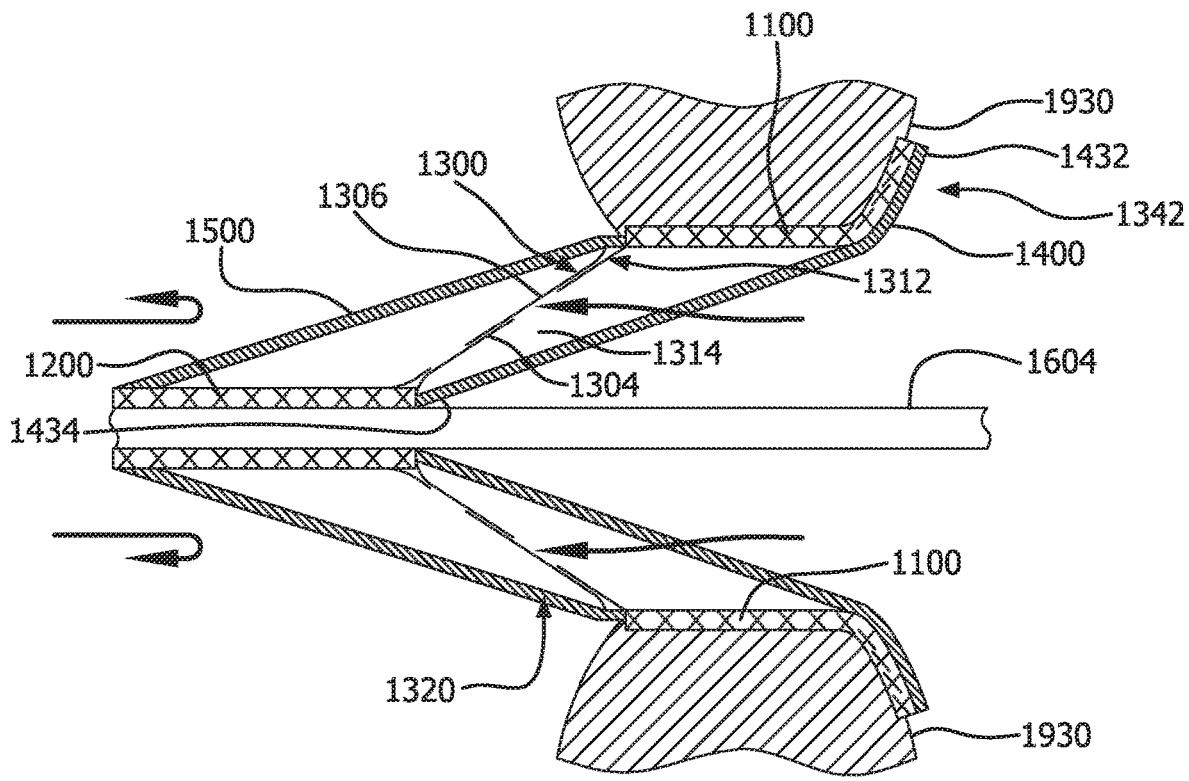

In terms of blood perfusion during delivery, FIGS. 13A-13F are greatly simplified cross-sectional views of a representation of the prosthetic valve 1000, as well as features of the delivery device 1600 associated with an example delivery sequence. FIG. 13A shows the prosthetic valve 1000 constrained onto the delivery catheter 1604 and placed within a tissue annulus 1342, in accordance with an embodiment. In accordance with the above embodiment, as shown in FIGS. 13A-13E, upon deploying the anchor frame subcomponent 1100 within the tissue annulus 1342, the leaflet frame subcomponent 1200 is translated and nested within the anchor frame subcomponent 1100 at a nested position while in the pre-deployed configuration (e.g., either fully compressed on the delivery catheter 1604 as shown or partially expanded according to other examples, such as that shown in FIG. 13G). As shown in the example of FIG. 13B, prior to transitioning the prosthetic valve 1000 to the fully deployed state, in which the leaflet frame subcomponent 1200 is fully nested and diametrically expanded, and during everting or folding/rotating the connecting sheath 1300, the inflow annular groove cover 1400 and the outflow annular groove cover 1500 are permeable to blood under physiologic conditions and antegrade flow is permitted through the inflow gap 1702 and outflow gap 1705.

Figure 13D:
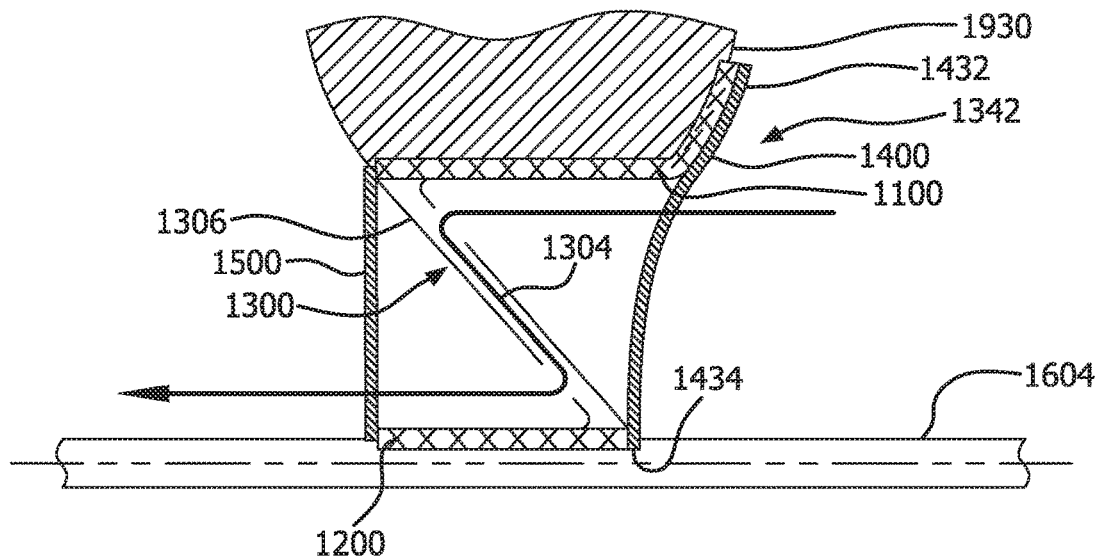
Figure 13E:
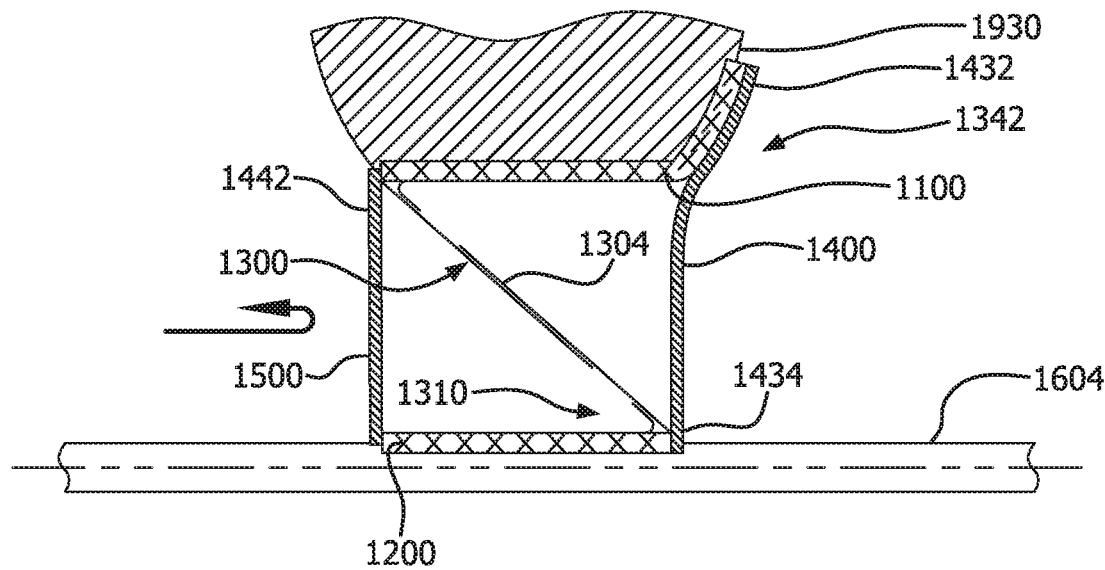
Figure 13F:
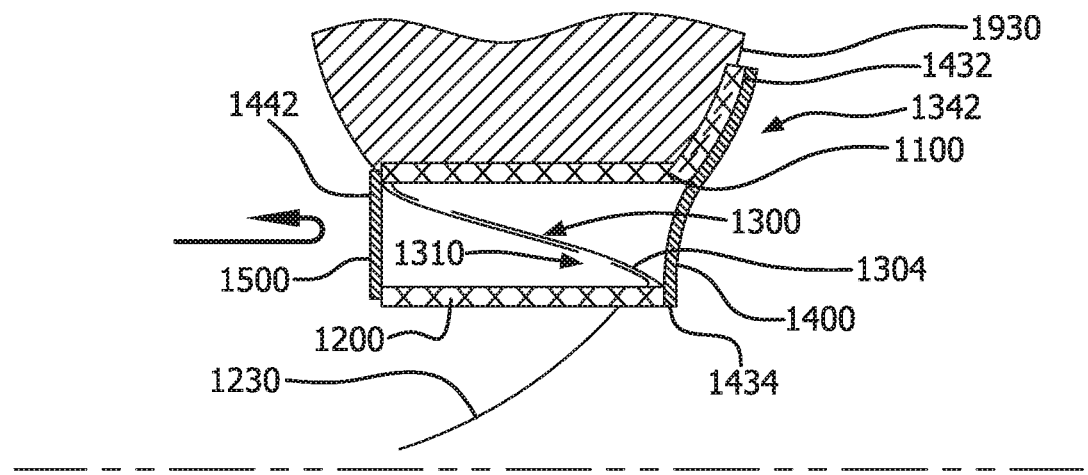
Figure 13G:
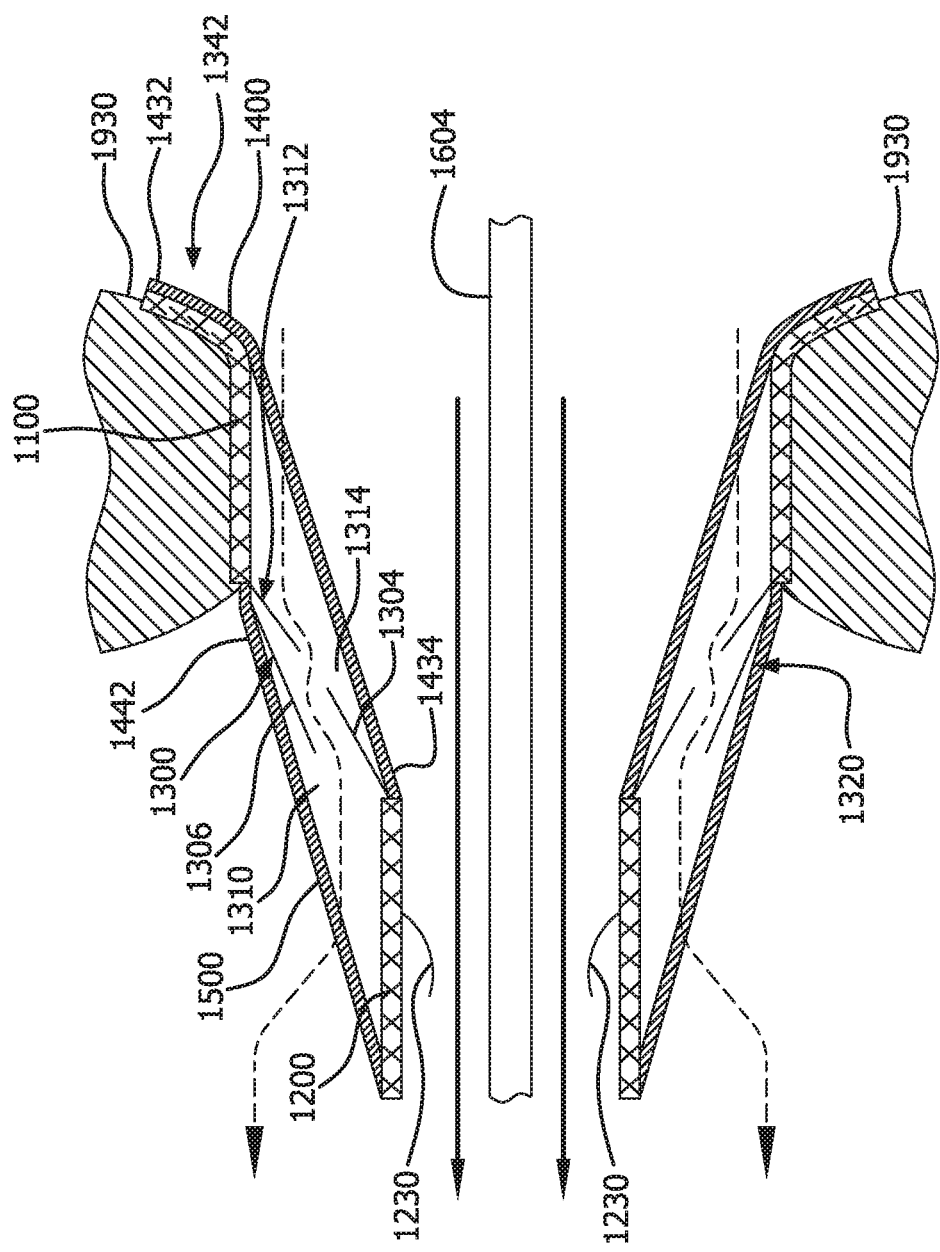
Figure 16:
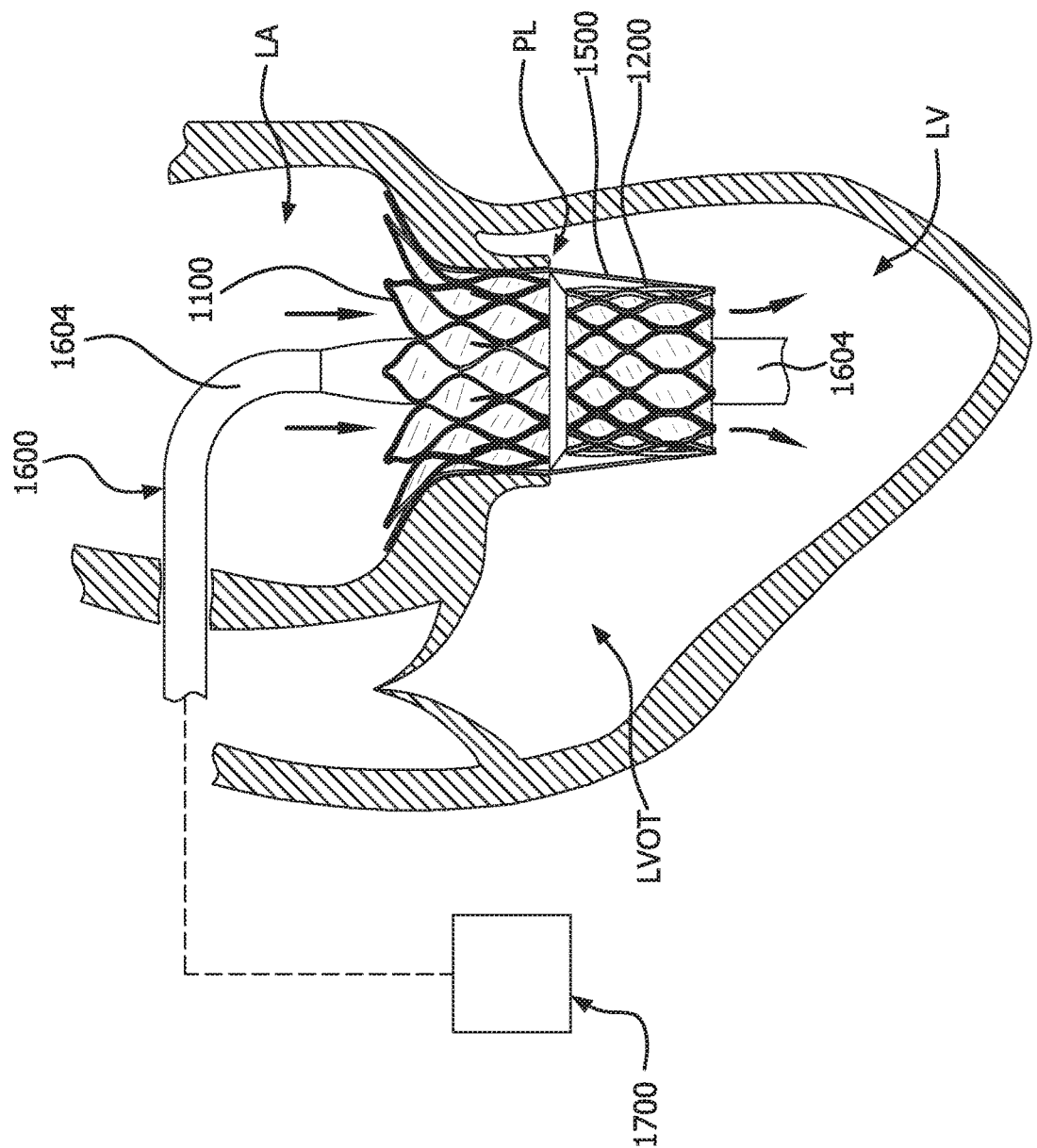
FIG. 16 shows a delivery device and prosthetic valve as implanted in a patient anatomy, according to some embodiments.

As referenced above, FIG. 13G shows the prosthetic valve 1000 in the un-nested configuration with the leaflet frame subcomponent 1200 either partially or fully expanded. For reference, FIG. 16 shows the prosthetic valve 1000 in a similar configuration situated in the patient's anatomy. According to some examples, in the un-nested, but expanded or partially expanded state, the leaflet frame subcomponent 1200 permits some degree of selective perfusion (e.g., antegrade perfusion) and/or assessment of valve function and positioning prior to final, full deployment. Such perfusion may be additional to perfusion through the inflow gap 1702 and outflow gap 1705 (e.g., as indicated by the broken lines in FIG. 13G), or may be an alternative to perfusion through the inflow gap 1702 and outflow gap 1705 where the flow enabling features are omitted and/or the inflow annular gap cover 1400 and/or outflow annular gap cover are impermeable, or insufficiently permeable, to facilitate effective perfusion during delivery.

As indicated by the flow lines in the figures, the antegrade flow pressure causes the outer film layer 1306 to move away from the inner film layer 1304 so as to define the flow space 1320 between the inner film layer 1304 and outer film layer 1306. Blood may flow in the antegrade direction into the inner film aperture 1312 and out of the outer film aperture 1310 especially during deployment of the prosthetic valve 1000 when the anchor frame subcomponent 1100 and the leaflet frame subcomponent 1200 are still mounted on the delivery catheter and are blocking antegrade flow with the leaflets 1230 of the leaflet subcomponent 1228 not yet being functional. In this example, blood profusion may be maintained during substantially the entire deployment process of the prosthetic valve 1000.

Under retrograde flow pressure, blood is prevented from flowing through the flow enabling features 1350 in a retrograde direction. Retrograde flow pressure causes the outer film layer 1306 to move toward and against the inner film layer 1304 so as to close the flow space 1320 between the inner film layer 1304 and outer film layer 1306, with the inner film layer 1304 covering the outer film aperture 1310 and/or the outer film layer 1306 covering the inner film aperture 1312 due to the radial offset of the inner film aperture 1312 and the outer film aperture 1310. Blood is prevented from flowing in the retrograde direction into the outer film aperture 1310 and out of the inner film aperture 1312 especially during deployment of the prosthetic valve 1000 when the deployed anchor frame subcomponent 1100, and the still-mounted-on-the-delivery-catheter leaflet frame subcomponent 1200, are blocking retrograde flow.

In this manner, antegrade flow, or perfusion may be permitted during the delivery sequence of the prosthetic valve 1000 prior to full deployment of the prosthetic valve 1000.

As shown in FIG. 13D the leaflet frame subcomponent 1200 is expanded into its final deployed configuration. The inner film layer 1304 and the outer film layer 1306 are caused to come together under antegrade and retrograde fluid pressure and/or mechanical pressure narrowing or closing the flow space 1320 and with the inner film layer 1304 covering the outer film aperture 1310 and/or the outer film layer 1306 covering the inner film aperture 1312 closing the respective outer film aperture 1310 and inner film aperture 1312 due to the radial offset of the inner film aperture 1312 and the outer film aperture 1310, preventing flow therethrough.

In this example, blood profusion may be maintained during substantially the entire deployment process when the leaflet frame subcomponent 1200 is not fully functional as shown in FIG. 13E. In various examples, the inflow annular groove cover 1400 and/or outflow annular groove cover 1500 reduce in permeability as they take on retracted configurations associated with the fully deployed configuration of the prosthetic valve 1000. In some examples, the inflow annular groove cover 1400 and/or outflow annular groove cover 1500 are generally low-permeability, such as blood impermeable under physiologic conditions when the prosthetic valve 1000 is fully deployed as shown in FIG. 13F. In at least this manner, the inflow gap 1702 and/or outflow gap 1705 is covered and blocked (e.g., to provide a smoother flow profile and/or reduce the potential for formation and release of emboli into the blood stream).

Although the examples above are generally described in association with flow enabling features similar to those of FIGS. 10C-10E, similar principles apply when employing other flow enabling features, such as those described in association with FIGS. 10A and 10B.

Biased-Deployment and Associated Features

In some embodiments, the inflow annular groove cover 1400 and/or outflow annular groove cover 1500 assist telescopic nesting of the leaflet frame subcomponent 1200 into the anchor frame subcomponent 1100 by "pulling" the leaflet frame subcomponent 1200 into the anchor frame subcomponent 1100. In accordance with some embodiments, after deployment or expansion of the anchor frame subcomponent 1100 into the tissue annulus, the connecting sheath 1300 presents a tapered configuration having a smaller diameter at the leaflet frame subcomponent inflow end 1202 to a larger diameter at the anchor frame subcomponent outflow end 1104. Upon axially releasing the leaflet frame subcomponent 1200 (e.g., by releasing one or more of the constraining elements 1716), the inflow annular groove cover 1400 and/or the outflow annular groove cover 1500 optionally contract so as to pull the leaflet frame subcomponent 1200 into the anchor frame subcomponent 1100, until the axial movement is stopped once the elastic bias is insufficient to cause further movement (e.g., by the connecting sheath 1300 becoming taught in the everted configuration preventing further movement or, where both inflow and outflow annular groove covers are present, upon the biasing forces of the two covers coming to equilibrium).

The elastic bias exhibited by the inflow annular groove cover 1400 and/or outflow annular groove cover 1500 may be configured such that sufficient force is produced to advance the leaflet frame subcomponent 1200 into the anchor frame subcomponent 1100 toward the anchor frame subcomponent inflow end 1102. In accordance with embodiments, the leaflet frame subcomponent 1200 may be either retained on the delivery catheter 1604 or deployed to the expanded configuration prior to being pulled into the anchor frame subcomponent 1100. In this embodiment, the elastic bias of the inflow annular groove cover 1400 and/or the outflow annular groove cover 1500 helps provide a passive means for advancing the leaflet frame subcomponent 1200 into the anchor frame subcomponent 1100, where an operator need not actively bias the leaflet frame subcomponent 1200 into the anchor frame subcomponent 1100 (e.g., by manipulating the position of the delivery catheter 1604) during nesting.

In accordance with another embodiment, the length and/or elastic properties of the inflow annular groove cover 1400 and/or the outflow annular groove cover 1500 is predetermined such that the leaflet frame subcomponent 1200 is properly positioned within the anchor frame subcomponent 1100 while in the deployed configuration. If desired, the bias may be predetermined to assist with centering or other desirable positioning of the leaflet frame subcomponent 1200 within the anchor frame subcomponent 1100 under physiologic loading conditions. In other embodiments, the bias may be selected to permit some resilient deflection, or adjustment of the position of the leaflet frame subcomponent 1200 within the anchor frame subcomponent 1100 to accommodate physiologic loading, or potentially even better replicate natural physiologic action (e.g., to more closely match movement of a natural valve during a cardiac cycle). In different terms, the bias may be predetermined the such that fluid dynamic forces on the prosthetic valve 1000 are not sufficient to overcome the elastic bias needed to stretch/expand the outflow annular groove cover 1500 which would lead to the leaflet frame subcomponent 1200 moving an unacceptable distance axially or radially within the anchor frame subcomponent lumen 1140 and maintain a relative axial and/or radial position (or at least minimize relative axial or radial movement) between the anchor frame subcomponent 1100 and the leaflet frame subcomponent 1200.

Tapered Configurations and Associated Features

Figure 14A:
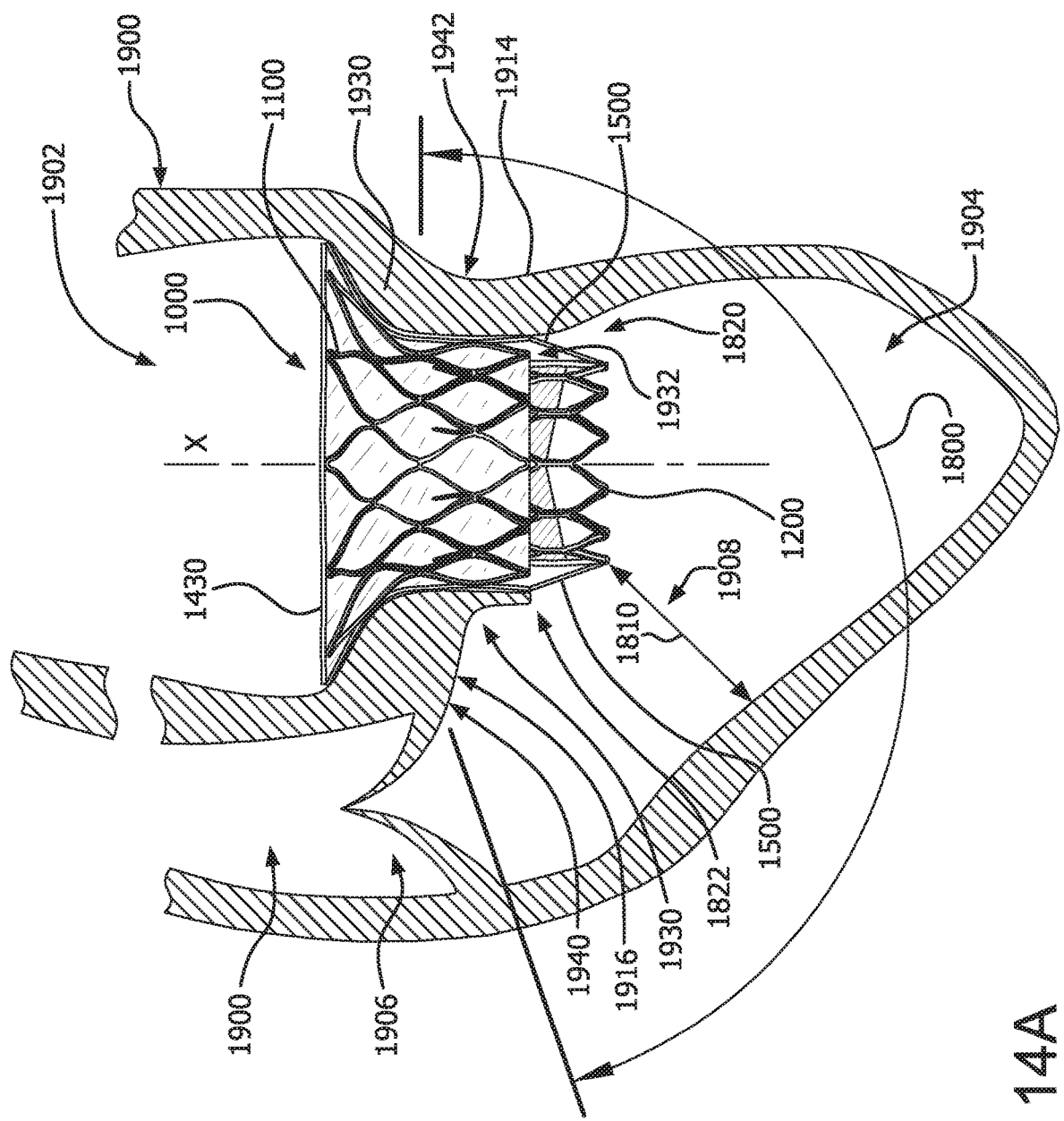
FIGS. 14A-14C show prosthetic valves as implanted in varying patient anatomies, according to some embodiments.
Figure 14B:
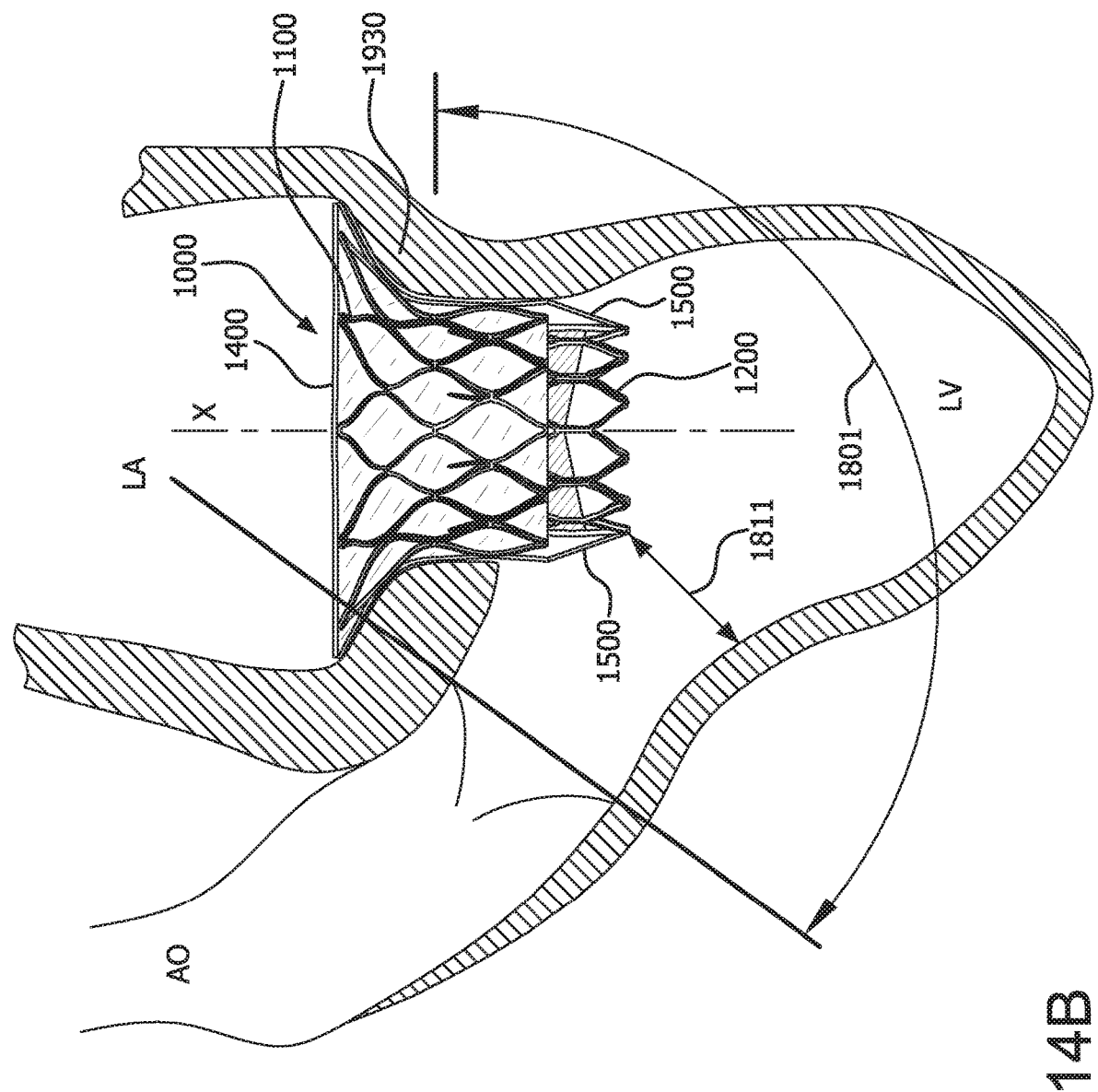
Figure 14C:
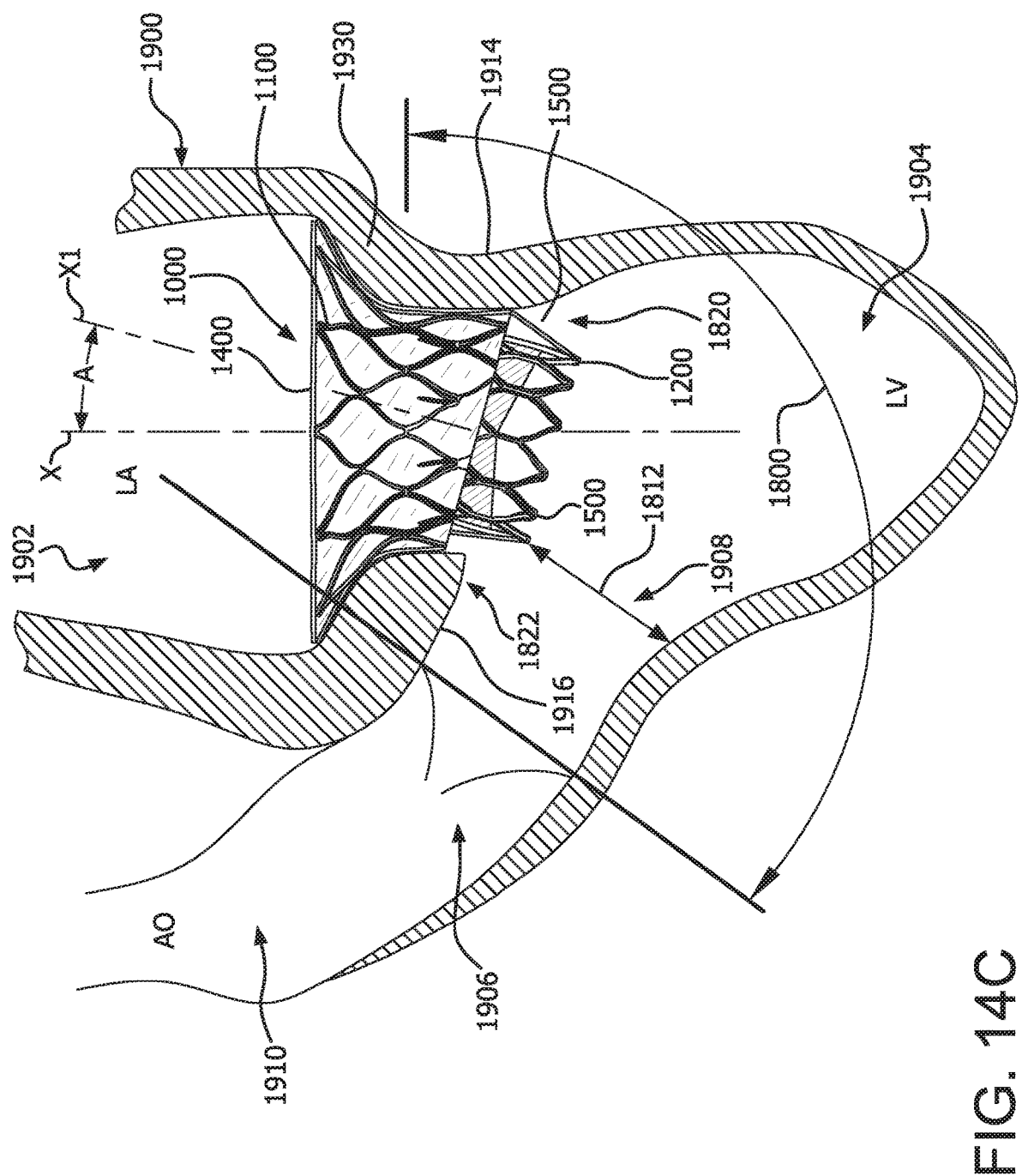

As shown in FIG. 14C, the length of the anchor frame subcomponent 1100 varies along the circumference, for example, when viewed transverse to the axis X, the anchor frame subcomponent outflow end 1104 has a tapered geometry, in some embodiments. As shown, the anchor frame subcomponent 1100 can be oriented along the X-axis and the leaflet frame subcomponent 1200 can be oriented along the X1-axis which is off-set to the X-axis. FIG. 14C shows an embodiment in which "off-set" can refer to an arrangement wherein the X1-axis can be angled from the X1-axis (e.g., the X-axis and the X1-axis are non-collinear or non-parallel) such that the leaflet frame subcomponent 1200 is generally tilted with respect to the anchor frame subcomponent 1100. In one embodiment, the second longitudinal axis is disposed at a tilt angle A between 15° and 45° relative to the first longitudinal axis. In another embodiment, the leaflet frame subcomponent outflow end 1204 is generally parallel with the anchor frame subcomponent outflow end 1104, wherein the anchor frame subcomponent outflow end 1104 has a taper as characterized as having a length that varies around the circumference. In this orientation, the extension of the leaflet frame subcomponent outflow end 1204 into the LVOT is reduced as compared with a coaxial anchor frame subcomponent 1100 and leaflet frame subcomponent 1200, as shown by comparing FIG. 14B with FIG. 14C.

Additional Prosthetic Valve Delivery Features

FIGS. 15A-15L are provided additional examples of features and associated methods for delivering the prosthetic valve 1000, according to some examples. In various examples, the delivery device 1600 incorporates elements to facilitate the advancement and deployment of the anchor frame subcomponent 1100 and the leaflet frame subcomponent 1200. In accordance with some embodiments, the advancement of the leaflet frame subcomponent 1200 into the anchor frame subcomponent 1100 is facilitated by moving or staged withdrawal of the delivery catheter 1604. In accordance with other embodiments, the advancement of the leaflet frame subcomponent 1200 into, the anchor frame subcomponent 1100 is facilitated by moving internal components of the delivery catheter 1604, such as, but not limited to the leaflet frame subcomponent 1200 riding on a trolley advanced by a pulling of a tether elements 1714 or by elastic bias of the inflow annular groove cover 1400 and/or the outflow annular groove cover 1500 or an internal component of the delivery device. An embodiment of a sliding trolley (not shown) may be a larger diameter tubular member operable to be slidingly received onto a smaller diameter delivery catheter 1604. The trolley may be constrained from sliding on the delivery catheter 1604 by a retention means, such as, but not limited to, tether elements 1714 or a latch.

Figure 15A:
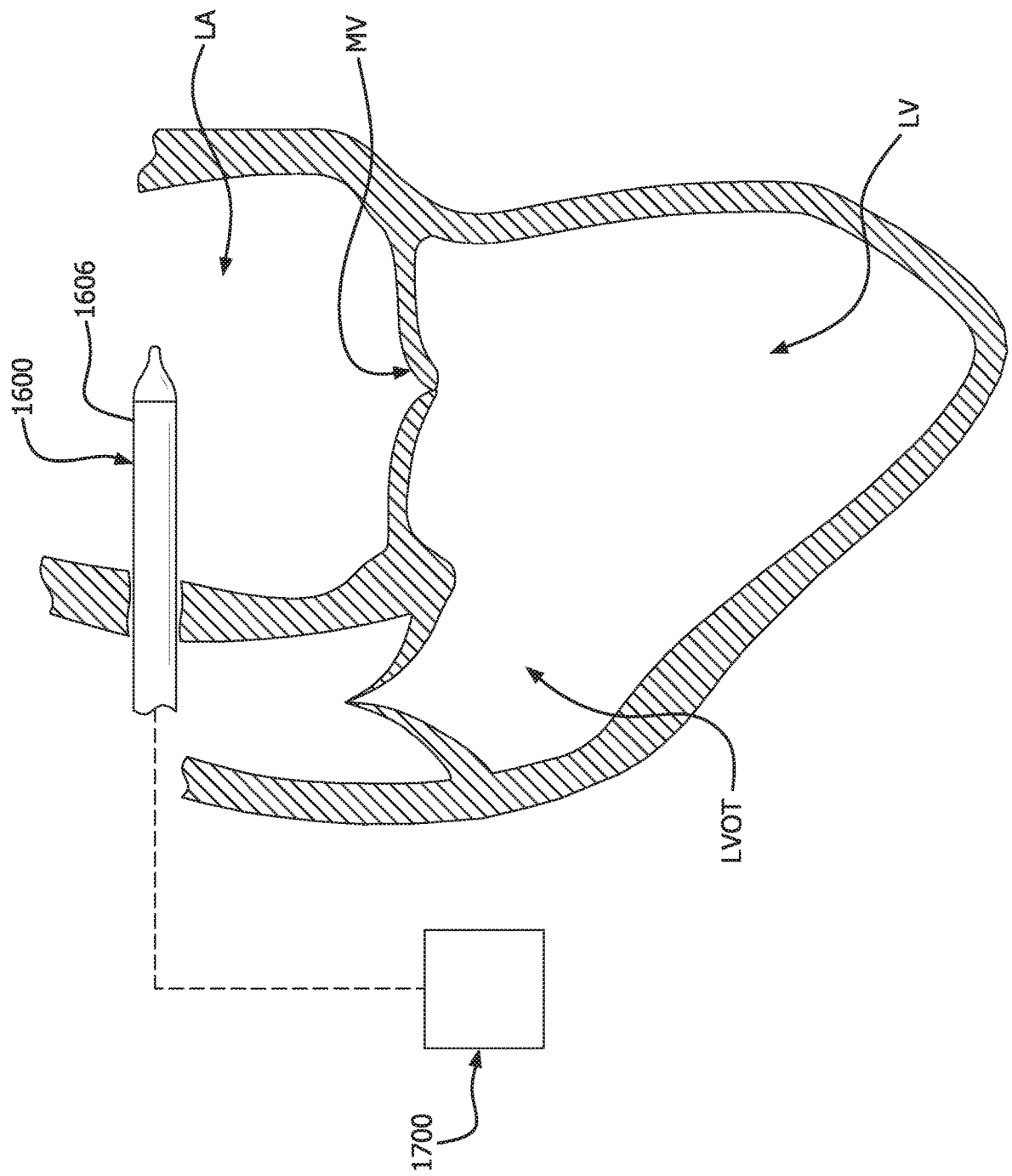
FIGS. 15A-15L are illustrative of a delivery device and deployment sequence for treating a patient with a prosthetic valve, according to some embodiments.
Figure 15B:
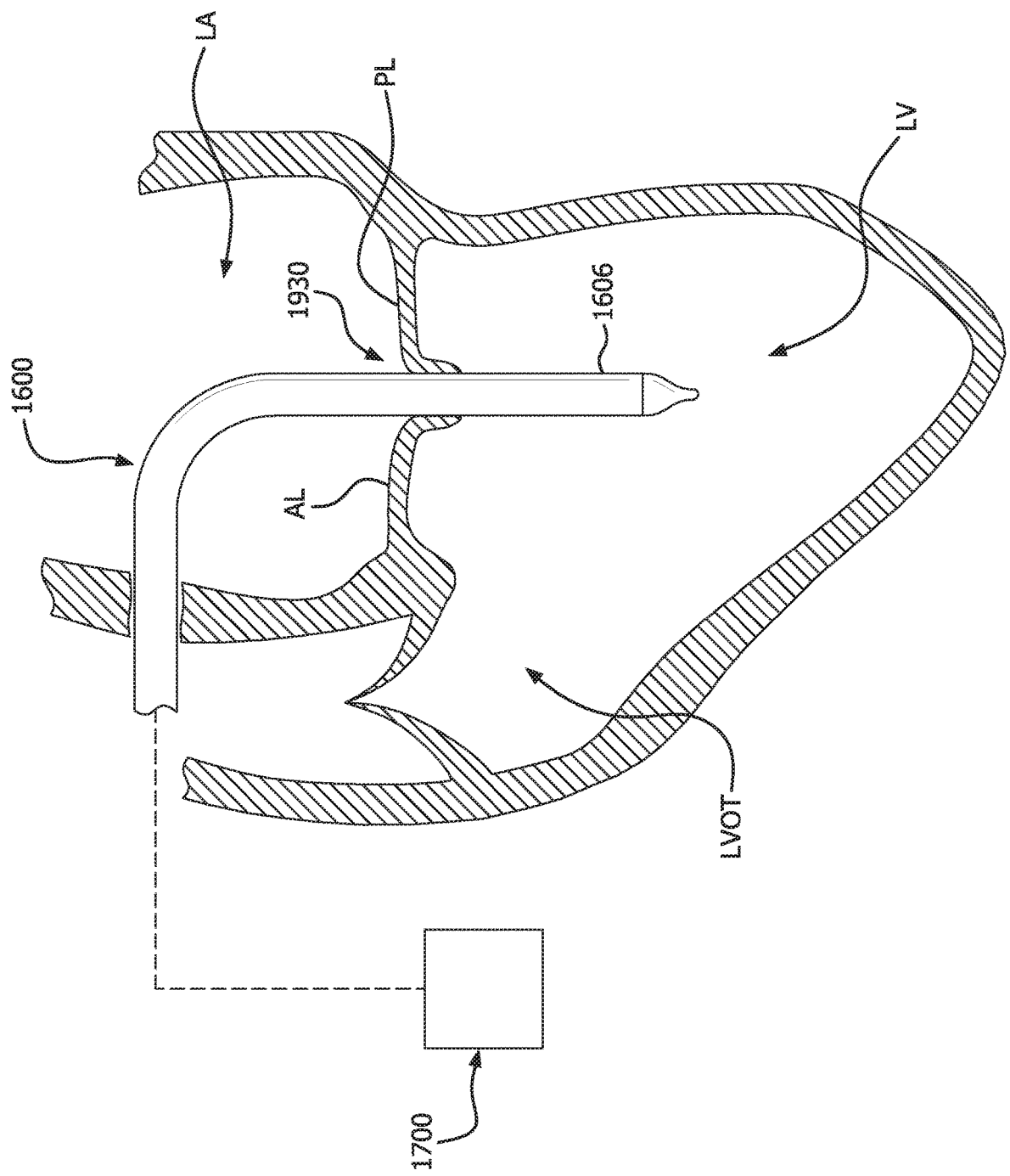

With reference to FIGS. 15A-15L a non-limiting exemplary deployment sequence and nesting configuration of the prosthetic valve 1000 in-situ during a mitral valve ("MV") replacement procedure is shown, with a cross-section of a portion of the heart for illustrative purposes. In FIG. 15A, the left atrium ("LA") is accessed transseptally by a delivery device 1600. In various examples, the delivery device 1600 delivered percutaneously and is coupled to a control system 1700 outside of the body. Accessing the left atrium transseptally can be done in accordance with techniques as known those of skilled in the art. Upon gaining access to the left atrium transseptally, the delivery device 1600 is positioned for deployment of the prosthetic valve 1000. For example, as shown in FIG. 15B, the delivery device 1600 is advanced through the mitral valve and into the left ventricle ("LV"). In some examples, advancement of the delivery device 1600 through the mitral valve causes the anterior leaflet ("AL") and the posterior leaflet ("PL") of the mitral valve to deflect into the left ventricle.

For reference, FIGS. 15A-15L show a cross-sectional view of a heart illustrating exemplary medical device delivery procedures using the delivery device 1600 to implant the prosthetic valve 1000 into a mitral valve tissue annulus 1930, according to some embodiments.

FIG. 15A shows the delivery device 1600 including a constraining sheath 1606 covering the prosthetic valve (1000, hidden from view). The constraining sheath 1606 is a tubular member that is operable to cover the prosthetic valve 1000 while constrained on the delivery device 1600. In FIG. 15A, the delivery device 1600 is shown entering the left atrium (LA) in a transseptal procedure to access the mitral valve (MV), in this example. The delivery device 1600 is steerable and flexible to traverse the anatomy.

Figure 15C:
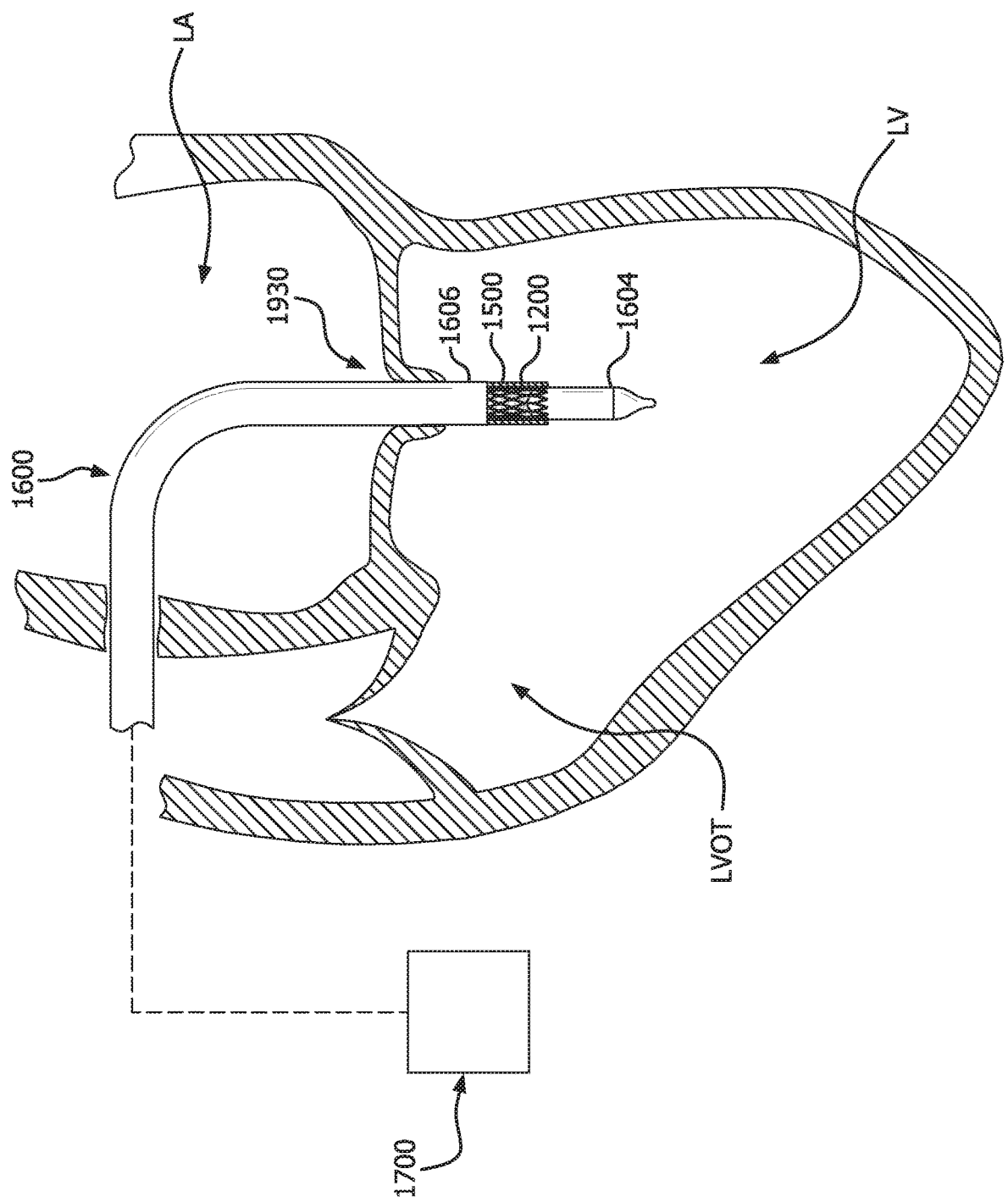

FIG. 15B shows the distal end of the delivery device 1600 being positioned through the mitral valve tissue annulus 1930. FIG. 15C shows the constraining sheath 1606 partially retracted to uncover the leaflet frame subcomponent 1200. Although the constraining sheath 1606 is shown covering the entire prosthetic valve 1000 in the initial stages of delivery, it should also be appreciated that the constraining sheath 1606 may only cover a portion of the prosthetic valve 1000 during positioning of the prosthetic valve (e.g., including, but not limited to when the prosthetic valve is passing through the vasculature, atrial septum, left atrium, and/or otherwise. In some examples, the constraining sheath 1606 is only extended over the anchor frame subcomponent 1100 during initial positioning of the prosthetic valve 1000 in the native valve tissue annulus 1930. Such a configuration may achieve a variety of advantages, including lower profiles and/or enhanced flexibility, as well as reduced compaction of the leaflet frame subcomponent 1200, and thus the leaflets 1230.

Figure 15D:
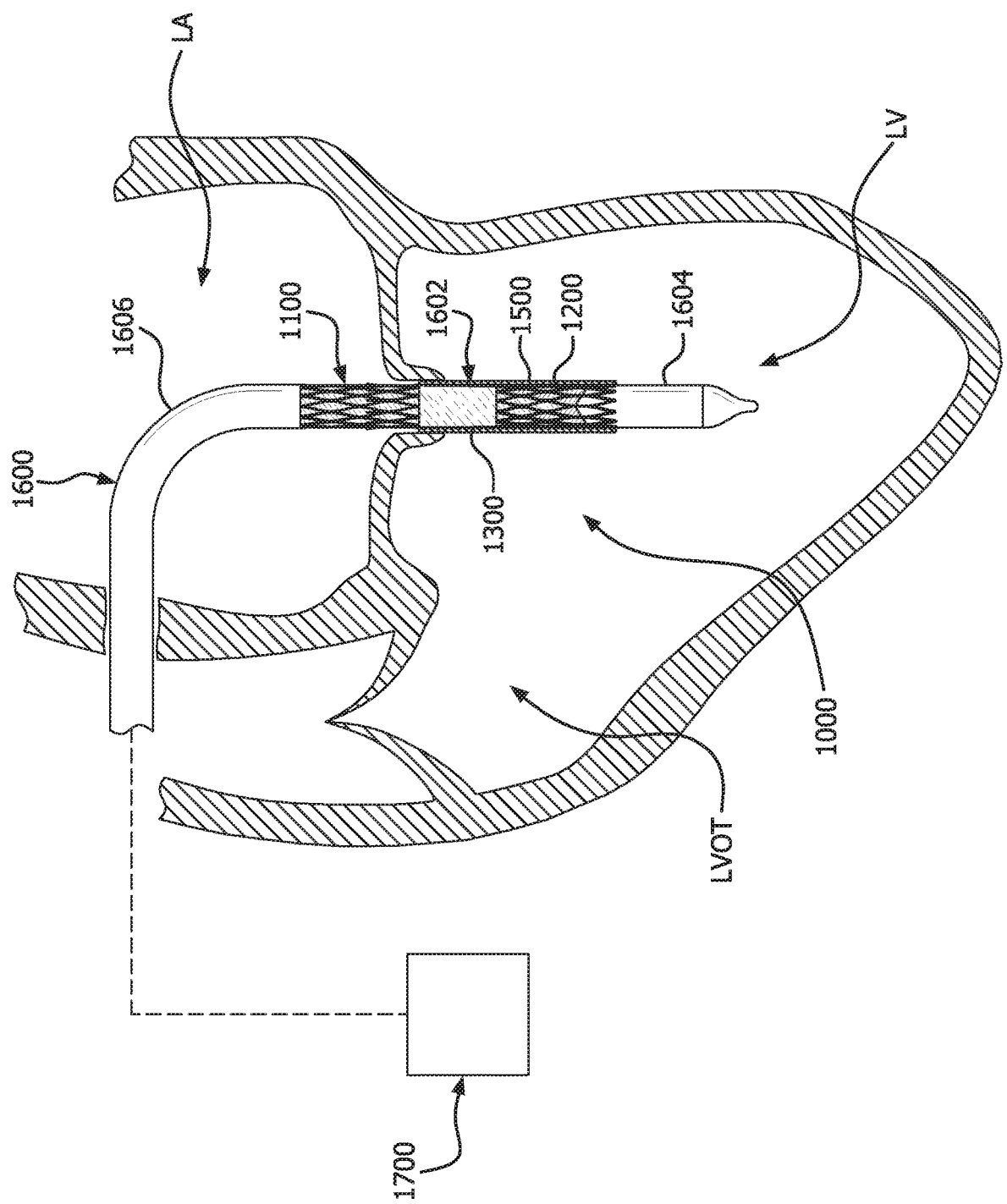

FIG. 15D shows the constraining sheath 1606 further retracted to fully uncover the connecting sheath 1300 and partially uncover the anchor frame subcomponent 1100. As now seen, the prosthetic valve 1000 is mounted on the delivery catheter 1604 in a pre-deployed, un-nested configuration with the anchor frame subcomponent 1100 and the leaflet frame subcomponent 1200 being longitudinally offset from one another (also referred to as being delivered in series) and coupled together with the connecting sheath 1300 therebetween, which is also shown in FIG. 12. The outflow annular groove cover 1500 can be seen, with the connecting sheath 1300 and the inflow annular groove cover 1400 being hidden from view.

As previously discussed and shown in FIG. 12, the leaflet frame subcomponent inflow end 1202 of the leaflet frame subcomponent 1200 is positioned distal to the anchor frame subcomponent outflow end 1104 of the anchor frame subcomponent 1100 with the connecting sheath 1300, the inflow annular groove cover 1400, and the outflow annular groove cover 1500 coupled thereto and positioned therebetween coupling them together.

Figure 15E:
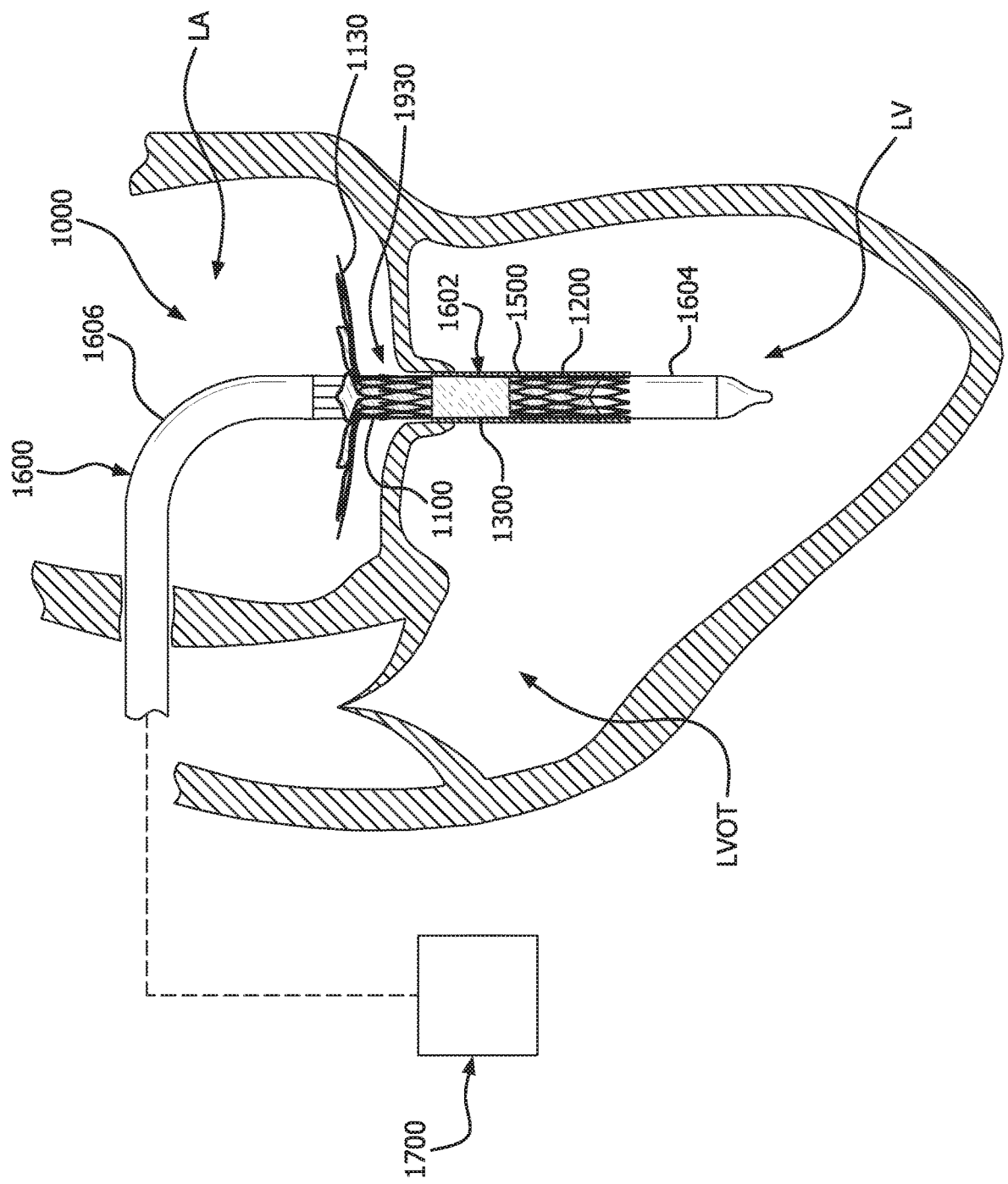
Figure 15F:
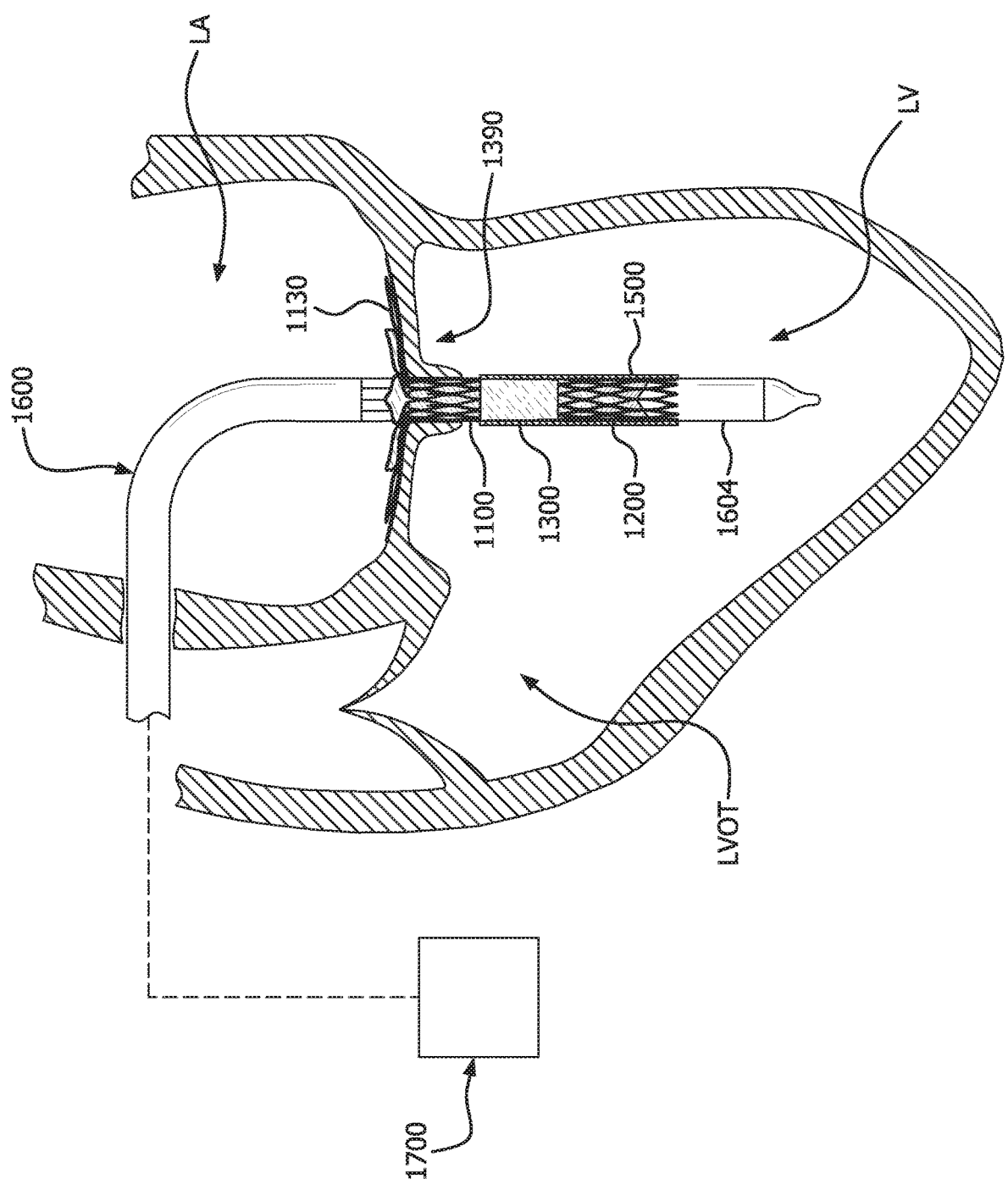
Figure 15G:
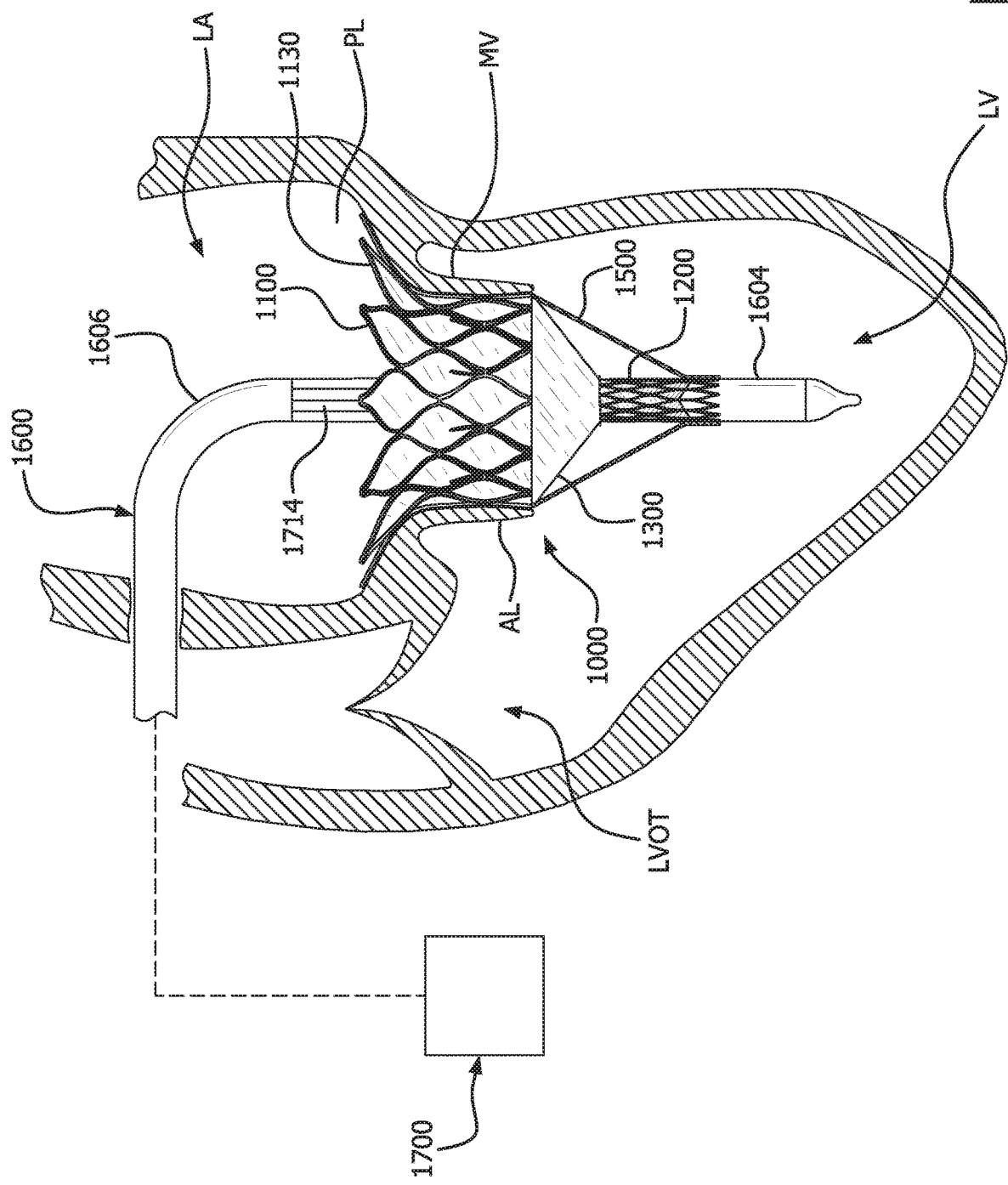

FIG. 15E shows the constraining sheath 1606 further retracted to fully uncover the anchor frame subcomponent 1100 which allows the flared portion 1130 to expand to a deployed configuration from the constrained configuration. In this example, the constraining sheath 1606 constrained the flared portion 1130, wherein in other examples other means of constraining may be used. The remaining portion of the anchor frame subcomponent 1100 and the leaflet frame subcomponent 1200 remain constrained to the delivery catheter 1604 by constraining elements 1716 as shown in FIG. 12. In various examples, withdrawal of a constraining sheath 1606 releases the flared portion 1130 as shown in FIGS. 2A and 2B or flange element of 1150 as shown in FIGS. 2C and 2D which engages the tissue annulus 1930, as shown in FIGS. 15E-15G. The other portions of the prosthetic valve 1000 are restrained to the delivery catheter 1604 by use of constraining elements 1716 such as fiber loops (FIG. 12). The prosthetic valve 1000 may be positioned and oriented within the tissue annulus 1930 by advancing and withdrawing and otherwise manipulating the delivery catheter 1604 or delivery device 1600 as a whole, for a particular purpose, such as to ensure correct orientation and engagement with the anatomical structure of the tissue annulus 1930 and surrounding tissue.

FIG. 15F shows the flared portion 1130 advanced to and placed in contact with the tissue annulus 1930. The delivery catheter 1604 or delivery device 1600 as a whole may be manipulated such that the flared portion 1130 and thus the anchor frame subcomponent 1100 may be positioned and repositioned suitable fora particular purpose. FIG. 15G shows the anchor frame expanded to a larger diameter of the deployed configuration. Before disengagement of the constraining elements 1716 that constrains the anchor frame subcomponent 1100 to the delivery catheter 1604, the position of the anchor frame subcomponent 1100 is verified, and if incorrect, the constraining elements 1716 may be used, such as by instilling tension to the constraining elements 1716 via a tether, for example, to re-constrain or recompress the anchor frame subcomponent 1100 back onto the delivery catheter 1604 for repositioning or removal.

As previously referenced, the anchor frame subcomponent 1100 optionally includes tissue engagement features 1118, such as those shown in FIGS. 2A-2D. In such instances, the constraining elements 1716 may constrain the deployment of the tissue engagement features 1118 so as to allow for repositioning or withdrawal of the anchor frame subcomponent 1100 from within the tissue annulus 1930. With the constraining elements 1716 constraining the deployment of the tissue engagement features 1118, such as tissue anchors, re-constraining, or recompressing and repositioning of the anchor frame subcomponent 1100 may be done without trauma to the tissue.

Figure 15H:
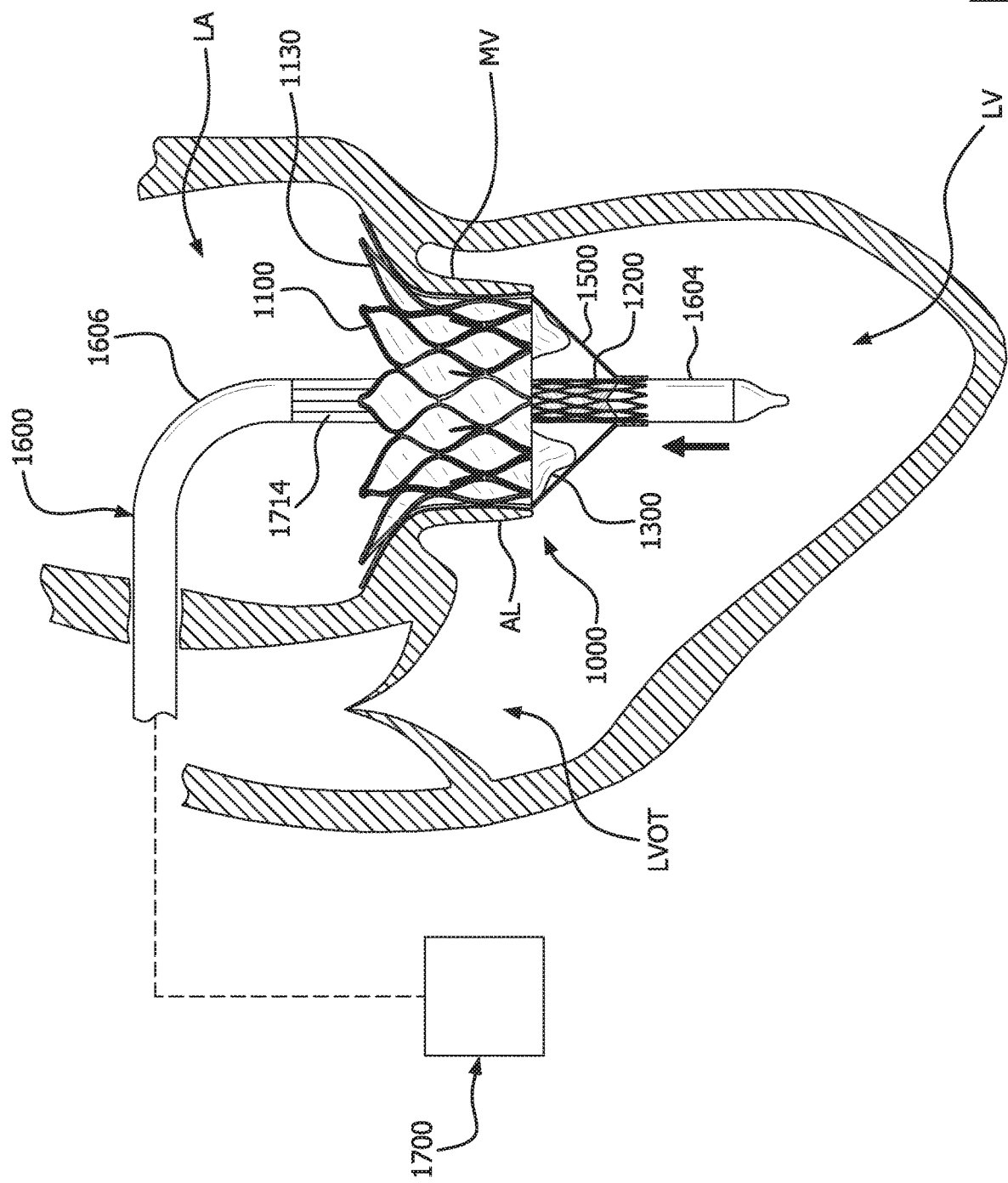

In various examples, after the anchor frame subcomponent 1100 is expanded, the anchor frame subcomponent 1100 and the leaflet frame subcomponent 1200 are nested together. In various examples, nesting of the anchor frame subcomponent 1100 and the leaflet frame subcomponent 1200 in-situ involves proximally advancing the leaflet frame subcomponent 1200 relative to the anchor frame subcomponent 1100. FIG. 15H illustrates the leaflet frame subcomponent 1200 as it is proximally advanced relative to the anchor frame subcomponent 1100 as indicated by the arrow. FIG. 15H shows the delivery catheter 1604 being withdrawn from the anchor frame subcomponent 1100 which pulls the connecting sheath 1300 and a portion of the leaflet frame subcomponent within the anchor frame subcomponent 1100 with the connecting sheath 1300 in the process of being everted therebetween.

Figure 15I:
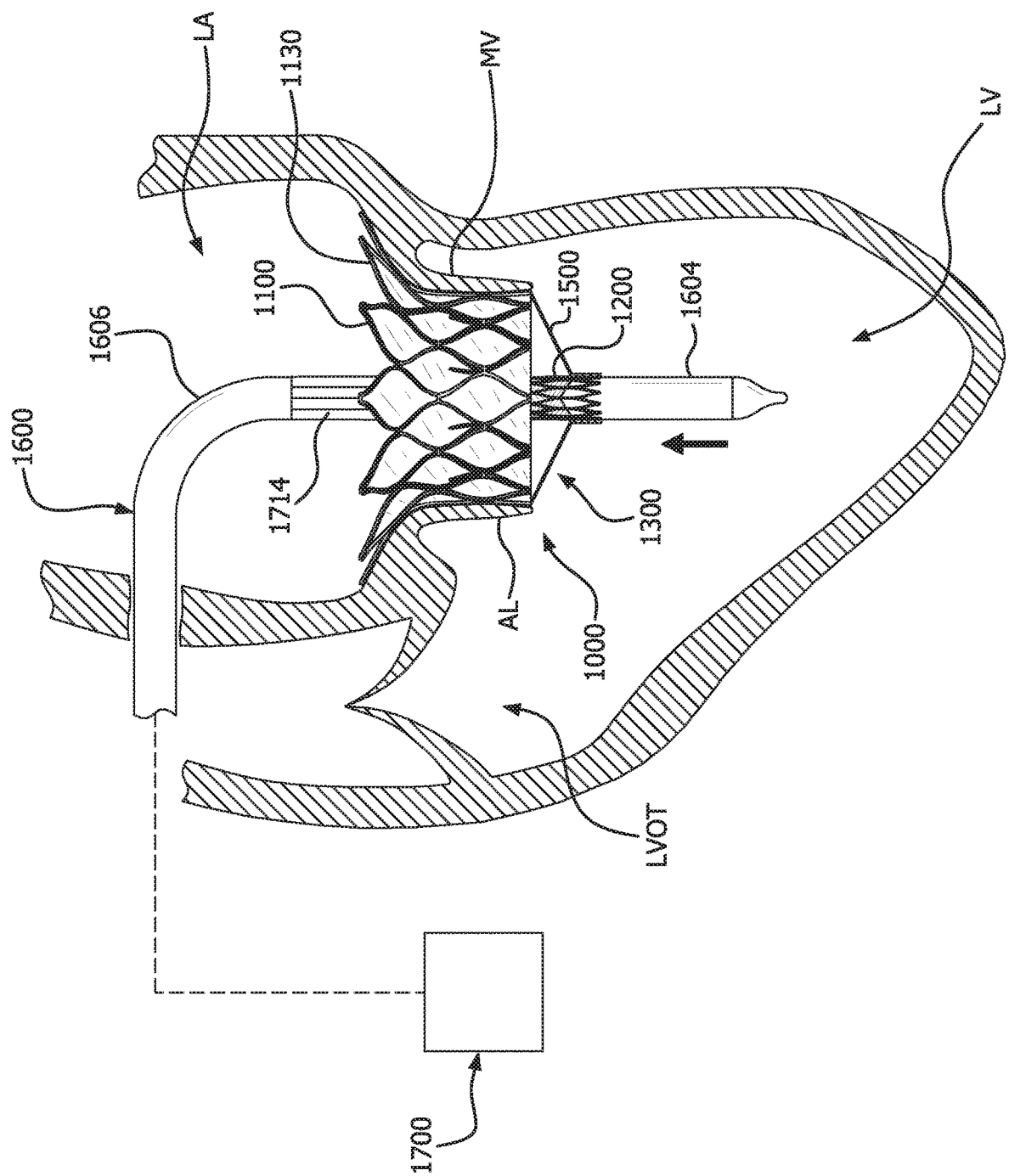

Alternatively, or in addition thereto, FIG. 15I shows the delivery catheter 1604 being further withdrawn from the anchor frame subcomponent 1100, and/or the pulling of tethers as discussed below, which pulls the connecting sheath 1300 and a portion of the leaflet frame subcomponent 1200 within the anchor frame subcomponent 1100 with the connecting sheath 1300 having been everted therebetween. As shown in FIG. 15I, one or more tether elements 1714 are coupled to the leaflet frame subcomponent inflow end 1202 as shown and discussed further below, which may be used to pull the leaflet frame subcomponent 1200 into the anchor frame subcomponent 1100.

If it is required to remove the prosthetic valve 1000 from the heart, in some examples, the leaflet frame subcomponent 1200 may be recompressed by the tether elements 1714 and the tether elements 1714 may be used to pull the leaflet frame subcomponent 1200 and subsequently the anchor frame subcomponent 1100 into the constraining sheath 1606 or a larger retrieval sheath (not shown). In this case, the anchor frame subcomponent 1100 is caused to evert initiating at the anchor frame subcomponent outflow end 1104 such that it is drawn, peeled or pulled away from the tissue annulus. Thus, various examples provide a means for removing a prosthetic valve 1000 that is experiencing a failed deployment without the need for invasive surgical care.

Figure 15J:
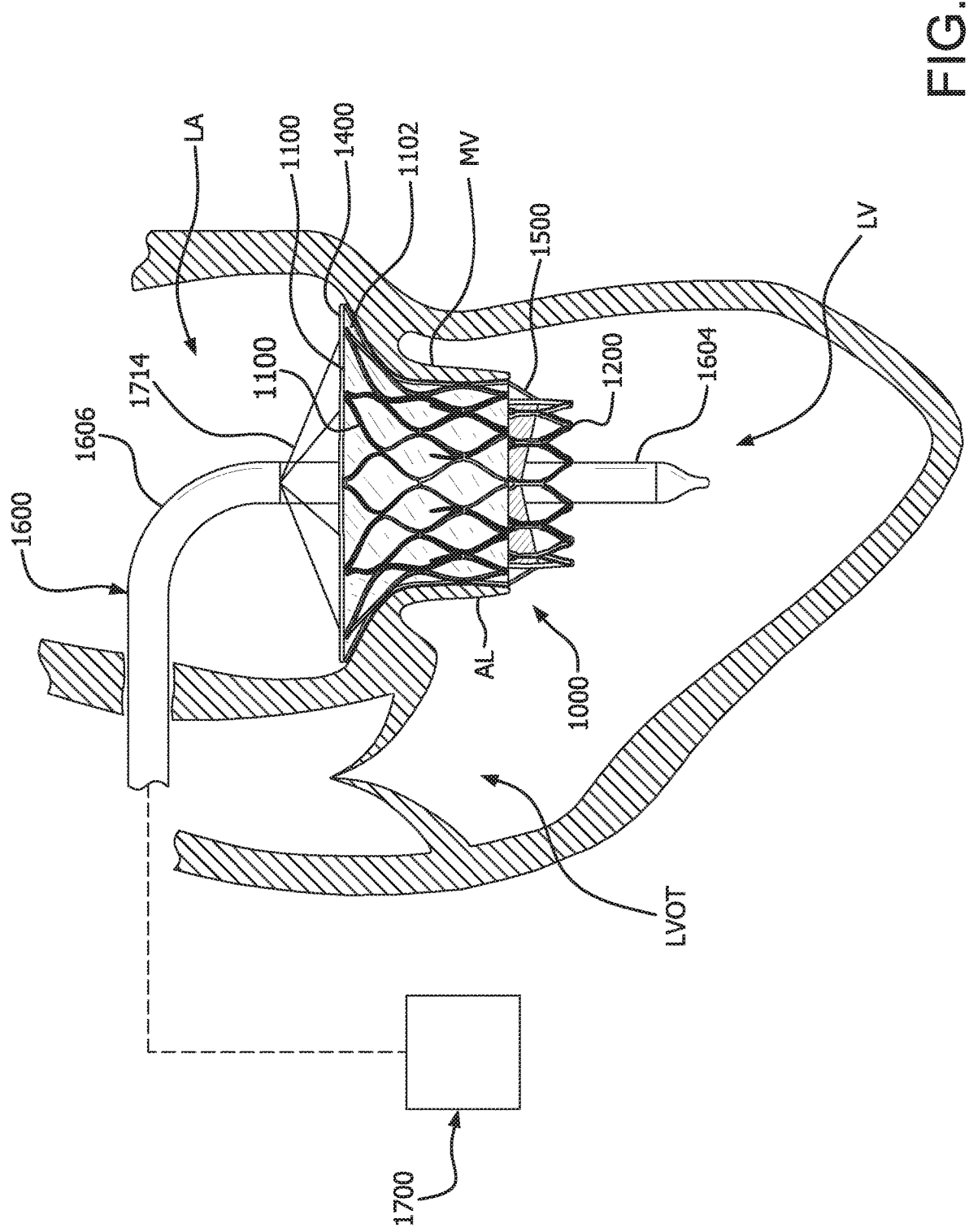
Figure 15K:
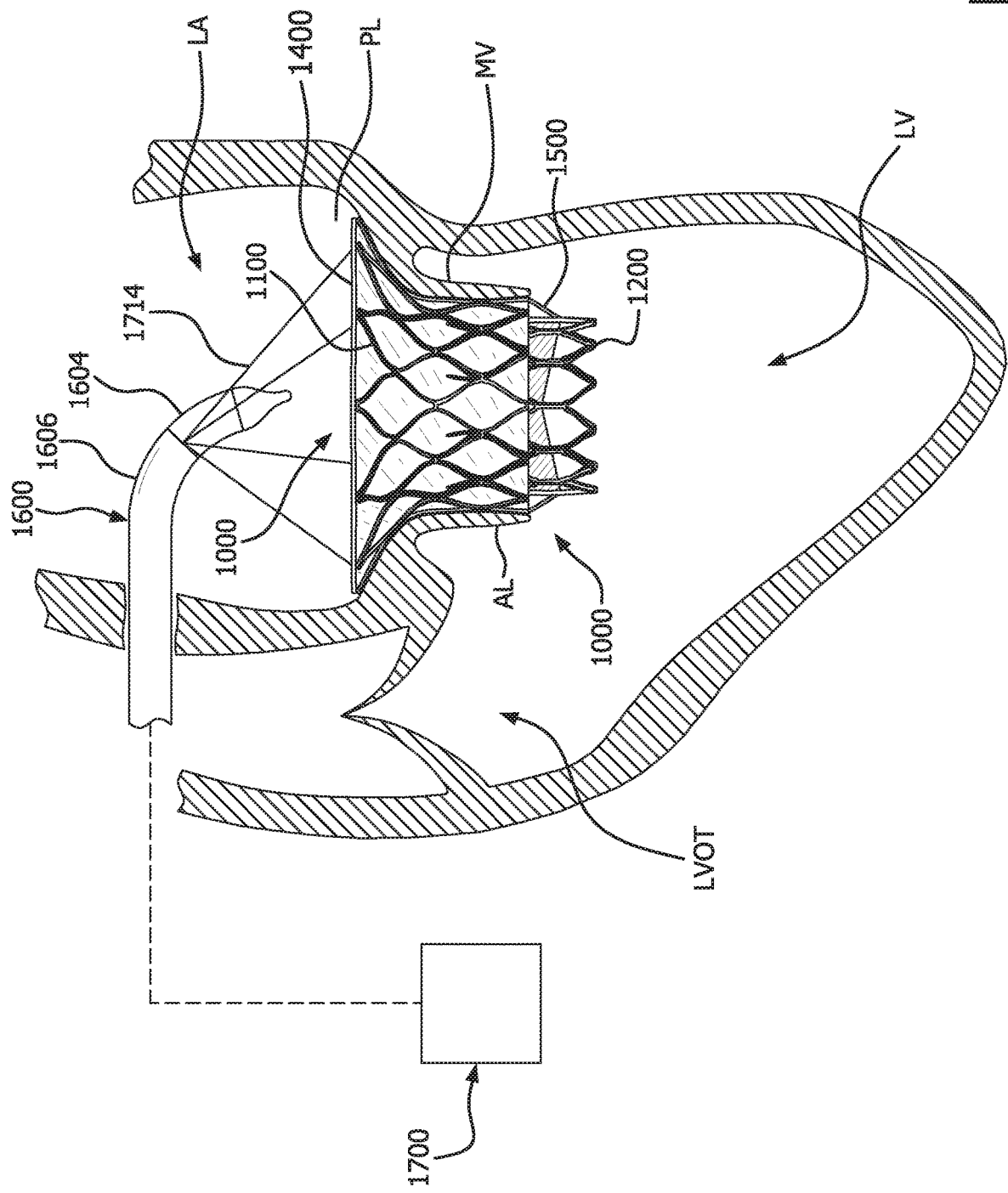

In various examples, while the leaflet frame subcomponent 1200 is being nested and expanded within the anchor frame subcomponent 1100, the tether elements 1714 are loosened allowing the inflow annular groove cover 1400 and the outflow annular groove cover 1500 to contract under elastic bias as shown in FIG. 15J so as to fully deploy over the inflow annular groove 1704 and the outflow annular groove 1706, respectively, as shown in FIG. 15K. The delivery catheter 1604 may be withdrawn from the prosthetic valve 1000, as shown in FIG. 15K, so as to verify that the leaflets 1230 are properly functioning prior to releasing the tether elements 1714 from the leaflet frame subcomponent 1200. If the leaflets 1230 are not functioning properly, the delivery catheter 1604 may be advanced adjacent to or within the leaflet frame subcomponent 1200 and the prosthetic valve 1000 removed with the procedure discussed above.

As previously discussed, additional tethers may be coupled to the leaflet frame subcomponent inflow end 1202 that are operable to constrain and pull the leaflet frame subcomponent 1200 out of the anchor frame subcomponent 1100 should repositioning and/or retrieval of the prosthetic valve 1000 be required.

Figure 15L:
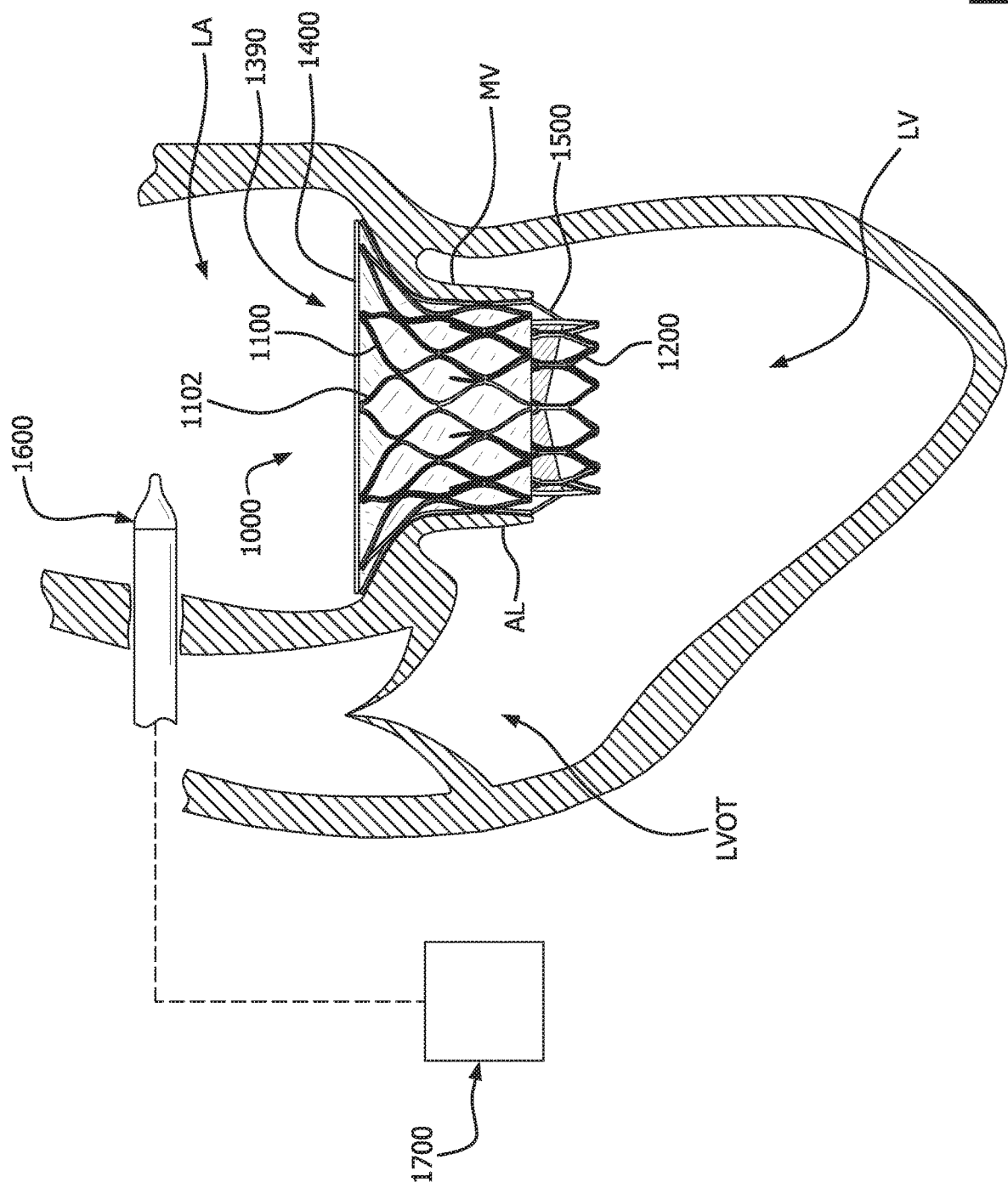

FIG. 15L shows the prosthetic valve 1000 fully deployed within the tissue annulus 1930 of the mitral valve (MV). The prosthetic valve 1000 is in a fully deployed configuration wherein the anchor frame subcomponent 1100 and the leaflet frame subcomponent 1200 are nested. The prosthetic valve 1000 is fully deployed and operational with the inflow annular groove cover 1400 and the outflow annular groove cover 1500 engaging the anchor frame subcomponent 1100 and the leaflet frame subcomponent 1200 which minimizes relative axial translation between the anchor frame subcomponent 1100 and the leaflet frame subcomponent 1200 and covers the inflow gap 1702 and inflow annular groove 1704, as well as the outflow gap 1705 and outflow annular groove 1706, respectively.

In various examples, the longitudinal separation or offset of the anchor frame subcomponent 1100 and the leaflet frame subcomponent 1200 provides for a low-profile delivery configuration that can be easily tracked through the vasculature of the patient. For instance, by longitudinally offsetting the anchor frame subcomponent 1100 and the leaflet frame subcomponent 1200, a profile of the delivery device 1600 can be minimized because, unlike conventional designs, the anchor frame subcomponent 1100 and the leaflet frame subcomponent 1200 do not overlap one another during delivery. In some examples, a maximum profile of the delivery device 1600 including the prosthetic valve 1000 can be 8 mm or less.

Additionally, as shown in FIGS. 12 and 15D, a region 1602 of the delivery device 1600 located between the anchor frame subcomponent 1100 and the leaflet frame subcomponent 1200 and adjacent to the connecting sheath 1300 and the inflow annular groove cover 1400 and the outflow annular groove cover 1500 may be bendable, or otherwise operable to bend, such that the anchor frame subcomponent 1100 and the leaflet frame subcomponent 1200 are temporarily misaligned with one another. In some examples, such a configuration is akin to rail cars navigating a curve. Such a configuration is beneficial in procedures where the prosthetic valve 1000 is delivered to a treatment region transseptally, which may require a delivery device to bend as much as ninety (90) degrees or more within the left atrium of the heart.

Additionally, as shown, the tissue engagement features 1118 of the anchor frame subcomponent 1100 extend away from the longitudinal axis of the anchor frame subcomponent 1100 and are configured to engage the tissue of the native valve tissue annulus surrounding the prosthetic valve 1000. In some examples, the tissue engagement features 1118 are configured to penetrate the tissue or otherwise embed within the tissue. In various examples, this interaction of the tissue engagement features 1118 of the anchor frame subcomponent 1100 with the native tissue surrounding the prosthetic valve 1000 operates to secure the anchor frame subcomponent 1100 (and thus the leaflet frame subcomponent 1200) to the native tissue of the tissue annulus 1930.

As shown, the anchor frame subcomponent inflow end 1102 of the anchor frame subcomponent 1100 illustrated in FIGS. 15B-15L is flared radially outward and is situated adjacent to and in abutment with the native valve tissue annulus 1930, as shown. In some examples, such a configuration provides that the anchor frame subcomponent inflow end 1102 of the anchor frame subcomponent 1100 obstructs or otherwise limits the extent to which the anchor frame subcomponent 1100 is operable to extend through the native valve. For instance, in the case of a mitral valve replacement, such a flared anchor frame subcomponent inflow end 1102 limits the extent to which the anchor frame subcomponent 1100 can be advanced through the native mitral valve tissue annulus and into the left ventricle. In some examples, such flared anchor frame subcomponent inflow end 1102 additionally operates to minimize the potential for the anchor frame subcomponent 1100 to migrate distally.

FIG. 16 shows the leaflet frame subcomponent 1200 at a fully or partially expanded diameter, but not yet nested with the anchor frame subcomponent 1100 as part of a deployment sequence. As shown, the leaflet frame subcomponent 1200 optionally perf uses at this stage of deployment, where the leaflet subcomponent 1228 (FIG. 7) is at least partially operational to permit antegrade flow, while restricting retrograde flow. The leaflet frame subcomponent 1200 may then be nested within the anchor frame subcomponent 1100 as described above, such that the prosthetic valve 1000 takes on a final, deployed configuration.

While the embodiments and examples illustrated and described above pertain to transseptal delivery, it should be appreciated that a variety of additional well-known delivery procedures can be utilized without departing from the spirit or scope of the present application. Additional non-limiting delivery procedures include transapical, left atriotomy, and transaortic approaches, among others. The scope of the concepts addressed in this disclosure has been described above both generically and with regard to specific examples. It will be apparent to those skilled in the art that various modifications and variations can be made in the examples without departing from the scope of the disclosure. Likewise, the various components discussed in the examples discussed herein are combinable. Thus, it is intended that the examples cover the modifications and variations of the scope.

What is claimed is:

1. A prosthetic valve comprising:
   a leaflet frame subcomponent including a leaflet frame and having an inflow end and an outflow end;
   an anchor frame subcomponent including an anchor frame and having an inflow end and an outflow end,
   the anchor frame subcomponent being coupled to the leaflet frame subcomponent such that the prosthetic valve is configured to be transitioned from a delivery configuration in which the leaflet frame subcomponent and the anchor frame subcomponent are longitudinally offset from one another such that the inflow end of the leaflet frame subcomponent is situated distal of the outflow end of the anchor frame subcomponent to a deployed configuration in which the leaflet frame subcomponent is at least partially nested at a nested position within the anchor frame subcomponent such that the leaflet frame subcomponent and the anchor frame subcomponent define a pair of adjacent inflow end portions, a pair of adjacent outflow end portions, and an annular gap that includes an outflow annular groove between the leaflet frame subcomponent and the anchor frame subcomponent; and an outflow annular groove cover extending between the pair of adjacent outflow end portions to cover the outflow annular groove between the leaflet frame subcomponent and the anchor frame subcomponent when the prosthetic valve is in the deployed configuration.

2. The prosthetic valve of claim 1, wherein the annular gap includes an inflow annular groove and an inflow annular groove cover coupled between the pair of adjacent inflow end portions to cover the inflow annular groove when the prosthetic valve is in the deployed configuration.

3. The prosthetic valve of claim 1, wherein the outflow annular groove cover is configured to be blood-permeable under physiologic conditions prior to the prosthetic valve being transitioned to the deployed configuration.

4. The prosthetic valve of claim 1, wherein the outflow annular groove cover is configured to be less permeable to blood under physiologic conditions when the prosthetic valve is in the deployed configuration than when the prosthetic valve is not in the deployed configuration.

5. The prosthetic valve of claim 1, wherein the annular gap includes an inflow annular groove and an inflow annular groove cover coupled between the pair of adjacent inflow end portions to cover the inflow annular groove when the prosthetic valve is in the deployed configuration.

6. The prosthetic valve of claim 5, wherein the inflow annular groove cover is configured to be blood-permeable under physiologic conditions prior to the prosthetic valve being transitioned to the deployed configuration.

7. The prosthetic valve of claim 1, wherein the outflow annular groove cover is configured to be blood impermeable under physiologic conditions subsequent to the prosthetic valve being transitioned to the deployed configuration.

8. The prosthetic valve of claim 1, wherein the outflow annular groove cover is transitionable from an extended configuration when the prosthetic valve is in the delivery configuration to a retracted configuration when the prosthetic valve is transitioned to the deployed configuration.

9. The prosthetic valve of claim 8, wherein the outflow annular groove cover is substantially wrinkle-free in the retracted configuration.

10. The prosthetic valve of claim 8, wherein the outflow annular groove cover has an elastic bias that causes the outflow annular groove cover to resiliently recoil from the extended configuration to the retracted configuration when the prosthetic valve transitions from the delivery configuration to the deployed configuration.

11. The prosthetic valve of claim 8, wherein the outflow annular groove cover has an annular wall that is configured to angulate relative to a longitudinal axis of the prosthetic valve upon transitioning the outflow annular groove cover from the extended configuration to the retracted configuration.

12. The prosthetic valve of claim 8, wherein the outflow annular groove cover includes a porous elastic film that when in the extended configuration defines pores large enough to render the porous elastic film blood-permeable under physiologic conditions and when in the retracted configuration the pores are small enough to render the porous elastic film less permeable to blood under physiologic conditions.

13. The prosthetic valve of claim 1, wherein the outflow annular groove cover includes a composite material formed of a fluoropolymer membrane that has been imbibed with an elastomeric material.

14. The prosthetic valve of claim 1, wherein the outflow annular groove cover includes at least one of a pleated configuration, a sinuous folded configuration, or a zig-zag folded configuration when the prosthetic valve is in the deployed configuration.

15. The prosthetic valve of claim 1, wherein the outflow annular groove cover is configured to provide a bias for translating the leaflet frame subcomponent to the nested position within the anchor frame subcomponent.

16. The prosthetic valve of claim 15, wherein the bias is sufficient to longitudinally translate the leaflet frame subcomponent into the anchor frame subcomponent when the leaflet frame subcomponent is longitudinally unconstrained relative to the anchor frame subcomponent.

17. The prosthetic valve according to claim 1, wherein:
at least a portion of the outflow annular groove cover is configured for tissue ingrowth; and
at least a portion of the outflow annular groove cover is configured to resist tissue ingrowth.

18. The prosthetic valve of claim 1, further comprising a connecting sheath coupling the leaflet frame subcomponent to the anchor frame subcomponent such that upon transitioning the prosthetic valve to the deployed configuration, the connecting sheath is everted.

19. The prosthetic valve of claim 18, wherein the annular gap is defined by the anchor frame subcomponent, the connecting sheath, and the leaflet frame subcomponent.

20. The prosthetic valve of claim 18, further comprising an inflow annular groove cover coupled to and extending circumferentially adjacent an anchor frame subcomponent inflow end and a leaflet frame subcomponent inflow end, wherein:
the annular gap includes an inflow annular groove formed by the anchor frame subcomponent, the connecting sheath, and the leaflet frame subcomponent; and
the inflow annular groove cover is configured to cover the inflow annular groove when the prosthetic valve is in the deployed configuration.

21. The prosthetic valve of claim 20, wherein, when the prosthetic valve is in the deployed configuration, the inflow annular groove cover and the outflow annular groove cover are configured to have lower permeability to blood than when the prosthetic valve is not in the deployed configuration.

22. The prosthetic valve of claim 20, wherein, after initiation but prior to completion of transitioning the prosthetic valve to the deployed configuration, the inflow annular groove cover and the outflow annular groove cover are configured to be blood permeable.

23. The prosthetic valve of claim 18, wherein the outflow annular groove is formed between the anchor frame subcomponent outflow end, the connecting sheath, a leaflet frame subcomponent outflow end.

24. The prosthetic valve of claim 23, wherein the outflow annular groove cover is coupled to and circumferentially extending from the anchor frame subcomponent outflow end and a leaflet frame cover outflow edge of the leaflet frame subcomponent.

25. The prosthetic valve of claim 18, wherein:
the connecting sheath is a thin-walled flexible tubular member that defines a connecting sheath lumen in fluid communication with an inner lumen of the anchor frame subcomponent and an inner lumen of the leaflet frame subcomponent when the prosthetic valve is in the delivery configuration; and
the connecting sheath is operable to fold and evert when the leaflet frame subcomponent is transitioned from the delivery configuration to the deployed configuration, such that the connecting sheath lies between the leaflet frame subcomponent and the anchor frame subcomponent.

26. The prosthetic valve of claim 18, wherein;
the connecting sheath comprises flow enabling features in a wall of the connecting sheath, the wall extending between a connecting sheath inflow end and a connecting sheath outflow end; and
the flow enabling features are operable to allow antegrade fluid flow through the connecting sheath wall and prevent retrograde flow through the connecting sheath wall after initiation, but prior to completion of, transitioning of the prosthetic valve to the deployed configuration.

27. The prosthetic valve of claim 18, wherein:
the connecting sheath comprises an inner film layer and an outer film layer, the inner film layer and the outer film layer being coupled together at least at a leaflet frame subcomponent inflow end and an anchor frame subcomponent outflow end;
the inner film layer defines at least one inner film aperture therethrough adjacent the anchor frame subcomponent outflow end;
the outer film layer defines at least one outer film aperture therethrough adjacent the leaflet frame subcomponent; and
the inner film layer and the outer film layer are not coupled at least between one of the at least one inner film aperture and one of the at least one outer film aperture so as to define a flow space therebetween operable to permit antegrade blood flow and restrict retrograde flow therethrough after initiation, but prior to completion, of transitioning of the prosthetic valve to the deployed configuration.

28. The prosthetic valve of claim 18, wherein:
the connecting sheath comprises an inner film layer and an outer film layer, the inner film layer and the outer film layer being coupled together at least at an anchor frame subcomponent outflow end;
the inner film layer defines at least one inner film aperture therethrough adjacent the anchor frame subcomponent outflow end; and
the inner film layer and the outer film layer are not coupled at least downstream of the at least one inner film aperture so as to define a flow space therebetween operable to permit antegrade blood flow with the inner film layer separating from the outer film layer at the at least one inner film aperture and restrict retrograde flow therethrough with the inner film layer coming together and covering the at least one inner film aperture after initiation, but prior to completion, of transitioning of the prosthetic valve to the deployed configuration.

29. The prosthetic valve according to claim 1, wherein the leaflet frame subcomponent includes a leaflet frame wall, one or more leaflets coupled to the leaflet frame wall, and a leaflet frame cover coupled to the leaflet frame wall, the leaflet frame wall being generally tubular in shape and defining a leaflet frame inflow end and a leaflet frame outflow end.

30. The prosthetic valve of claim 29, wherein the leaflet frame wall includes one or more openings at least partially covered by the leaflet frame cover to define a covered portion of the leaflet frame wall, such that the leaflet frame cover is configured to restrict fluid from passing through the covered portion of the leaflet frame wall.

31. The prosthetic valve of claim 29, wherein the one or more leaflets coupled to the leaflet frame wall are operable to:
open to allow flow from the leaflet frame subcomponent inflow end to pass through the leaflet frame subcomponent outflow end in antegrade flow conditions; and
close to restrict flow from flowing from the leaflet frame subcomponent outflow end through the leaflet frame subcomponent inflow end in retrograde flow conditions.

32. The prosthetic valve of claim 29, wherein the one or more leaflets comprise a composite material including a porous synthetic fluoropolymer membrane defining pores and an elastomer or elastomeric material filling the pores.

33. The prosthetic valve according to claim 1, wherein;
the anchor frame subcomponent further includes an anchor frame cover;
the anchor frame defines a generally tubular shape;
an anchor frame inner surface and an anchor frame outer surface define an anchor frame wall of the anchor frame; and
the anchor frame wall defines one or more apertures at least partially covered by the anchor frame cover to define a covered portion of the anchor frame wall, such that the anchor frame cover is configured to restrict fluid from passing through the anchor frame wall.

34. The prosthetic valve of claim 33, wherein a connecting sheath is contiguous with the anchor frame cover and a leaflet frame cover.

35. The prosthetic valve according to claim 1, wherein when the prosthetic valve is in the deployed configuration, the anchor frame defines a flared portion at the inflow end of the anchor frame that flares radially outward.

36. The prosthetic valve according to claim 1, wherein the prosthetic valve has a smaller diameter in the delivery configuration than in the deployed configuration.

37. The prosthetic valve according to claim 1, wherein, in the deployed configuration, the anchor frame subcomponent has an inner surface defining an inner diameter larger than a portion of the leaflet frame subcomponent that is nested within the anchor frame subcomponent.

38. A method of treating a native valve of a patient's anatomy comprising:
advancing a prosthetic valve in a delivery configuration to a treatment site within a patient's anatomy, wherein in the delivery configuration a leaflet frame subcomponent and an anchor frame subcomponent of the prosthetic valve are longitudinally offset from one another such that a leaflet frame subcomponent inflow end of the leaflet frame subcomponent is situated distal of an anchor frame subcomponent inflow end of the anchor frame subcomponent;
deploying the anchor frame subcomponent within a tissue annulus; and
nesting the leaflet frame subcomponent within the anchor frame subcomponent by changing a relative longitudinal position between the leaflet frame subcomponent and the anchor frame subcomponent such that the leaflet frame subcomponent is at least partially nested at a nested position within the anchor frame subcomponent such that the leaflet frame subcomponent and the anchor frame subcomponent define a pair of adjacent inflow end portions, a pair of adjacent outflow end portions and an annular gap that includes an outflow annular groove between the leaflet frame subcomponent and the anchor frame subcomponent, wherein, during nesting of the leaflet frame subcomponent within the anchor frame subcomponent, an outflow annular groove cover of the prosthetic valve that extends between the pair of adjacent outflow end portions transitions from an extended configuration to a retracted configuration to cover the outflow annular groove.

39. A prosthetic valve comprising:

a leaflet frame subcomponent including a leaflet frame and having an inflow end and an outflow end;

a leaflet subcomponent operably coupled to the leaflet frame subcomponent;

an anchor frame subcomponent including an anchor frame and having an inflow end and an outflow end, the leaflet frame subcomponent being configured to be in a nested configuration at a nested position at least partially within the anchor frame subcomponent; and one or more bridging members coupled between the leaflet frame subcomponent and the anchor frame subcomponent to bridge an outflow annular gap defined between the outflow end of the anchor frame and the outflow end of the leaflet frame in the nested configuration, the one or more bridging members being resiliently extendible and retractable in length between an extended configuration and a retracted configuration such that the leaflet frame subcomponent is translatable longitudinally relative to the anchor frame subcomponent.

* * * * *